US009123261B2

(12) United States Patent
Lowe

(10) Patent No.: US 9,123,261 B2
(45) Date of Patent: Sep. 1, 2015

(54) SURGICAL SIMULATION MODELS, MATERIALS, AND METHODS

(71) Applicant: Gaumard Scientific Company, Inc., Miami, FL (US)

(72) Inventor: Siobhain Lowe, Miami, FL (US)

(73) Assignee: Gaumard Scientific Company, Inc., Miami, FL (US)

( * ) Notice: Subject to any disclaimer, the term of this patent is extended or adjusted under 35 U.S.C. 154(b) by 130 days.

(21) Appl. No.: 13/752,242

(22) Filed: Jan. 28, 2013

(65) Prior Publication Data

US 2014/0011172 A1 Jan. 9, 2014

Related U.S. Application Data

(60) Provisional application No. 61/591,857, filed on Jan. 28, 2012.

(51) Int. Cl.
G09B 23/30 (2006.01)
(52) U.S. Cl.
CPC ...................................... G09B 23/30 (2013.01)
(58) Field of Classification Search
CPC ....................................................... G09B 23/30
USPC .................................................. 434/272, 273
See application file for complete search history.

(56) References Cited

U.S. PATENT DOCUMENTS

| | | | |
|---|---|---|---|
| 5,472,345 A * | 12/1995 | Eggert | 434/273 |
| 5,853,292 A | 12/1998 | Eggert et al. | |
| 6,193,519 B1 | 2/2001 | Eggert et al. | |
| 6,443,735 B1 | 9/2002 | Eggert et al. | |
| 6,503,087 B1 | 1/2003 | Eggert et al. | |
| 6,527,558 B1 | 3/2003 | Eggert et al. | |
| 6,758,676 B2 | 7/2004 | Eggert et al. | |
| 7,114,954 B2 | 10/2006 | Eggert et al. | |
| 7,192,284 B2 | 3/2007 | Eggert et al. | |
| 7,811,090 B2 | 10/2010 | Eggert et al. | |
| 7,866,983 B2 | 1/2011 | Hemphill et al. | |
| 7,976,312 B2 | 7/2011 | Eggert et al. | |
| 7,976,313 B2 | 7/2011 | Eggert et al. | |
| 8,016,598 B2 | 9/2011 | Eggert et al. | |
| 8,152,532 B2 | 4/2012 | Eggert et al. | |
| 8,197,259 B2 * | 6/2012 | Allen et al. | 434/273 |
| 8,419,438 B2 | 4/2013 | Eggert et al. | |
| 8,500,452 B2 | 8/2013 | Trotta et al. | |
| 8,517,740 B2 | 8/2013 | Trotta et al. | |
| 8,608,483 B2 | 12/2013 | Trotta et al. | |
| 8,678,831 B2 | 3/2014 | Trotta et al. | |

(Continued)

Primary Examiner — Robert J Utama
Assistant Examiner — Elroy S Crocker
(74) Attorney, Agent, or Firm — Haynes and Boone, LLP

(57) ABSTRACT

Devices, systems, and methods appropriate for use in medical training using a patient simulator, various anatomical inserts, and an integrated camera and computer system are disclosed. In some instances, a surgical simulator is provided that includes a uterine assembly. The uterine assembly simulates the appearance and feel of natural tissue and includes a plurality of materials arranged and dimensioned to simulate anatomic structures such as a right fallopian tube, a left fallopian tube, a right ovary, a left ovary, a uterus having a cervix, a bladder, ureters, a peritoneum, a uterine artery, a uterine vein, a plurality of ligaments, an ovarian artery, an ovarian vein, a perineum, and a vagina. In some implementations, at least the uterine artery, uterine vein, ovarian artery, and ovarian vein are in communication with a fluid supply such that each is pressurized with a blood-like fluid to simulate natural arteries and veins.

20 Claims, 111 Drawing Sheets

(56) References Cited

U.S. PATENT DOCUMENTS

| | | | |
|---|---|---|---|
| 8,696,362 B2 | 4/2014 | Eggert et al. | |
| 8,740,624 B2 | 6/2014 | Eggert et al. | |
| 2003/0091967 A1* | 5/2003 | Chosack et al. | 434/262 |
| 2009/0148822 A1 | 6/2009 | Eggert et al. | |

* cited by examiner

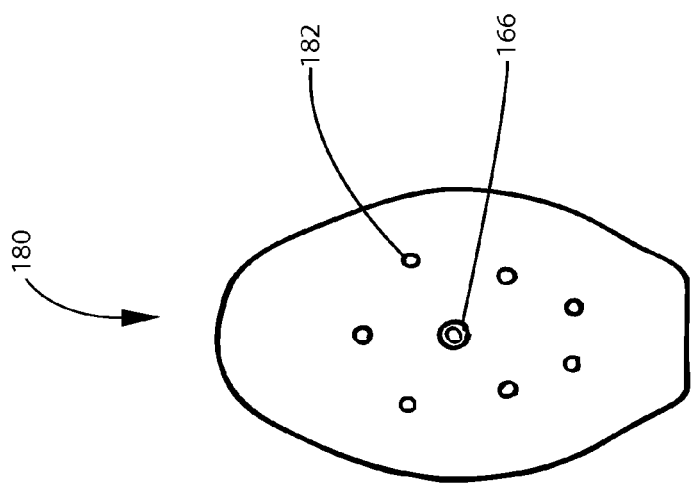

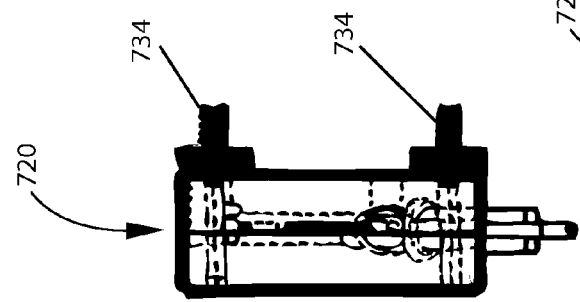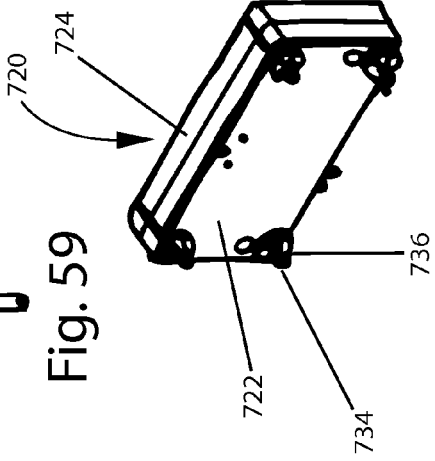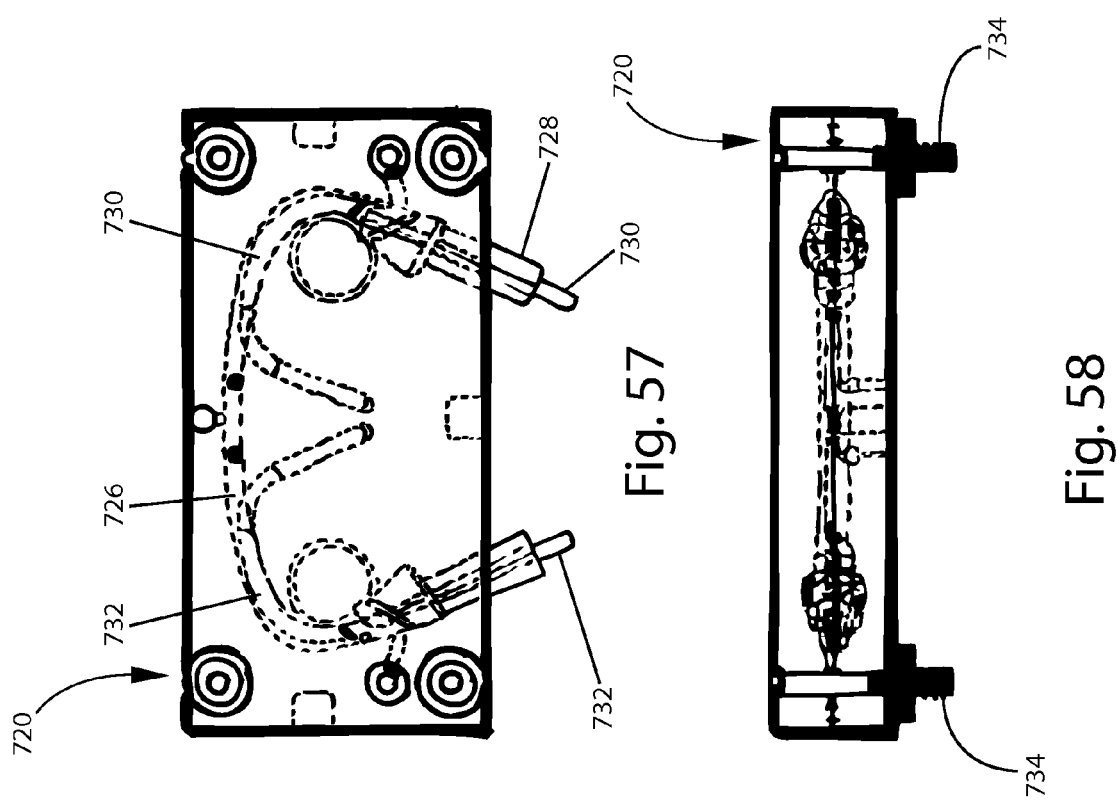

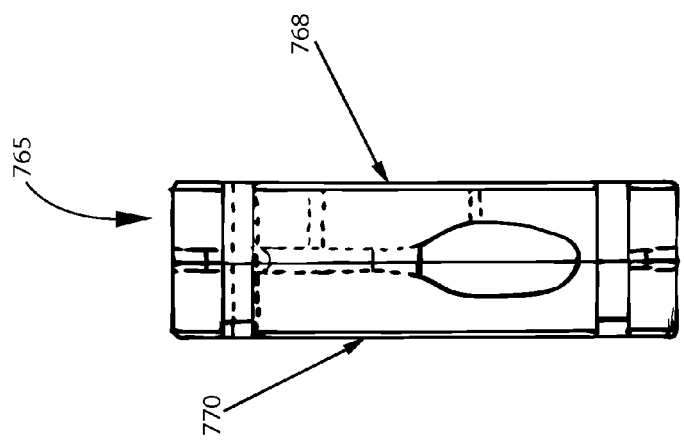
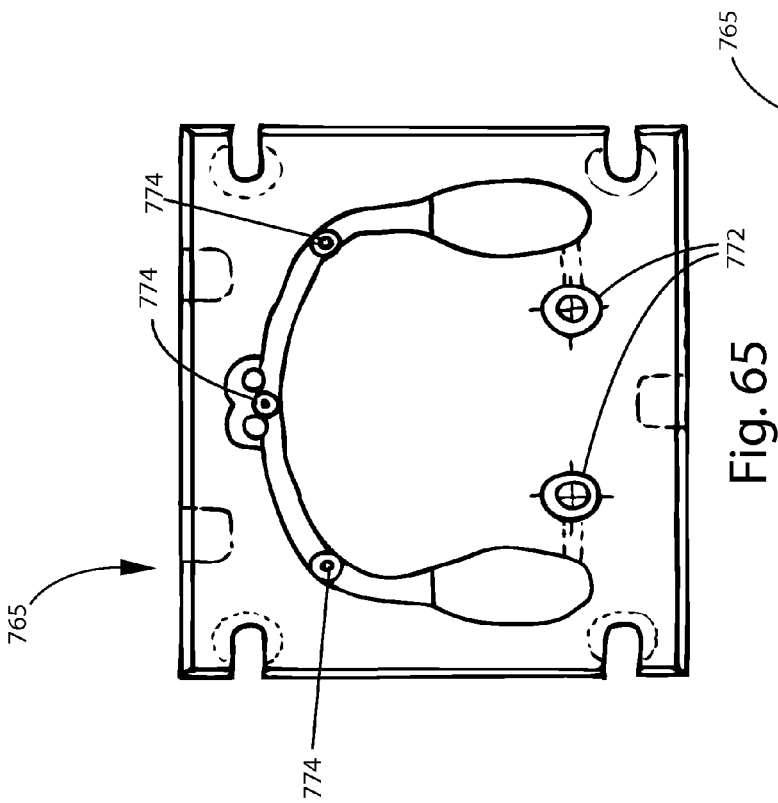
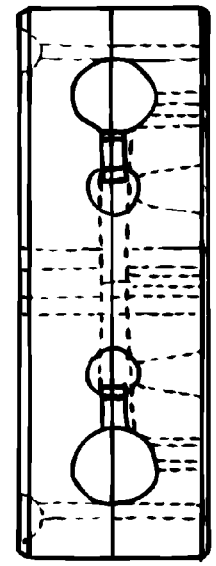
Fig. 67
Fig. 65
Fig. 66

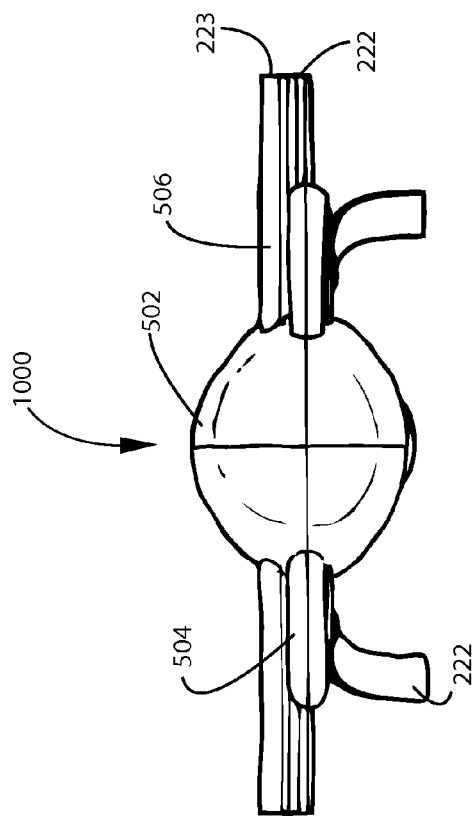
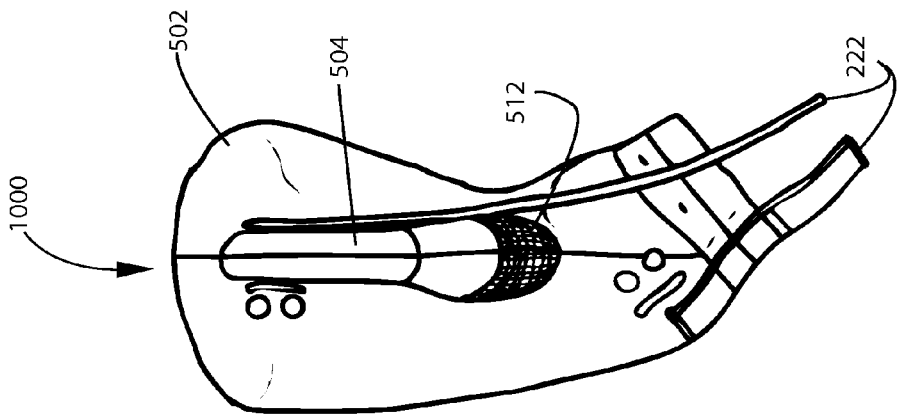
Fig. 91
Fig. 90

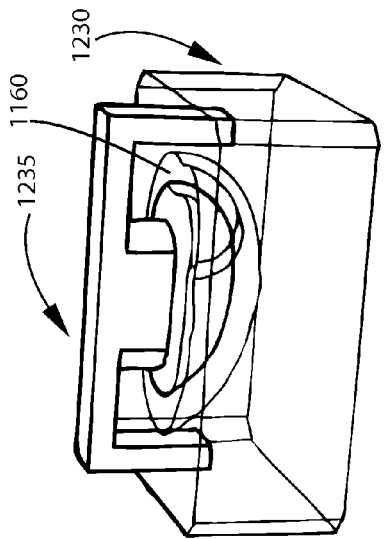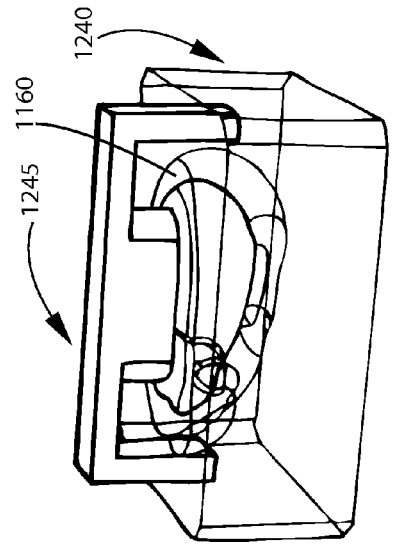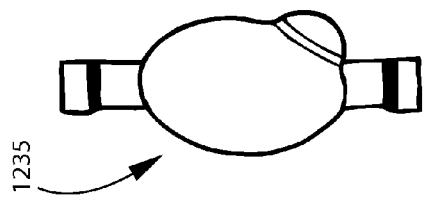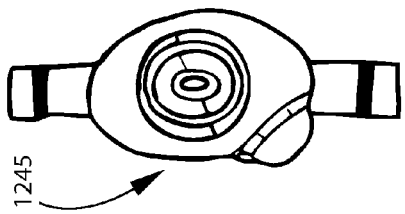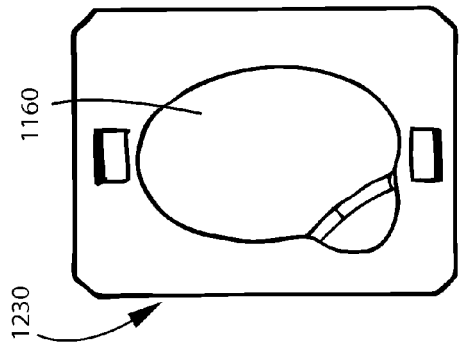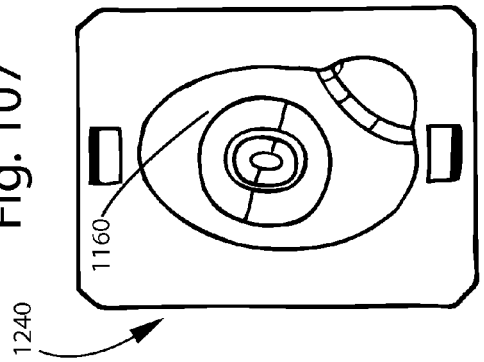

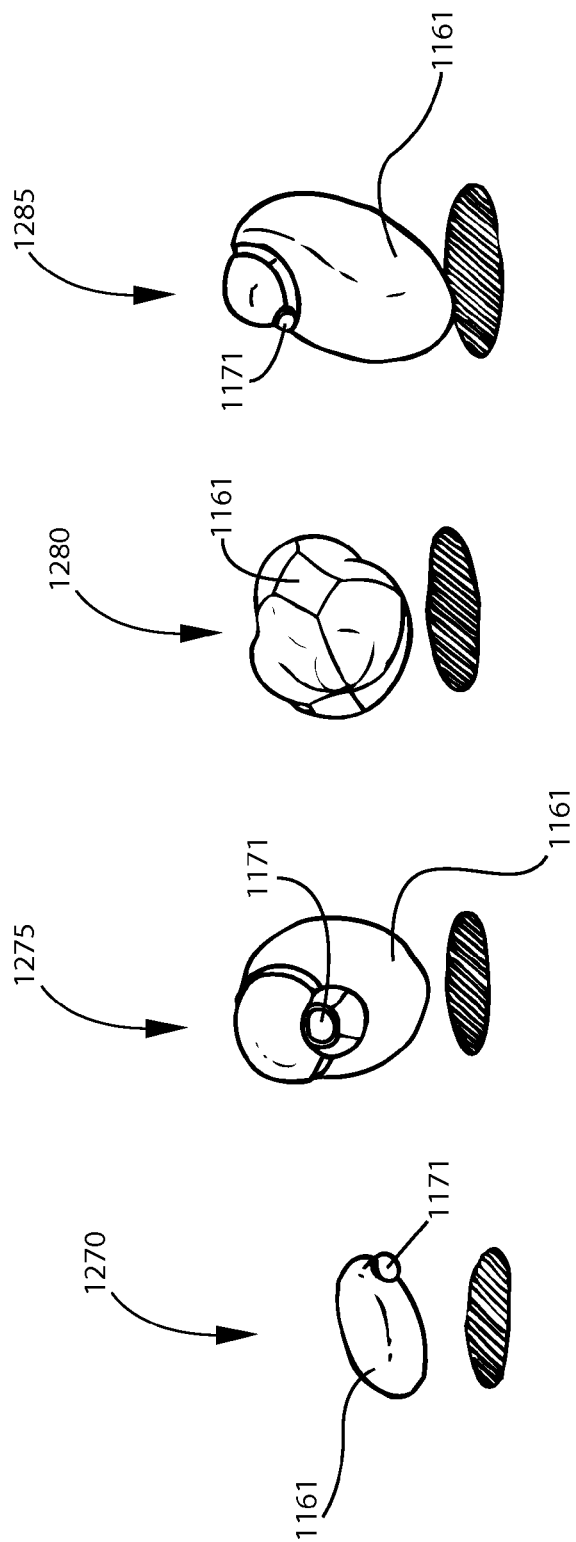

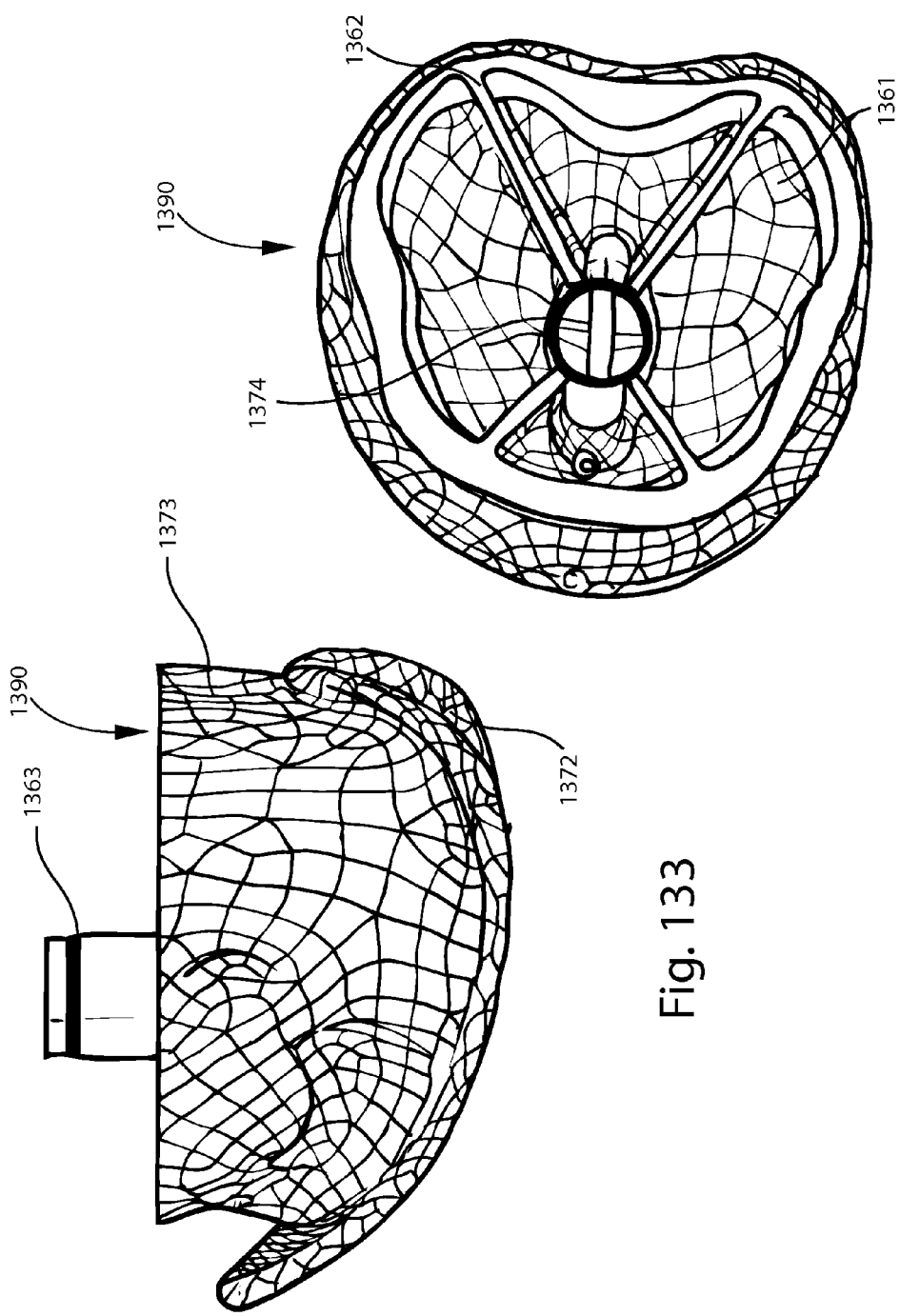

SURGICAL SIMULATION MODELS, MATERIALS, AND METHODS

CROSS-REFERENCE TO RELATED APPLICATIONS

This application is a continuation of U.S. Ser. No. 13/223,020, now U.S. Pat. No. 8,419,438, filed on Aug. 31, 2011, which is a continuation of U.S. Ser. No. 11/952,559, now U.S. Pat. No. 8,016,598, filed on Dec. 7, 2007, which is a continuation-in-part of U.S. Ser. No. 11/538,306, now U.S. Pat. No. 7,811,090, filed on Oct. 3, 2006, each of which is hereby incorporated by reference in its entirety.

BACKGROUND

As medical science has progressed, it has become increasingly important to provide non-human interactive formats for teaching patient care. While it is desirable to train medical personnel in patient care protocols before allowing contact with real patients, textbooks and flash cards lack the important benefits to students that can be attained from hands-on practice. On the other hand, allowing inexperienced students to perform medical procedures on actual patients that would allow for the hands-on practice cannot be considered a viable alternative because of the inherent risk to the patient. Non-human interactive devices and systems can be used to teach the skills needed to successfully identify and treat various patient conditions without putting actual patients at risk.

For example, patient care education has often been taught using medical instruments to perform patient care activity on a simulator, such as a manikin. Such training devices and systems can be used by medical personnel and medical students to teach and assess competencies such as patient care, medical knowledge, practice based learning and improvement, systems based practice, professionalism, and communication. The training devices and systems can also be used by patients to learn the proper way to perform self-examinations.

While these simulators have been adequate in many respects, they have not been adequate in all respects. Therefore, what is needed is an interactive education system for use in conducting patient care training sessions that is even more realistic and/or includes additional simulated features.

SUMMARY

Devices, systems, and methods appropriate for use in medical training using a patient simulator, various anatomical inserts, and an integrated camera and computer system are disclosed.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

The accompanying drawings illustrate embodiments of the devices and methods disclosed herein and together with the description, serve to explain the principles of the present disclosure.

In particular, FIGS. 55-63 are directed to the molding and manufacture of a fallopian tubes model according to one embodiment of the present disclosure.

FIGS. 64-70b are directed to the molding and manufacture of an ovarian model according to one embodiment of the present disclosure.

FIGS. 85-91 are directed to the molding and manufacture of an enlarged uterine model according to one embodiment of the present disclosure.

FIGS. 92-129 are directed to the molding and manufacture of fibroids and a fibroid uterus model according to one embodiment of the present disclosure.

FIGS. 130-134 are directed to the molding and manufacture of a perineum model according to one embodiment of the present disclosure.

FIGS. 150-154 are directed to the molding and manufacture of a bowel model according to one embodiment of the present disclosure.

DETAILED DESCRIPTION OF PREFERRED EMBODIMENTS

Figure 1:
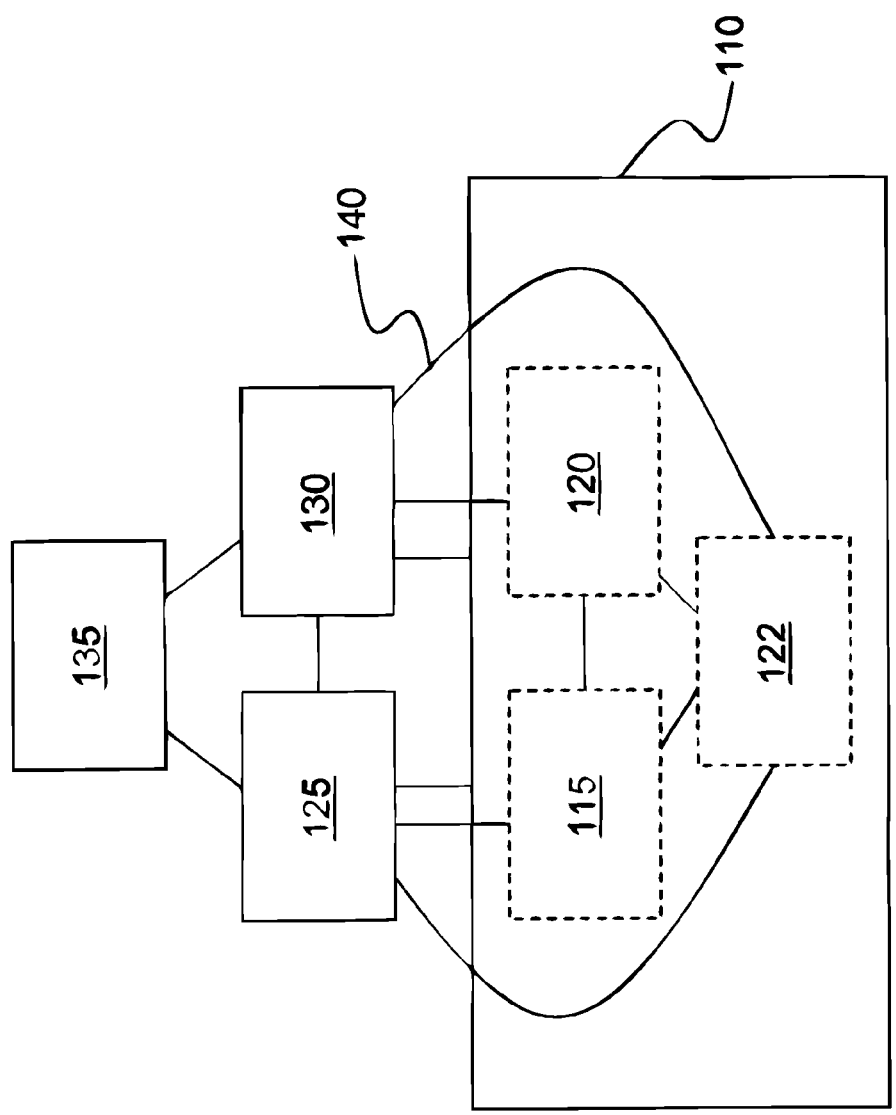
FIG. 1 is a diagrammatic schematic view of an exemplary patient simulator system according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. For simplicity, in some instances the same reference numbers are used throughout the drawings to refer to the same or like parts.

One of the aims of healthcare simulation is to establish a teaching environment that closely mimics key clinical cases in a reproducible manner. The introduction of high fidelity tetherless simulators, such as those available from Gaumard Scientific Company, Inc., over the past few years has proven to be a significant advance in creating realistic teaching environments. The present disclosure is directed to a patient simulator system that expands the functionality of the stimulators by providing a variety of interchangeable and reuseable anatomical inserts that can be used to train medical personnel by simulating a variety of clinical situations. The patient simulator system disclosed herein offers a training platform on which team-building scenarios can be performed for the development of surgical skills and the advancement of patient safety.

In particular, the patient simulator system disclosed herein includes a patient simulator capable of receiving a variety of anatomical inserts representing different organs and/or organ systems, including without limitation abdominal organ inserts, gynecological inserts, and bowel inserts. The various anatomical inserts are sized, shaped, and formed of a suitable material to mimic natural human anatomy. In particular, the anatomical inserts incorporate realistic texture, density, and landmarks in the organs and tissues, thereby allowing the anatomical inserts to be manipulated, cut, and sutured like real human tissue. Thus, the patient simulator system allows users to practice surgical procedures with actual surgical instruments, thereby enhancing the educational experience by allowing for a high-fidelity surgical simulation offering immediate tactile and visual feedback. The patient simulator system allows users to perform a range of surgical interventions, including without limitation laparotomy, laparoscopy, hysteroscopy, and/or vaginal procedures, using real surgical instruments. Thus, the patient simulator system facilitates the training and assessment of open and closed surgical techniques, as well as robotic techniques. By providing anatomically relevant inserts, familiarity with needle, scalpel, and suture techniques can be achieved in a system that provides realistic tactile feedback. These skills can be obtained in a stress-free environment so that a medical practitioner is adequately trained prior to work on a live patient.

Moreover, the patient simulator system allows for multiple users to simultaneously work with the patient simulator and anatomical inserts during a particular surgical scenario, thereby facilitating training and assessment of surgical technique in a realistic, team-based environment. By allowing multiple users to simultaneously interact with the patient simulator system, the system facilitates the real-time training and assessment of the cooperative efforts of a surgical team in a wide variety of scenarios, including by way of non-limiting example, a myomectomy, a hysterectomy, intraoperative hemorrhage, malignant hyperthermia, and patient safety scenarios, such as, by way of non-limiting example, a fire in the OR. In some embodiments, the patient simulator system provides for pre-operative care simulation as well as post-operative care simulation, thereby allowing users to experience, address, and assess pre-operative and post-operative management, including pre-operative acquisition of the patient history and management of post-operative complications.

For example, in some embodiments, the patient simulator system allows for the realistic reception and transport of the patient simulator through a hospital (e.g., from an emergency room to an operating room) during operation of a particular surgical scenario. In addition, the patient simulator systems can be used to conduct patient safety drills in an actual operating room.

In some embodiments, the patient simulator system includes features designed to enhance the educational experience. For example, in some embodiments, the system includes a processing module to simulate different surgical and medical scenarios during operation of the patient simulator system. In some embodiments, the system includes an integrated camera system that allows visualization of the procedure for real-time video and log capture for debriefing purposes. In some embodiments, the patient simulator system is provided with a workbook of medical scenarios that are pre-programmed in an interactive software package, thereby providing a platform on which team-building scenarios can be performed for the development of surgical skills and general patient safety. Thus, the patient simulator system disclosed herein provides a system that is readily expandable and updatable without large expense and that enables users to learn comprehensive medical and surgical skills through "hands-on" training, without sacrificing the experience gained by users in using standard surgical instruments in a simulated patient treatment situation.

I. Structure and Organization

FIG. 1 is a schematic diagrammatic representation of a patient simulator system 100 according to one embodiment of the present disclosure. The patient simulator system 100 includes a patient simulator 110, an anatomical insert 115, an abdominal wall insert 120, a vascular system 122, a camera system 125, a processing module 130, and a display 135. In each embodiment, the camera system 125, the computer system 130, the display 135, the patient simulator 110, the inserts 115, 120, and the vascular system 122 may be physically connected by connectors 140 (such as, by way of non-limiting example, wires, tubes, cables, etc.) or remotely connected (such as, by way of non-limiting example, transmitter/receiver, inductive coupling, magnetic coupling, etc.).

In that regard, in some embodiments, the patient simulator 110 is tetherless. That is, the patient simulator 110 is functional without wired or tubular connection to other devices outside of the body and, therefore, does not require wires, tubes, or other lines extending from the patient simulator 110 in order to be fully functional. Rather, the patient simulator 110 is self-contained. Thus, the patient simulator 110 can include an internal power supply, such as a rechargeable power cell, and all pneumatic and fluid connections are made to the corresponding compressors or other devices within the patient simulator 110. As the patient simulator 110 is self-contained, it is not only portable, but can be in use while being transported between different locations. Further, in such embodiments, the patient simulator 110 may communicate with other devices, such as a control interface, through wireless communication. Thus, the entire simulator system can be functional up to the limits of the wireless communication. Further, in some embodiments the patient simulator 110 connects wirelessly to the processing module 110, which in some instances includes a computer or network system, which then connects to other remote devices via a wired or wireless network, making the functional distance of the patient simulator system 100, and in particular the patient simulator 110, virtually limitless. Similarly, in some embodiments when the anatomical insert 115 is used outside of the patient simulator 110, it is operable in a tetherless mode as well. In alternative embodiments, the patient simulator and/or the anatomical inserts 115 are tethered, as noted above.

Figures 2, 3B:
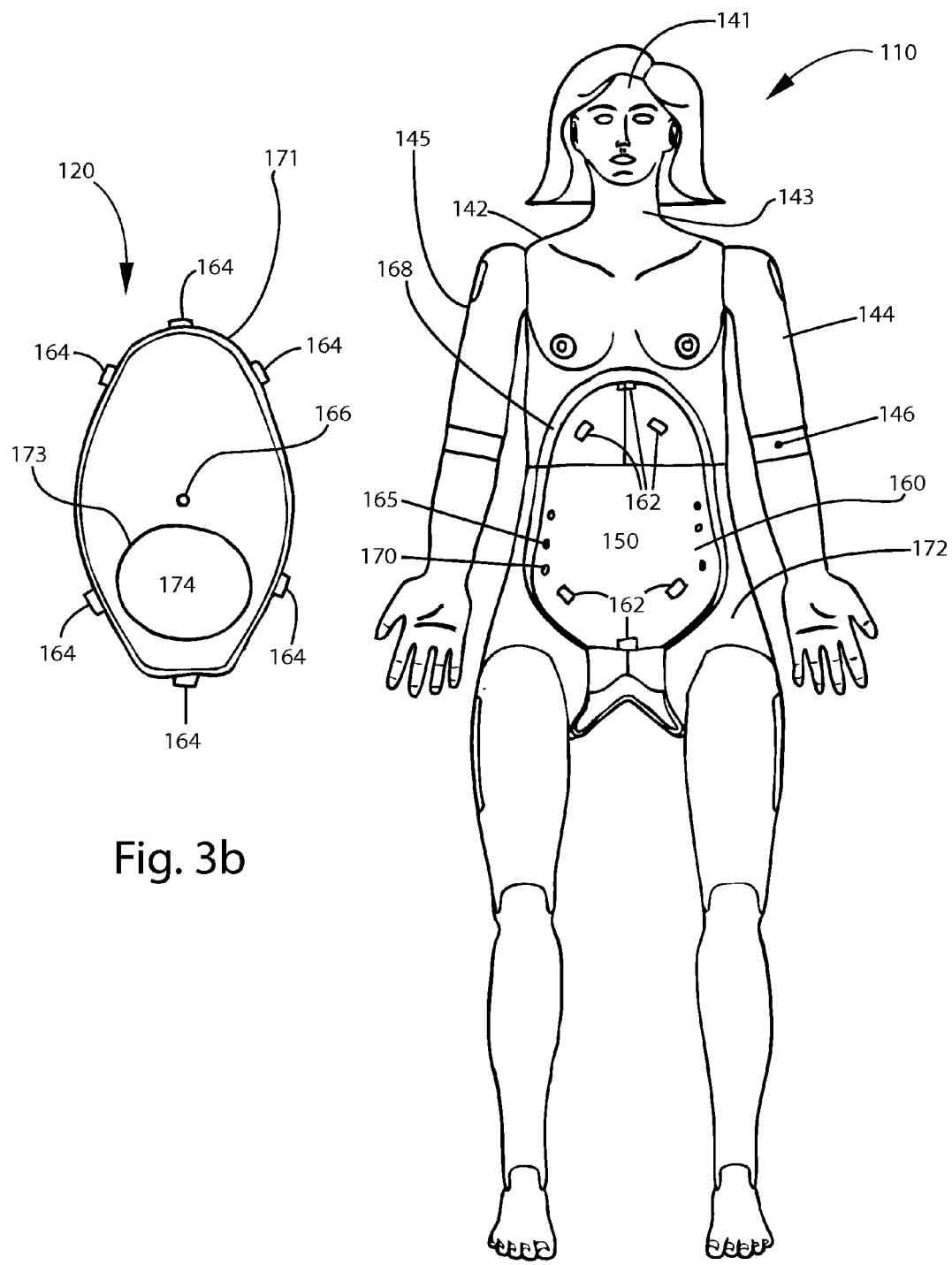
FIG. 2 is a perspective view of an exemplary patient simulator according to one embodiment of the present disclosure.
Figure 3C:
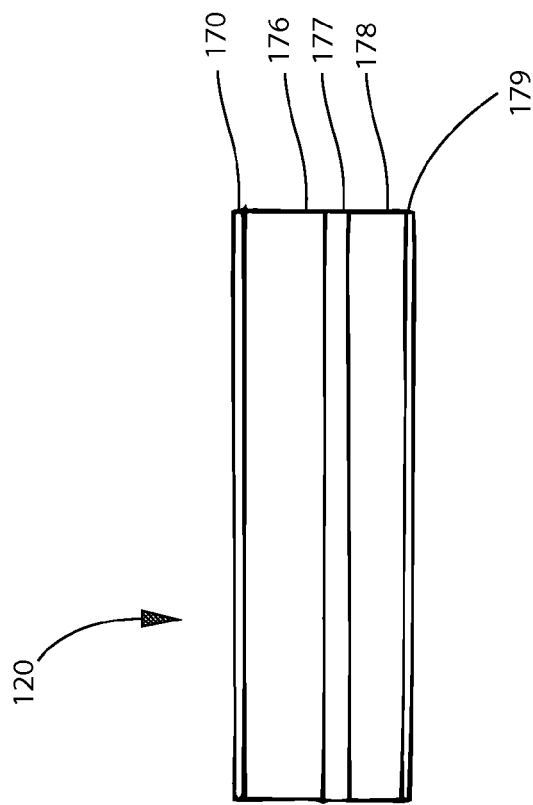
FIGS. 3a-20 illustrate various aspects of the patient simulator system according to embodiments of the present disclosure.

In the embodiment illustrated in FIG. 2, the patient simulator 110 comprises a female patient simulator. It is understood that the illustrated embodiment of the patient simulator 110 is sized and shaped to represent a patient that will receive treatment. In that regard, the patient simulator can take a variety of forms, including a manikin sized and shaped to represent patients of any size, age, and/or health, ranging from premature fetus to full-sized adults. Further, the patient simulator may include only a portion of the simulated patient (e.g., specific body parts or combinations of body parts). For example, in some implementations, the patient simulator includes a torso without arms or legs that may or may not include a head. Generally, the combination of anatomical parts may be selected based on the particular type(s) of training that the patient simulator is intended to be used for. In that regard, while it is generally desirable to have a full patient simulator to enhance realism, due to portability, costs, and/or other factors in some implementations task trainers having only the most necessary anatomical parts are utilized. The patient simulator 110 can be either a male simulator or a female simulator and will include appropriate anatomical features based on the simulated gender.

Further, in some instances, the patient simulator 110 includes a simulated circulatory system, a simulated respiratory system, and/or other simulated aspects. In that regard, the patient simulator 110 is in communication with a control system configured to control the circulatory system, respiratory system, and/or other aspects of the patient simulator. For example, in some instances, the control system is configured to adjust parameters associated with the circulatory system, respiratory system, and/or other aspects of the patient simulator 100 in accordance with a simulation scenario and/or a user's application of treatment to the patient simulator 100 based on the simulation scenario. In some embodiments, the control system comprises the processing module 110. Accordingly, while aspects of the present disclosure are described with respect to particular embodiments of patient simulators, no limitation is intended thereby.

It is understood that the features of the present disclosure may be incorporated into or utilized in conjunction with any suitable patient simulators. In some instances, aspects of the present disclosure are configured for use with the simulators and the related features disclosed in U.S. patent application Ser. No. 13/223,020, now U.S. Pat. No. 8,419,438; U.S. patent application Ser. No. 13/031,116, now U.S. Pat. No. 8,517,740; U.S. patent application Ser. No. 13/031,087, now U.S. Pat. No. 8,678,831; U.S. patent application Ser. No. 13/031,102, now U.S. Pat. No. 8,608,483; U.S. patent application Ser. No. 12/856,903, now U.S. Pat. No. 8,152,532; U.S. patent application Ser. No. 12/708,682, now U.S. Pat. No. 8,740,624; U.S. patent application Ser. No. 12/708,659, now U.S. Pat. No. 8,500,452; U.S. patent application Ser. No. 11/952,606, now U.S. Pat. No. 8,696,362; U.S. patent application Ser. No. 11/952,669, published as U.S. 2009-0148822, now abandoned; U.S. Pat. No. 8,016,598, U.S. Pat. No. 7,976,313, U.S. Pat. No. 7,976,312, U.S. Pat. No. 7,866,983, U.S. Pat. No. 7,114,954, U.S. Pat. No. 7,192,284, U.S. Pat. No. 7,811,090, U.S. Pat. No. 6,758,676, U.S. Pat. No. 6,503,087, U.S. Pat. No. 6,527,558, U.S. Pat. No. 6,443,735, U.S. Pat. No. 6,193,519, and U.S. Pat. No. 5,853,292, and U.S. Pat. No. 5,472,345, each herein incorporated by reference in its entirety.

Further, in some instances, the patient simulator 100 includes one or more features as provided in medical simulators provided by Gaumard Scientific Company, Inc. based out of Miami, Fla., including but not limited to the following models: S1000 Hal®, S1020 Hal®, S1030 Hal®, S3000 Hal®, S2000 Susie®, S221 Clinical Chloe, S222 Clinical Chloe, S222.100 Super Chloe, S303 Code Blue®, S304 Code Blue®, S100 Susie®, S100 Simon®, S200 Susie®, s200 Simon®, S201 Susie®, S201 Simon®, S203 Susie®, S204 Simon®, S205 Simple Simon®, S206 Simple Susie®, S3004 Pediatric Hal®, S3005 Pediatric Hal®, S3009 Premie Hal®, S3010 Newborn Hal®, S110 Mike®, S110 Michelle®, S150 Mike®, S150 Michelle®, S107 Multipurpose Patient Care and CPR Infant Simulator, S117 Multipurpose Patient Care and CPR Pediatric Simulator, S157 Multipurpose Patient Care and CPR Pediatric Simulator, S575 Noelle®, S565 Noelle®, S560 Noelle®, S555 Noelle®, S550 Noelle®, S550.100 Noelle, and/or other patient simulators.

Referring more specifically to the embodiment pictured in FIG. 2, the patient simulator 110 has a head 141 that is connected to a torso 142 by a neck 143. A left arm 144 and a right arm 145 extend from the torso 142. In the illustrated embodiment, the left arm 144 includes an IV receptacle 146 capable of accepting injected medications. In some instances, an RFID reader is positioned adjacent to the IV receptacle such that an RFID tag associated with an injected medication is read by the RFID reader. In some embodiments, the RFID reader can then communicate the injected medication to a control unit of the patient simulator 100. In that regard, in some instances the RFID reader also communicates the amount or dosage of injected medicine. In some embodiments, the right arm 145 is substantially similar to the left arm 144. In other embodiments, the right arm 145 contains more or less features than the left arm. In that regard, it is understood that any combination of the features disclosed herein may be utilized in an arm of a patient simulator in accordance with the present disclosure.

As shown in FIG. 2, the patient simulator 110 includes at least one recess 150 sized and shaped for receiving at least one anatomical insert 115. Each of the anatomical inserts is manufactured to accurately conform to existing patient simulator geometry. In that regard, the insert 115 is typically sized and shaped to be received within an opening of the patient simulator 110 at an appropriate anatomical location.

Figure 3A:
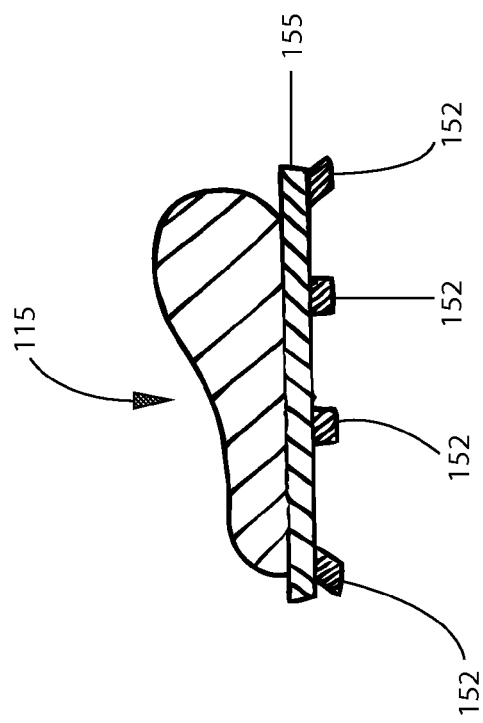

As shown in FIG. 3a, the anatomical insert 115 includes a plurality of fasteners 152 extending from a base 155. Returning to FIG. 2, in the pictured embodiment, an inner surface 160 defined by the recess 150 is configured to mate with the backing 155 of the anatomical insert 115 shown in FIG. 3a and/or the backing of the abdominal wall insert 120. The inner surface 160 of the recess 150 includes a plurality of fasteners 162 extending therefrom. The fasteners 152 and the fasteners 162 are configured to mate with each other to releasably secure the anatomical insert 115 to the patient simulator 110. The fasteners 152, 162 comprise releasable fasteners, such as hook and loop, snaps, buttons, ties, adhesives, tongue-and-groove mechanisms, quick connects, or any other suitable fastening device, to selectively attach the anatomical insert 115 to an object, including the patient simulator 110. For example, in some embodiments, the fasteners 152, 162 cooperate to form a track and rail attachment mechanism. In other embodiments, the fasteners 152, 162 cooperate to form a threaded engagement system.

In some instances, the fasteners 152, 162 are bonded to the anatomical insert 115 and the inner surface 160, respectively, with an adhesive. In some instances, the adhesive is a cyanoacrylate and primer suitable for use on a silicon thermoset. Such adhesives are currently available from Loctite® Corporation. In other instances, the anatomical insert 115 is molded or formed as part of the base (e.g., as part of the patient simulator 110) and is, therefore, permanently attached to the base.

Similarly, as shown in FIG. 3b, in some embodiments, the abdominal wall insert 120 includes a plurality of fasteners 164 extending therefrom that are substantially similar to the fasteners 152. In that regard, the abdominal wall insert 120 may be attached to the patient simulator 110 via fastening means such as snaps, hook and loop closures, buttons, ties, adhesives, quick connects, track and rail mechanisms, tongue-and-groove mechanisms, or other releasable attachment devices.

In the pictured embodiment, the abdominal wall insert 120 is shaped and configured to cover and close the recess 150 in the patient simulator 100. In some instances, the abdominal wall insert 120 covers the recess 150 in the patient simulator 110 while the recess 150 houses various components of the patient simulator 100, including for example at least one anatomical insert 115. In some instances, the abdominal wall insert 120 includes an umbilicus 166. In the embodiment pictured in FIG. 2, the patient simulator 110 includes a surface 168 circumferentially bounding the recess 150. In some instances, the abdominal wall insert 120 includes a simulated skin layer 170 that includes an overhang or lip 171 sized and shaped to mate with a surface 168 of the patient simulator 110 such that when the abdominal insert 120 is received within the recess 150, the skin layer 170 of the abdominal wall insert 120 and a skin layer 172 of the patient simulator are substantially aligned to form an apparently continuous skin layer. In other words, when seated within and secured to the patient simulator 110, the skin layer 170 of the abdominal insert 120 (e.g., the outer surface) is typically flush with the surrounding skin layer 172 (e.g., the outer surface) of the manikin such that the abdominal insert 120 provides an approximate continuation of the natural outer surface of the patient simulator 110.

The abdominal wall insert 120 is configured for use in laparotomy procedures, and includes a window 173 in which a separate abdominal wall insert or laparotomy insert 174 is placed that allows for incisions through and dissections of the laparotomy insert 174 with standard surgical instruments. In addition, the laparotomy insert 174 can be sutured with standard suture materials. In some embodiments, the laparotomy insert and/or the abdominal wall insert includes a vascular element to provide limited bleeding during and after incision for added realism. In some instances, a single laparotomy insert 174 can be re-used at least four times. In some instances, aspects of the laparotomy insert include features disclosed in U.S. Patent Application No. 61/591,748, entitled "Human Tissue Models, Materials, and Methods, filed on Jan. 27, 2012, which is herein incorporated by reference in its entirety.

In some embodiments, the laparotomy insert 174 includes several layers of simulated tissue to replicate the anatomy of a true abdominal wall. As shown in FIG. 3d, the abdominal wall insert 120 includes a subcutaneous layer 176, a fascial layer 177, a muscle layer 178, and a peritoneal layer 179. In some embodiments, the muscle layer 178 is configured to represent the abdominal rectus muscles. In some instances, the layers, in particular the fascial layer 177 and the muscle layer 178 are constructed to provide maximum realism during performance of a Pfannenstiel or vertical incision, and the layers can incorporate limited bleeding for added realism. Incisions and dissection of the abdominal wall insert can be carried out with standard surgical instruments, and it can be sutured like real tissue. Classically, the abdominal wall insert 120 can be used to train laparotomy, but it also has the potential for training of the placement of laparoscopic ports. Each laparotomy insert 174 can be re-used at least four (4) times for laparotomy, and more often for laparoscopy.

In some instances, the abdominal wall insert is configured for use in laparoscopic procedures. For example, FIG. 3d illustrates an abdominal wall insert 180 that is similar to the abdominal wall insert 120 except for the differences noted herein. In the pictured embodiment, the abdominal wall insert 180 includes a plurality of access ports 182 arranged on the left, right, and midline of the abdominal wall insert. The abdominal wall insert 180 includes eight access ports 182, with one access port 182 located in the anatomical area of the umbilicus 166. In various embodiments, the abdominal wall insert 180 may include any number and arrangement of access ports. The abdominal wall insert 180 can be used by those users proficient in the placement of ports, so they can proceed directly to training of laparoscopic surgical techniques. In some instances, the patient simulator system 100 includes two abdominal wall inserts, an abdominal wall insert with access ports (e.g., insert 180) and an abdominal wall insert without access ports (e.g., insert 120), each of which is configured for use with the patient simulator 110.

In some instances, the abdominal wall insert 120 is configured for use in a simulated caesarean section procedure. In such instances, the multi-layer abdominal wall insert further includes a uterus with a fetus disposed therein that can be surgically removed by a user. In some instances, the uterus is filled with a fluid or gel, such as saline, silicon gel, petroleum jelly, or otherwise. The size, shape, orientation, flexibility, texture, tear strength, and/or other features of the uterus, fetus, and/or associated materials are configured to be similar to a natural uterus and fetus.

Returning to FIG. 2, the vascular system 122 is integrated into patient simulator 110, and the patient simulator 110 includes ports 165 to selectively link the vascular system 122 to the anatomical insert 115 and/or the abdominal wall insert 120 (e.g., the vascular element of the abdominal wall insert). The vascular system 122 can interact with the patient simulator 110, the anatomical insert 115, and/or the abdominal wall insert 120 to simulate realistic blood flow through the patient simulator system 100.

In some embodiments, the vascular system 122 demonstrates realistic pulsatile arterial blood flow and lower pressure venous return. Incorporation of a pulsatile arterial and steady venous blood supply adds to the heightened realism of the simulation, and allows the practice of hemostasis. In some instances, aspects of the vascular system 122 include features disclosed in U.S. patent application Ser. No. 13/031,087, which has been incorporated by reference in its entirety above.

In some embodiments the patient simulator 110 includes bilateral carotid, radial, and brachial pulses that vary in strength with changes in blood pressure. In some embodiments, blood pressure may be measured on the patient simulator 110 with a standard sphygmomanometer, and real electrocardiograms and oxygen saturations may be measured. In some embodiments, both abnormal and normal heart sounds (as well as right and left lung sounds) may be auscultated on the patient simulator 110, and the patient simulator system 100 can detect ventilation and chest compressions for logging of cardiopulmonary resuscitation efforts. In some embodiments, the patient simulator 110 can demonstrate spontaneous breathing with chest rise and controlled rates and depths of respiration, as well as independently programmable left and right lung sounds. Ventilation may be measured and logged. In some embodiments, the patient simulator includes an airway capable of oral and nasal intubation with either an ET tube or an LMA, and sensors to detect the depth of intubation.

In the pictured embodiment, the patient simulator 110 includes ports 170 to connect other features of the patient simulator 110 to the anatomical insert 115 and/or the abdominal wall insert 120, including by way of non-limiting example, fluidic channels and/or electrical connections.

The patient simulator 110 is shaped and configured to interface and interact with a wide variety of anatomical inserts 115, including by way of non-limiting example uterine assemblies, bowel inserts, and kidney inserts. Generally, the inserts 115 fit into recesses or openings in the patient simulator 110, thereby allowing training procedures to be carried out in situ. Further, since the inserts 115 are easily replaceable, multiple training procedures can be performed using the same patient simulator 110 by simply exchanging a used insert for a new insert. Further still, in many instances the inserts are suitable for use in multiple training procedures, such that a single insert can be used to train many users before needing replacement.

In some embodiments, the patient simulator system 100 includes several different anatomical inserts that represent different pathologies and/or complications of the same organ, organ system, or anatomic region. In some embodiments, each anatomical insert includes a different combination of medical conditions, and thus each insert may be used for the training of a different combination of surgical procedures. The order in which the procedures are planned can increase the functionality of the anatomic insert.

Figure 4:
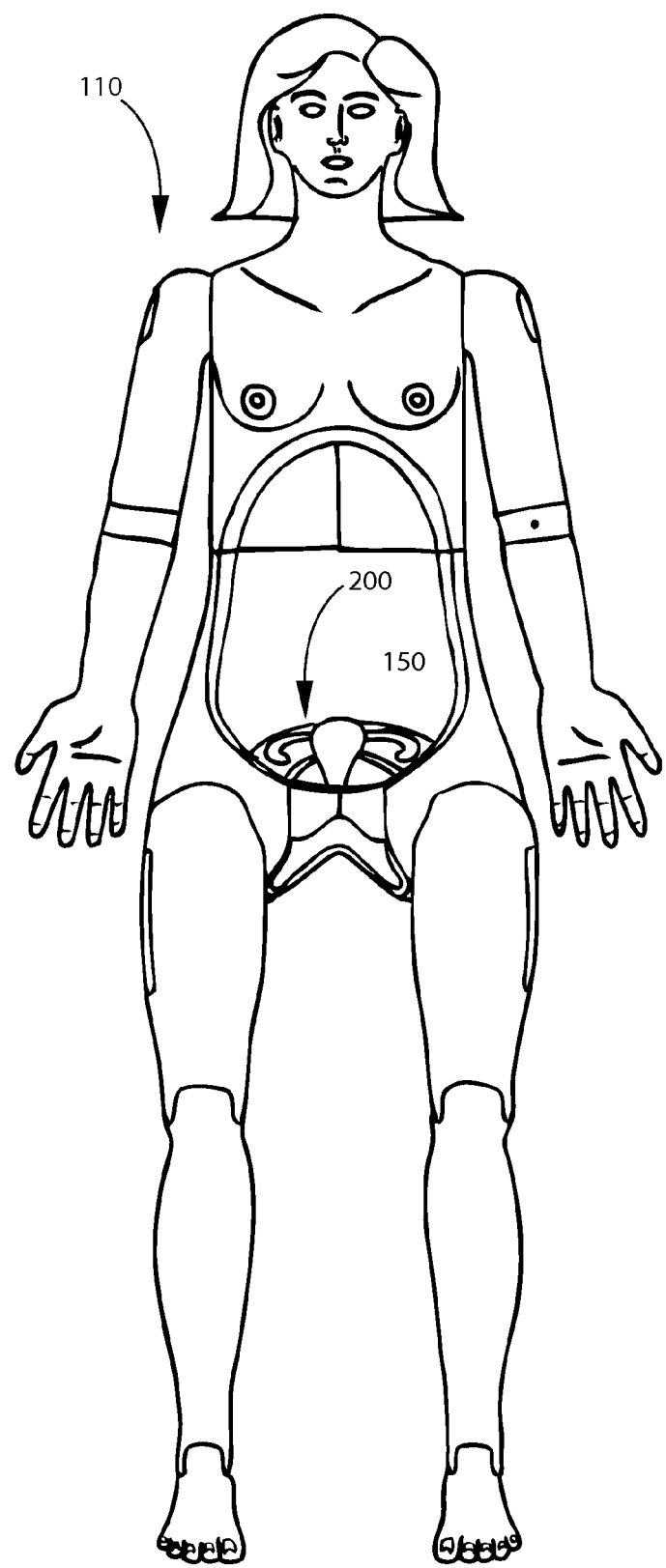

As mentioned above, single anatomical insert may include multiple different pathologies and/or complications of a single organ, organ system, or anatomic region. For example, as shown in FIG. 4, the patient simulator system 100 may include a uterine assembly 200, which is an exemplary anatomic insert including various pelvic organs, positioned within the recess 150 of the patient simulator 110. In the pictured embodiment, the recess 150 of the patient simulator 110 is sized and shaped for receiving the uterine assembly 200. In some instances, the uterine assembly 200 is provided pre-assembled for easy attachment to and removal from the recess 150 of the patient simulator 110.

Figure 5:
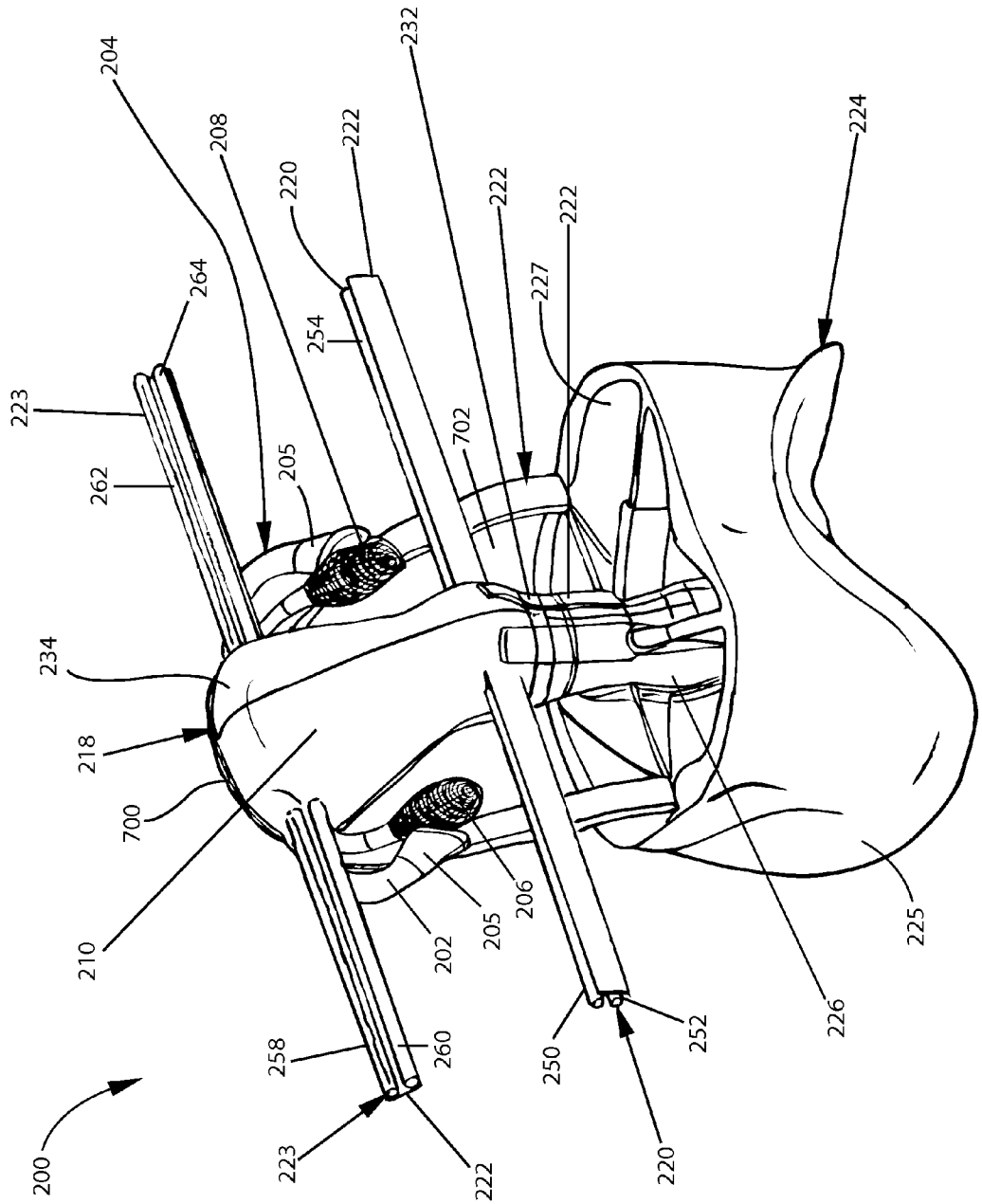
Figure 6:
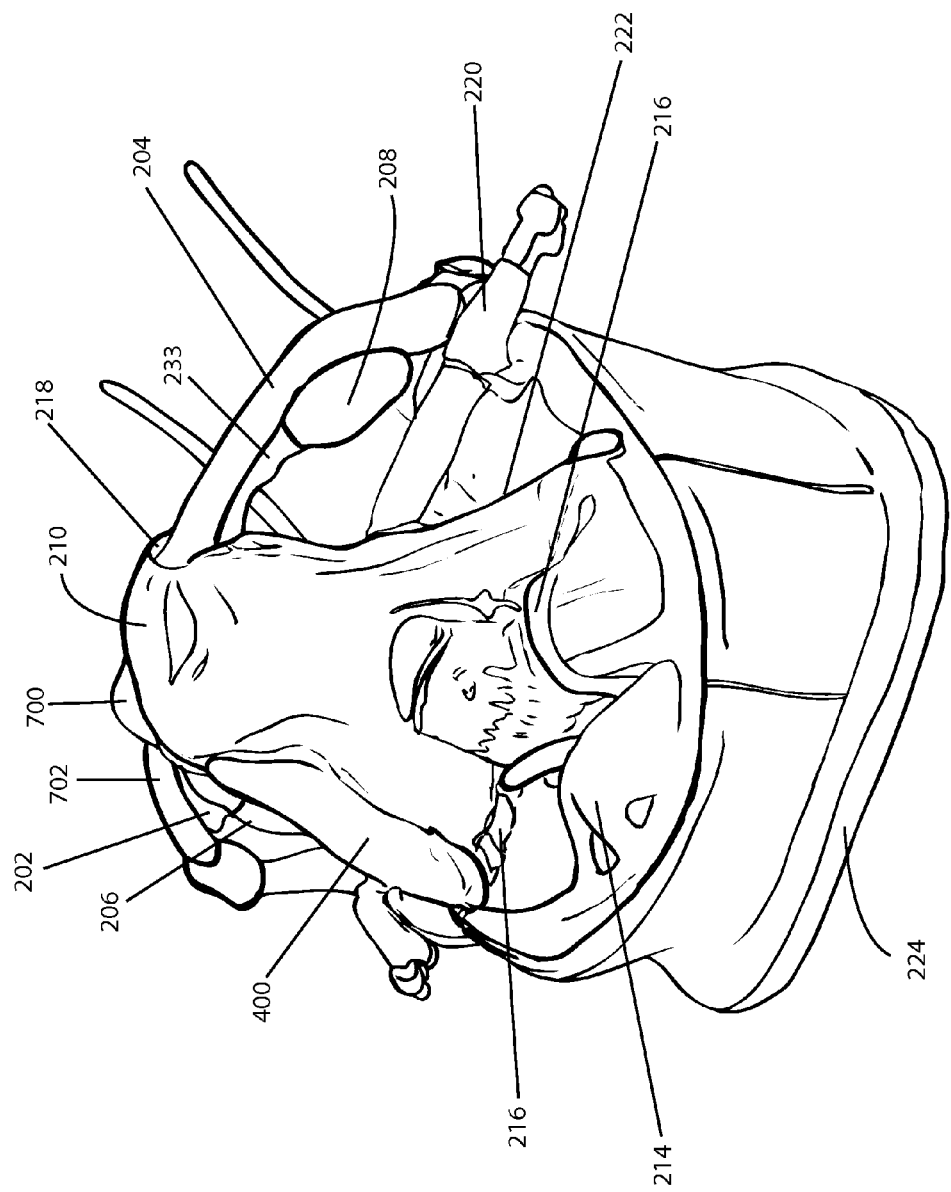

As shown in FIGS. 5 and 6, the uterine assembly 200 models the anatomical structure and relationship of various pelvic organs according to one embodiment of the present disclosure. In particular, the uterine assembly 200 includes a right fallopian tube 202, a left fallopian tube 204, a right ovary 206, a left ovary 208, a uterus 210 including a cervix 212 (not visible in FIG. 5), a bladder 214, ureters 216, a peritoneum 218, uterine vessels 220 (arteries and veins), ligaments 222 (i.e., round, uterosacral, infundibulopelvic, and cardinal ligaments), ovarian vessels 223 (arteries and veins) (not clearly visible in FIG. 6), and a perineum 224 with an integrated vagina 226 (not visible in FIG. 6). The fallopian tubes 202, 204 include fimbriae 205 at their free ends (i.e., ends not connected to the uterus 210). As a general matter, the anatomical inserts, including the uterine assembly 200, simulates the appearance and feel of realistic tissue, and the relative arrangement and dimensions of the simulated anatomic structures accurately reflect true anatomical relationships.

The uterus 210 is sized and shaped to simulate a normal human uterus. Accordingly, the uterus 210 will have different sizes and shapes in various embodiments. Specifically, the uterus may be sized and shaped to represent normal human uteri of varying age, medical condition, and other aspects. In the pictured embodiment, the uterus 210 is shaped and sized to replicate a normal-sized, adult, non-gravid uterus positioned normally within the pelvic cavity. In alternate embodiments, the uterus may be shaped as sized to replicate an enlarged or gravid uterus. In some instances, the uterus may be positioned in an anteverted or retroverted position.

In some instances, the uterus 210 includes anatomical features replicating the natural pelvic area of a human female. In that regard, the uterus 210 includes an internal chamber or uterine cavity 230 (not shown) extending from a proximal portion 232 of the uterus 210 to a distal portion 234 of the uterus 210. In some instances, the uterine cavity 230 is in communication with an internal passage 236 (not shown) of the vagina 226 extending from the perineum 224 to the proximal portion 232 of the uterus 210. In some embodiments, the uterus 210 includes a tubular cervix (not shown) at the proximal portion of the uterus 210 that enters the internal passage 236 of the vagina 226.

In addition, in some instances, the pelvic area includes a pubic bone area (not shown) and a vulva (not shown). It is understood that the pelvic may include features simulating a urinary tract, rectum, or other anatomical features. In that regard, the pubic bone area, the vulva, and/or other portions of the pelvic area may be inserts or components that are replaceable with other inserts or components for displaying various patient conditions (e.g., by way of non-limiting example, a fistula, either between the bowel and the vagina or the bladder and the vagina).

The perineum 224 provides the base and structural support for the uterine assembly 200. In some instances, it is molded to include not only the perineum surface but a wall structure 225 that follows the internal geometry of the recess 150 of the patient simulator 110. In the pictured embodiment, the wall 225 forms the contact area between the uterine assembly 200 and the inner surface 160 of the recess 150 of the patient simulator, and the vagina 226, bladder 214, ligaments 222, and peritoneum 218 are bonded to an inner surface 227 of the wall 225.

Figure 7:
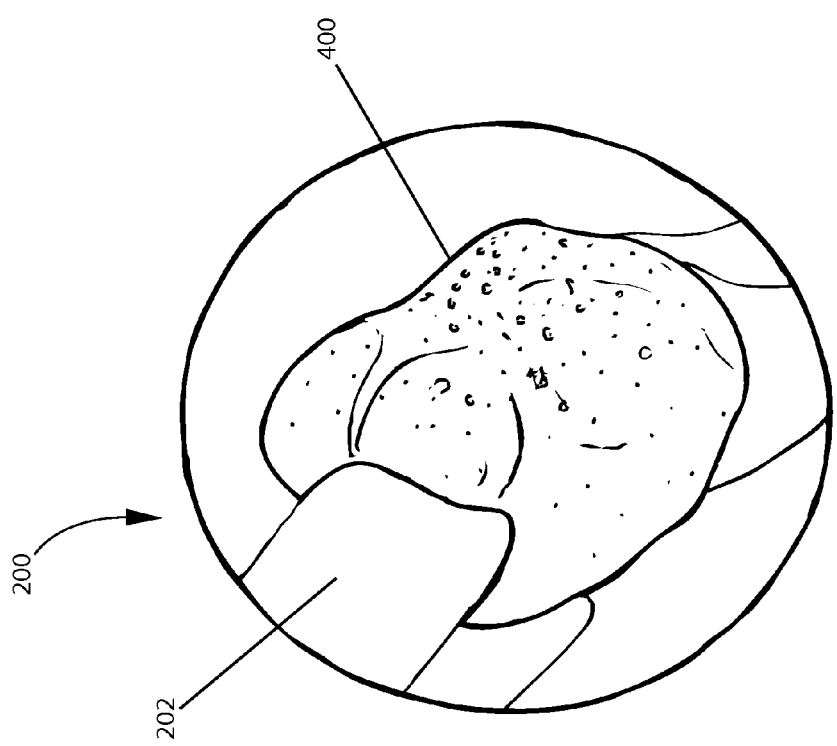

As shown in FIGS. 6 and 7, a simulated ruptured ectopic pregnancy 400 is modeled on the right fallopian tube 202 of the uterine assembly 200. In some instances, a shunt is placed between the venous blood supply of the vascular system 122 and the right fallopian tube 202 so that when the uterine assembly 200 is secured within the patient simulator 110 and the blood supply of the vascular system 122 is switched on, the ruptured ectopic pregnancy 400 begins to bleed in a realistic fashion. The fallopian tube 202 is configured to direct the entering blood into the ruptured ectopic pregnancy 400. In some instances, a second shunt may be placed between the venous blood supply of the vascular system 122 and the uterine cavity 230 for the simulation of a bleeding disorder, such as von Willebrand's Disease. The uterine cavity 230 is configured allow the entering blood through the cervix into the vagina 226. Thus, when the uterine assembly 200 is secured in the patient simulator 110 and the blood supply is switched on, blood will pool within the uterine cavity 230 and flow out from the vagina 226. This hemorrhaging can be visualized at the perineum 224 and used for diagnosis.

Both the venous supplies are assembled with a clamp, thereby allowing the bleeding to be manually stopped by a user. This allows each of the pathologies on the patient simulator 110 to be isolated, and a scenario may run one or both of the conditions at once. Thus, the user may experience a scenario where only one condition has to be diagnosed and treated during a procedure or a scenario where both conditions are present and must be addressed during a single procedure.

In summary, the uterine assembly 200 models the normal sized uterus 210 with the ruptured ectopic pregnancy 400 and uterine bleeding. Thus, the uterine assembly 200 can be used to train and assess, by way of non-limiting example, 1) diagnosing and treating a ruptured ectopic pregnancy, 2) performing a dilatation and curettage, 3) diagnosing and treating a bleeding disorder, 4) performing a bladder repair, and/or 5) performing a vaginal or abdominal hysterectomy.

With reference back to FIG. 5, the uterine assembly 200 includes a vascular network separated into distinct arterial and venous loops, which enables the patient simulator system 100 to control the flow characteristics of both the arterial and venous blood supplies. In particular, the uterine vessels 220 and the ovarian vessels 223 include both artery simulators and vein simulators. The uterine vessels 220 comprise a right uterine artery 250, a right uterine vein 252, a left uterine artery 254, and a left uterine vein 256 (not shown in FIG. 5). The ovarian vessels 223 comprise a right ovarian artery 258, a right ovarian vein 260, a left ovarian artery 262, and a left ovarian vein 264. Some embodiments may include additional pelvic vessels, including without limitation the iliac vessels, the pudendal vessels, the vaginal vessels, the rectal vessels, and/or the umbilical vessels.

In some instances, a small air compressor is used to fill an air bag for each vascular loop (i.e., the uterine vessels 220 and/or the ovarian vessels 223) to provide pneumatic pressure on a similar fluid-filled bag. Miniature electronically-controlled valves regulate when each loop is open or closed as well as whether the flow is pulsatile or steady, representing arterial and venous flow, respectively. The simulated blood can be filled or drained through a quick-connect fitting. In some embodiments, this drainage site is located behind the knee joint on either leg. When the uterine assembly 200 is connected into the patient simulator 110, the arterial system connects to the ovarian arteries 258, 262 and the uterine arteries 250, 254, and the venous system connects to the ovarian veins 260, 264 and uterine veins 252, 256.

Figure 156:
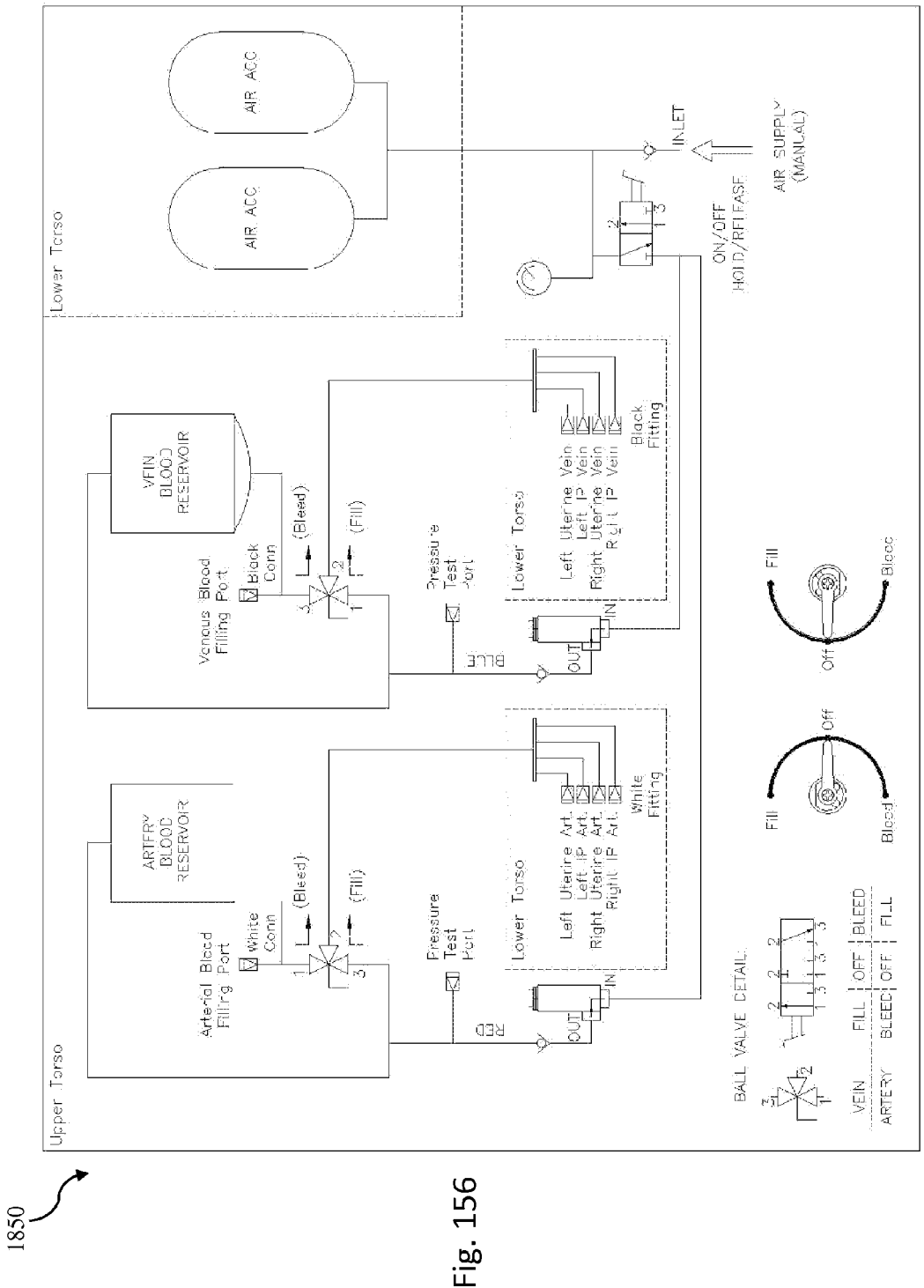
FIG. 156 is a schematic of a pneumatic fluid control system according to an embodiment of the present disclosure.

In some implementations, including some torso-only patient simulators, the system includes a pneumatic fluid control system that does not require a compressor or a power source to facilitate hemorrhaging simulation. To that end, in some instances the pneumatic fluid control system includes air reservoirs (e.g., between one and eight reservoirs, including two in some instances) that can be pressurized (e.g., to between 2 and 10 psi, including 6 psi) using a manual air pump and connection port on patient simulator. A valve controls air flow so that if an associated switch is in a "Hold" position, the fluid reservoirs are pressurized resulting in blood flow when the fluid valves are open and if the switch is in a "Release" position the air is vented from the reservoirs and the pressure equalizes. In some implementations, separate venous and arterial fluid supplies are provided using the reservoirs. To that end, in some instances each reservoir supplies four separate ports in the torso: 1) left uterine artery/vein, 2) right uterine artery/vein, 3) left ovarian artery/vein, and 4) right ovarian artery/vein. Further, in some embodiments separate valves for the arterial and venous systems are provided that allow a user/instructor to "Fill" or add blood to the reservoirs, turn "Off" or stop blood flow, or "Bleed" or allow blood flow. FIG. 156 illustrates provides a schematic an exemplary embodiment of such a pneumatic fluid control system 1850.

When the vascular system is selectively activated, anatomical inserts 115, including the uterine assembly 200, that include pathologies that hemorrhage will begin to bleed, and the extent of bleeding will be dependent on the particular vital signs as controlled by the processing module 130 (shown in FIG. 1). For example, in some instances, if the patient simulator 110 is simulating a patient in critical condition with low blood pressure, the patient simulator 110 will display reduced hemorrhaging within the anatomical insert 115. This phenomenon can be controlled through pre-programmed scenarios, through physiologic models, or by manually adjusting the patient's vital signs within the processing module 130. If the arteries and veins of the anatomical insert 115, for example the uterine assembly 200, are not connected to the vascular system 122 of the patient simulator 110, a closed vascular system will exist and no hemorrhaging will occur. By connecting the vascular system of the anatomical insert 115 (e.g., the uterine assembly 200) with the vascular system 122 of the patient simulator 110, training of hemostasis can occur, and the blood vessels can be used to train students on the proper methods for ligation of blood vessels to prevent hemorrhage.

Figure 8:
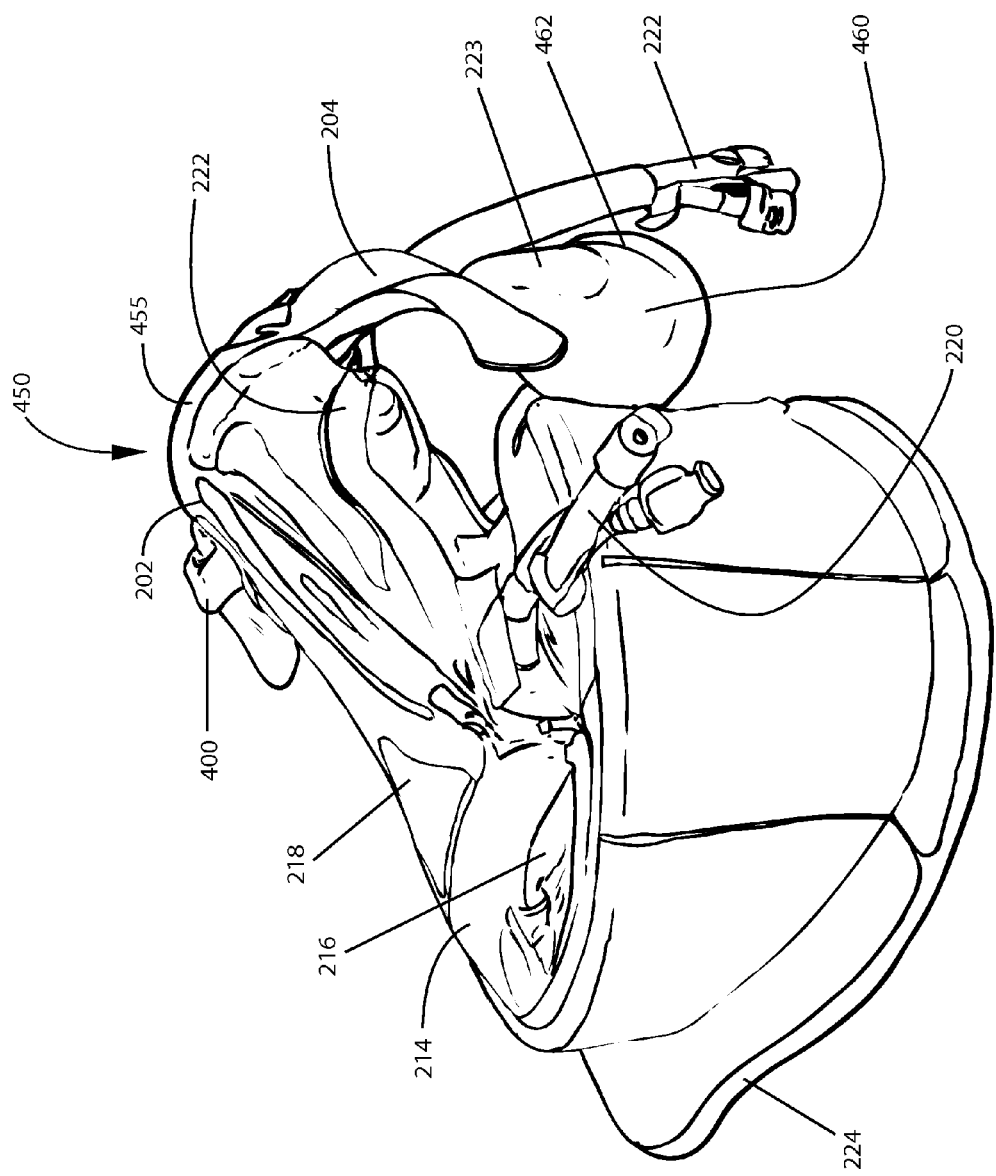

FIG. 8 illustrates a uterine assembly 450 according to one embodiment of the present disclosure. The uterine assembly 450 is substantially similar to the uterine assembly 200 except for the differences noted herein. The uterine assembly 450 models the anatomical structure and relationship of the several pelvic organs modeled in the uterine assembly 200, including the right fallopian tube 202, the ruptured ectopic pregnancy 400, the left fallopian tube 204, the right ovary 206 (not shown in FIG. 8), the bladder 214, the ureters 216, the peritoneum 218, the uterine vessels 220 (arteries and veins), the ovarian vessels 223 (arteries and veins), the ligaments 222 (i.e., round, uterosacral, infundibulopelvic, and cardinal ligaments), and the perineum 224 with the integrated vagina 226 (not visible in FIG. 8). The ruptured ectopic pregnancy 400 is configured to bleed with a shunt placed between the venous blood supply and the right fallopian tube 202, as described above in relation to the uterine assembly 200.

Figure 9:
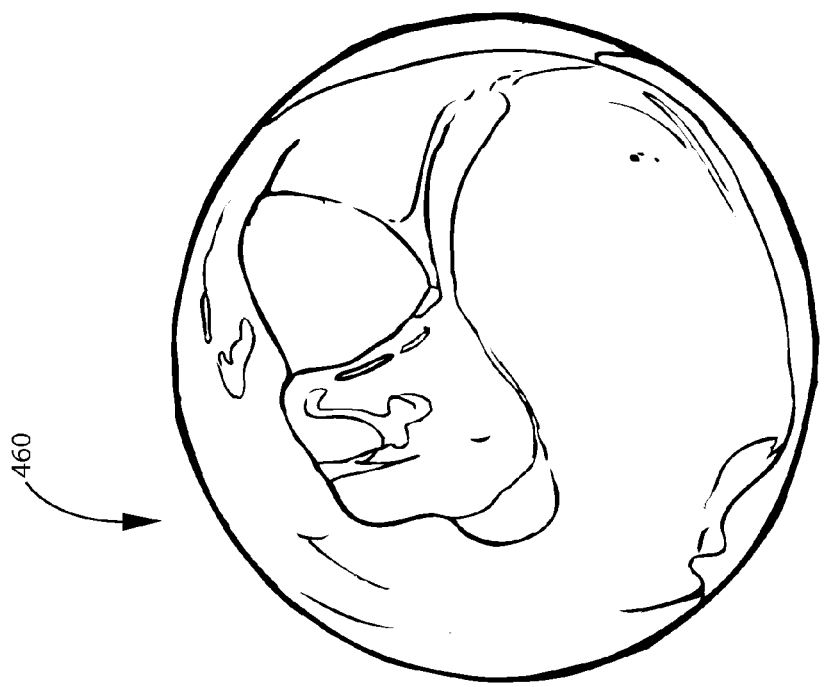

The uterine assembly 450 also models an enlarged uterus 455 and a dermoid cyst 460. As shown in more detail in FIG. 9, the dermoid cyst 460 comprises a simulated mass modeled on a left ovary 462. The cyst 460 is modeled to replicate the shape, size, texture, and contents of an actual dermoid cyst. As such, the dermoid cyst 460 includes hair, blood, fat, teeth, and sebum. The dermoid cyst 460 is configured such that it can be removed without damaging the left ovary 462, especially by a skilled surgeon. In the case of a less skilled surgeon, removal may present sufficient difficulty that the choice can be made to sacrifice the ovary 462. In some embodiments, the dermoid cyst may be positioned on the right ovary 206.

In summary, the uterine assembly 450 models the enlarged uterus 455 with a ruptured ectopic pregnancy 400 and a dermoid cyst 460. Thus, the uterine assembly 450 can be used to train and assess, by way of non-limiting example, 1) diagnosing and treating a ruptured ectopic pregnancy, 2) diagnosing and removing a dermoid cyst, 3) performing suction curettage, 4) removing products of conception such as in the case of septic abortion, 5) performing bladder repair, 6) performing a vaginal hysterectomy with morcellation or an abdominal hysterectomy, and/or 7) oophorectomy.

Figure 10:
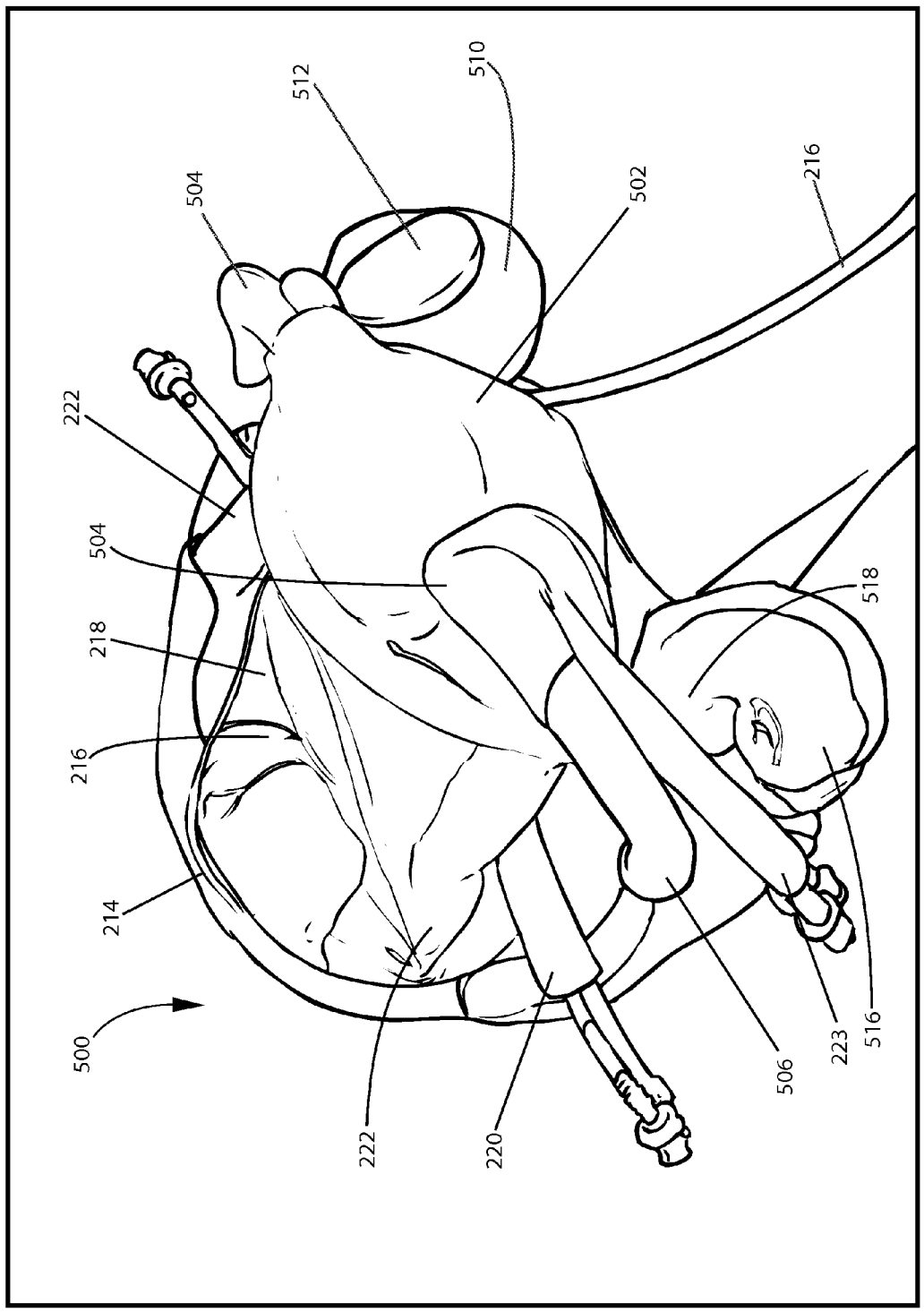

FIG. 10 illustrates a uterine assembly 500 according to one embodiment of the present disclosure. The uterine assembly 500 is substantially similar to the uterine assembly 450 except for the differences noted herein. The uterine assembly 500 models the anatomical structure and relationship of the several pelvic organs modeled in the uterine assembly 450, including the bladder 214, the ureters 216, the peritoneum 218, the uterine vessels 220 (arteries and veins), the ligaments 222 (i.e., round, uterosacral, infundibulopelvic, and cardinal ligaments), the ovarian vessels 223 (arteries and veins), and the perineum 224 with the integrated vagina 226 (not visible in FIG. 10).

Figure 11:
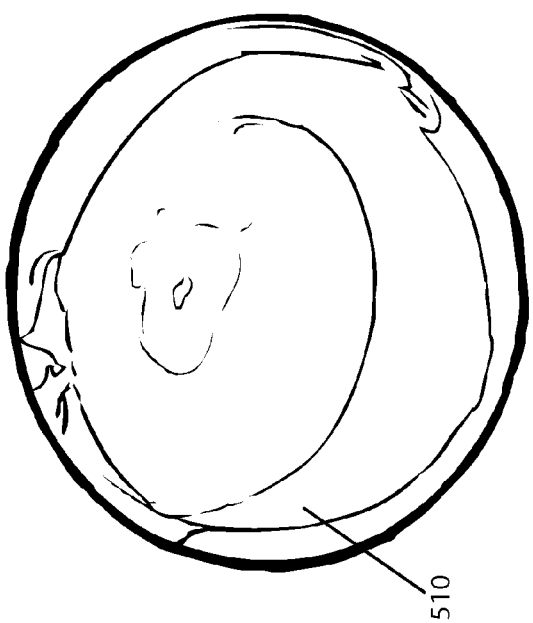

The uterine assembly 500 also models an enlarged uterus 502, from which extend a right fallopian tube 504 and a left fallopian tube 506. The right fallopian tube 504 is positioned adjacent a simulated endometrioma 510 on a right ovary 512. As shown in more detail in FIG. 11, the endometrioma 510 is modeled to replicate the shape, size, texture, and contents of an actual endometrioma. As such, the endometrioma 510 includes coagulated blood surrounded by a thin wall. The endometrioma 510 is configured such that it may be removed without damaging the right ovary 512, especially by a skilled surgeon. In the case of a less skilled surgeon, removal may present sufficient difficulty that the choice can be made to sacrifice the ovary 512.

Figure 12:

The uterine assembly also models a simple cyst 516 on a left ovary 518. As shown in more detail in FIG. 12, the cyst 516 is modeled to replicate the shape, size, texture, and contents of an actual simple cyst. As such, the cyst 516 contains fluid surrounded by a thin wall, and it is designed so that it can be removed without damaging the left ovary 518, especially by a skilled surgeon. In the case of a less skilled surgeon, removal may present sufficient difficulty that the choice can be made to sacrifice the ovary 518. In alternate embodiments, the endometrioma may be on the right ovary, while the cyst is on the left ovary.

The enlarged uterus 502 offers a realistic replica of a human uterus containing uterine masses including, but not limited to, intramural fibroids 504 and subserosal fibroids 506 found in the intramural and subserosal uterine sites. In some embodiments, the enlarged uterus 502 allows an innovative, dynamic and interactive scenario simulating a routine myomectomy through laparotomy, a small abdominal incision, or laparoscopy where uterine fibroids or myomas are surgically removed from the intramural and subserosal uterine sites featuring oozing blood upon removal. Alternatively the fibroid uterus can provide a platform for hysterectomy, the removal of the entire uterus, should this route be chosen by the user.

Figure 14:
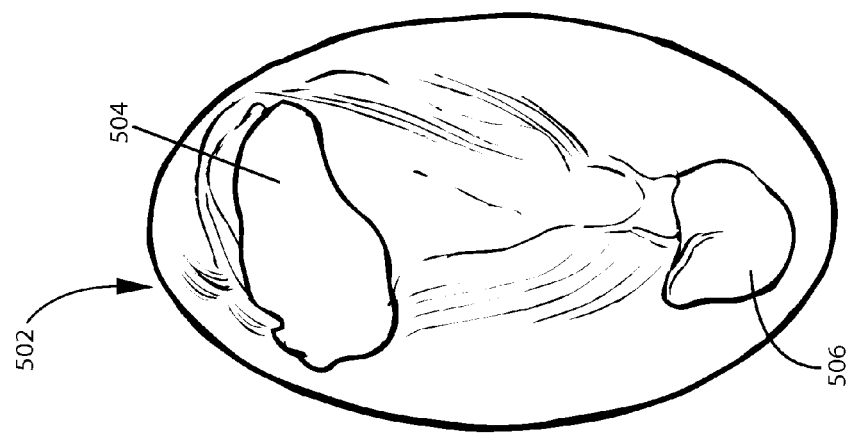
Figure 13:
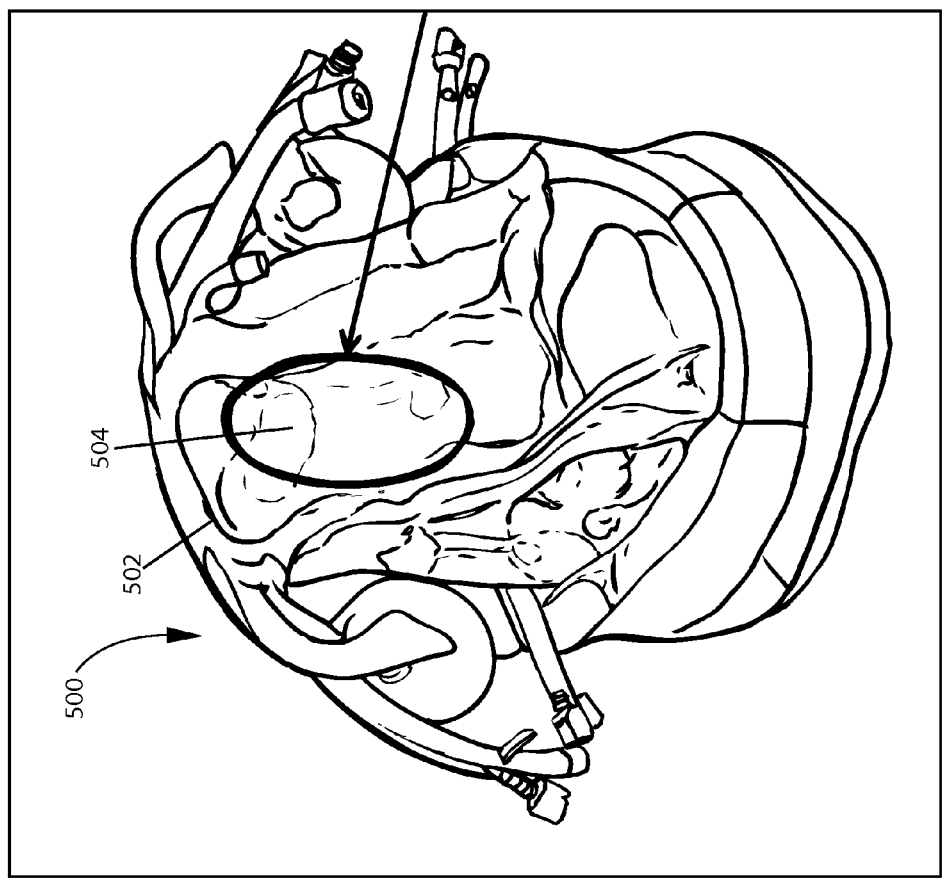

As more clearly shown in FIGS. 13 and 14, the uterus 502 is embedded with a combination of the intramural fibroids 504 and the subserosal fibroids 506. In the pictured embodiment, portions of the subserosal fibroid 506 may be intramural, and portions of the intramural fibroid 504 may be subserosal. In some instances, the fibroids 504, 506 are filled with synthetic blood to create the appearance of bleeding during the surgical removal of these fibroids. In other embodiments, the fibroids 504, 506 are configured without a blood supply.

In alternate embodiments, the enlarged uterus may contain any number of a variety of uterine pathologies and/or masses, including without limitation submucosal fibroids, endometriosis, adenomyosis, hydatiform mole, uterine cancer, intrauterine adhesions, and polyps. Such masses may be intramural, subserosal, submucosal, endometrial, intrauterine, or cervical in location.

In summary, the uterine assembly 500 models the enlarged uterus 502, the endometrioma 510, and the simple cyst 516. Thus, the uterine assembly 500 can be used to train and assess, by way of non-limiting example, 1) abdominal myomectomy, 2) removing an endometrioma, 3) removing a simple cyst, 4) performing a dilation and curettage, 5) performing suction curettage, 6) performing bladder repair, 7) performing a vaginal hysterectomy with morcellation or an abdominal hysterectomy, and/or 8) oophorectomy.

Figure 15:

The enlarged uterus 502 comprises uterine and fibroid composition mimicking an average human fibroid uterus in its anatomical size, geometry, and pigmentation. As shown in FIG. 15, the uterine assembly 500 properly adapts to and seats within a lower abdomen portion 510 of the recess 150 of the patient simulator 110 to provide an accurate anatomical surgical platform. Thus, operation on the realistic enlarged uterus 502 (or other anatomical inserts 115 described herein) may offer the user sufficient surgical recognition and familiarity with the pathological anatomy to successfully perform the necessary procedures (e.g., a myomectomy or a hysterectomy) on a real patient. By operating on the enlarged uterus 502, the user can gain the surgical experience of performing a successful operation (e.g., myomectomy or hysterectomy) as well as attain the skills of visually recognizing and identifying the fibroid location and type and approximating the fibroid size, borders, and/or spread within the myometrium. Moreover, during operation on the enlarged uterus 502, the user is allowed the opportunity of choosing the optimum surgical approach in a stress free environment. Such experience and skills may eventually aid the user in the performance of the same procedures on real patients.

Figure 16:

FIG. 16 shows a bowel overlay 550 according to one embodiment of the present disclosure. In some embodiments, the bowel overlay 550 is provided for added realism during the surgical procedure. The bowel overlay 550 comprises intestinal loops 552 and a mesentery 554. The intestinal loops 552 may comprise any of a variety of intestinal loops, including without limitation portions of small intestine, portions of large intestine, an appendix, and/or a cecum. In some embodiments, the mesentery 554 includes mesenteric deposits of adipose tissue. The bowel overlay may display any of a variety of tissue types and/or deposits, including without limitation fat, diverticula, opaque or clear membrane, infection sites, and blood. In some embodiments, the bowel overlay is a solid mass construction. In some embodiments, the bowel overlay comprises hollow intestinal loops.

As shown in FIG. 16, the bowel overlay 550 properly adapts to and seats within the recess 150 of the patient simulator 110 to provide an accurate and realistic anatomical surgical platform. The bowel overlay 550 properly overlays the uterine assembly in order to offer an accurate anatomical surgical platform for various type of invasive medical procedures. For both abdominal and laparoscopic procedures, the simulated bowel overlay 550 can be moved aside to provide access to the underlying uterine assembly.

The bowel overlay 550 allows for an innovative, dynamic, and interactive scenario simulating proper organ encounters during surgical routines. The bowel overlay 550 allows a realistic interpretation of average human anatomy and provides for marker familiarization during invasive surgical scenarios. In addition, the bowel overlay may enhance training of surgical methods by allowing for performance of surgical procedures on an accurate, realistic, physical platform in a stress free environment. In some embodiments, the bowel insert 550 can be used to train and assess a variety of surgical procedures, including by way of non-limiting example 1) the removal of diverticula, 2) appendectomy, 3) resection of cancer, 4) biopsy retrieval, 5) bowel resection, and 6) the treatment of intestinal infections and/or inflammatory disease.

Figure 51:
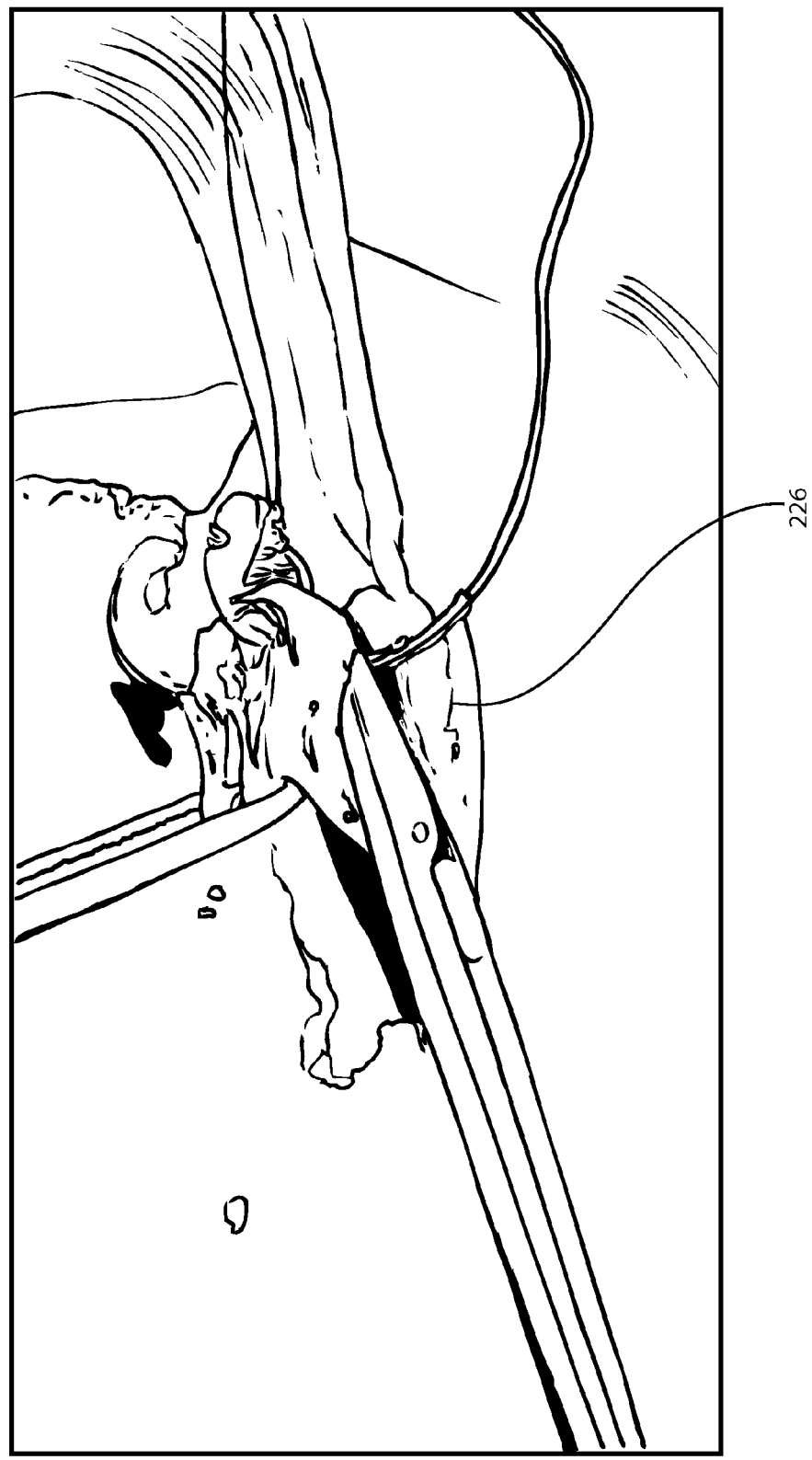

FIG. 51 is a diagrammatic perspective view of a delivery mechanism for use in a patient simulator according to another embodiment of the present disclosure.

Figure 17:
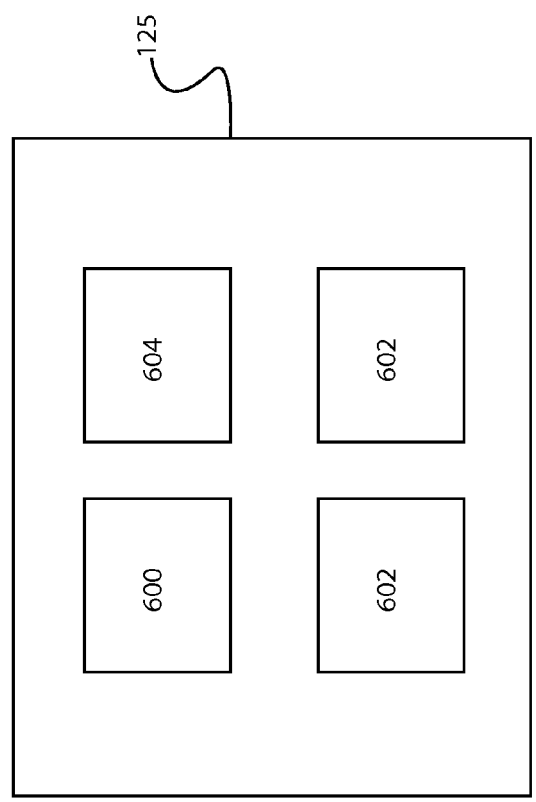

As mentioned above with reference to FIG. 1, the patient simulator system 100 includes a camera system 125 that provides both recording and playback or debriefing functionality. In the pictured embodiment depicted in FIG. 17, the camera system 125 includes a head-mounted camera 600, two onboard cameras 602, 603 and an overhead camera 604. In some instances, the head-mounted camera 600 and the two onboard cameras 602 focus on the surgical technique and intervention methods, while the overhead camera 604 records the actions of the surgical team. Thus, the camera system 125 visualizes both the internal and external features of the patient simulator 110 and the surgical procedure. The camera system 125 allows for the real-time or post-operative, local or remote evaluation of surgical technique, decision making, and team skills exhibited during the scenario.

Figure 18:
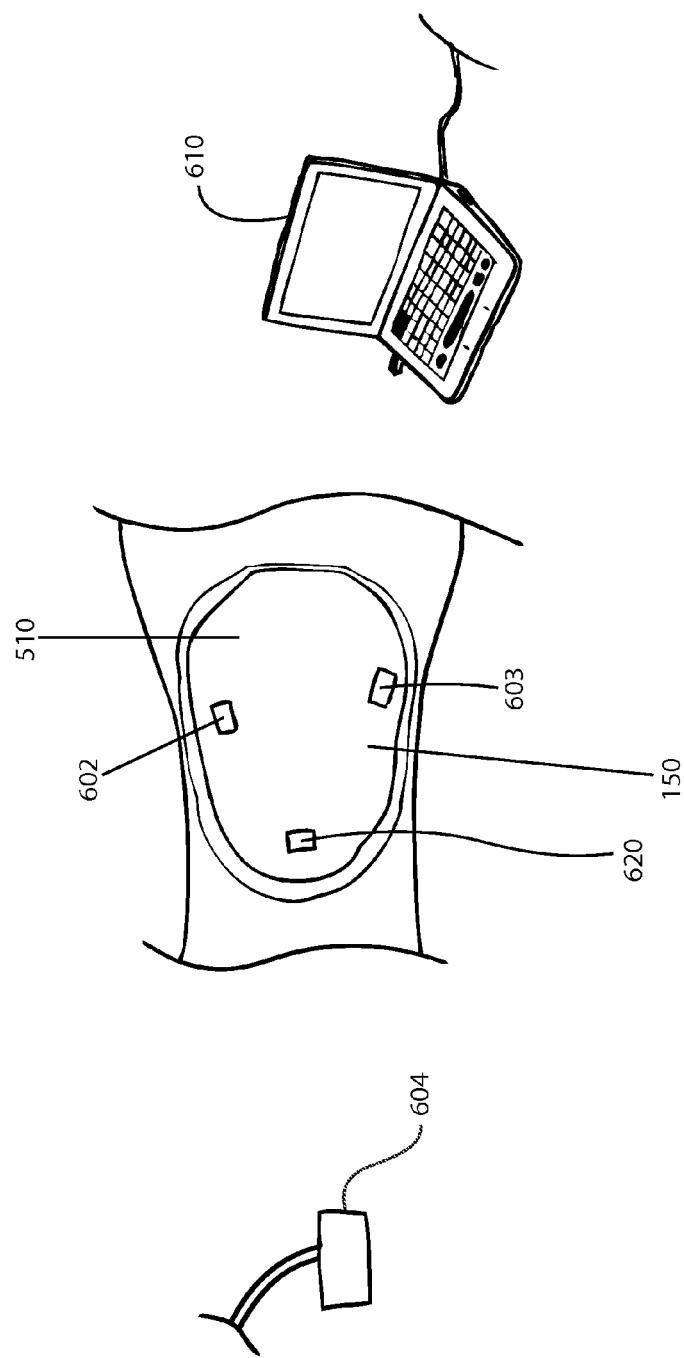

In the pictured embodiment in FIG. 18, the two onboard cameras 602, 603 are installed on the left and right sides, respectively, of the lower abdomen portion 510 in the recess 150 of the patient simulator 110. In the pictured embodiment, the cameras 602 are connected by USB-interface to a laptop 610 controlling the patient simulator 110. An infrared light 620 is positioned in the upper torso and is pointed inferiorly to illuminate the recess 150 (i.e., the simulated abdominal and pelvic cavities) with infrared light, which is invisible to the human eye yet allows the cameras to record the surgical procedure in the darkness of the patient simulator 110. The two cameras 602, 603 allow visualization of the surgical technique from within the recess 150 of the patient simulator 110.

The overhead camera 604 is positioned above the surgical team and field to monitor the actions of the surgical team and well as the surgical technique. In some instances, the overhead camera is positioned directly over the surgical team, while in other instances the overhead camera is positioned at an angle above and away from the surgical team.

Figure 19:

As shown in FIG. 19, the surgeon 620 is provided with the head-mounted camera 600 to provide an "eyes of the surgeon" view for evaluation of surgical technique. The camera 600 allows recording of sound so the verbal interactions of the surgical team can be captured. The camera 600 may be connected to a transmission module and/or battery pack (not shown) carried on the body (e.g., the hip) of the surgeon that allows wireless transmission of the images and sound to the computer system 130 and/or the display 135 (not shown in FIG. 19).

Figure 20:
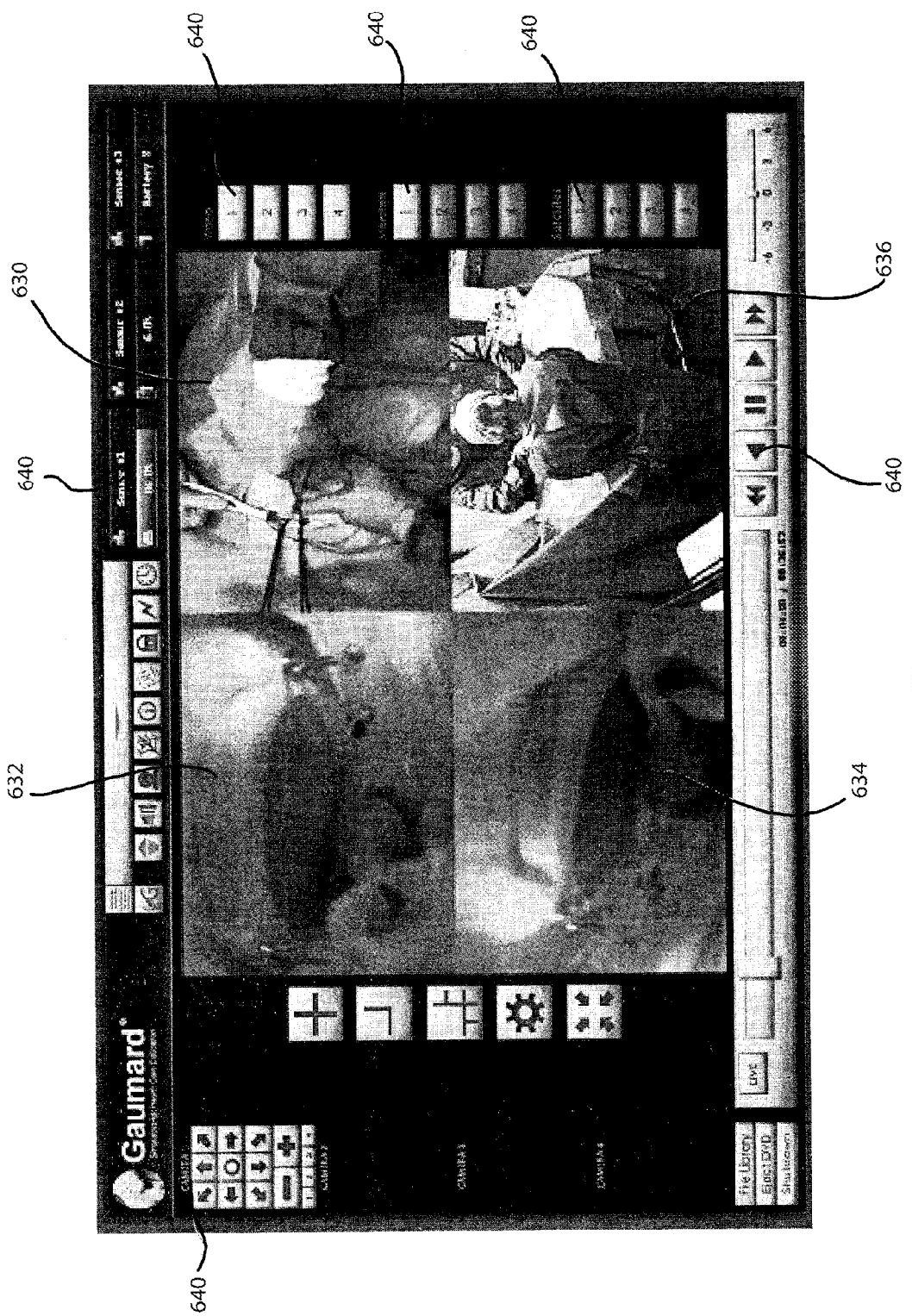

FIG. 20 illustrates a screenshot of an exemplary camera display on either a monitor of the laptop 610 or the display 135. As shown in FIG. 20, the four cameras 600, 602, 603, and 604 can provide four different views 630, 632, 634, 636, respectively, of the surgical procedure and/or the surgical team at substantially the same time. In some embodiments, the user may adjust the camera features, including by way of nonlimiting example, angles, video functions, and display functions, using the computer system 130 and/or the display 135. For example, in the pictured embodiment, the user may adjust various camera system features using the plurality of controls or buttons 640.

The patient simulator system 100 allows users to perform and assess a variety of surgical procedures, including but not limited to: dilation and curettage for pregnancy loss, removal of an ovarian mature teratoma (including a dermoid cyst), treatment of an ectopic pregnancy, an abdominal hysterectomy, a vaginal hysterectomy, treatment of a pelvic mass, a myomectomy, removal of a simple cyst, removal of an endometrioma, fistula repair, and treatment of a septic abortion. In addition, the patient simulator system 100 allows users to address and assess a variety of surgical complications in the operating room, including a patient with bleeding disorders (such as, by way of non-limiting example, von Willebrand's disease), post-operative hemorrhage, fire in the operating room, cardiac arrest, hypoxia, anaphylaxis, and malignant hyperthermia.

Referring back to FIG. 1, the computer system 130 controls the physiological behavior of the patient simulator 110, the anatomical insert 115, and/or the abdominal wall insert 120 in response to a selected or pre-set scenario as well as user interactions with the patient simulator 110, the anatomical insert 115, and/or the abdominal wall insert 120. In some embodiments, the computer system 130 provides physiological algorithms that are modeled on concurrent differential equations to provide autonomous or semi autonomous control of the simulators' vital signs. In that regard, in many instances the physiological modeling is executed without the need for substantial input or direction from the facilitator or user in control of the simulator system 100. Rather, in many instances, the facilitator or user in control of the simulator need only actuate a particular scenario through a user-interface (e.g., clicking on a simulated button for the particular physiological scenario on a display associated with a computing device) and the physiological models will automatically control the vital signs of the simulators based on the selected scenario and/or the user's interaction with the simulators (e.g., treatments applied to the simulator(s)). In this regard, aspects of the present disclosure are configured for use with the simulators and the related features disclosed in U.S. patent application Ser. No. 13/031,087, which is hereby incorporated by reference in its entirety.

The computer system 130 provides a scenario-based learning platform on which core surgical competencies can be taught, perfected, and tested. In some instances, the computer system 130 utilizes an interactive software package containing the scenarios. In some instances, the patient simulator system 100 includes a workbook of advanced scenarios that are pre-programmed in the interactive software package, thereby providing a platform on which team-building scenarios can be performed for the development of surgical skills and general patient safety. The computer system 130 and/or the workbook may include any of a variety of surgical scenarios, including without limitation ruptured ectopic pregnancy, pelvic mass in pregnancy, post-operative hemorrhage after conization of the cervix, dilation and curettage for pregnancy loss, removal of an ovarian mature teratoma (including a dermoid cyst), treatment of an ectopic pregnancy, an abdominal hysterectomy, a vaginal hysterectomy, treatment of a pelvic mass, a myomectomy, removal of a simple cyst, removal of an endometrioma, fistula repair, and treatment of a septic abortion. In addition, the computer system and/or the workbook may include scenarios dealing with a variety of surgical complications in the operating room, including a patient with bleeding disorders (such as, by way of non-limiting example, von Willebrand's disease), post-operative hemorrhage, fire in the operating room, cardiac arrest, anaphylaxis, and malignant hyperthermia.

Scenarios can be as simple or complex as desired and can cover an entire procedure, starting from patient presentation, to assessment, to surgical management, and ending in the recovery room. For example, the scenario may begin with the patient simulator present in the field with an unknown diagnosis, and then continue with the patient simulator being transported to and evaluated in the emergency room where a pre-operative history can be taken and an initial diagnosis can be made. After the initial diagnostic and history-taking process is completed and assessed, the patient simulator can be transported to the operating room where the appropriate procedure or procedures are performed and assessed. After the simulated procedure or surgery is complete, the patient simulator can be transported to an observation room where post-operative care can be performed and assessed.

Scenarios may be either pre-programmed or self-constructed (i.e., self-designed). Through the use of either pre-programmed or self-constructed scenarios, the patient simulator system 100, and in particular the anatomical inserts and the patient simulator, responds appropriately to interventions and procedures. In some instances, the patient simulator system 100 may include at least one pre-programmed "quick-start" scenario.

In some instances, the scenario can cover an entire procedure. In other instances, the scenarios can cover a portion of a single procedure or multiple portions of various procedures. In other instances, the scenarios can cover a series of complete procedures. In addition, the patient simulator system 100 can be utilized to conduct patient safety drills in real hospital rooms, including without limitation an actual surgical operating room. Through the use of either pre-programmed or self-built scenarios, the simulator responds appropriately to interventions and procedures. In some instances, the scenario starts with the incision to the abdominal insert, and the scenario ends with the abdominal insert being re-sutured.

The order in which procedures are planned can increase the functionality of the anatomical insert 115, including for example the uterine assemblies 200, 450, and 500, by allowing multiple procedures to be carried out on a single insert. In some instances, a minimum of four procedures can be carried out on each uterine assembly disclosed herein. In some instances, a maximum of twenty procedures can be carried out on each uterine assembly disclosed herein. Aside from the specific procedures outlined for each of the uterine assemblies disclosed herein, all of the uterine assemblies disclosed herein can be used to train and assess users in the following procedures: unilateral oophorectomy, conization of the cervix, chromopertubation, and hysteroscopy.

II. Operation of Patient Simulator System

FIGS. 21-54 depict several steps of an exemplary procedure carried out by users on the surgical simulator system 100 that includes the uterine assembly 200 positioned within the patient simulator 110. As shown in the following figures, the procedure is carried out with standard surgical instruments. In this instance, the scenario begins with an incision to the abdominal wall insert 120 while the patient simulator 110 is located in a surgical operating room.

Figure 21:
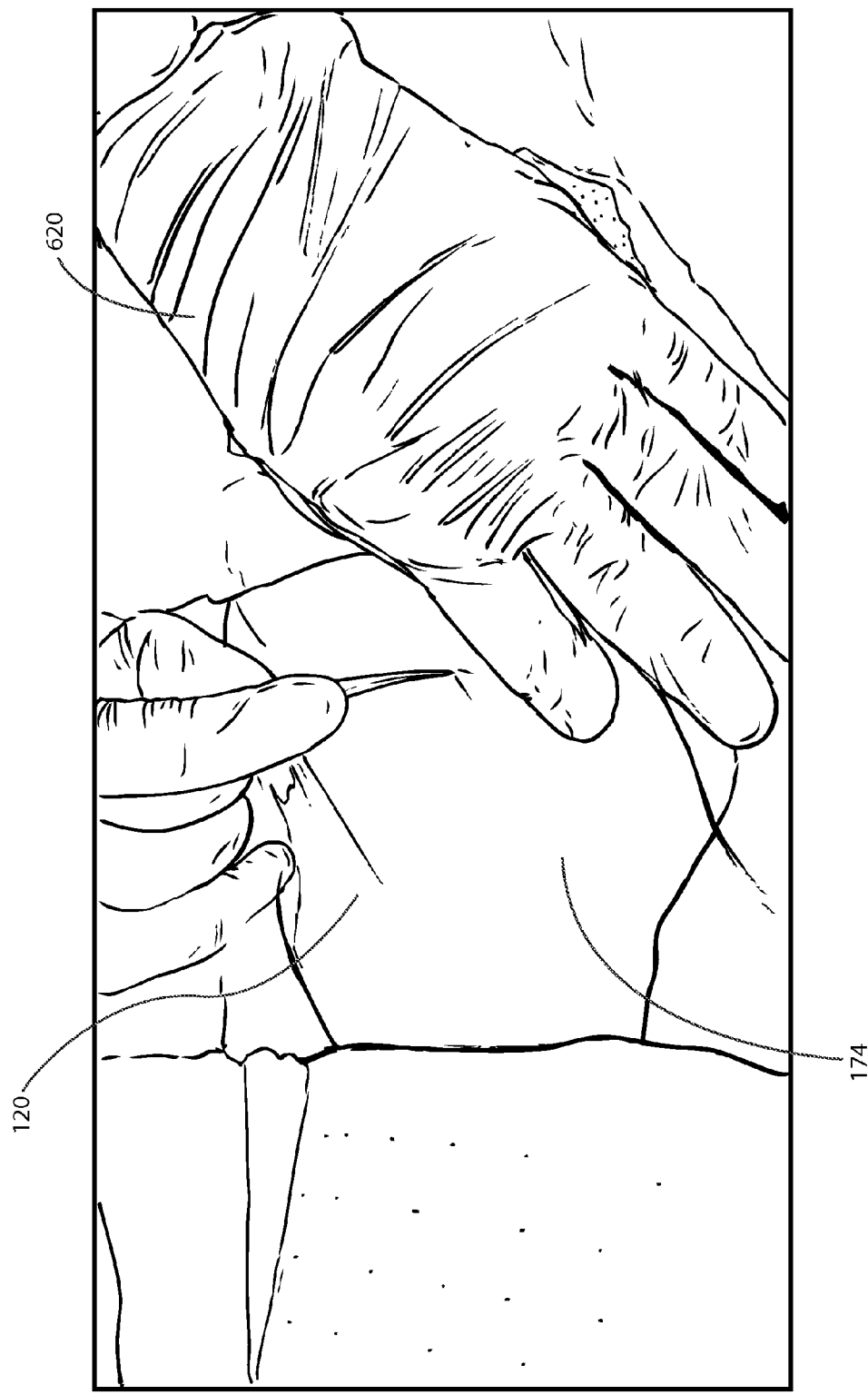
FIGS. 21-54 illustrate various aspects of an exemplary simulation scenario performed with the patient simulator in accordance with one embodiment of the present disclosure.

FIG. 21 illustrates the surgeon 620 incising the laparotomy insert 174 of the abdominal wall insert 120.

Figure 22:
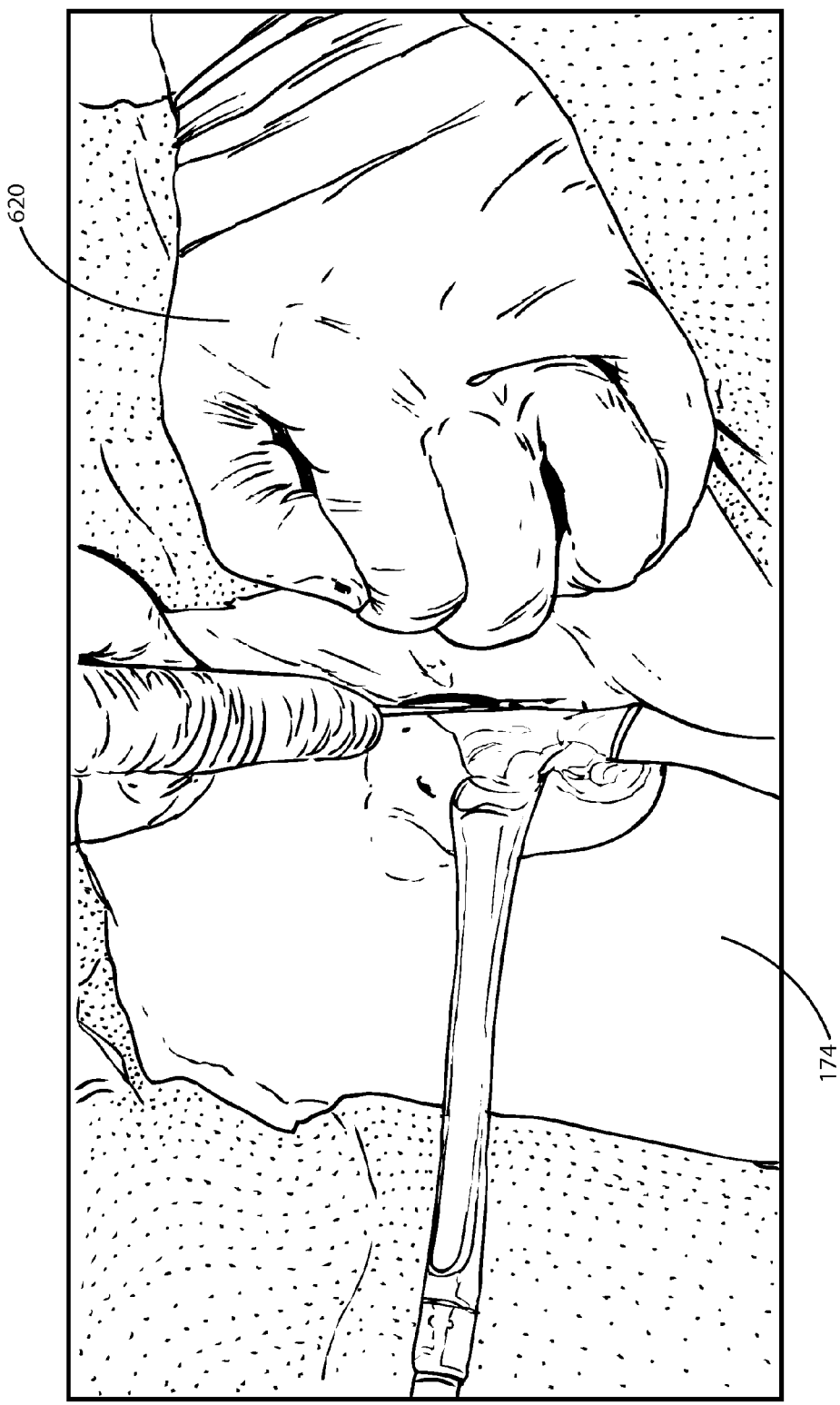

FIG. 22 illustrates retraction of the abdominal wall tissue as the surgeon 620 continues the incision through the layers of the laparotomy insert 174. FIG. 22 shows how the subcutaneous layer 176 is exposed as the incision proceeds deeper into the patient simulator 110.

Figure 23:
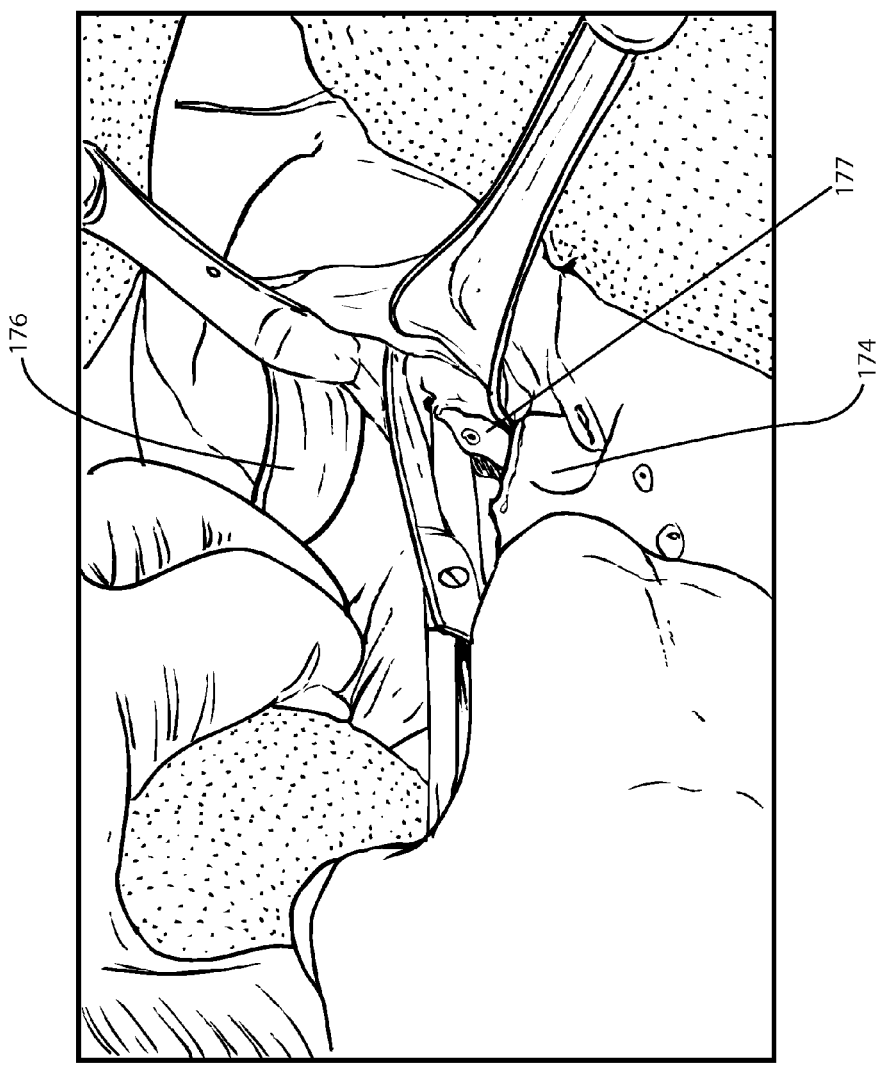

FIG. 23 illustrates incision of the fascial layer 177.

Figure 24:

FIG. 24 illustrates the fascial layer 177 being separated from the underlying muscle layer 178 of the laparotomy insert 174. In some instances, the muscle layer is configured to have the appearance, texture, and feel of the rectus muscles.

Figure 25:
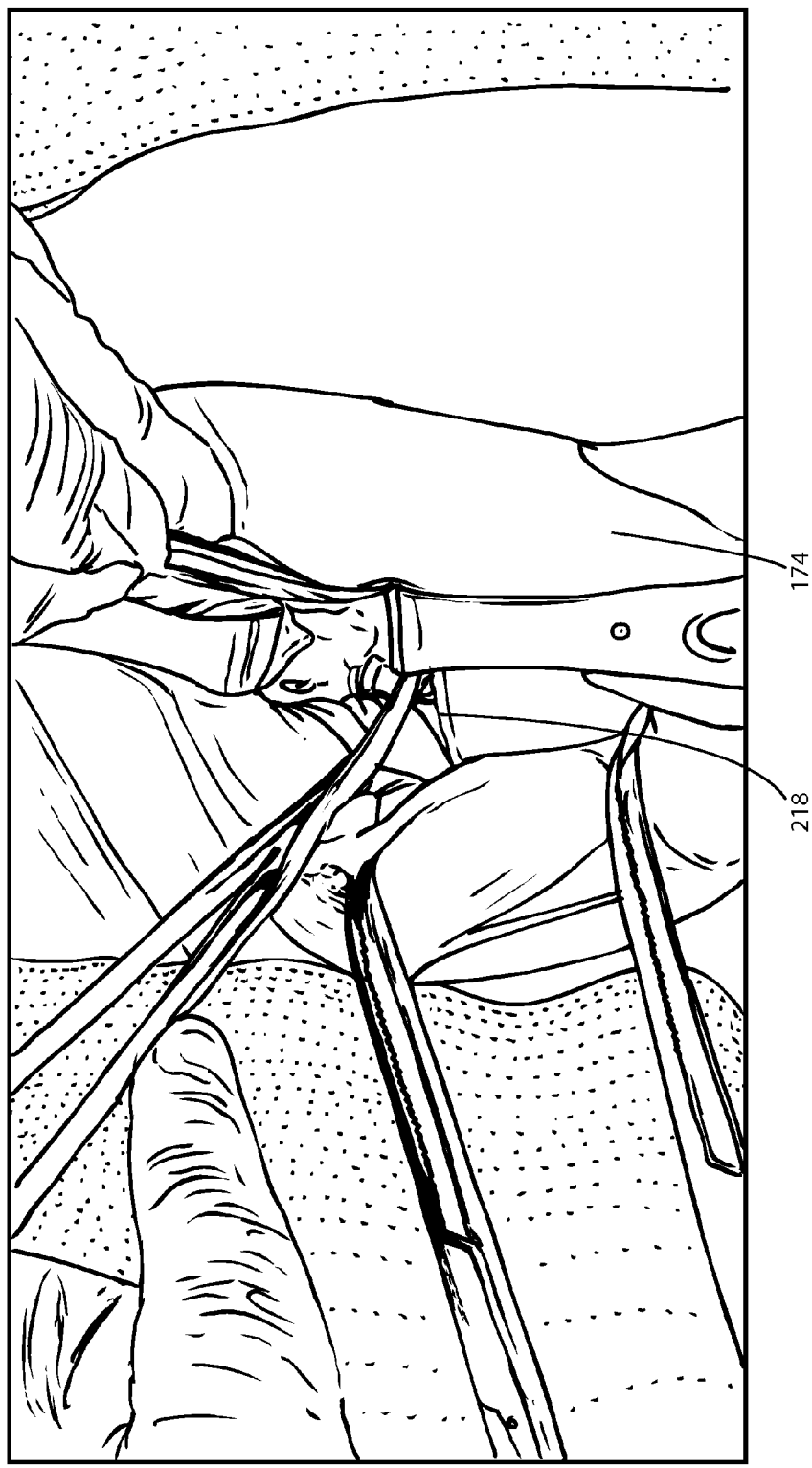

FIG. 25 illustrates incision of the peritoneum 218.

Figure 26:
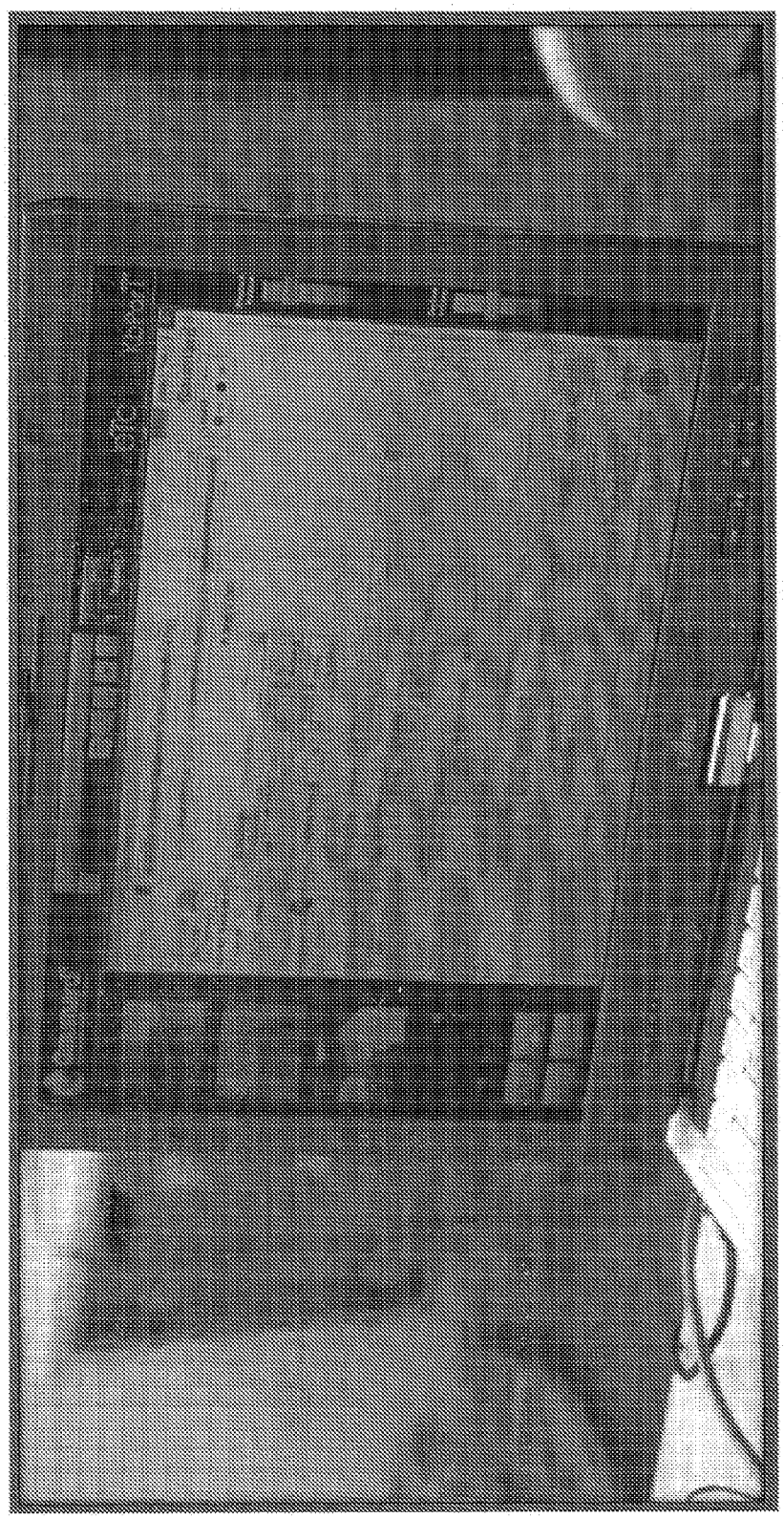

FIG. 26 illustrates the laptop 610, which displays the patient "status" (e.g., vital signs, hemodynamic status, metabolic status, other medically relevant data) and views of the internal cameras 602, 603 and the head-mounted camera 600. In the pictured embodiment, the laptop 610 is wired, but in alternative embodiments the laptop may operate wirelessly. At any time during the course of the procedure, the users (including the surgical team) may refer to the laptop 610 and/or the display 135 to gauge the patient's status, view the camera views of the camera system 125, and view a vital signs monitor 630 (not shown in FIG. 26, shown in FIG. 31). This ability to continuously refer to the laptop 610 and/or the display 135 to monitor the patient's status, view the surgical procedure, and evaluate the patient's vitals mimics the ability of surgeons in a real operating room to continuously be appraised of the patient's condition and the progress of the procedure.

Figure 27:
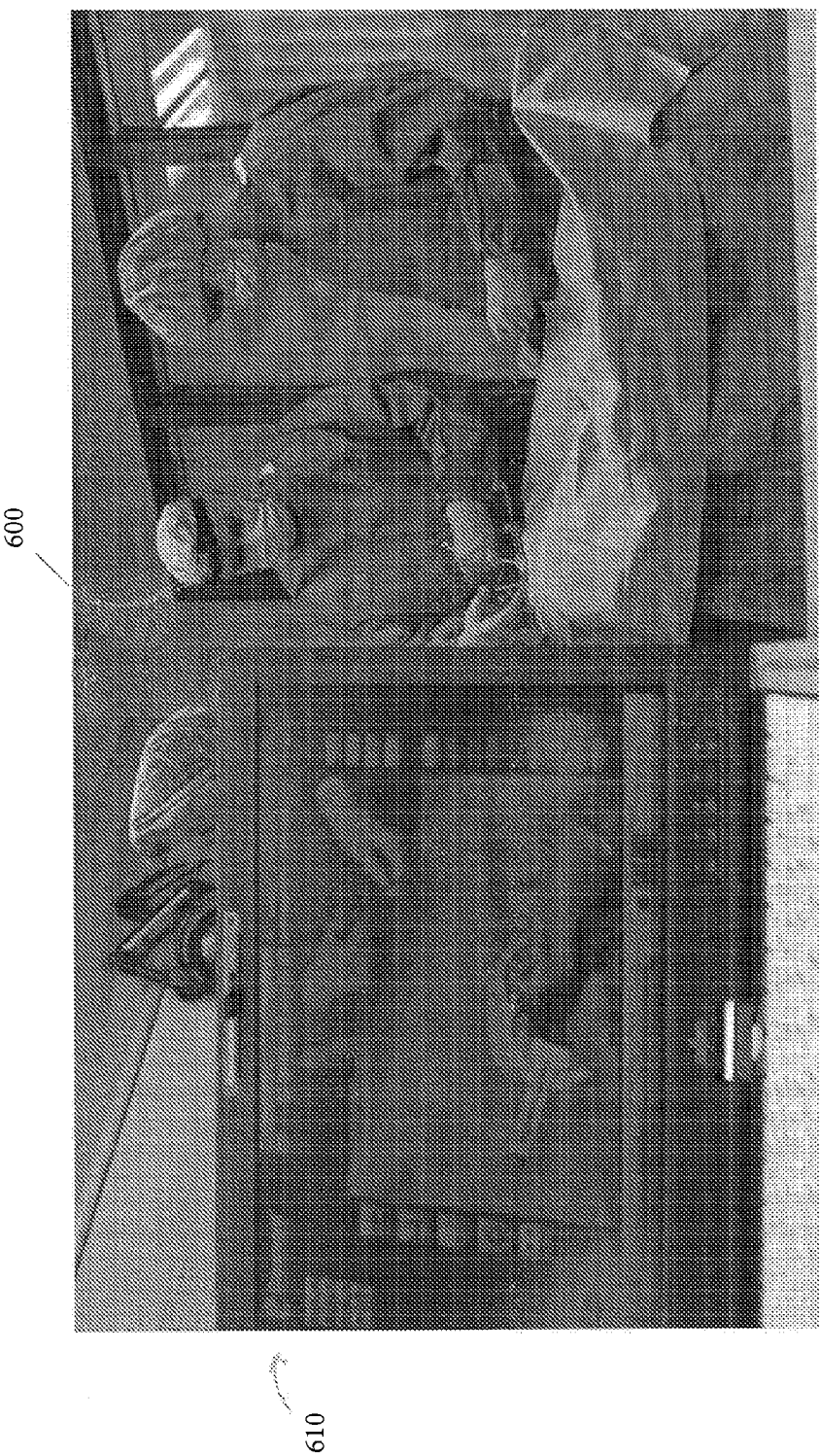

FIG. 27 illustrates the surgical team working on the patient simulator 110 in a surgical operating room. As indicated by FIG. 27, the surgical team is operating under sterile conditions in full surgical gowns and gloves. The laptop 610 is shown displaying the view from the head-mounted camera 600. As noted above, the views from the various cameras in the camera system 225 may be recorded for future review and assessment.

Figure 28:
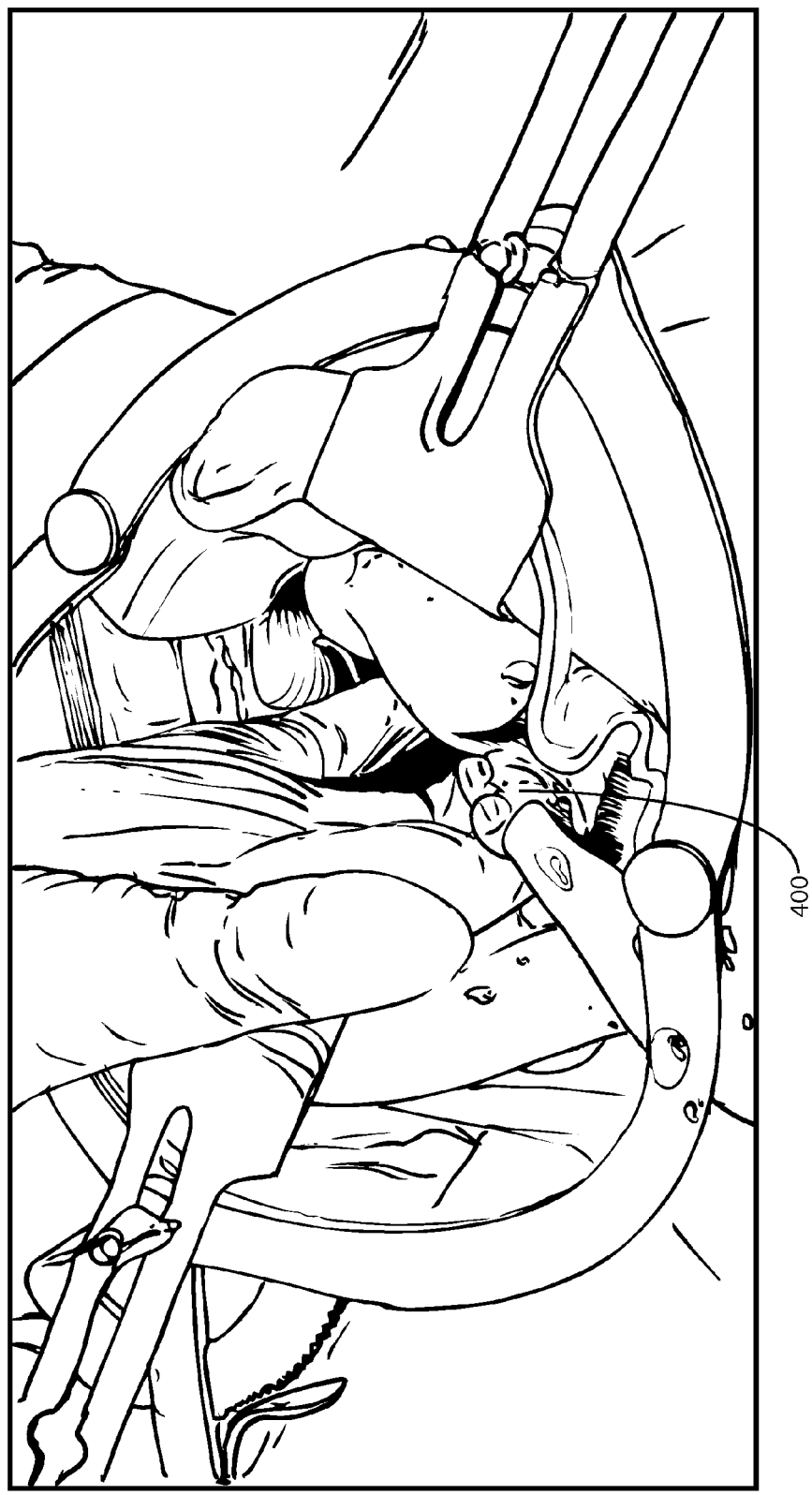

In FIG. 28, the surgical team achieves visualization of the ruptured ectopic 400.

Figure 29:

In FIG. 29, the surgeon 620 identifies and confirms the bleeding ruptured ectopic 400.

Figure 30:
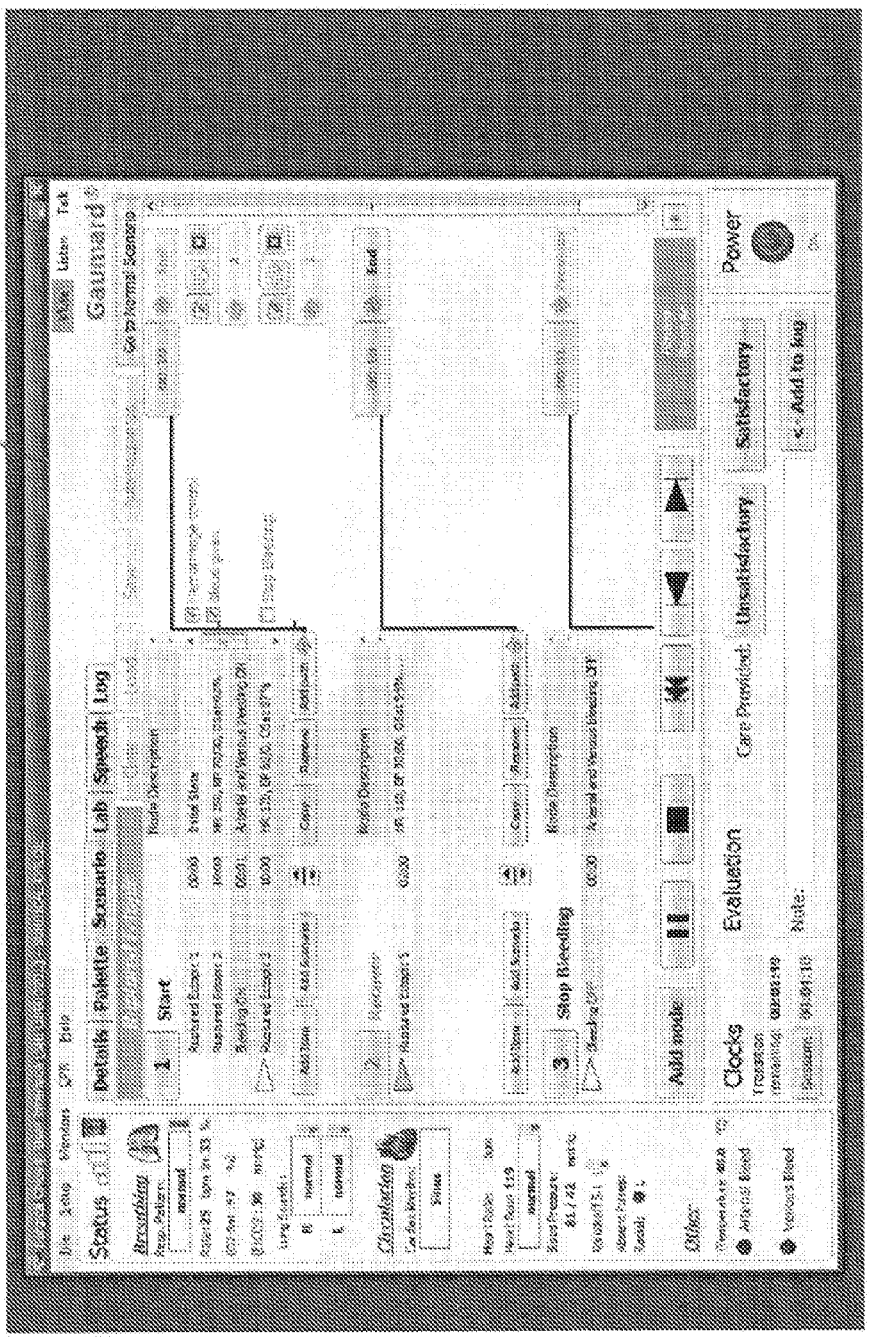

FIG. 30 illustrates the laptop 610 and/or the display 135 showing a screen image 635 describing various features of the current ruptured ectopic scenario. For example, in the pictured embodiment, the ruptured ectopic scenario presents a hemodynamically unstable patient that continues to worsen during the course of treatment unless the ectopic is resected in a timely manner.

Figure 31:
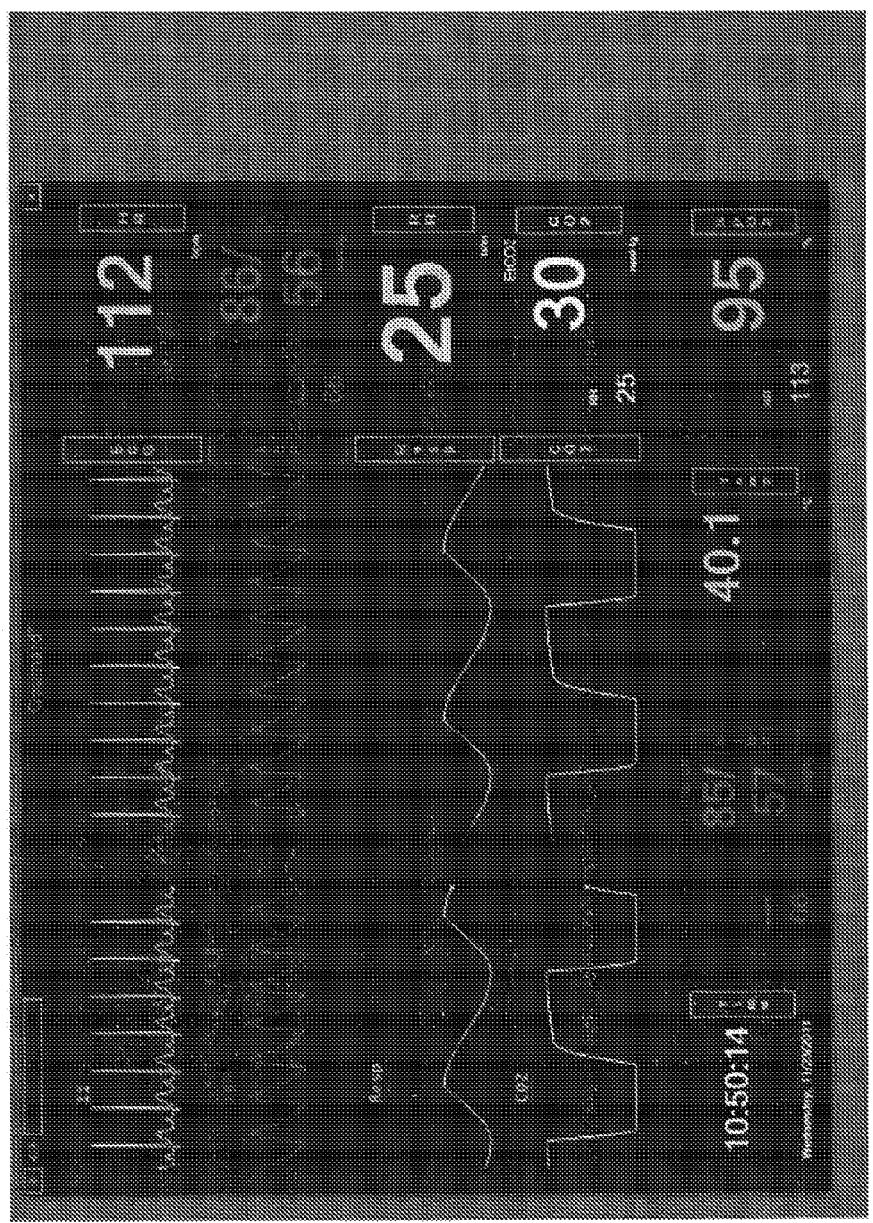

FIG. 31 illustrates the laptop 610 and/or the display 135 showing the vital signs monitor 630. In the pictured embodiment, the vital signs monitor 630 shows deteriorating vital signs, eleven minutes into the ruptured ectopic scenario. In some embodiments, the vital signs monitor includes touch screen capability.

Figure 32:
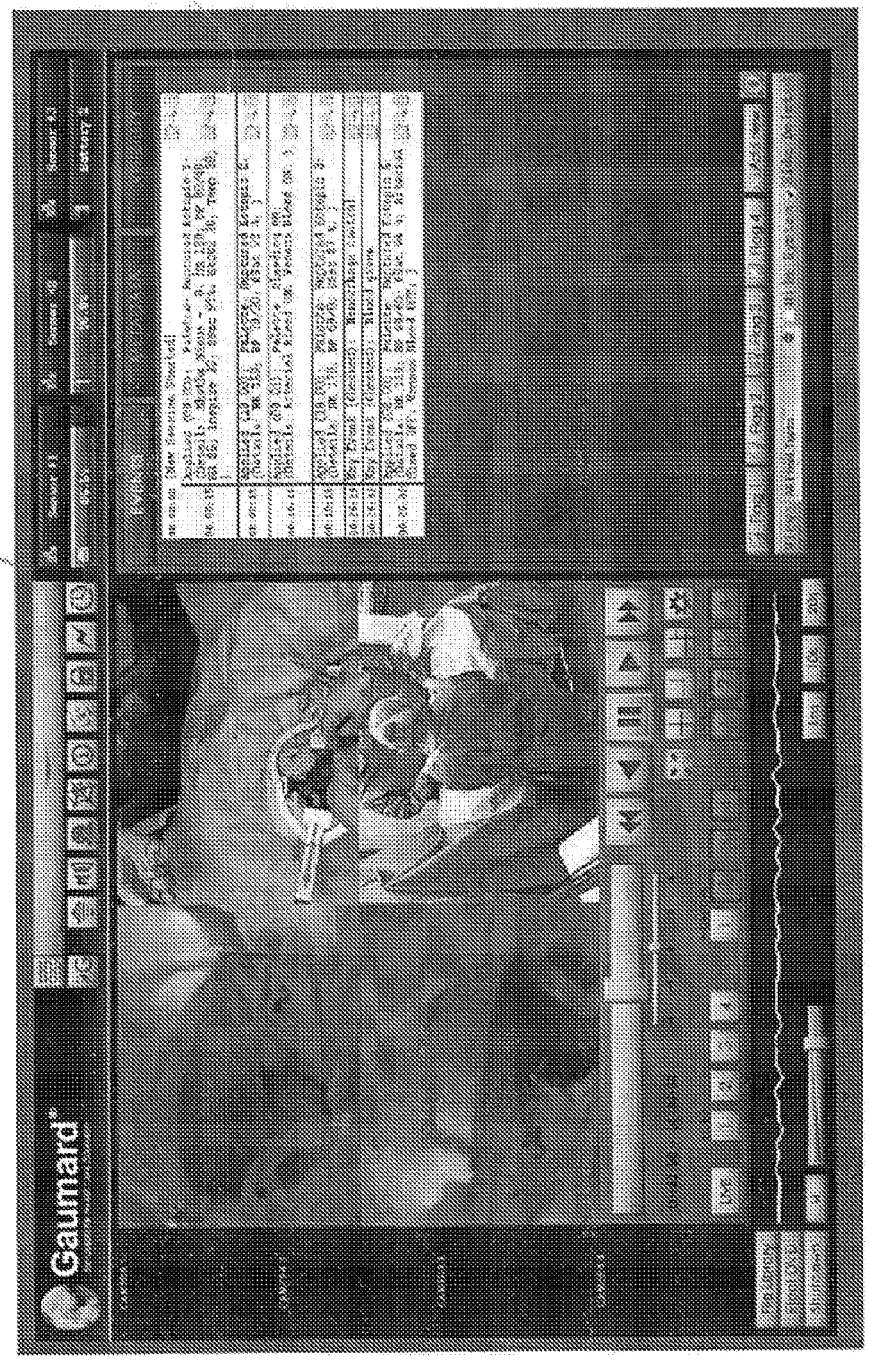

FIG. 32 illustrates the laptop 610 and/or the display 135 showing a screen 636 displaying the four different camera views of the camera system 125 as well as a log 640 of events that occurred during the scenario.

Figure 33:
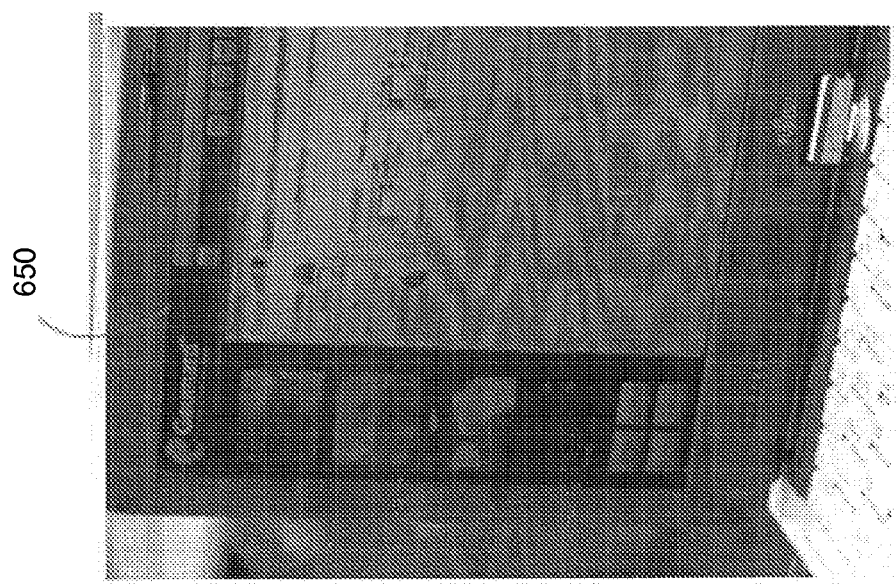

The user may use the computer system 130, the laptop 610, and/or the display 135 to customize the desired display on the laptop 610 and/or the display 135. For example, FIG. 33 illustrates the laptop 610 and/or the display 135 showing a split screen 650 showing various camera view of the camera system 125 as well as the patient "status" during the running of the scenario.

Figure 34:
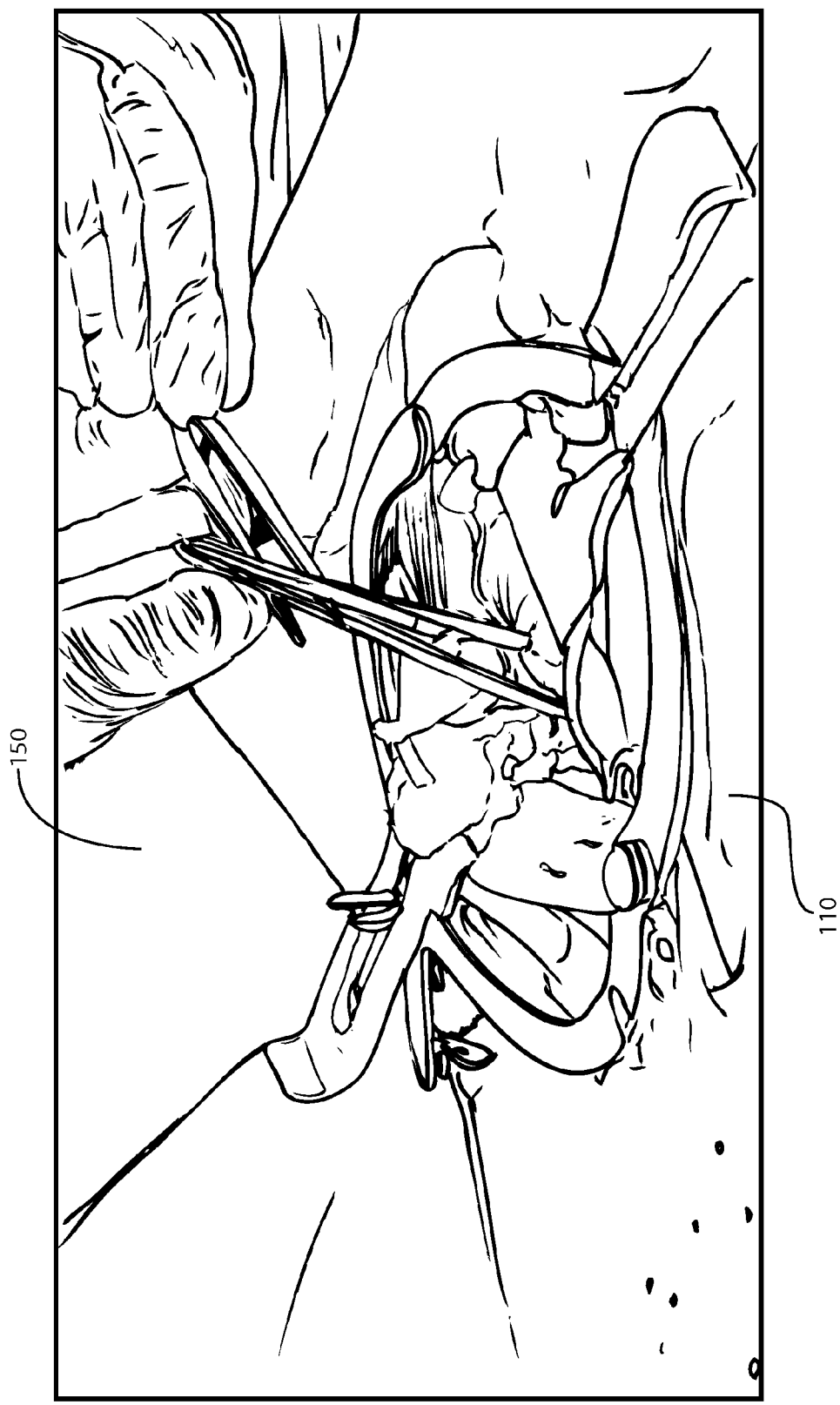

In FIG. 34, the ruptured ectopic 400 (not clearly visible in FIG. 34) is isolated inside the recess 150 of the patient simulator 110.

Figure 35:

FIG. 35 illustrates the resection and removal of the ruptured ectopic 400 after the left fallopian tube 202 is clamped.

Figure 36:

FIG. 36 illustrates the ligation of the left fallopian tube 202.

Figure 37:
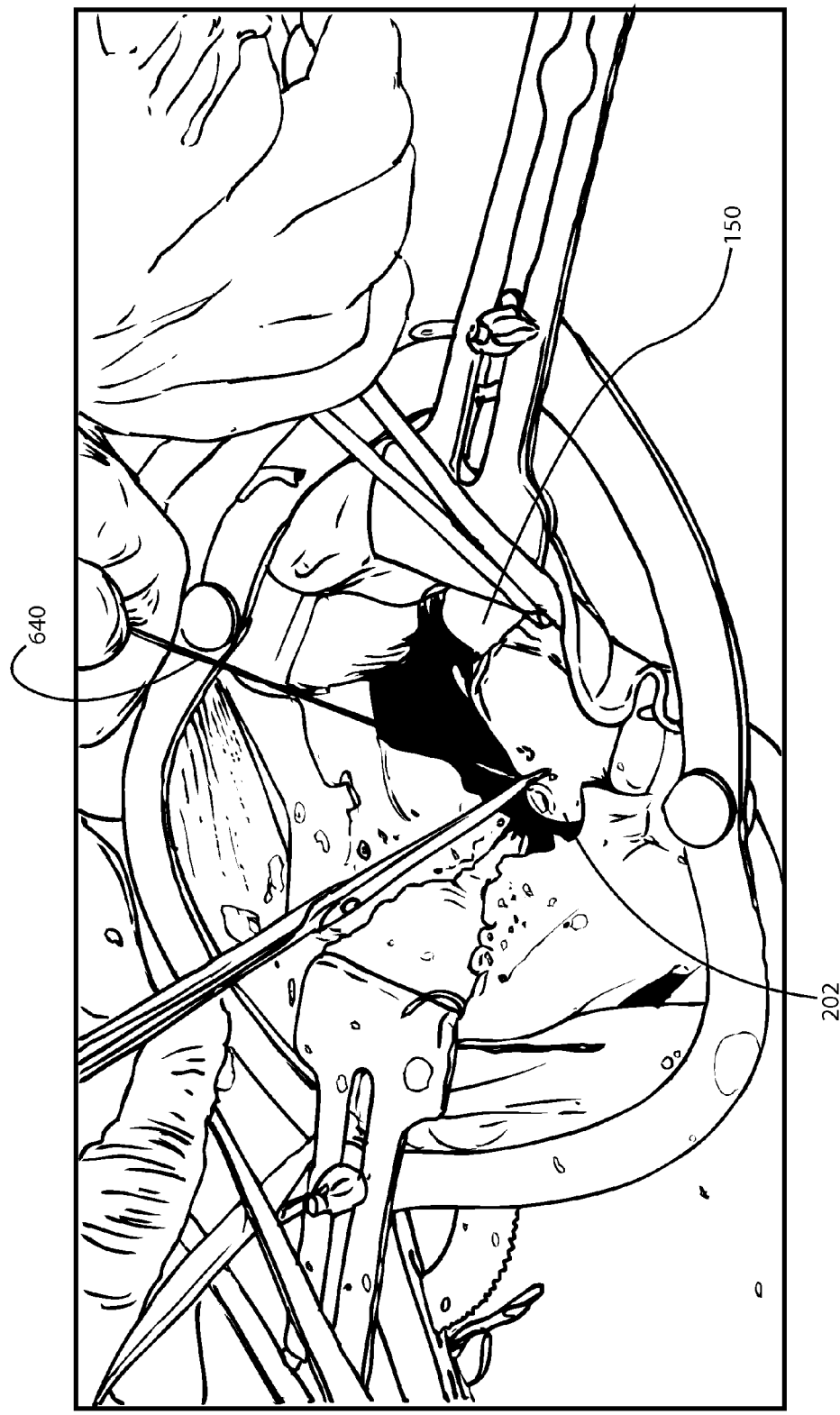

FIG. 37 illustrates cutting a suture 640 of the tubal ligation. The fallopian tube 202 is visible as a stump inside the recess 150.

Figure 38:
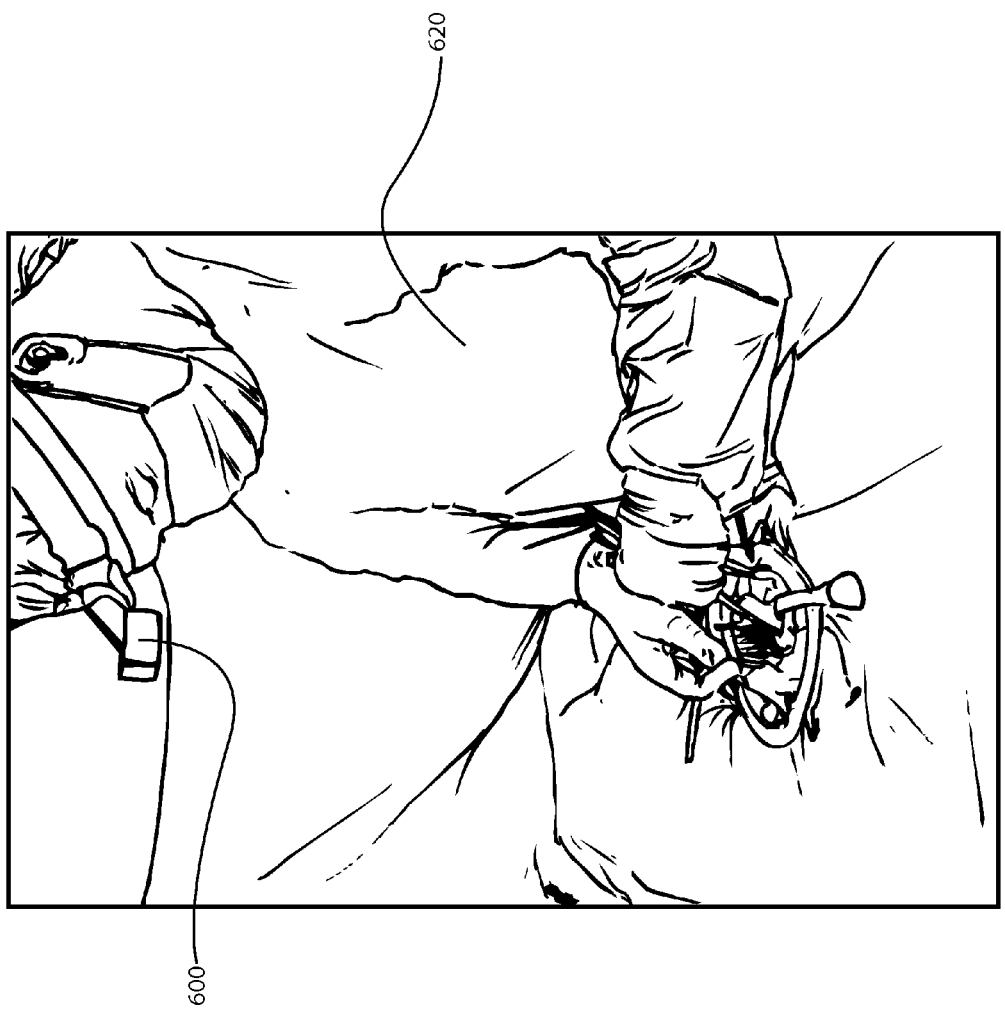

In FIG. 38, the surgeon 620 inspects the fallopian tube 202 (not shown in FIG. 38) for hemostasis after ligation. Throughout the procedure, the head-mounted camera 600 records an "eyes of the surgeon" video for immediate viewing (i.e., by other members of the surgical team or training personnel) or future review.

Figure 39A:
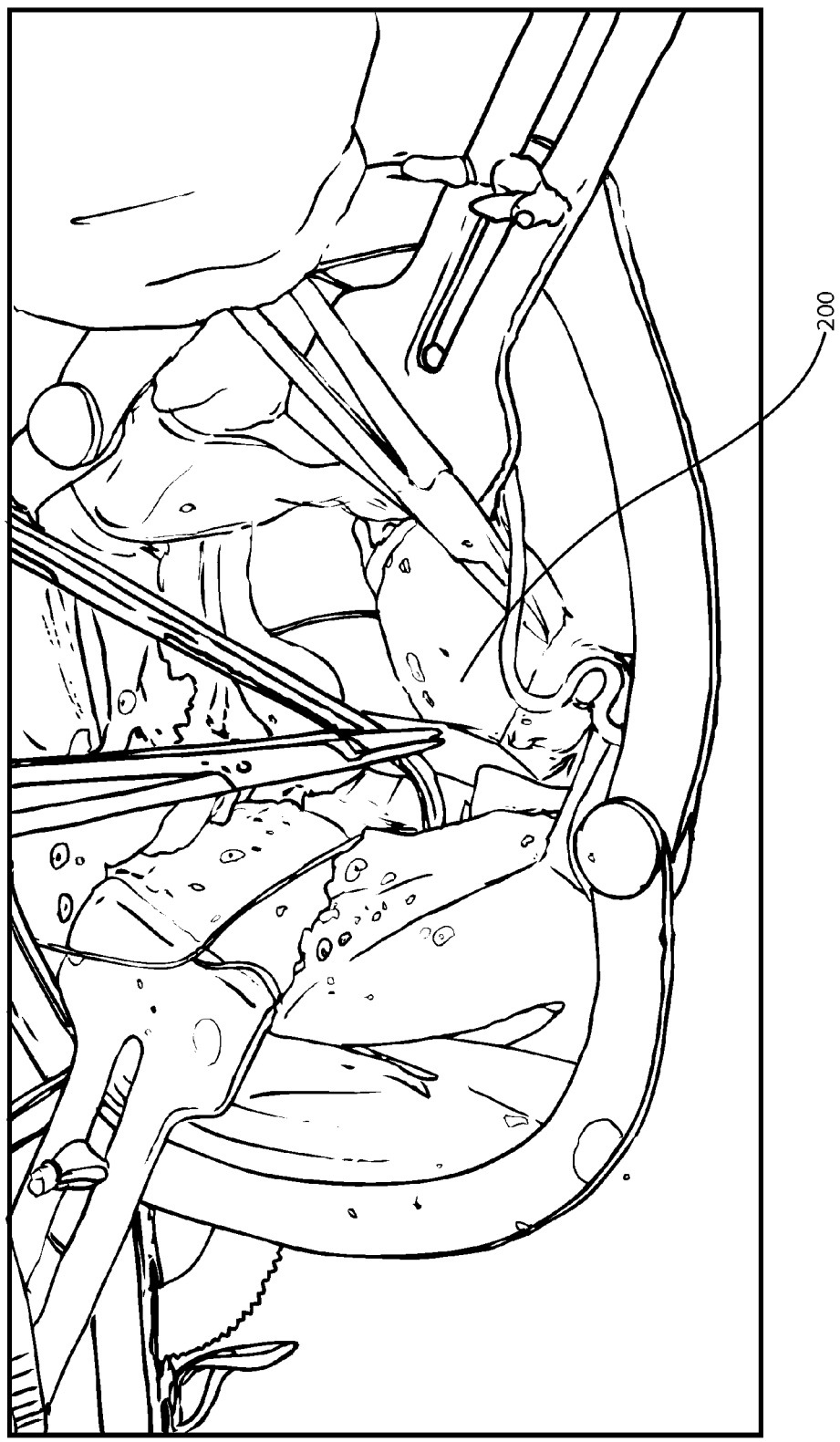
Figure 39:
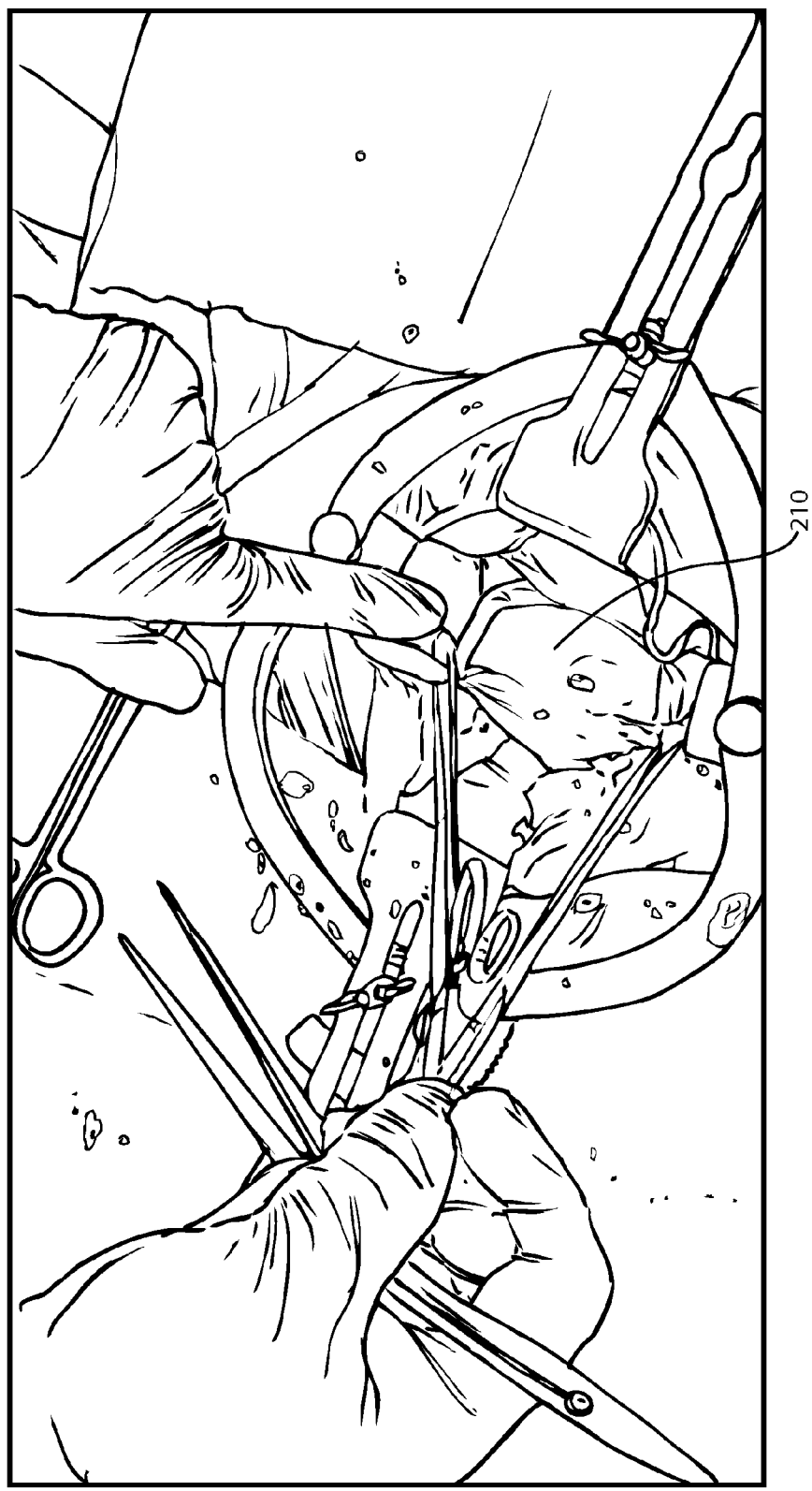

FIG. 39A illustrates how hemostasis of the suture technique can be confirmed using the uterine assembly 200.

After the successful removal of the ruptured ectopic or ectopic pregnancy 400, the uterine assembly 200 can be used for additional procedures. As mentioned above, the order in which the procedures are planned can increase the functionality of the uterine assembly by allowing multiple procedures to be carried out on a single assembly, whether during a single operation or multiple operations.

For example, in one situation, the surgical team performs a simulated abdominal hysterectomy after removal of the ectopic pregnancy 400. FIG. 39B illustrates the surgical team proceeding with an abdominal hysterectomy, in which the uterus 210 is removed.

Figure 40:
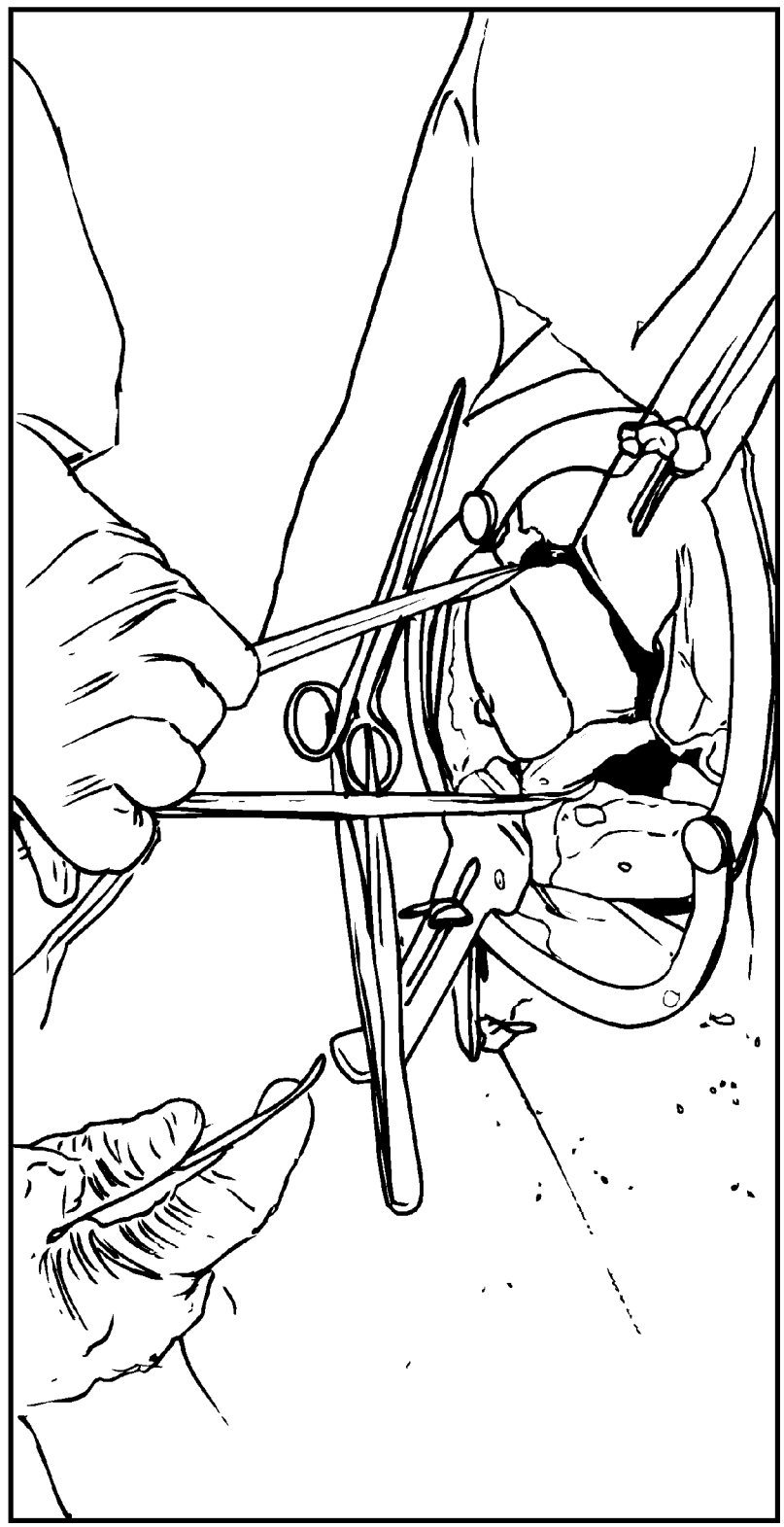

In FIG. 40, the surgical team has isolated the uterine-ovarian pedicles as the abdominal hysterectomy proceeds.

Figure 41:
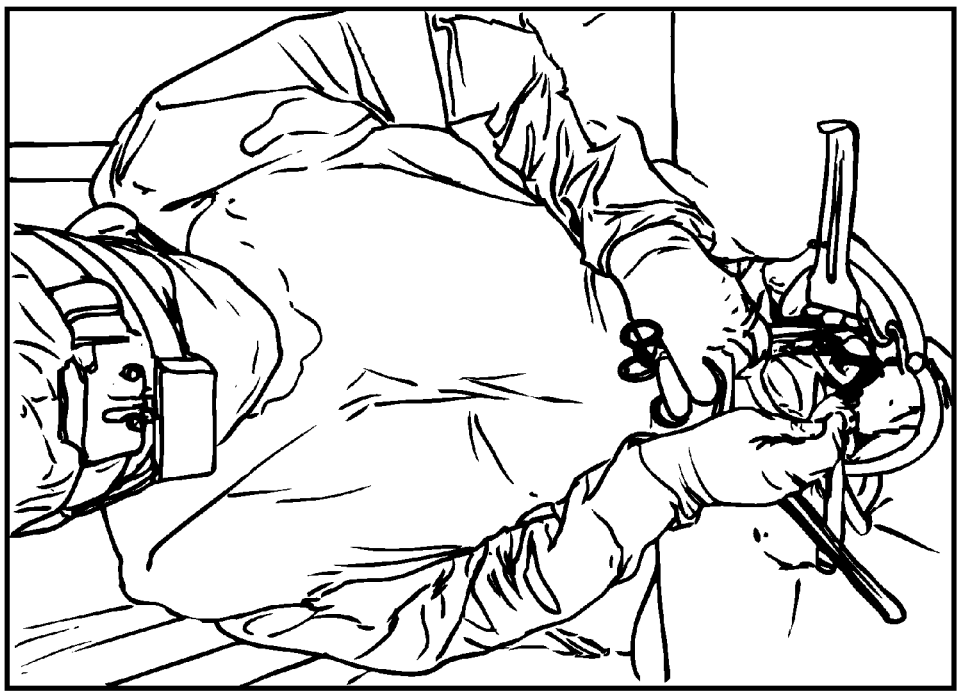

In FIG. 41, the surgeon 620 assesses the knot integrity of the sutures. The uterine assembly 200 with its vascular supply enables realistic assessment of knot integrity.

Figure 42:
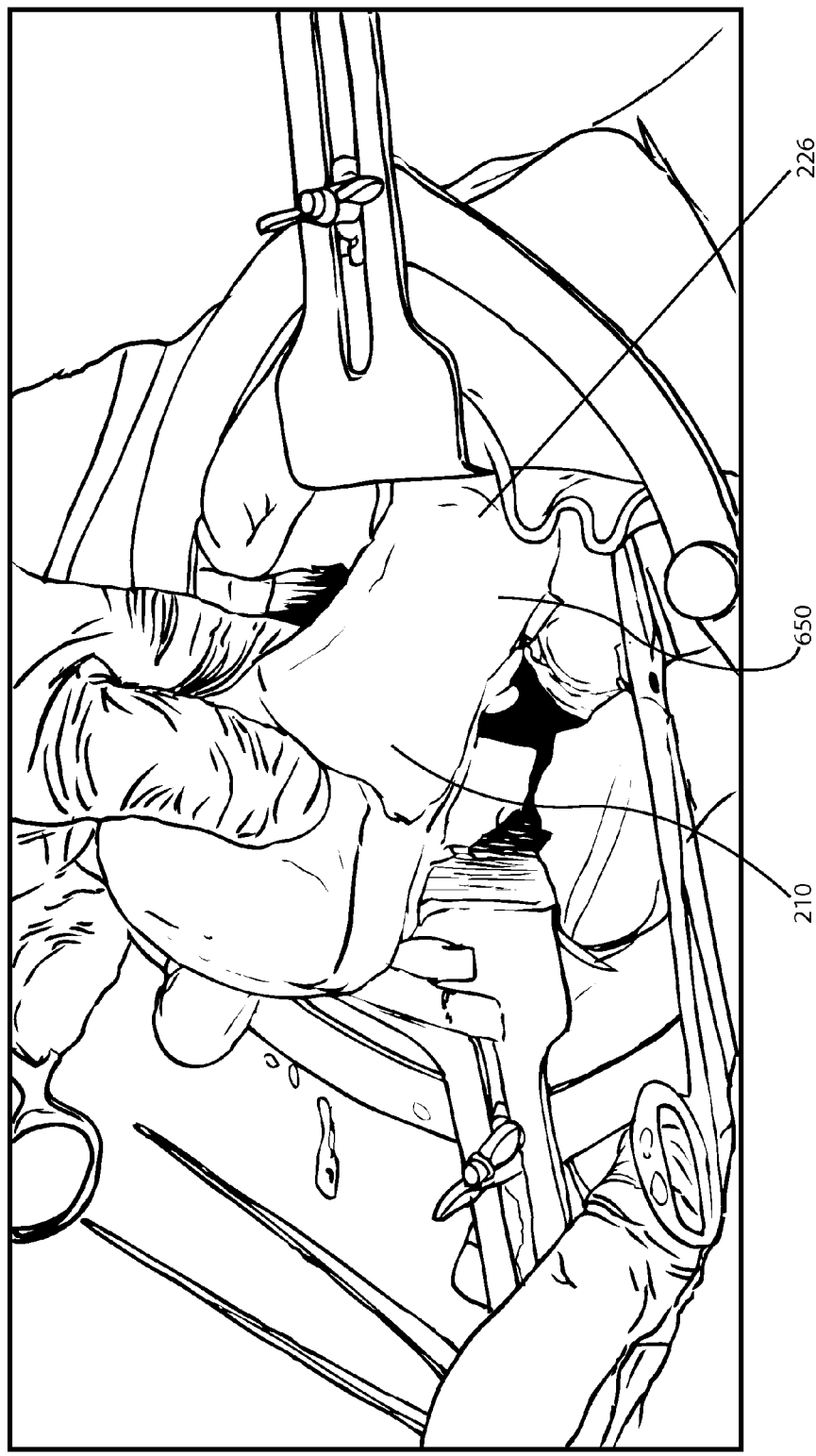

In FIG. 42, a cervico-vaginal junction 650 is exposed in order to place a clamp across the cervico-vaginal junction. Generally, the cervico-vaginal junction 650 is located between the uterus 210 and the vagina 226.

Figure 43:
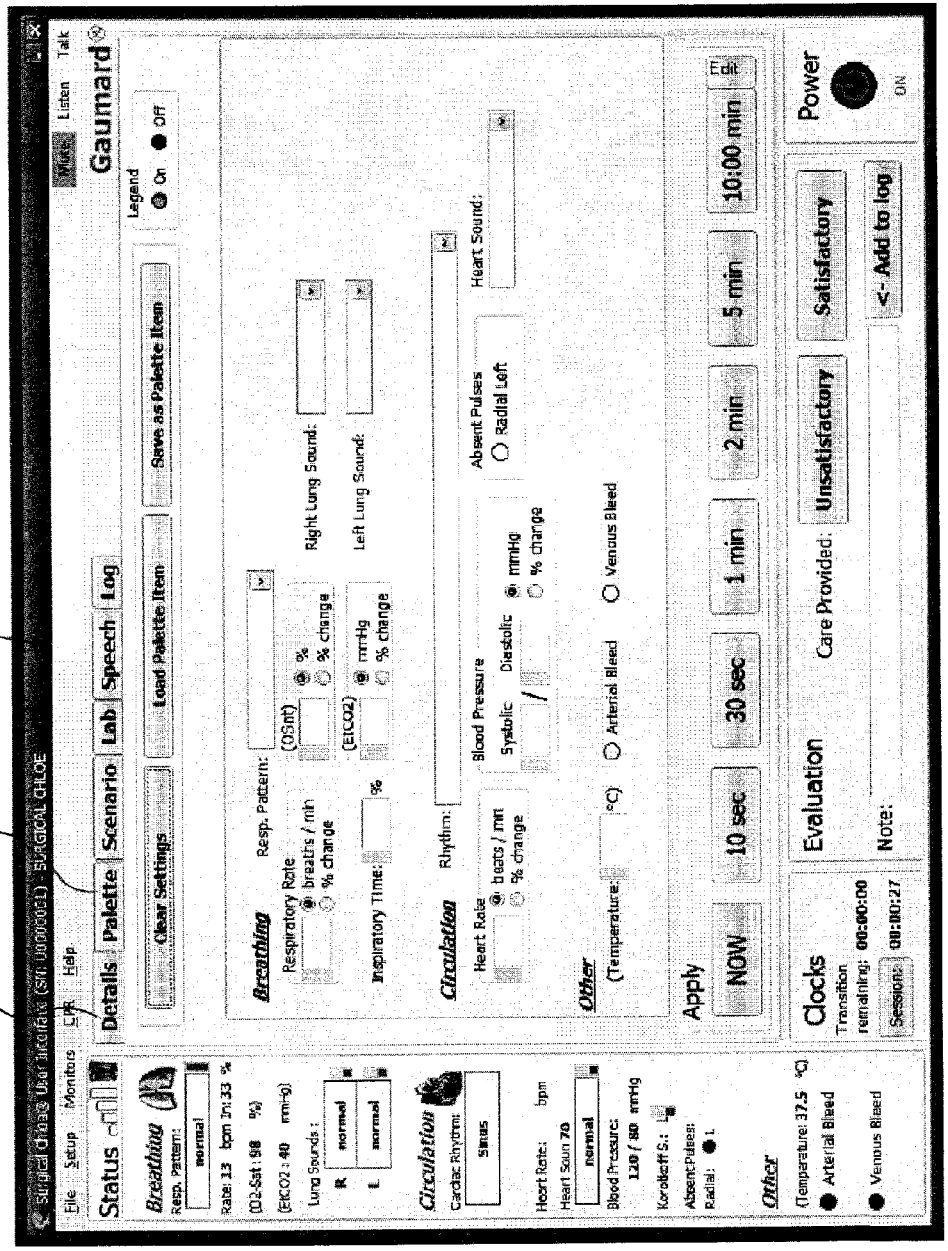

FIG. 43 illustrates the laptop 610 and/or the display 135 showing a screen image 655 describing various features of the patient condition during the current procedure and various setting of the current scenario. For example, the image 655 indicates various vital signs of the patients in real-time, and also provides for options in breathing, circulation, temperature, and other settings of the patient simulator 110. The "devices" menu or tab 659 allows the user to create or select a vital state and apply it immediately to the patient simulator 110. In some embodiments, the user may change conditions in mid-operation (i.e., in the midst of a scenario) and/or save a particular vital state as a palette item in the palette menu 661.

Figure 44:
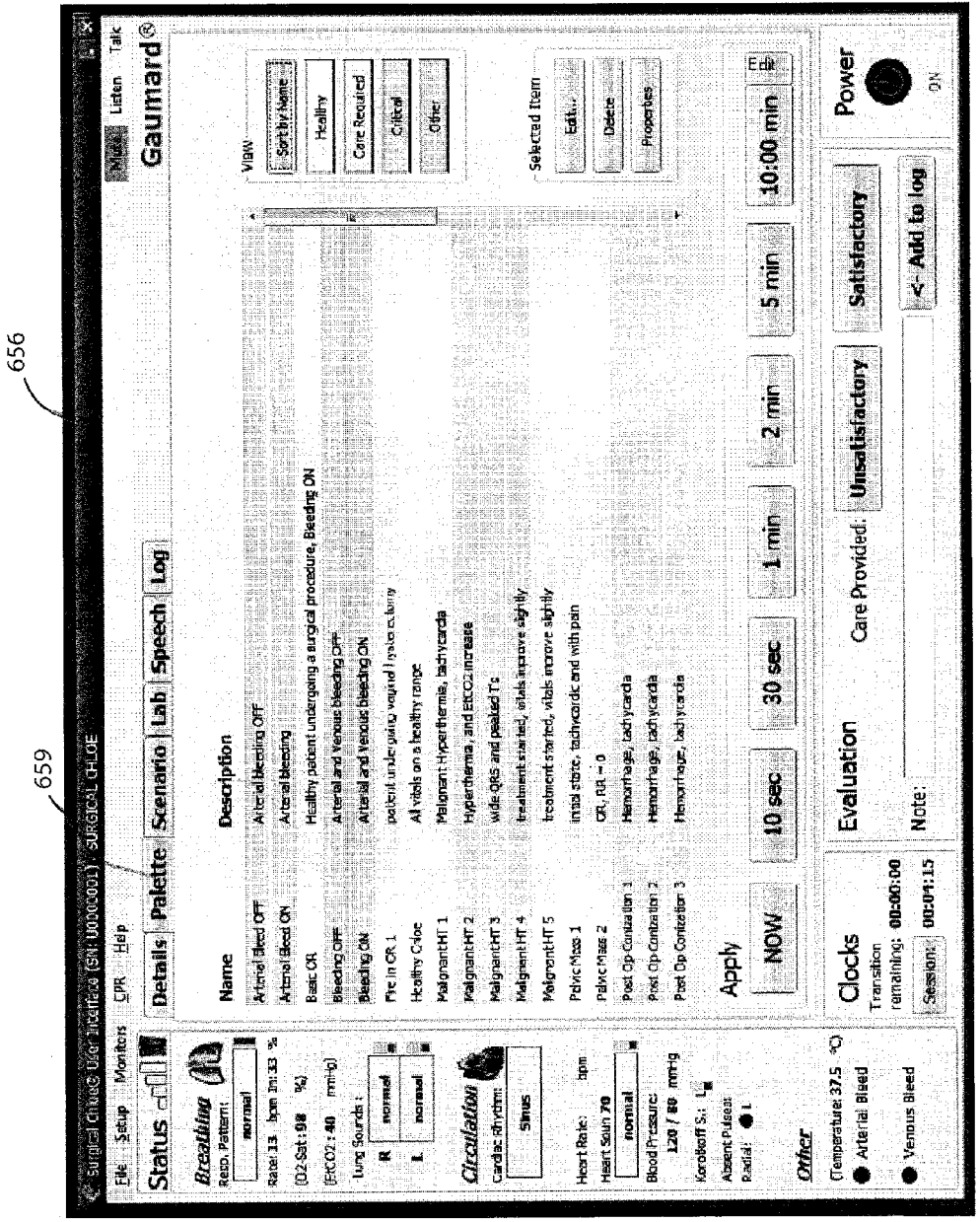

FIG. 44 illustrates a screen image 656 indicating various scenarios in the palette menu 661 available for selection by the user. Thus, the user may select to step the patient simulator 110 through different vital states or create a scenario.

Figure 45:
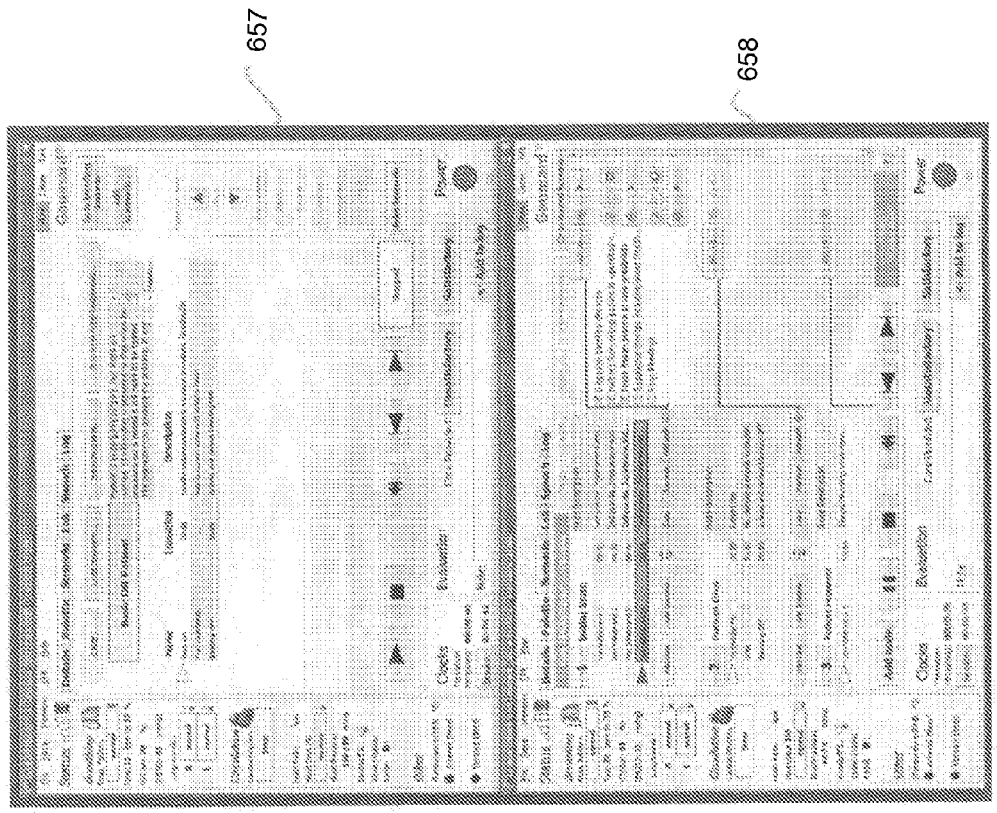

FIG. 45 illustrates two screen images 657, 658 which show options for selecting the type of patient (e.g., by way of non-limiting example, a basic healthy operating room patient or an unhealthy, emergent patient) and the baseline or pre-existing condition of the patient (e.g., by way of non-limiting example, a bleeding disorder such as von Willebrand's disease). Thus, in some embodiments, the user may customize the scenario to select the type of pathologies and medical conditions as well as the baseline or starting condition of the patient simulator 110. In addition, in some embodiments, the user may select the format and frequency of the acquisition of vitals from the patient simulator, as well as the format of the outputted data.

The computer system 130, which in some instances comprises a software platform, allows smooth transitions between physiological states in response to commands from the laptop 610 or another control module. As shown in FIGS. 657, 658, changes in patient simulator condition and care are all time stamped and logged for review.

Figure 46:
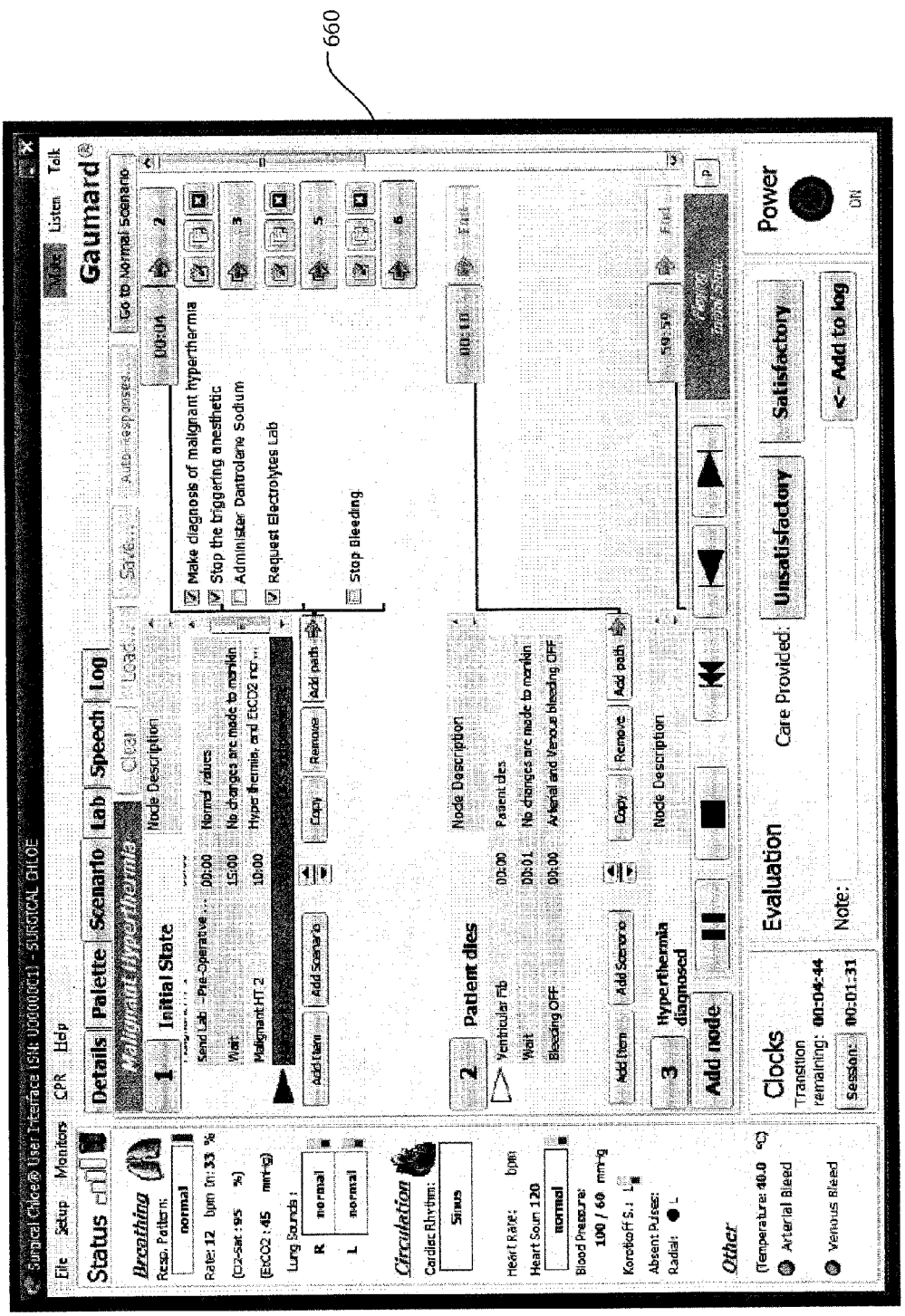
Figure 47:
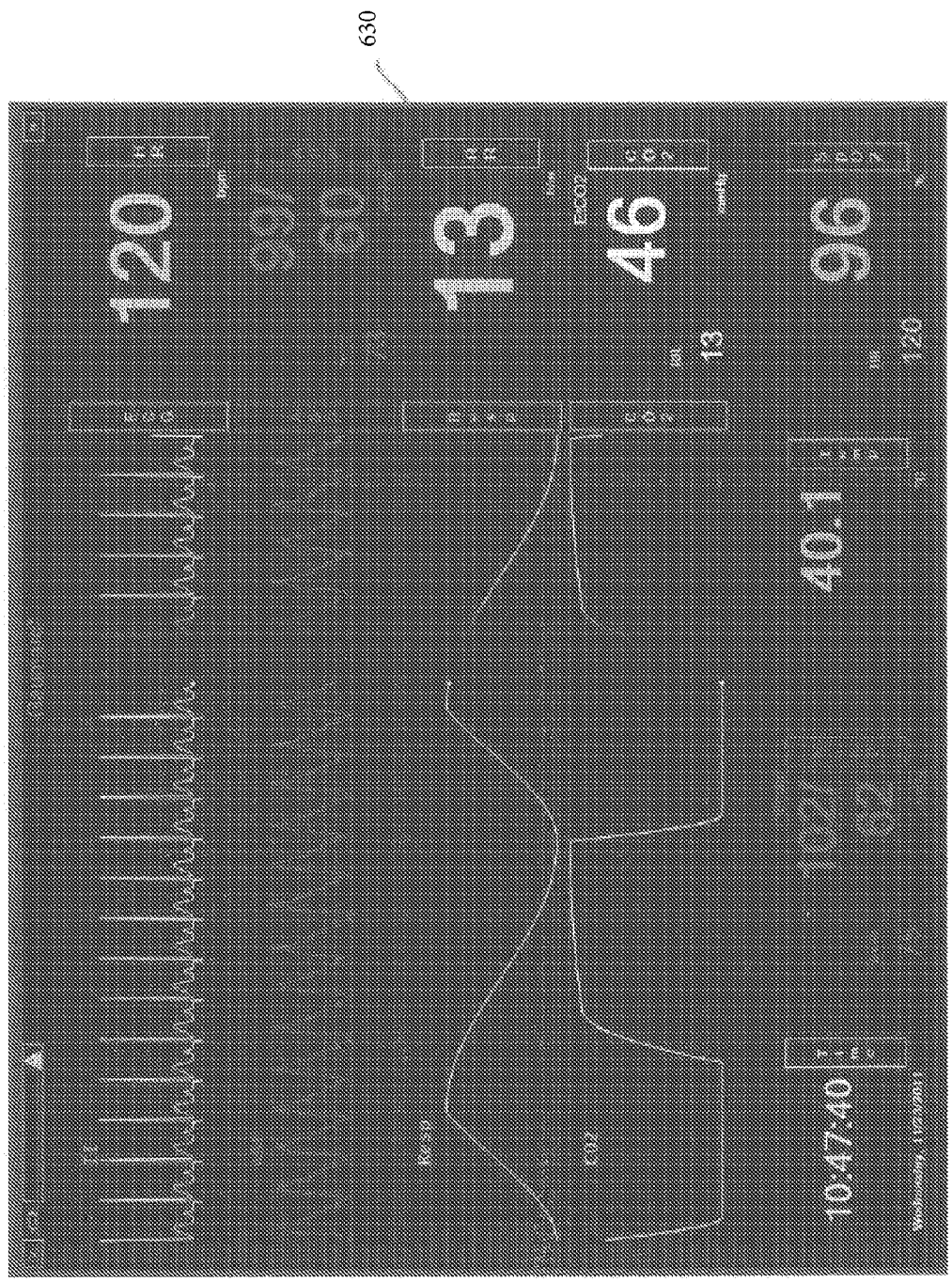

As mentioned above, the scenarios can be made as simple or as complex as desired. For example, FIG. 46 illustrates the laptop 610 and/or the display 135 showing a screen image 660 describing various features of the current hysterectomy (post-ectopic removal) scenario. In the pictured embodiment, the current scenario incorporates a malignant hyperthermia scenario. FIG. 47 illustrates the vital signs monitor 630 showing the increase carbon dioxide, tachycardia, increased temperature, and decreased blood pressure associated with malignant hyperthermia. Because the malignant hyperthermia scenario is operating in unison with the hysterectomy scenario, the screen image 660 and the vital signs monitor 630 both indicate a decline in the patient's condition. In this scenario, the hysterectomy outcome, as well as the overall patient outcome, depends on the diagnosis and treatment of the malignant hyperthermia.

Figure 48:
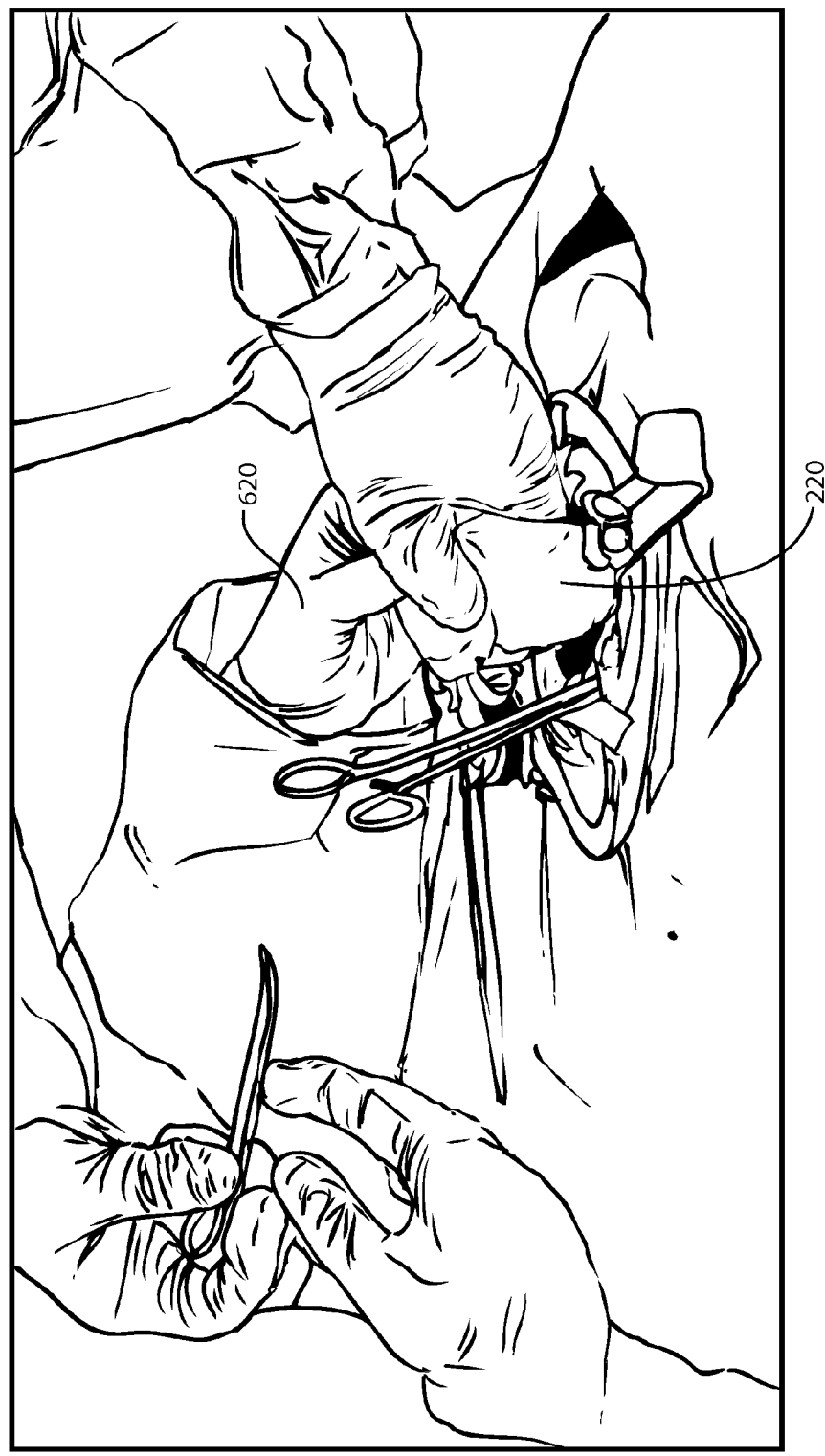

FIG. 48 illustrates the surgeon 620 palpating the uterus 210 in preparation for amputation of the uterus from the vagina 226. The realistic texture and structure of the uterus 210 offer the surgeon the ability to accurately assess the readiness of the uterus 210 for removal.

Figure 49:
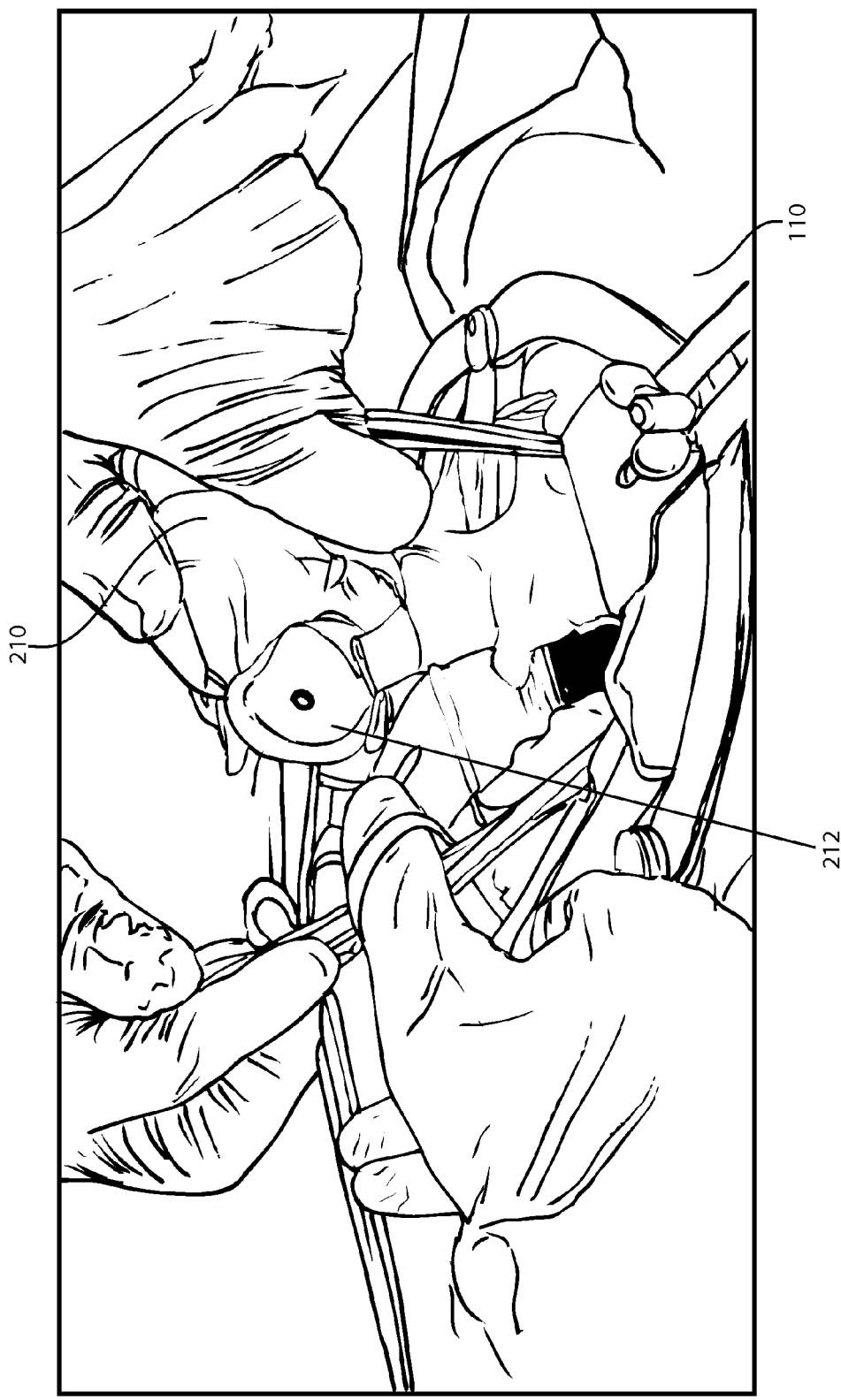

FIG. 49 illustrates the removal of the uterus 210 from the patient simulator 110. FIG. 49 illustrates at least a portion of the cervix 212.

Figure 50:
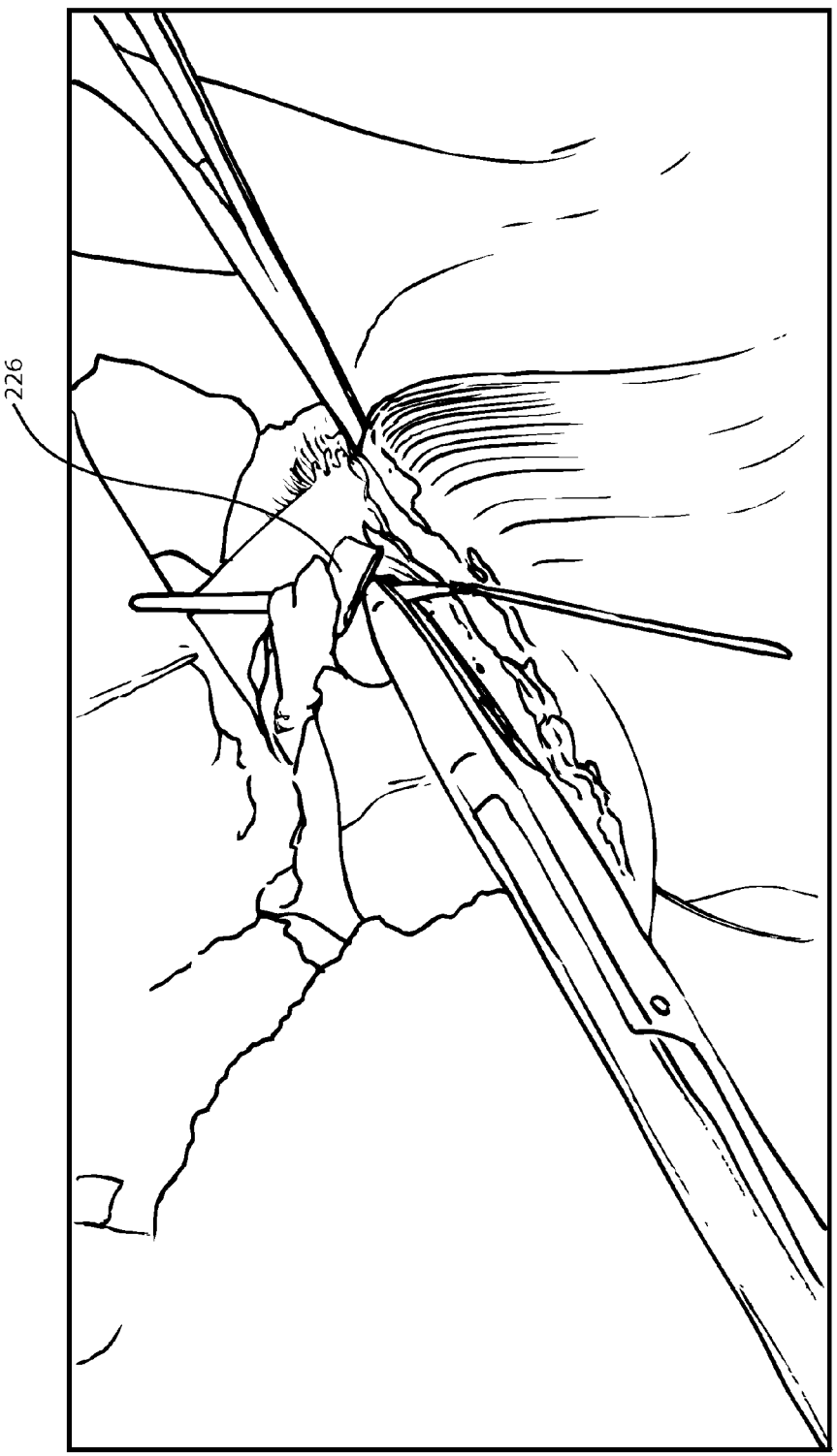

FIGS. 50 and 51 illustrate suturing and closure of a vaginal cuff of the vagina 226.

Figure 52:
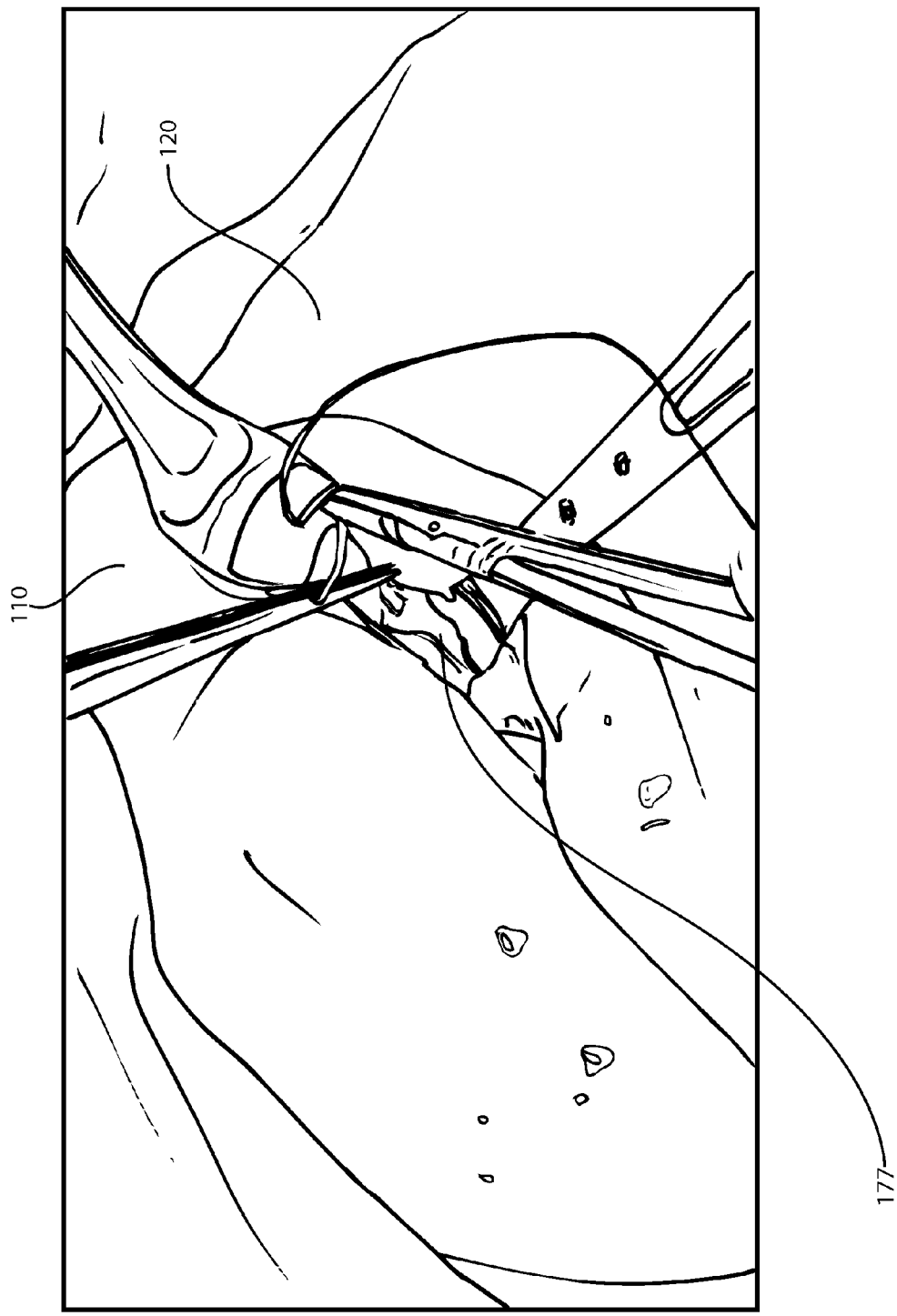

FIG. 52 illustrates the closure of the fascial layer 177 of the abdominal wall insert 120 of the patient simulator 110.

Figure 53:
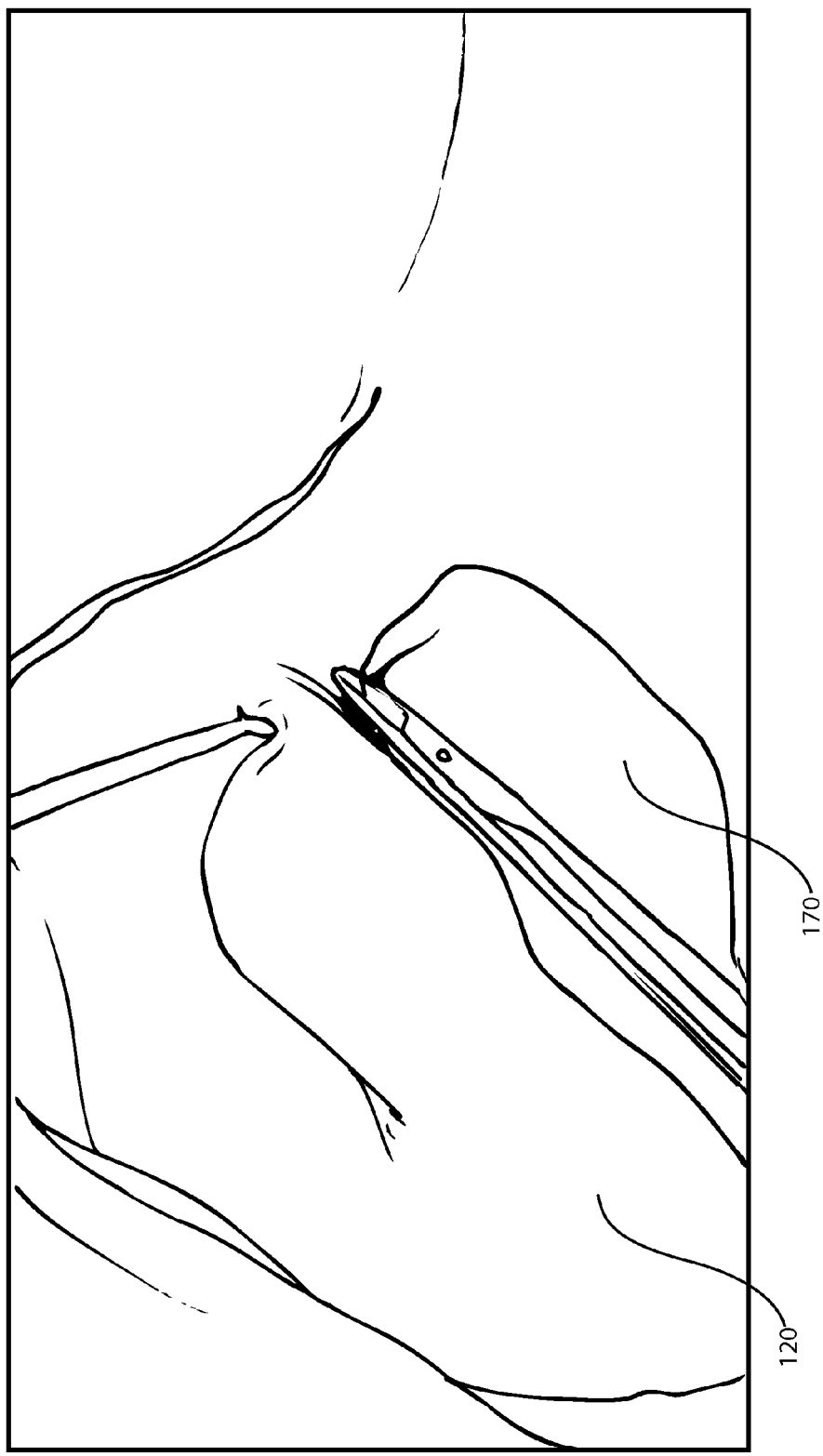

FIG. 53 illustrates closure of the skin layer 170 of the abdominal wall insert 120. In the pictured embodiment, the skin layer 170 is closed with a vertical mattress technique. Any of a variety of suture techniques may be practiced on the abdominal wall insert 120.

Figure 54:
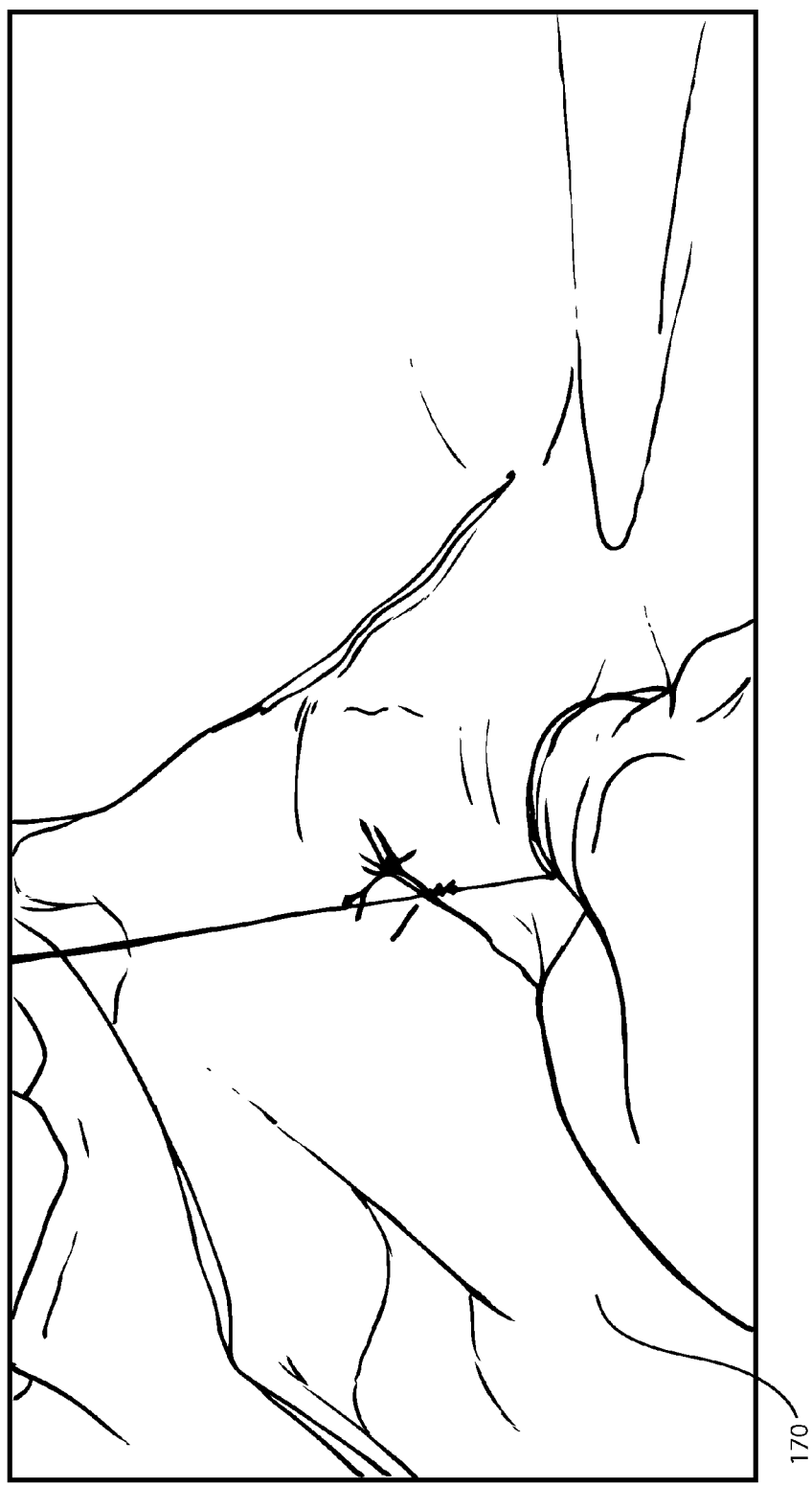

FIG. 54 illustrates tying of the suture knots to close the skin layer 170. In this particular example, the scenario ends with closure of the abdominal wall insert 120.

III. Materials

In some instances, the individual components of the anatomical inserts disclosed herein are manufactured separately and then combined in subassemblies and assemblies by either embedding pre-manufactured components within assembly molds prior to injection or performing post-assembly by gluing two or more components. In general, each organ is molded with a specific pigmentation and silicone blend to maintain fidelity. The uterine assemblies disclosed herein incorporate additional components to simulate ligaments and blood vessels. In other instances, the anatomical inserts, including the uterine assemblies, do not incorporate additional features beyond the pertinent pelvic organs. Exemplary materials, molds, and manufacturing processes are outlined below.

The present disclosure provides materials that mimic the appearance and feel of human tissue. Although silicone is frequently described as a material used for the construction of the component parts of the patient simulator and the anatomic inserts, the parts need not be made of silicone; other materials known to those of ordinary skill in the art can be used as well.

In some instances, the present disclosure provides materials that are similar to the materials discussed in U.S. patent application Ser. No. 13/031,102, which has been incorporated by reference in its entirety above. For example, polysiloxane materials have unique physical properties that mimic biological tissue, including very low flexural modulus (tendency for a material to bend), exceptional resilience (the power or ability to return to original form or position after being bent, compressed, or stretched; elasticity), and self sealing characteristics (ability to automatically seal punctures). Products that are properly constructed from these materials in accordance with the present disclosure provide properties that include the tactile properties, ultrasound properties, and resilient properties of biological tissue. The products formed from such materials simulate real skin and tissue, and are resistant to deterioration, even after repeated puncture by needles and other medical instruments. The products formed from these materials can also advantageously mimic aspects of real medical procedures, e.g., natural closure of a puncture. Such materials provide lower flexural modulus with greater recovery than materials previously used to recreate the look and feel of biological tissue.

In some embodiments, the skin layers, for example 170 and 172, of the patient simulator system is formed of a silicone thermoset. Preferably, the silicone thermoset has a softness and resiliency similar to natural human skin and has a shore hardness of equal to or lesser than 00-10. One example of a suitable silicone thermoset is Smooth-On Ecoflex® 0010. Colorant (or pigment) is added to the silicone thermoset of the skin layer in order to simulate the natural colors of the skin. Also, adding colorant to the skin of the patient simulator and the abdominal wall inserts prevents a user from being able to visualize the underlying anatomical structures and/or pathologies within the patient simulator. Generally, the skin color may be selected to match the corresponding natural skin colors of any ethnic group around the world.

In some instances, the uterus is molded from a platinum-cured silicone thermoset or a platinum cured silicone thermoset blend with a shore hardness as low as 00-10 but no higher than 30 A. Silicone pigments are added to replicate the natural pigments of an average human uterus. In some embodiments, two or more different platinum-cured silicones are blended to optimize hardness, tissue dissection, and suture retention.

In some instances, the uterus is molded from a platinum-cured silicone thermoset with a shore hardness of 10 A (e.g., Dragon Skin® 10 Medium, Smooth-On, Inc., Easton, Pa.) as it is highly effective for dissection and suture retention.

In some instances, silicone tubing (e.g., Dow Corning Silastic silicone tubing, 0.132" ID×0.183" OD, catalog #508-11) is embedded within a uterine mold prior to injection to create patent uterine and ovarian arteries and veins, and elastic reinforcement material is embedded within the mold to represent the various uterine ligaments 222, including the infundibulopelvic, round, cardinal, and uterosacral ligaments. In addition, the fallopian tubes and ovaries, described below, are assembled within the uterine mold, so they become embedded within the uterine silicone, thereby forming a uterine sub-assembly that includes ovaries, fallopian tubes, arteries, veins, and ligaments.

The ligaments 222 provide support for the uterus while also playing an important role in the training of surgical technique. Therefore, the ligaments 222 are formed of a material that closely replicates the form and function of the ligaments they represent, including materials such as, by way of non-limiting example, a polyester knit, a polyester mesh, elastics, and latex-free elastic bandage. The material can be dyed to match the natural pigmentation of average human uterine ligaments. For example, in some embodiments, the ligaments are formed of latex-free elastic bandage, which behaves similar to ligament material where there is initial elasticity, but elongation is restricted due to the presence of embedded fibers with higher durometer. The latex-free formulation prevents cure inhibition of the silicone while providing a latex-free product for those with latex sensitivity. The latex-free elastic bandage can be cut and sutured like true ligaments.

In some instances, the ovaries 206, 208 are molded in one piece from a platinum-cured silicone thermoset or a platinum cured silicone thermoset blend with a shore hardness as low as 00-20 but no higher than 30 A. Silicone pigments may be added to replicate the natural pigments of average human ovaries. In some embodiments, two or more different platinum-cured silicones are blended to optimize hardness, tissue dissection, and suture retention. In some instances, higher durometer materials provide optimized tear strength for suture retention, but they are too hard to replicate the feel of ovaries. In order to achieve the best of both worlds, materials may be blended with a higher shore hardness with materials with a lower shore hardness to result in a product whose shore hardness falls in between the two extremes, based on the ratio of the mixture.

In some instances, the ovaries 206, 208 are molded from a platinum-cured silicone thermoset with a shore hardness of 10 A (e.g., Dragon Skin® 10 Medium, Smooth-On, Inc., Easton, Pa.) as it is highly effective for dissection and suture retention.

In some instances, the fallopian tubes 202, 204 are molded in one piece from a platinum-cured silicone thermoset or a platinum cured silicone thermoset blend with a shore hardness as low as 00-20 but no higher than 30 A. Silicone pigments may be added to replicate the natural pigments of average human fallopian tubes. In some embodiments, two or more different platinum-cured silicones are blended to optimize hardness, tissue dissection, and suture retention. In some instances, silicone tubing (e.g., Dow Corning Silastic silicone tubing, 0.132" ID×0.183" OD, catalog #508-11) is embedded within the mold prior to injection to create patent fallopian tubes that can be used during procedures, such as chromopertubation In some instances, the fallopian tubes 202, 204 are molded from a platinum-cured silicone thermoset with a shore hardness of 10 A (e.g., Dragon Skin® 10 Medium, Smooth-On, Inc., Easton, Pa.) as it is highly effective for dissection and suture retention.

In some instances, the enlarged uterus 502 has a relatively hard feel or consistency representative of the common fibroid human uterus in the range of 2 and 30 in hardness in the A scale under the Rockwell hardness standard using platinum cured silicone as primary material. Generally, the enlarged uterus 502 includes lifelike uterine pigmentation and geometry composition. In some instances, the enlarged uterus 502 is molded from a platinum-cured silicone thermoset with a shore hardness of 10 A (e.g., Dragon Skin® 10 Medium, Smooth-On, Inc., Easton, Pa.) as it is highly effective for the use and construction of the uterine material due to its effective endurance to needle puncture, cutting, and suture retention while maintaining a high degree of realism.

In some instances, the fibroids 504, 506 found in, but not limited to, the enlarged uterus 502 are consistent and depict a firm feel characteristic of actual fibroids in the range of 10 and 30 in hardness in the A scale under the Rockwell hardness standard using platinum cured silicone as its material composition. In general, the fibroids 504, 506 are colored in a pinkish tone that is characteristic of the typical uterine fibroid (i.e., lighter pink than the uterine pigmentation) and are well circumscribed in their anatomy. In some embodiments, the solid mass fibroids or myomas are molded from a platinum-cured silicone thermoset with a shore hardness of 10 A (e.g., Dragon Skin® 10 Medium, Smooth-On, Inc., Easton, Pa.) as it is highly effective for the added hardness in comparison to the urine material and its consistency to those fibroids found in human tissue. In some embodiments, blood-filled fibroids are molded from Dragon Skin® 30, Smooth-On, Inc., Easton, Pa. as it is effective and efficient in compensating for the hollow construction of the fibroids and in providing the needed hardness to resemble their real counterparts found in the human body. It is important to note that differing degrees of hardness or firmness can be achieved with a mixture of different silicones having different hardnesses under the Rockwell hardness standards.

In some instances, the vagina 226 is molded in one piece from a platinum-cured silicone thermoset or a platinum cured silicone thermoset blend with a shore hardness as low as 00-10 but no higher than 20 A. Silicone pigments can be added to replicate the natural pigments of an average human vagina. In some embodiments, two or more different platinum-cured silicones are blended to optimize hardness/elasticity, tissue dissection, and suture retention. The vagina 226 is formed of a material that is compliant enough to accept surgical instruments, including speculums, retractors, forceps, hemostats, and dilators; however, the material is hardy enough to be stretched, deformed, cut, sutured, and capable of returning to its original shape. Higher durometer materials provide a more resilient alternative that will show improved tear resistance and overall durability, but this alternative may result in a material with insufficient elasticity. For example, natural vaginal tissue is sufficiently elastic that it can be temporarily dilated during a procedure such as, by way of non-limiting example, a vaginal hysterectomy. Consequently, in order to maintain acceptable elasticity while achieving superior durability, some embodiments include an embedded fiber reinforcement within the material that will maintain durability while not restricting elasticity.

For example, in some instances, the vagina 226 is molded from a silicone blend featuring a platinum-cured silicone thermoset with a shore hardness of 00-30 (Ecoflex® 0030, Smooth-On, Inc., Easton, Pa.) and a platinum-cured silicone thermoset with a shore hardness of 10 A (Dragon Skin® 10 Medium, Smooth-On, Inc., Easton, Pa.) as these materials are effective for use in dilation, cutting, and suture retention.

In some instances, the recommended percentage of 00-30 ranges from 0-100%, where the preferred blend sets the ratio between the 00-30 and 10 A materials to 3:1. It should be noted that the 00-30 has a much lower viscosity that the 10 A Silicone thermoset (3000 cps versus 23000 cps), so by blending the two materials, a lower viscosity silicone can be produced with a combination of optimal mechanical properties and reduced viscosity when compared with the 10 A silicone alone. A lower viscosity means that the material is easier to manufacture using injection, and is more likely to penetrate the pores of the fiber reinforcement.

In some instances, a reinforcement material or fabric is embedded within the silicone material during the molding process. Thus, in such instances, the reinforcement material or fabric selected should not include any substance that will inhibit the platinum cured silicone. In some instances, the reinforcement fabric includes adequate pore size or interstices size to ensure that it is properly encapsulated within the silicone and cannot be seen or felt within the vagina in its relaxed state. The reinforcement fabric may be formed of any of a variety of materials, including without limitation polyester, cotton, and poly with spandex knits and meshes. For example, in some embodiments, the reinforcement fabric is a latex-free poly and spandex tubular elastic (e.g., Surgilast Latex-Free Tubular Elastic Dressing Retainer, Derma Sciences, Inc., Princeton, N.J.), which provides structural support to the silicone and increases durability, thereby allowing the vagina to withstand the forces of the surgical instruments. The reinforcement material may provide for a closer approximation to the resistance of human tissue.

In some instances, the perineum 224 is molded in one piece from a platinum-cured silicone thermoset or a platinum cured silicone thermoset blend with a shore hardness as low as 00-10 but no higher than 30 A. Silicone pigments can be added to replicate the natural pigments of an average human perineum to represent light, medium, or dark skin tone. In some embodiments, two or more different platinum-cured silicones are blended to optimize hardness, tissue dissection, and suture retention. In some embodiments, the perineum 224 is molded from a platinum-cured silicone thermoset with a shore hardness of 10 A (e.g., Dragon Skin® 10 Medium, Smooth-On, Inc., Easton, Pa.) as it is highly effective for dissection and suture retention, and it provides enough structural support to maintain the geometry of the perineum when it is attached to the patient simulator 110.

In some embodiments, the bladder 214 is molded in one piece from a platinum-cured silicone thermoset or a platinum cured silicone thermoset blend with a shore hardness as low as 00-30 but no higher than 30 A. Silicone pigments are added to replicate the natural pigments of the bladder. In some embodiments, two or more different platinum-cured silicones are blended to optimize hardness, tissue dissection, and suture retention. In some embodiments, the bladder 214 is molded from a platinum-cured silicone thermoset with a shore hardness of 10 A (e.g., Dragon Skin® 10 Medium, Smooth-On, Inc., Easton, Pa.) as it is highly effective for dissection and suture retention.

In some embodiments, the ectopic 400 is molded in one piece from a platinum-cured silicone thermoset or a platinum cured silicone thermoset blend with a shore hardness as low as 00-10 but no higher than 10 A. Silicone pigments can be added to replicate the natural pigments of a bruised human fallopian tube with a ruptured ectopic pregnancy. In some embodiments, two or more different platinum-cured silicones are blended to optimize hardness and tissue dissection. In some embodiments, the ectopic is molded from a platinum-cured silicone thermoset with a shore hardness of 00-30 (e.g., Ecoflex® 0030, Smooth-On, Inc., Easton, Pa.) as it is compliant and gives the sensation of soft tissue.

In some embodiments, the endometrioma 510, the dermoid cyst 460, and the simple cyst 516 are each molded as a double layer membrane that is filled with a substance replicating the relevant pathology. The membranes are manufactured on a smooth spherical surface forming a silicone thermoset globe of volume 10 mL to 100 mL. However, other volume ranges are contemplated for the globe. In some embodiments, the silicone thermoset blend can have a shore hardness as low as 00-30 but no higher than 50 A. Silicone pigments can be added to replicate the natural pigments of the membranes in these pathologies. In some embodiments, two or more different platinum-cured silicones are blended to optimize hardness and tissue dissection.

In one embodiment, the size of the double layer membrane of the endometrioma 510 is 50 mL. The endometrioma 510 is filled with a substance mimicking the consistency of accumulated, coagulated blood. One example of a possible blend to mimic coagulated blood includes fine saw dust, red food coloring, deionized water, and corn syrup. Other blends and materials are contemplated, including, by way of non-limiting example, corn starch.

In one embodiment, the size of the double layer membrane of the dermoid cyst 460 is 50 mL. As described above, the dermoid cyst 460 is filled with a blend of materials that replicate the hair, blood, fat, teeth, and sebum. By way of non-limiting example, the hair can be obtained from any synthetic wig, the blood can be replicated using pigmented silicone oil, the fat can be replicated with a platinum silicone castable foam blended with a silicone oil, the teeth can be manufactured from a higher durometer material such as a urethane plastic, and the sebum can be replicated with an oil, such as silicone oil, mineral oil, or olive oil.

In some embodiments, the fat layer inside the dermoid cyst 460 is manufactured from a soft, two-component, platinum silicone castable foam blended with a silicone oil. The addition of the silicone oil allows manipulation of the foam's properties, including hardness and foam density. The percentage foam recommended for use ranges from 16-33% of the total weight, and the percentage silicone oil ranges from 67-84% of the total weight. These ranges are not intended to be limiting, and other ranges are contemplated. The silicone foam (e.g., Soma Foama, Smooth-On, Inc., Easton, Pa.) and silicone oil (e.g., TC-5005 C, BJB Enterprises, Tustin, Ca) are blended so that the mass of the silicone oil ranges from 200% to 500% the mass of the foam. In one embodiment, the percentage of oil is set to 77.6% of the total weight. These ranges are not intended to be limiting, and other ranges are contemplated. Silicone pigments can be added to replicate the appearance of fat.

In some embodiments, the teeth are made of a hard material to realistically represent human tooth enamel. In one embodiment, the teeth are formed of a castable urethane plastic with a shore hardness of 70 D (e.g., Smooth-Cast® 305, Smooth-On, Inc., Easton, Pa.). This castable urethane plastic allows for 1) low viscosity so mold-filling is easy, 2) the final cured part to be colored similar to teeth without the addition of pigments, and 3) a short e.g., 30 minute) de-mold time at room temperature.

In some embodiments, the blood is made of a silicone oil (e.g., TC-5005 C, BJB Enterprises, Tustin, Ca), blended with a silicone pigment (e.g., Silc Pig Blood, Smooth-On, Inc., Easton, Pa.). In one embodiment, the ratio of the silicone oil to blood pigment is 1:2 by mass.

In some embodiments, the simple cyst 516 is configured as a collection of fluid surrounded by a double membrane. In one embodiment, the size of the double membrane is 30 mL. The simple cyst 516 is mostly filled with a low viscosity liquid, such as, by way of non-limiting example, deionized water, silicone oil, or mineral oil. In one embodiment, the filling is deionized water due to its ease of use, long-term stability, and ease of clean-up in case of cyst rupture. In some embodiments, the simple cyst 516 includes silicone foam.

With reference back to FIGS. 5 and 6, the peritoneum 218 consists of a peritoneum wrap 700 and peritoneum sleeves 702. The sleeves 702 cover veins, arteries, and ligaments that extend past the body of the uterus 210, and the peritoneum wrap is used to cover the uterus 210, the bladder 214, and all major ligaments and vessels that lie close to the body of the uterus. In some embodiments, both the sleeves 702 and the wrap 700 are manufactured from a platinum-cured silicone thermoset or a platinum cured silicone thermoset blend with a shore hardness as low as 00-30 but no higher than 30 A. Silicone pigments can be added to replicate the natural pigments of thin film peritoneum in an average human. Since the peritoneum 218 is a thin film structure, it is more delicate that other components in the assembly and demonstrates reduced tear resistance. As a result, when selecting a material for the peritoneum, tear resistance needs to be considered. In some embodiments, two or more different platinum-cured silicones are blended to optimize hardness, tissue dissection, and suture retention. In one embodiment, the peritoneum 218 is formed of a platinum-cured silicone thermoset with a shore hardness of 10 A (e.g., Dragon Skin® 10 Medium, Smooth-On, Inc., Easton, Pa.) as it is highly effective for dissection, tear resistance, and suture retention.

In some embodiments, the bowel insert 550 have a consistency representative of the relatively soft feel characteristic of the average human bowel loops in the range of 10 and 30 in hardness in the 00 scale and up to 10 in hardness in the A scale under the Rockwell hardness standard using platinum cured silicone as primary material. The bowel insert 550 may be colored to replicate the appropriate lifelike bowel pigmentation and may be shaped to reflect the accurate geometry of human bowel loops. In one embodiment, the bowel insert 550 is formed of Ecoflex® 30, Smooth-On, Inc., Easton, Pa. as it is highly effective and durable for use with needle puncture, cutting, and suture retention while maintaining a high degree of realism. In some instances, the bowel insert 550 is constructed as a solid piece of silicone that is injection molded.

IV. Molds

In some instances, the anatomical inserts described herein are manufactured in multiple steps where subcomponents are pre-manufactured and then incorporated in assembly molds so that they are embedded within the matrix of the assembly component. This section describes the particular molds required to manufacture each of the assembly components, and the following section will provide examples of the manufacturing process, including specific material details. Generally, injection molds are utilized for solid anatomical inserts.

The shapes of the mold components have varying degrees of complexity based on the tissue model being manufactured. In some instances, the mold components are formed of machined aluminum 6061 that are designed in a 3 D CAD system such as SolidWorks or Rapidform, and have a matte surface finish that is obtained by bead blasting. Most tissue models include undercuts, so a split cavity mold is required to allow machining of the mold components and to improve de-molding. Aluminum 6061 was selected as a mold material due to the fact that it is light-weight and has superior heat transfer properties for those steps that require cure at elevated temperatures. However, any other suitable mold materials may be utilized as would be recognized by those skilled in the art.

Regarding the uterine assemblies disclosed herein, the first components to be manufactured include the fallopian tubes, ovaries, and vagina. In some instances, the molding systems described herein are designed to be milled using CNC aluminum, which allows for an increase in curing temperature and consequently allows for an increased rate of production.

Figure 55:
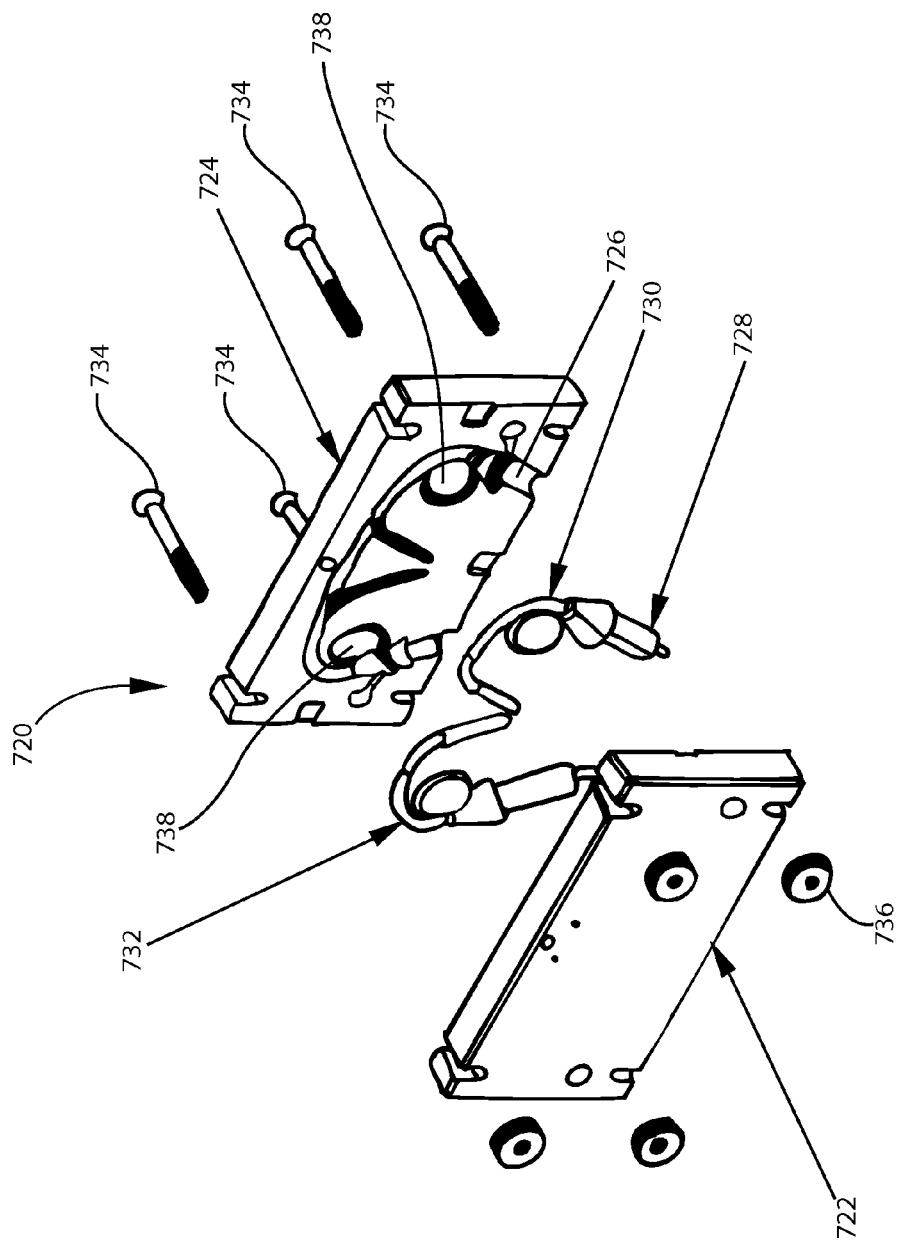
FIGS. 55-154 are directed to aspects of molding and manufacturing various components of the patient simulator system and various anatomical inserts according to embodiments of the present disclosure.

Referring now to FIGS. 55-59, shown therein are aspects of a molding system 715 for manufacturing a fallopian tube model, such as the right fallopian tube 202, the left fallopian tube 204, and the fimbriae 205 described above, according to embodiments of the present disclosure. Specifically, FIG. 55 is an exploded perspective view of the molding system 715; FIG. 56 is a perspective view of the molding system 715; FIG. 57 is a partial cut-away view of the molding system 715; FIG. 58 is a top view of the molding system 715; and FIG. 59 is a side view of the molding system 715.

As shown in FIG. 55, the fallopian tubes are manufactured in a split mold 720 that includes a drag 722 and cope 724 that forms a cavity 726 within the mold that is used to form the external geometry of the fallopian tubes. In particular, the cavity 726 is shaped to define an outer surface 727 of the fallopian tube inserts (shown in FIGS. 60-63). The drag 722 is configured to mate with the cope 724. Two fallopian cores 728 are seated within the cavity 726 of the cope 724 and drag 722 during assembly, and these are used to form the fimbriae geometry (i.e., the fimbriae 205) while at the same time securing the silicone tubing within the mold 720. The left and right fallopian cores 728 are mirror images of each other, and they are split along the plane of the tubing cavity 726 for ease of assembly and disassembly. Right tubing 730 and left tubing 732 are placed between the halves of the cores 728, and then the cores 728 are seated within the drag 722. The opposite and free ends of the tubings 730, 732 are placed within the cavity 726 on the drag 722 so that they are centered, and the tubing ends are secured within the tubing holders on the drag 722.

Once all components are in place, the cope 724 is placed in position on the drag 722, and four fasteners 734 are put in place and secured with knurled-rim knobs 736. The cope 724 and the drag 722 are self-aligning when the core 728 is in place. In the pictured embodiment, the fasteners 734 comprise threaded fasteners such as, by way of non-limiting example, socket head cap screws. However, any suitable manner of securing the cope 724 and the drag 722 may be utilized.

Once fully assembled as shown in FIGS. 56-59, the mold 720 can be injected. There are two separate injection ports 738 located at the region of the left and right fimbriae 205, and the mold has three separate vent ports close to the midline of the fallopian tube. As shown in FIG. 57, the diameter of the tubing 730, 732 is less than the diameter of the cavity 726 such that a space remains around the tubing. In that regard, the space around the tubing 730, 732 will be filled with material injected into the mold 720.

Figure 61:
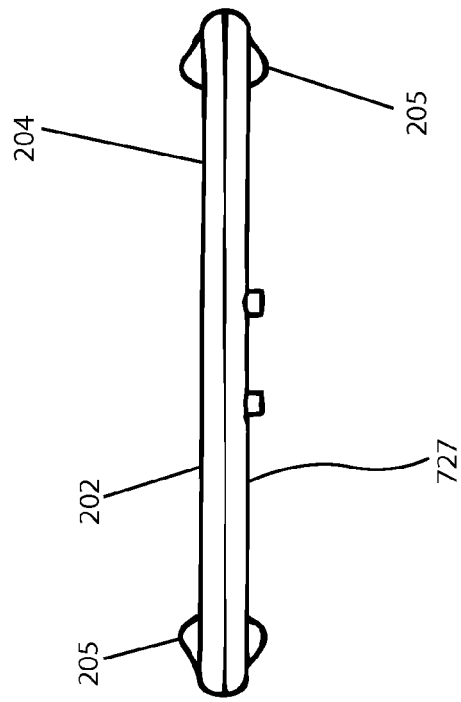
Figure 60:
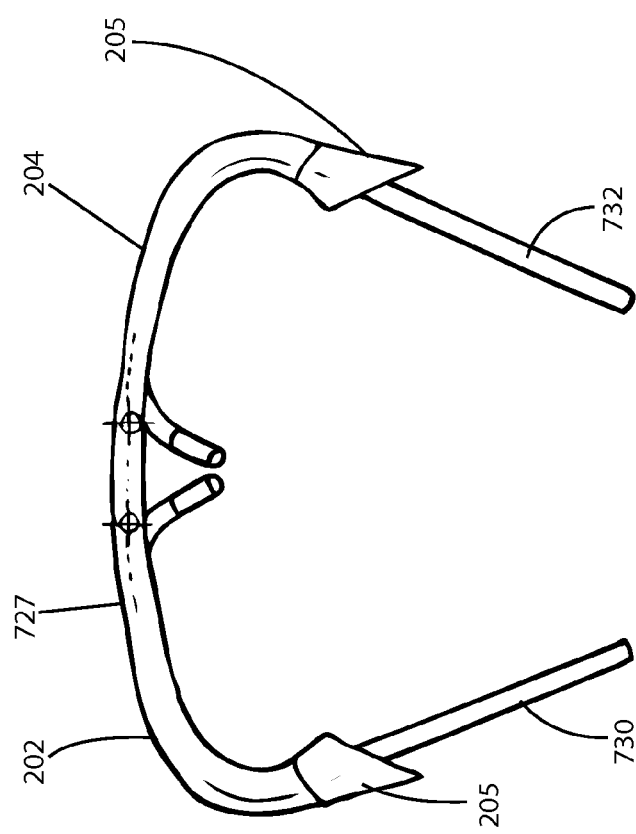
Figure 63:
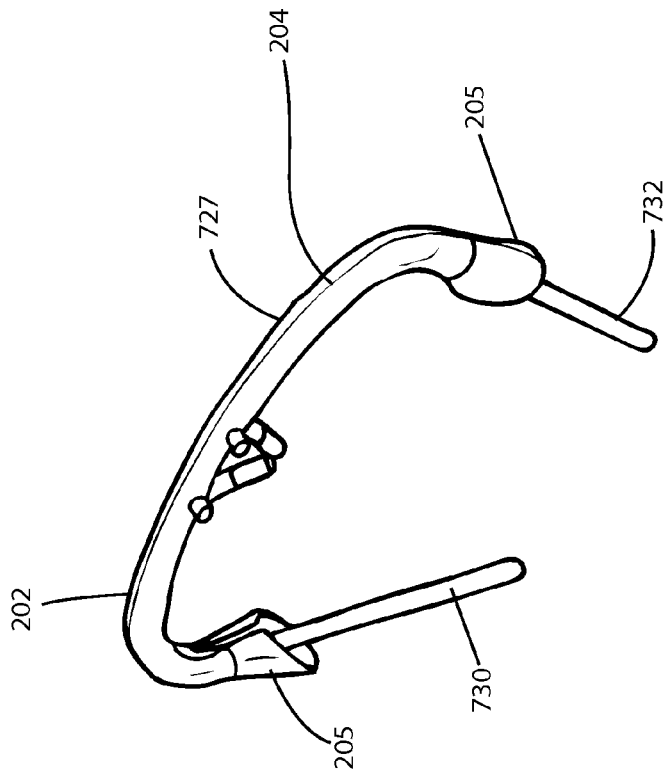
Figure 62:
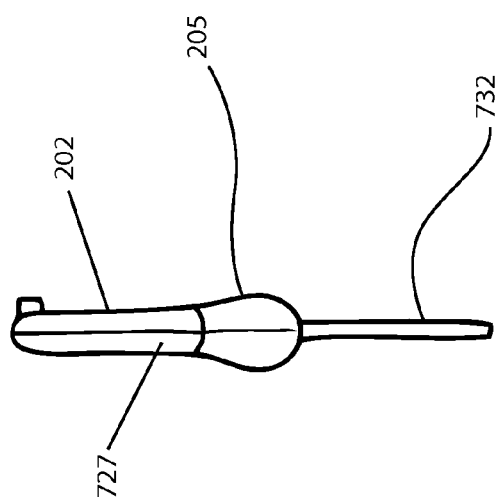

Referring now to FIGS. 60-63, shown therein are aspects of a fallopian tube model 750 according to one embodiment of the present disclosure. Specifically, FIG. 60 illustrates a plan view of the fallopian tube model 750; FIG. 61 illustrates a top view of the fallopian tube model 750; FIG. 62. illustrates a side view of the fallopian tube model 750; and FIG. 63 illustrates a perspective view of the fallopian tube model 750. In the pictured embodiment, the fallopian tube model 750 includes the right fallopian tube 202 and the left fallopian tube 204, the fimbriae 205, the right tubing 730, and the left tubing 732 described above. The right and left tubing 730, 732, respectively, may be used to connect the fallopian tubes and/ or their pathologies (e.g., an ectopic pregnancy) to the vascular system 122 of the patient simulator 110 to provide for realistic blood flow through the fallopian tube model 750.

Figure 64:
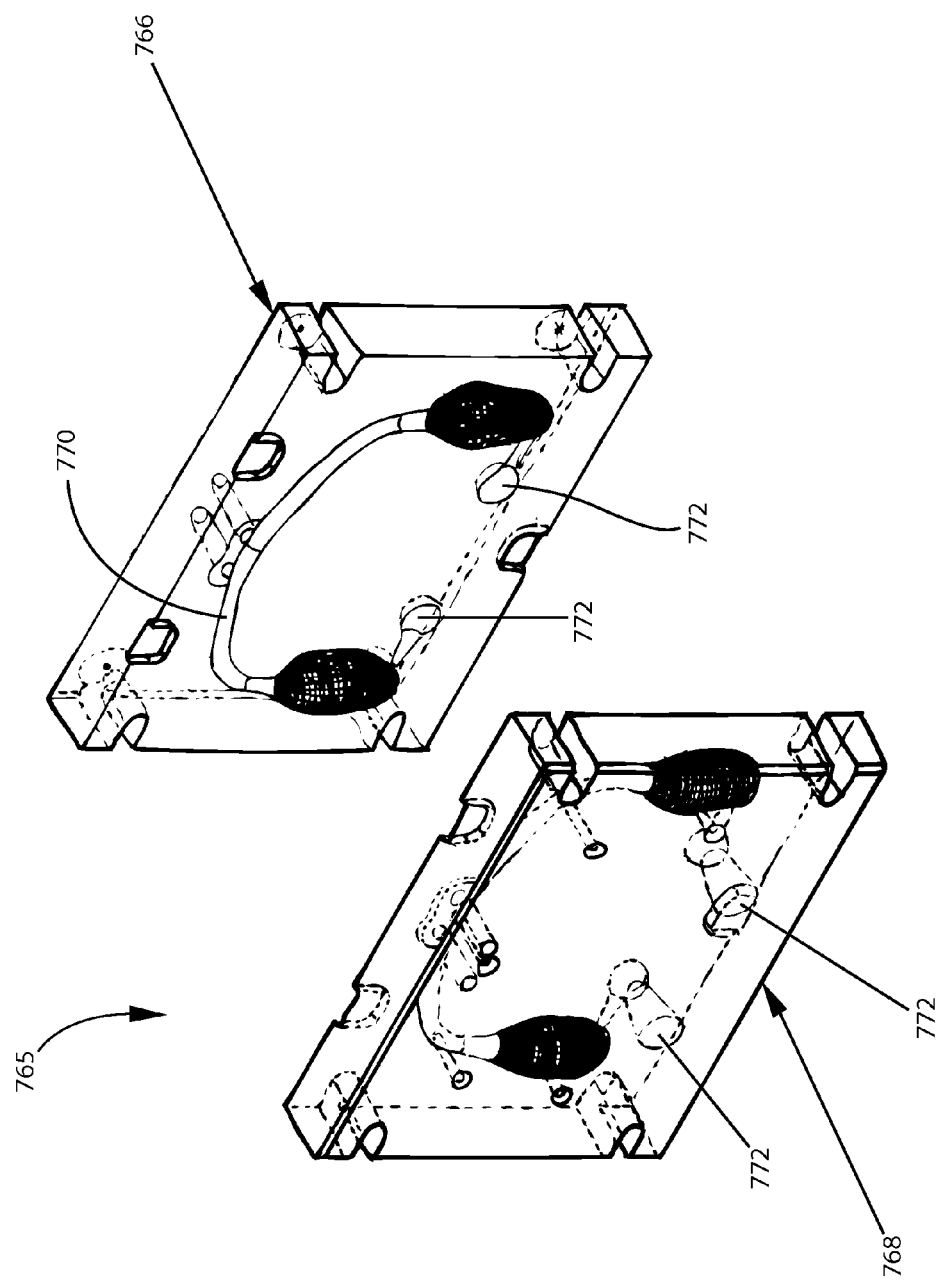

Referring now to FIGS. 64-67, shown therein are aspects of a molding system 760 for forming an ovarian model, such as the right ovary 206 and the left ovary 208 described above, according to embodiments of the present disclosure. Specifically, FIG. 64 is an exploded perspective view of the molding system 760; FIG. 65 is a cross-sectional view of the molding system 760; and FIG. 66 is a top view of the molding system 760; and FIG. 67 is a side view of the molding system 760.

As shown in FIG. 64, the ovaries are manufactured in a split mold 765 that includes a drag 766 and cope 768 that are configured to mate to create a cavity 770 within the mold. The cavity 770 is used to form the external geometry of the ovaries. In particular, the cavity 770 is shaped to define an outer surface 771 of the ovary inserts (shown in FIGS. 68-70b). The drag 766 is configured to mate with the cope 768. The ovaries mold 765 is designed in a manner similar to the fallopian tubes mold 750; however, the ovaries are solid and do not require the incorporation of any core. As a result, the ovaries mold consists only of the cope 768 and drag 766 that are aligned and secured in place with four fasteners (not shown). In some embodiments, the fasteners comprise threaded fasteners such as, by way of non-limiting example, socket head cap screws. However, any suitable manner of securing the cope 768 and the drag 766 may be utilized.

Once fully assembled, the mold 765 can be injected through two separate injection ports 772 located at the left and right ovaries. As shown in FIG. 65, the mold 765 has three separate vent ports 774, one located on each ligament approximately halfway along, and one located on the midline.

Figure 68:
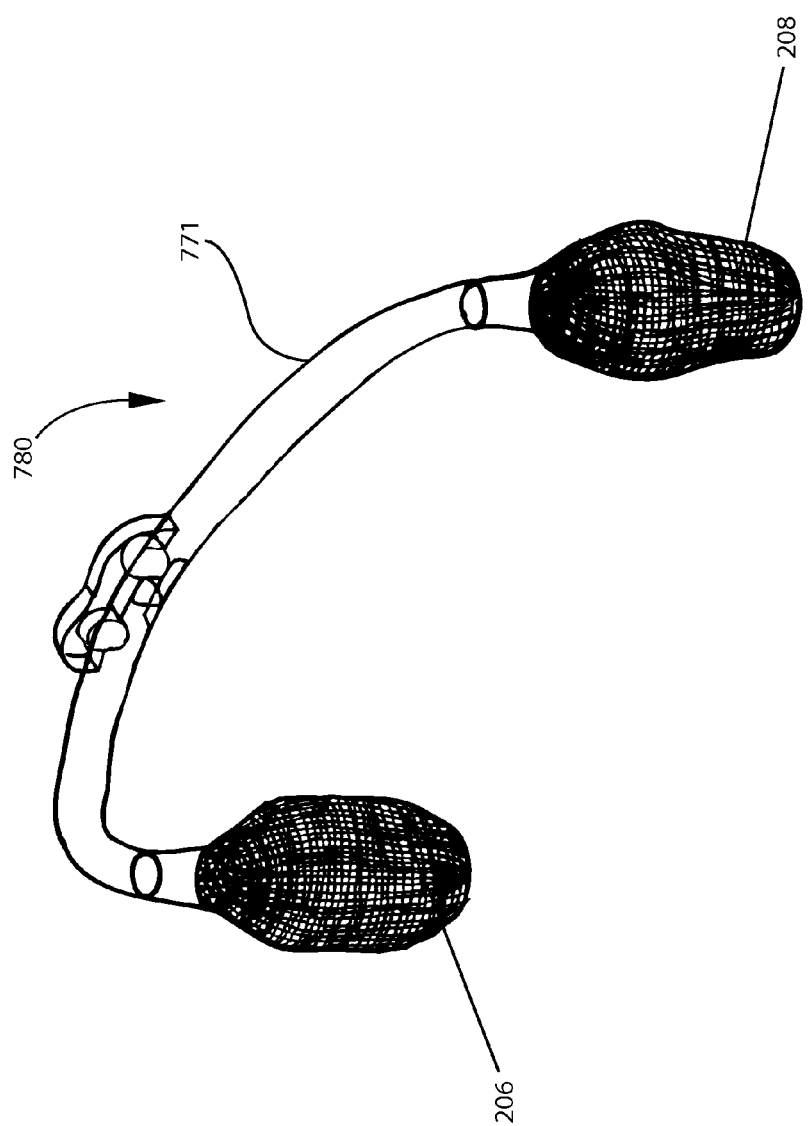
Figure 69:
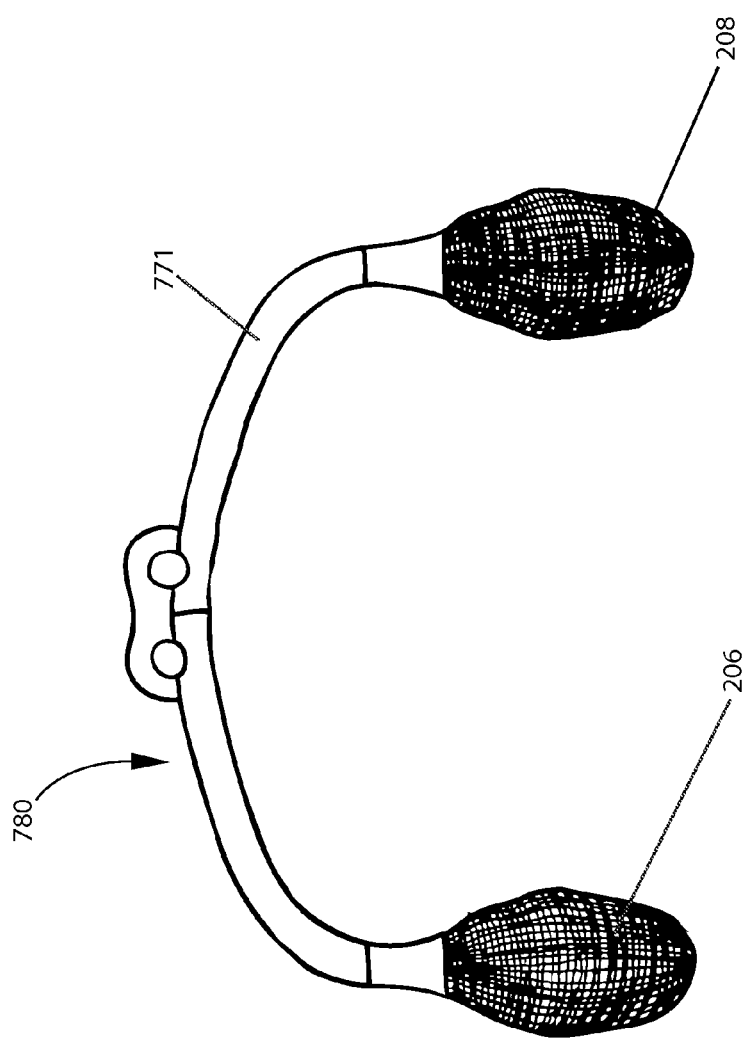
Figure 70:
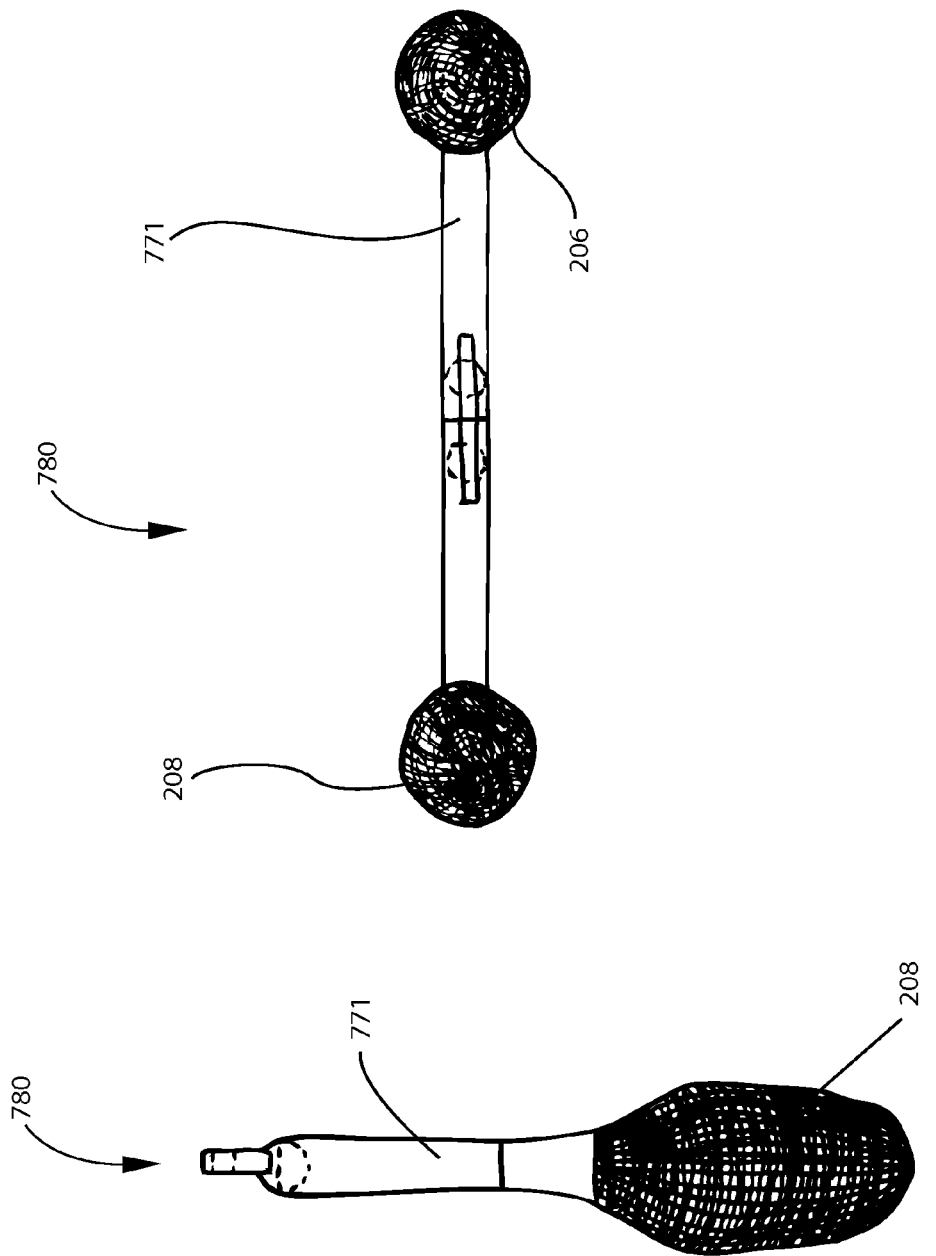

Referring now to FIGS. 68-70b, shown therein are aspects of an ovarian model 780 according to one embodiment of the present disclosure. Specifically, FIG. 68 illustrates a perspective view of the ovarian model 780; FIG. 69 illustrates a plan view of the ovarian model 780; FIG. 70a illustrates a side view of the ovarian model 780; and FIG. 70b illustrates a top view of the ovarian model 780. In the pictured embodiment, the ovarian model 780 includes the right ovary 206 and the left ovary 208 described above.

Figure 71:
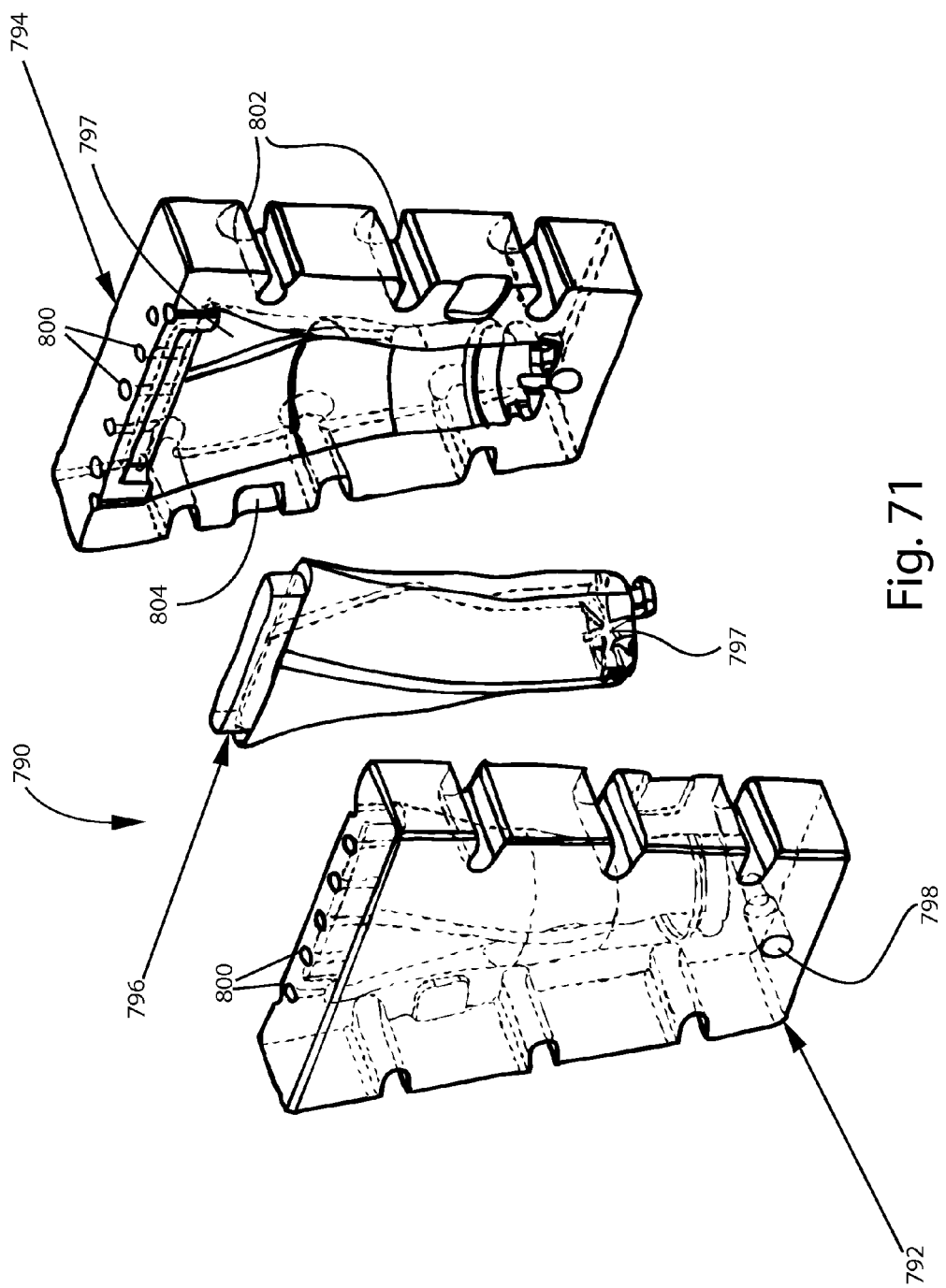
FIGS. 71-79 are directed to the molding and manufacture of a vagina model according to one embodiment of the present disclosure.
Figure 73:
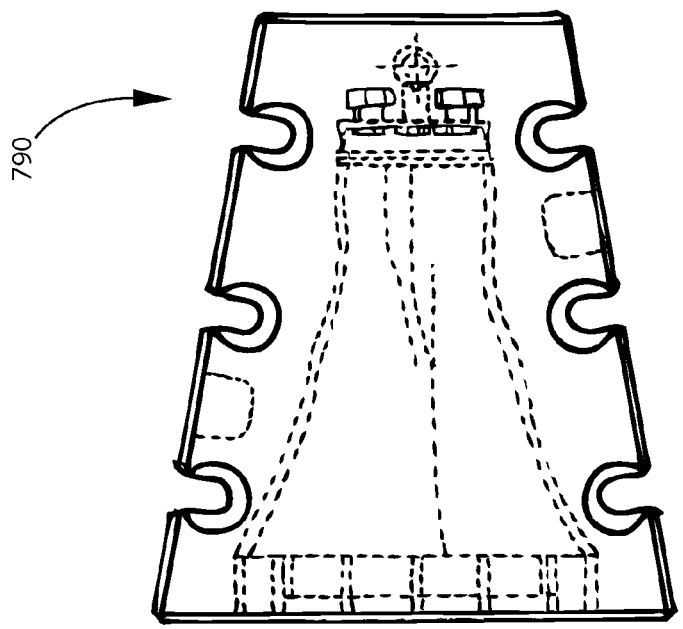
Figure 72:
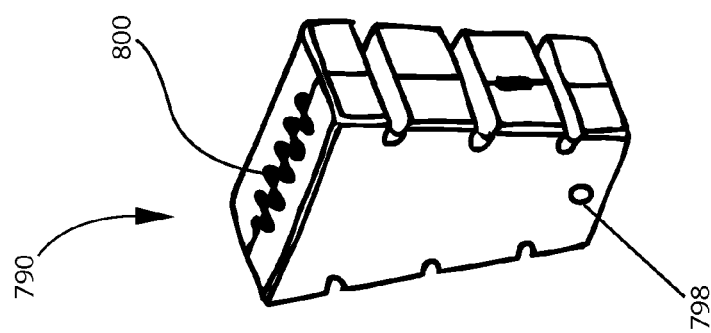
Figure 75:
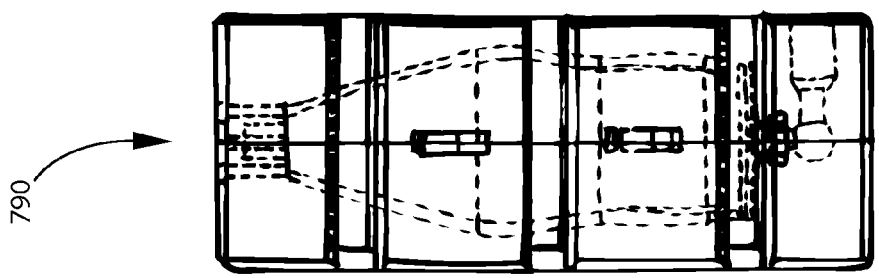
Figure 74:
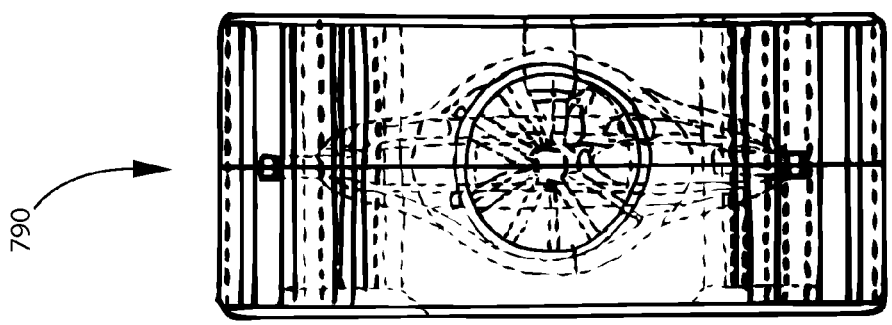
Figure 77:
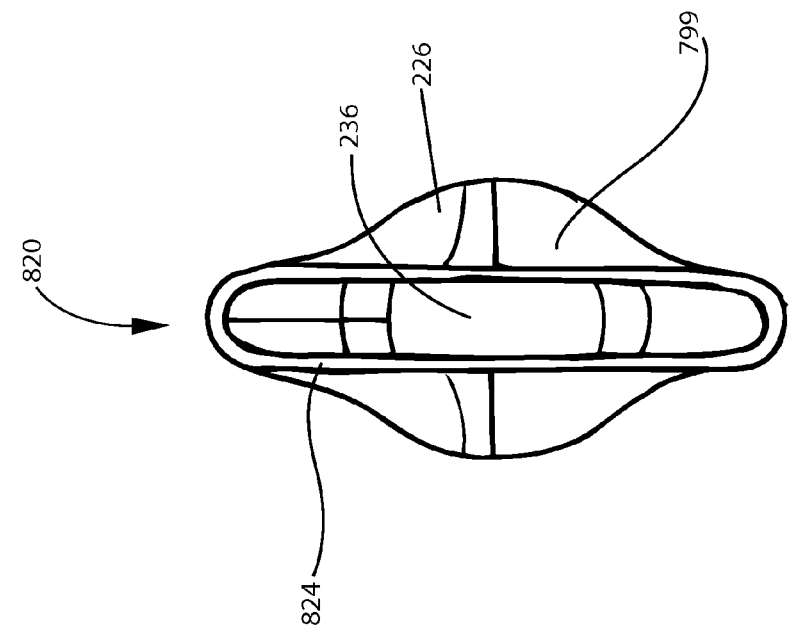

Referring now to FIGS. 71-75, shown therein are aspects of a molding system 790 for forming a vagina model, such as the vagina 226 described above, according to embodiments of the present disclosure. Specifically, FIG. 71 is an exploded perspective view of the molding system 790; FIG. 72 is a perspective view of the molding system 790; and FIG. 73 is a front plan view of the molding system 790; FIG. 74 is a top view of the molding system 790; and FIG. 75 is a side view of the molding system 790.

The vagina molding system 790 is similar to the fallopian tube molding system 720 in some aspects, and consists of a cope 792, a drag 794, and a core 796. The cope 792, the drag 794, and the core 796 are configured to mate to create a cavity 797 that is used to form the external geometry of the vagina model. The cavity 797 is shaped to define an outer surface 799 of the vagina model (shown in FIGS. 76-79).

In some embodiments, the fiber reinforcement, which allows for increased flexibility and durability of a resulting model, as described above, is oriented on the core 796 prior to mold assembly; the reinforcement is wrapped so that it fits tightly around the core 796 and is hooked into position on the legs on the base of the core 796.

Once the reinforcement is secure, the core 796 is slid into position on the drag 794, and the cope 792 is then seated on the drag 794 and secured in place with six fasteners (not shown). In some embodiments, the fasteners comprise threaded fasteners such as, by way of non-limiting example, socket head cap screws and/or knurled rim knobs. However, any suitable manner of securing the cope 792 and the drag 794 may be utilized. Grooves 797 on the core 796 allow the flow of silicone and provide attachment points for a resultant vagina mold.

Once fully assembled the mold 790 can be injected through a single injection port 798 located on the lower surface of the cope 792 close to the circular side of the vagina that will be attached to the uterus. The diameter of the core 796 is less than the diameter of the cavity 799 such that a space remains around the core when the cope 792 is mated to the drag 794. In that regard, the space between the core 796 and the cavity 799 will be filled with material injected into the mold 790.

Because the material injected into the vagina molding system 790 may have a lower durometer and thus lower viscosity, the material is injected slowly to allow for constant and consistent silicone thickness throughout the mold 790. The injected material seeps through or wicks through the fiber reinforcement as it is injected into the mold. The mold 790 vents through twelve separate vent ports 800 on the top surface of the mold 790 on both the cope 792 and drag 794 halves. The mold 790 includes quick disconnects 802 and opening slots 804.

Figure 76:
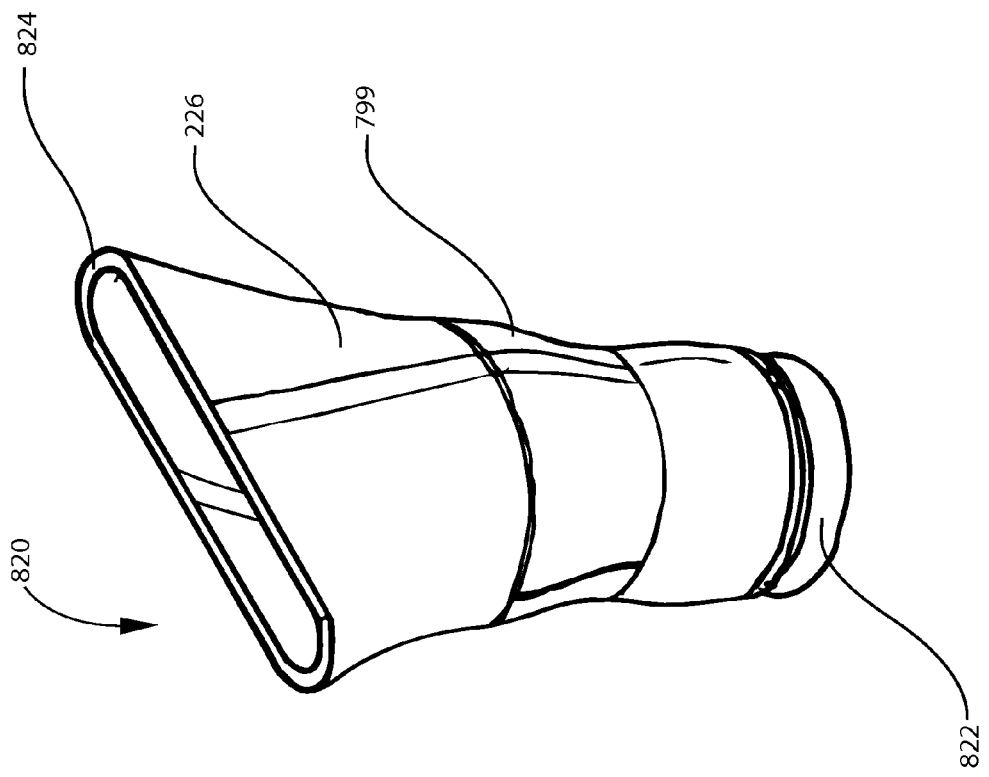
Figure 79:
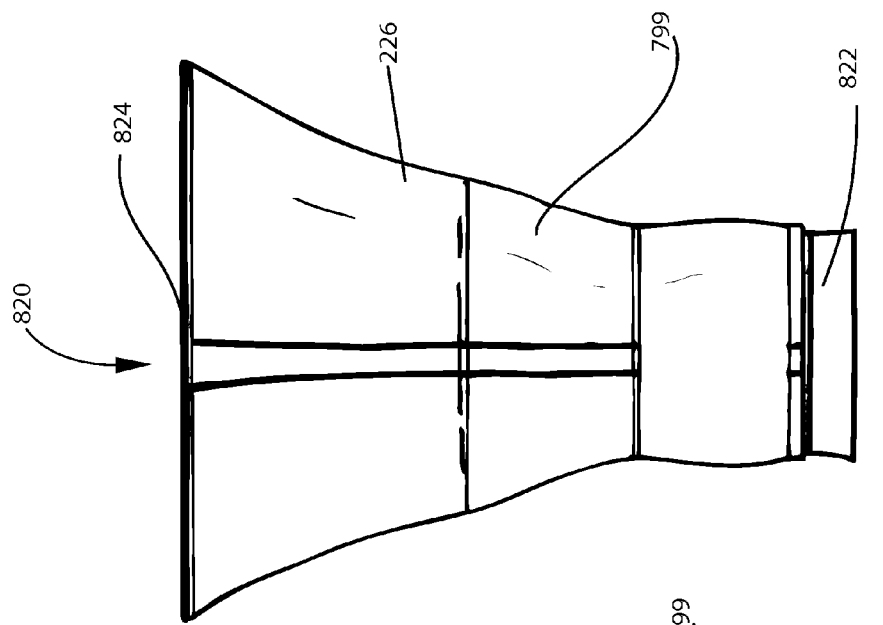
Figure 78:
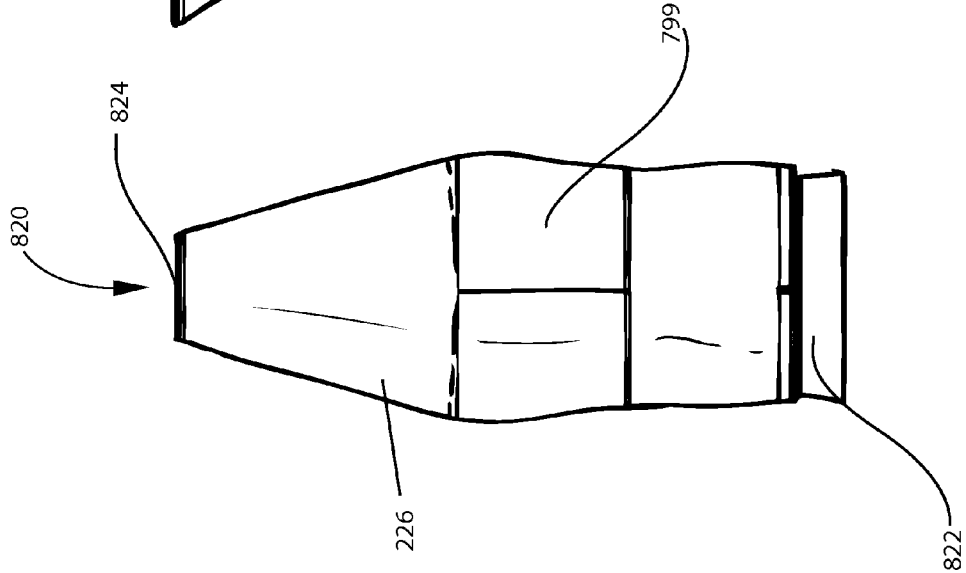

Referring now to FIGS. 76-79, shown therein are aspects of a vagina model 820 according to one embodiment of the present disclosure. Specifically, FIG. 76 illustrates a perspective view of the vagina model 820; FIG. 69 illustrates a top view of the vagina model 820;

FIG. 70 illustrates a side view of the vagina model 820; and FIG. 71 illustrates a plan view of the vagina model 820. In the pictured embodiment, the vagina model 820 includes vagina 226 described above. In the pictured embodiment, a circular end 822 of the vagina 226 is designed in such a manner that it includes a step that slides into position on the manufactured uterine assembly for orientation and ease of assembly. The elliptical end 824 of the vagina 226 is configured to attach to the perineum 224 (shown in FIG. 5, for example). The vagina 226 thus forms a sleeve that connects to the uterine assembly at both ends.

Figure 80:
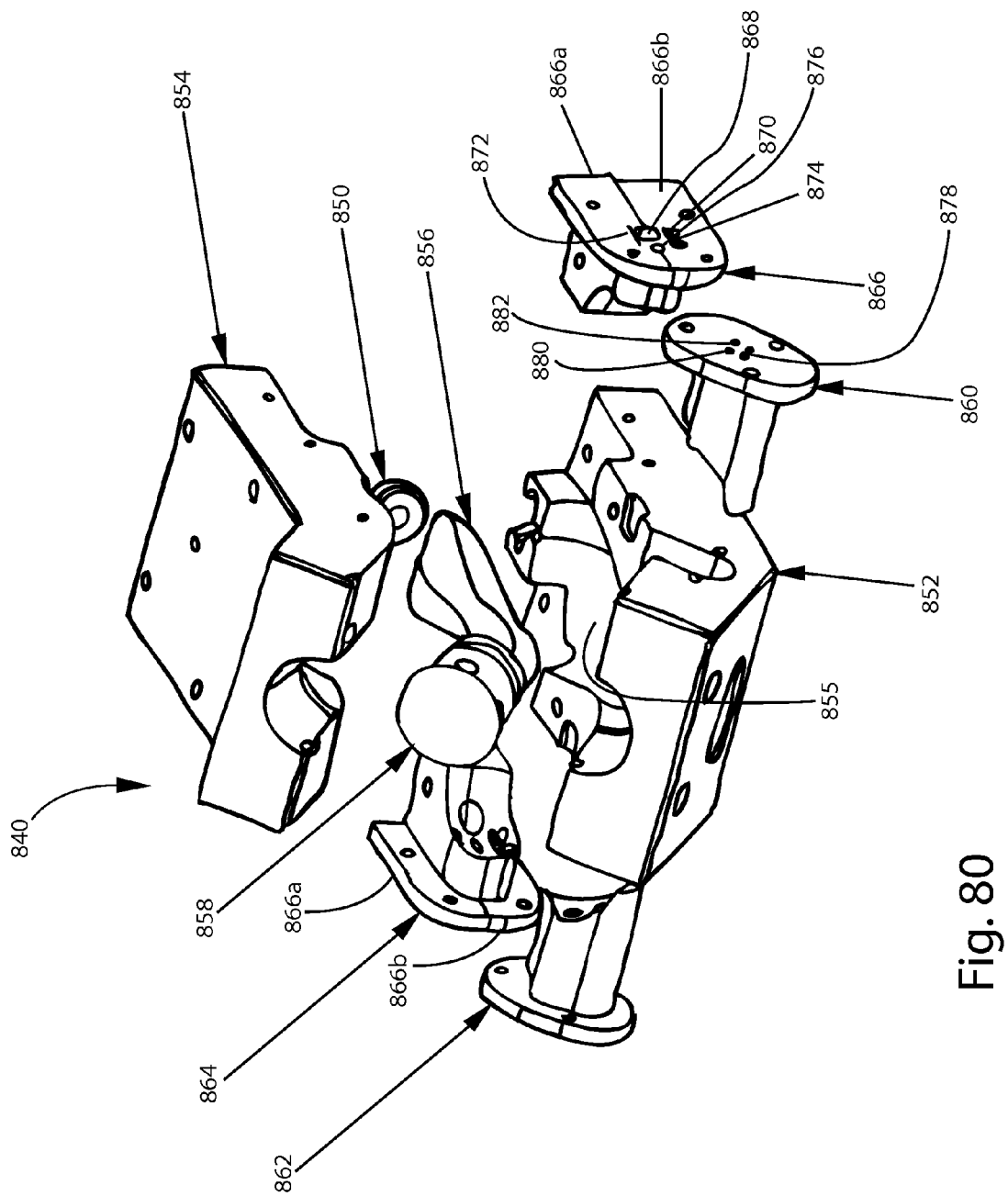
FIGS. 80-84 are directed to the molding and manufacture of a uterine model according to one embodiment of the present disclosure.

Referring now to FIG. 80, shown therein are aspects of a molding system 840 for forming a uterine model according to embodiments of the present disclosure. Specifically, FIG. 80 is an exploded view of the molding system 840.

The uterine molding system 840 is a more complex injection mold than the mold described above, at least in part because the manufacture of a uterus model 845 (not shown) is accomplished by embedding structures such as, by way of non-limiting example, fallopian tubes, ovaries, veins, arteries, and ligaments within the matrix of the uterine tissue. As shown in FIG. 80, the uterine molding system 840 includes an injection port 850; a mold bottom 852 and a mold top 854 that mate to define a cavity 855 that defines a uterus model, such as the uterus 210 described above; a uterine core 856 that forms the uterine cavity, such as the uterine cavity 230 described above; a vaginal-cervical core 858 that forms the cervix, such as the cervix 212 described above and the attachment wall for the vagina, such as the vagina 226 described above; left and right insert bases 860, 862, respectively, that locate the uterine arteries and veins, the uterosacral ligaments, and the cardinal ligaments; and left and right insert ovary and fallopian 864, 866, respectively, that locate the ovaries, fallopian tubes, ovarian arteries and veins, round ligaments and infundibulopelvic ligaments. The cavity 855 defines an external surface 857 of a uterus (shown in FIGS. 81-84).

The left and right insert ovary and fallopian mold components 864, 866, respectively, are split into upper halves 864a, 866a, respectively, and lower halves 864b, 866b, respectively, so that the ovaries and fallopian tubes can be positioned between the two halves on either side. The lower halves 864b, 866b are secured on the mold bottom 852 and the upper halves 864a, 866a are secured on the mold top 854. The previously manufactured ovaries and fallopian tubes are placed within slots 868, 870, respectively, on the lower halves 864b, 866b, and the ligament material and artery and vein tubing are slid into their designated slots 872, 874, 876, respectively.

The left and right insert bases 860, 862, respectively, are secured on the mold bottom 852, and the ligament material and artery and vein tubing are slid into their designated slots 878, 880, 882, respectively, on these inserts.

An alignment rod (not shown) is slid into position on the vaginal-cervical core 858, and the vaginal cervical core 858 and the uterine core 856 are assembled and slid into position on the mold bottom 852. In some embodiments, the alignment rod measures 0.25 inches in diameter.

In the pictured embodiment, the uterine core 856 has two holes near the fundus of the uterus that receive the free, centrally-located ends of the silicone tubing 730, 732 from the fallopian tubes (e.g., fallopian tubes 202, 204 described above) that are assembled within the mold. By sliding these two tubes into place in the core 856, patent fallopian tubes are created that can be visualized from within the uterus, and if any fluid or dye is injected into these tubes, it can be seen evacuating from the opposite end.

The left and right insert bases 860, 862, respectively, and left and right insert ovary and fallopians 864, 866, respectively, are secured to the mold top 854 and the mold bottom 852 with several fasteners (not shown). In some embodiments, this securing may occur with 10-32 screws.

After the injection port 850 is slid into position on the mold bottom 852, the mold top 854 is aligned on the mold bottom 852 and secured in place with several socket head cap screws and knurled-rim knobs. In the pictured embodiment, the fasteners 734 comprise threaded fasteners such as, by way of non-limiting example, socket head cap screws and/or knurled-rim knobs. However, any suitable manner of securing the mold bottom 852 and the mold top 854 may be utilized.

Once fully assembled, the mold 840 can be injected through the single injection port 850, and it vents through three separate vent ports, one on the mold top 854 near the highest point of the core 856 (i.e., an area corresponding to a uterine fundus), and two on the mold top 854 at the cervical-vaginal junction. The diameter of the uterine core 856 is less than the diameter of the cavity 855 such that a space remains around the core 856. In that regard, the space around the core 856 will be filled with material injected into the mold 840.

Figure 81:
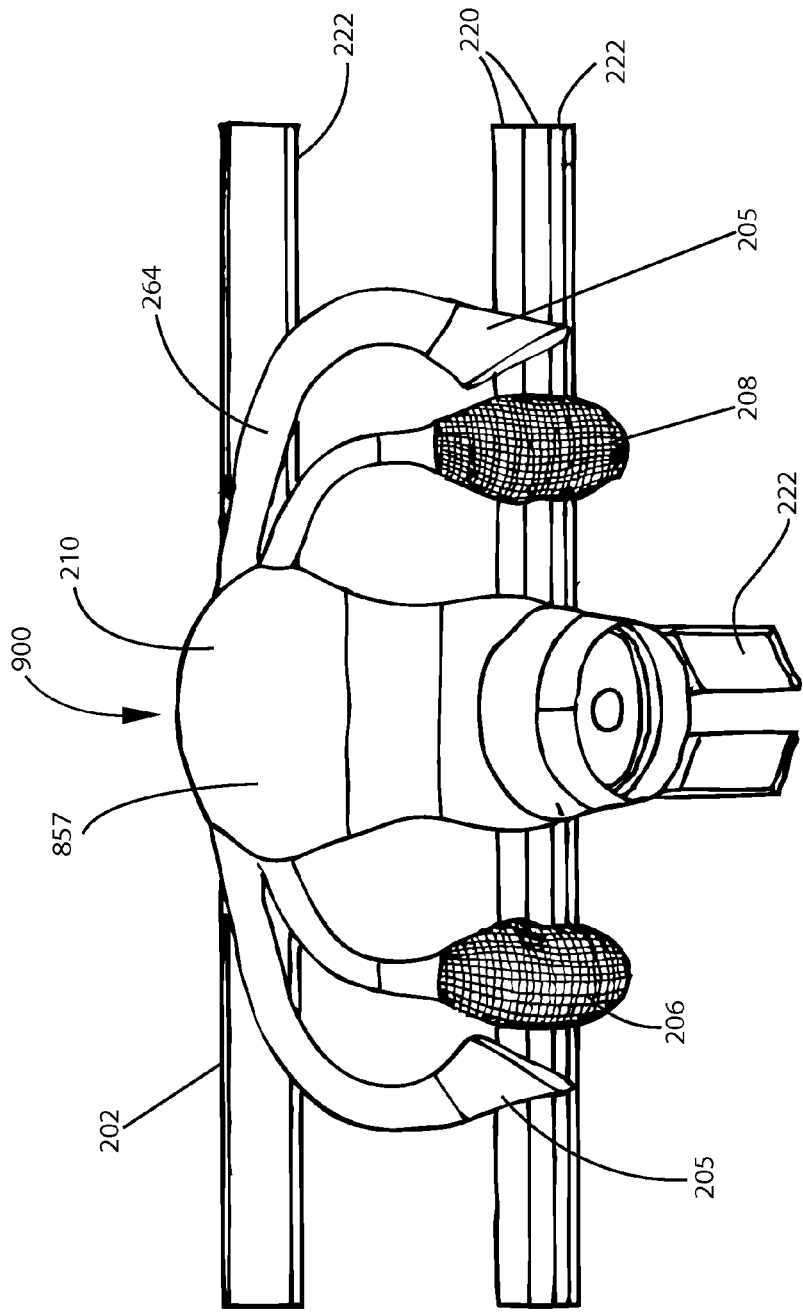
Figure 82:
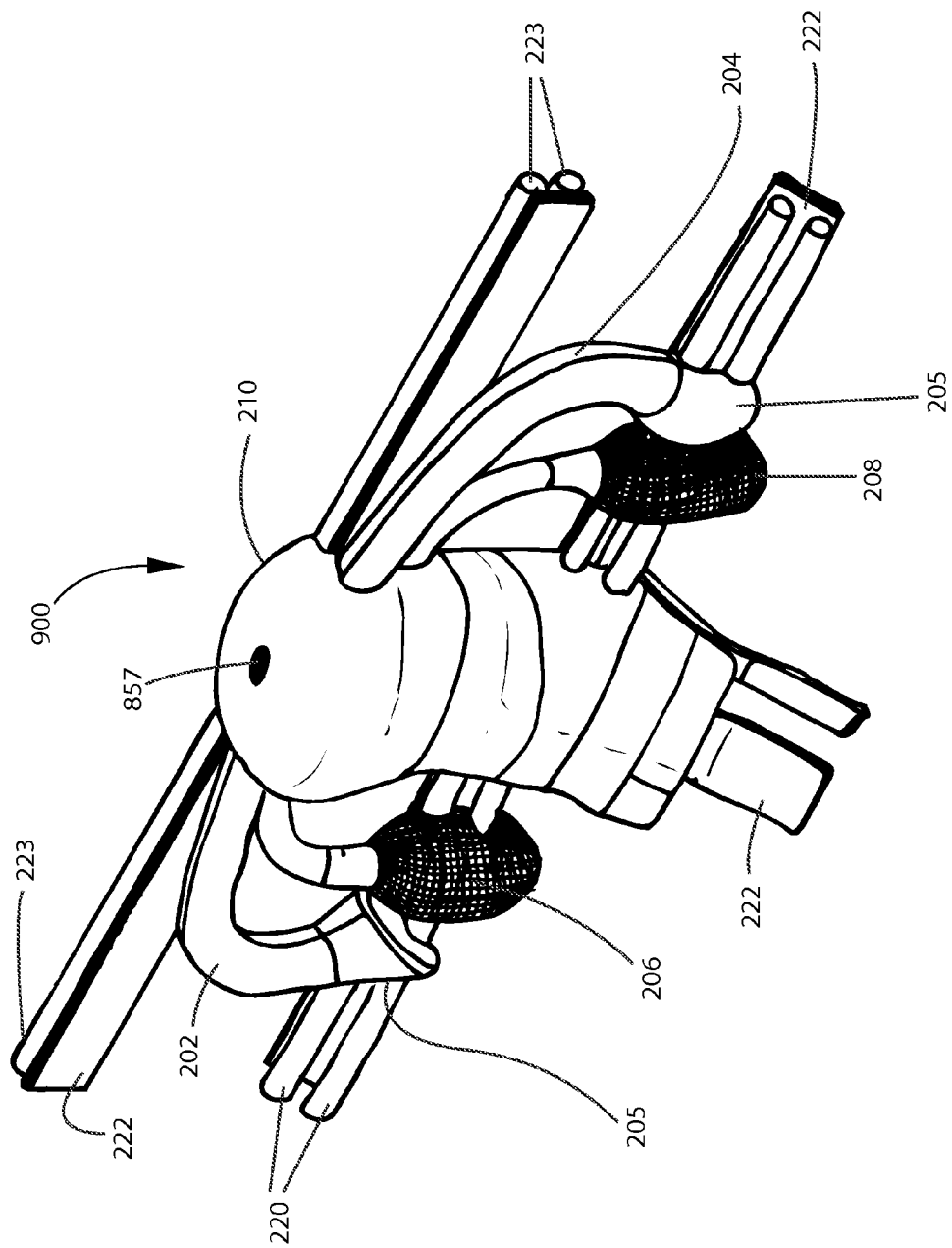
Figure 84:
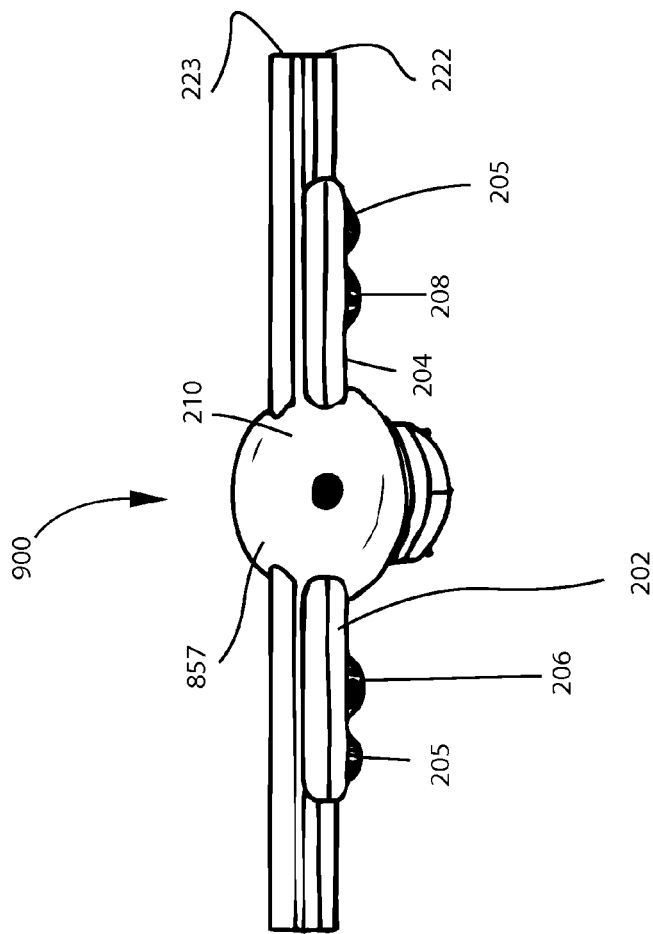
Figure 83:
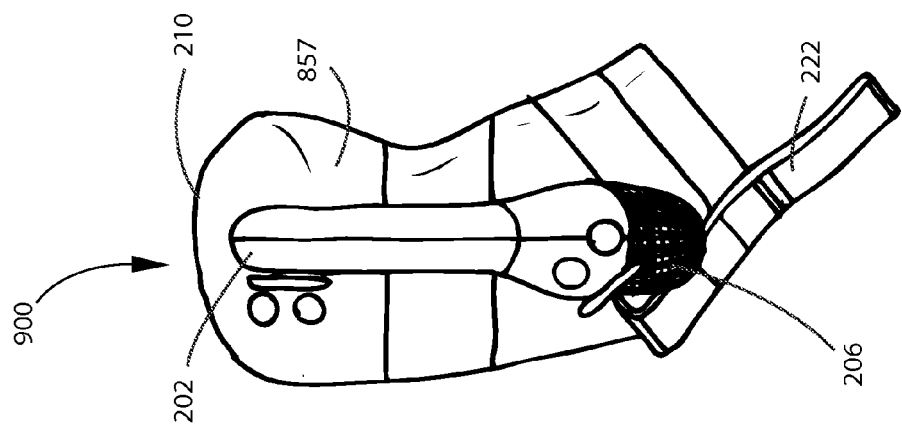

Referring now to FIGS. 81-84, shown therein are aspects of a uterine model 900 according to one embodiment of the present disclosure. Specifically, FIG. 81 illustrates a plan view of the uterine model 900; FIG. 82 illustrates a perspective view of the uterine model 900;

FIG. 83 illustrates a side view of the uterine model 900; and FIG. 84 illustrates a top view of the uterine model 900. In the pictured embodiment, the uterine model 900 includes the uterus 210, fallopian tubes 202, 204, ovaries 206, 208, uterine vessels 220, ligaments 222, and ovarian vessels 223 (not visible in FIG. 81) described above.

Figure 85:
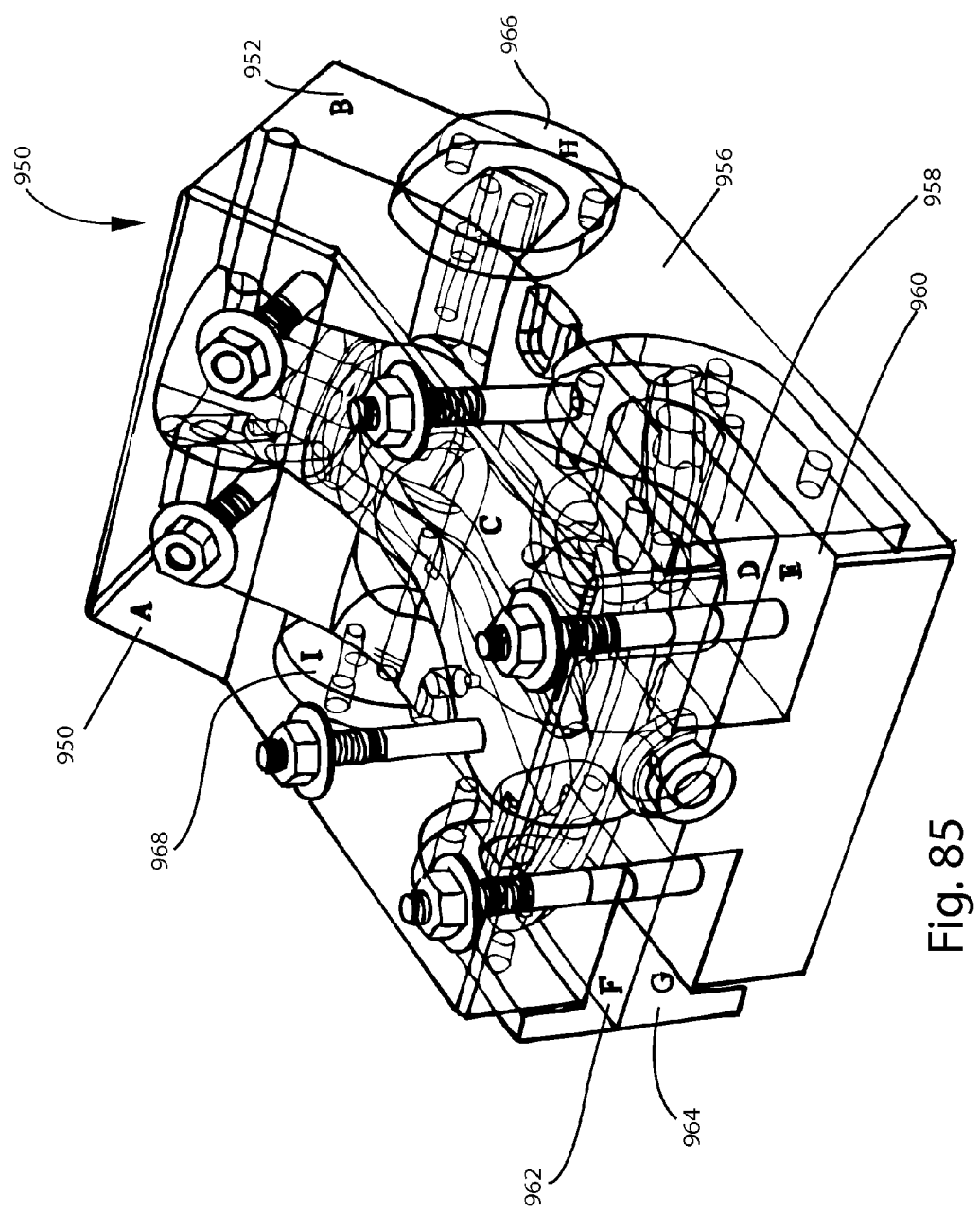
Figure 87:
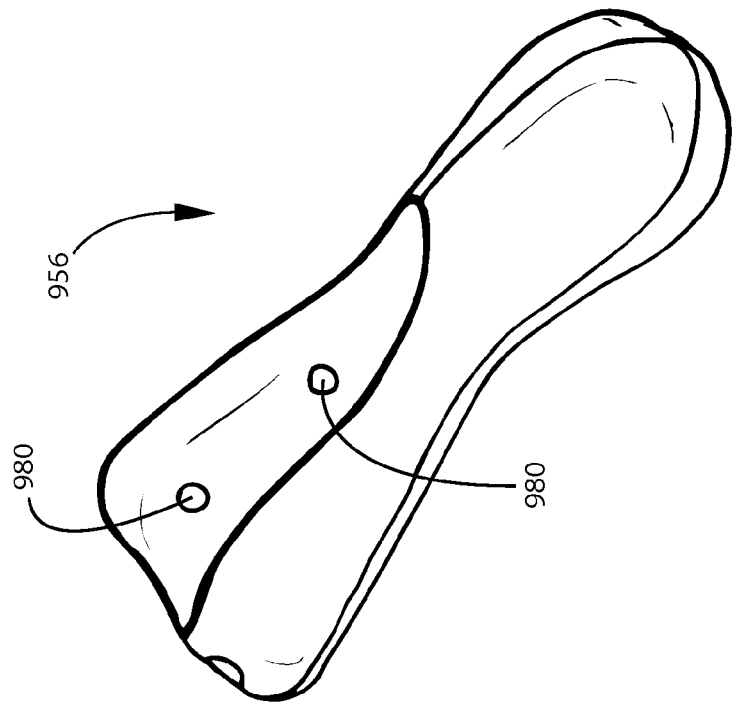
Figure 86:
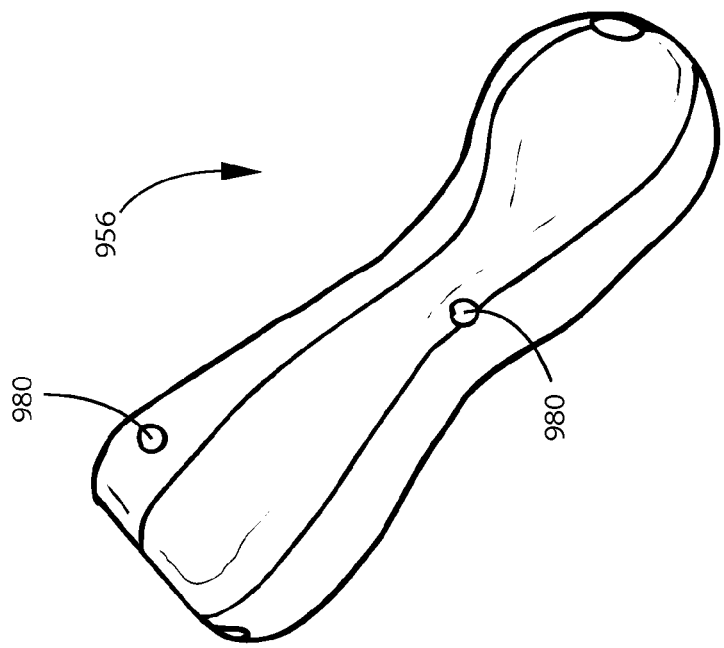

Referring now to FIGS. 85-87, shown therein are aspects of a molding system 950 for forming an enlarged uterine model according to embodiments of the present disclosure. Specifically, FIG. 85 is a perspective view of the molding system 840 with various components shown in phantom and FIGS. 86-87 are perspective views of a core 956 of the molding system 840.

In the pictured embodiment shown in FIG. 85, the molding system 950 is configured to form an enlarged uterine model containing a fibroid uterus, for example the enlarged uterus 502 described above. As shown in FIG. 85, the molding system 950 includes a cope (A) 952, a drag (B) 954, the core (C) 956, a right top tube and ligament bracket (D) 958, a right bottom tube and ligament bracket (E) 960, a left top tube and ligament bracket (F) 962, a left bottom tube and ligament bracket (G) 964, a right ligament bracket (H) 966, and a left ligament bracket (I) 968.

The molding system 950 is similar to the molding system 840 in structure and operation except for differences directed to the production of an enlarged uterine model containing pathologies or masses. Such masses or pathologies may include, by way of non-limiting example, fibroids, including submucosal fibroids, endometriosis, adenomyosis, hydatiform mole, uterine cancer, intrauterine adhesions, and polyps.

FIGS. 86-87 illustrate the uterine core 956 including ports 980 to which tubing can be attached to adhere to the uterus material and enable simulation of the continuous flow or oozing of blood. In some embodiments, the tubing is permanently adhered to a uterine model at regions corresponding to ports 980. In other embodiments, the tubing may be temporarily attached to the uterine model at regions corresponding to ports 980.

Figure 88:
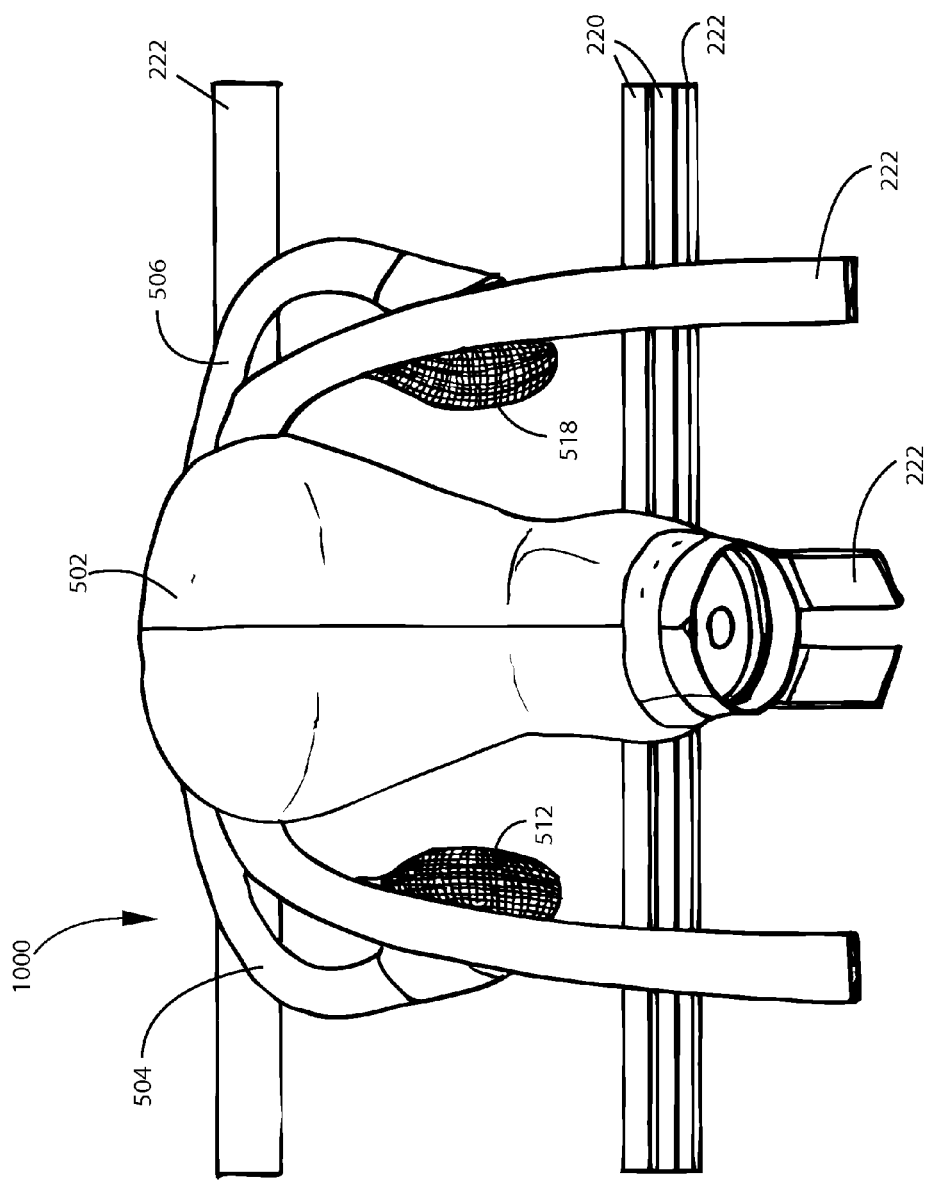
Figure 89:
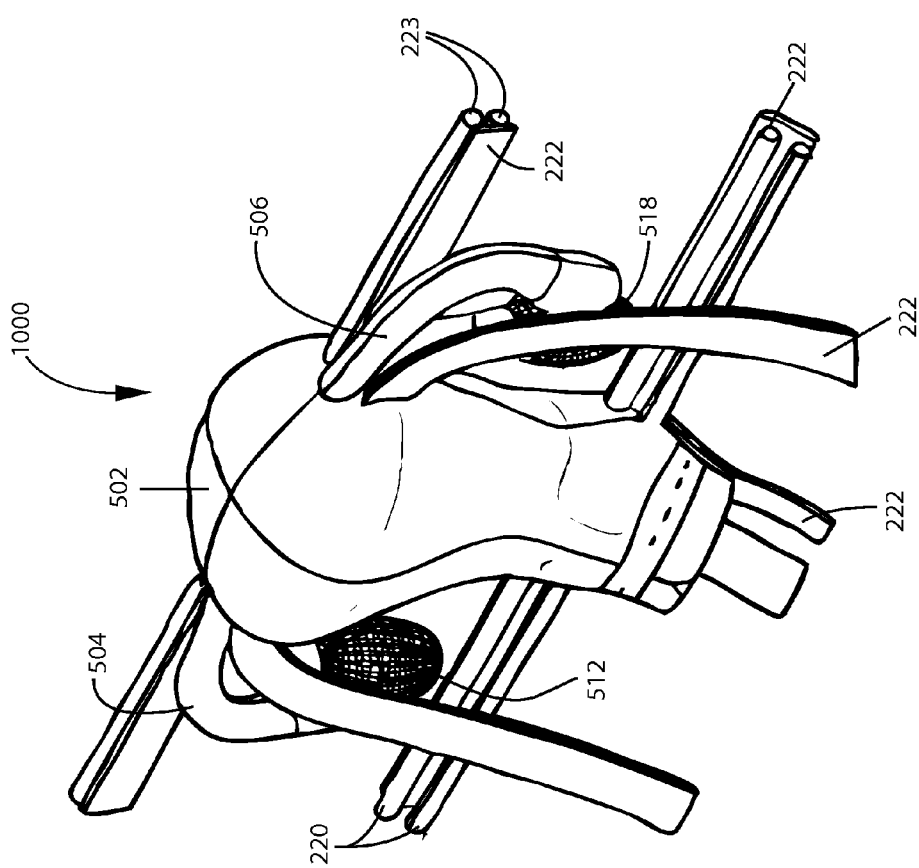

Referring now to FIGS. 88-91, shown therein are aspects of a uterine model 1000 according to one embodiment of the present disclosure. Specifically, FIG. 88 illustrates a plan view of the uterine model 1000; FIG. 89 illustrates a perspective view of the uterine model 1000;

FIG. 90 illustrates a side view of the uterine model 1000; and FIG. 91 illustrates a top view of the uterine model 1000. In the pictured embodiment, the uterine model 1000 includes the enlarged uterus 502, fallopian tubes 504, 506, ovaries 512, 518, uterine vessels 220, ligaments 222, and ovarian vessels 223 (not visible in FIG. 88) described above. In other embodiments, the uterine model may contain other embodiments of various components (e.g., certain component parts of uterine model 900).

Figure 92:
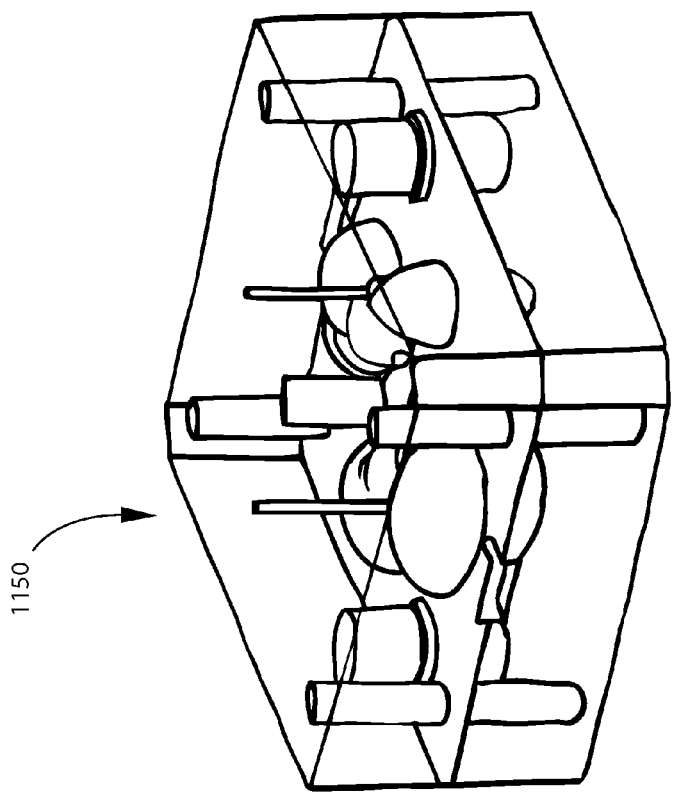

Referring now to FIGS. 92-122, shown therein are aspects of a molding system 1150 for forming a fibroid model according to embodiments of the present disclosure. FIG. 92 is a perspective view of the molding system 1150.

Figure 94:
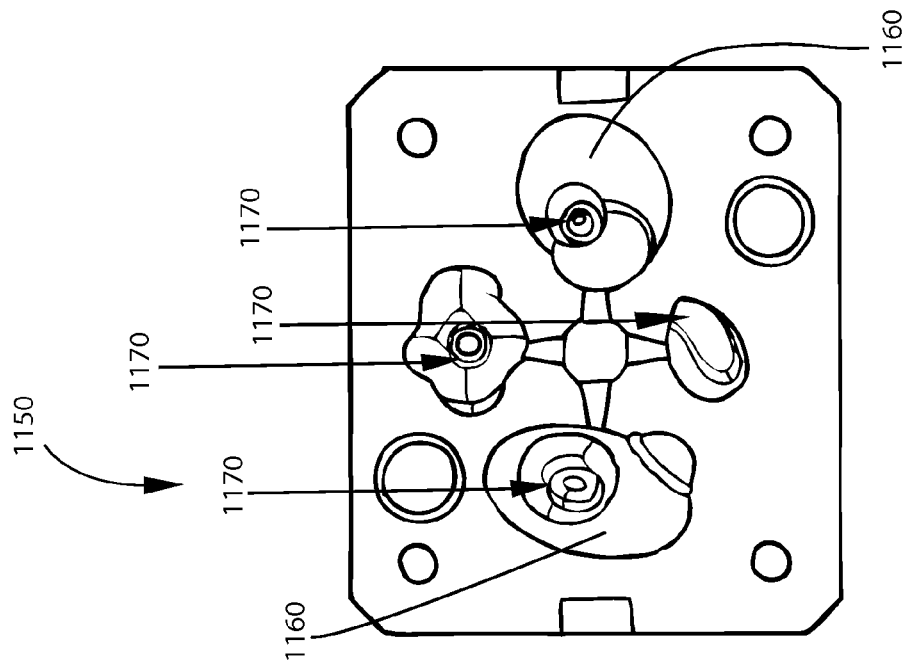
Figure 93:
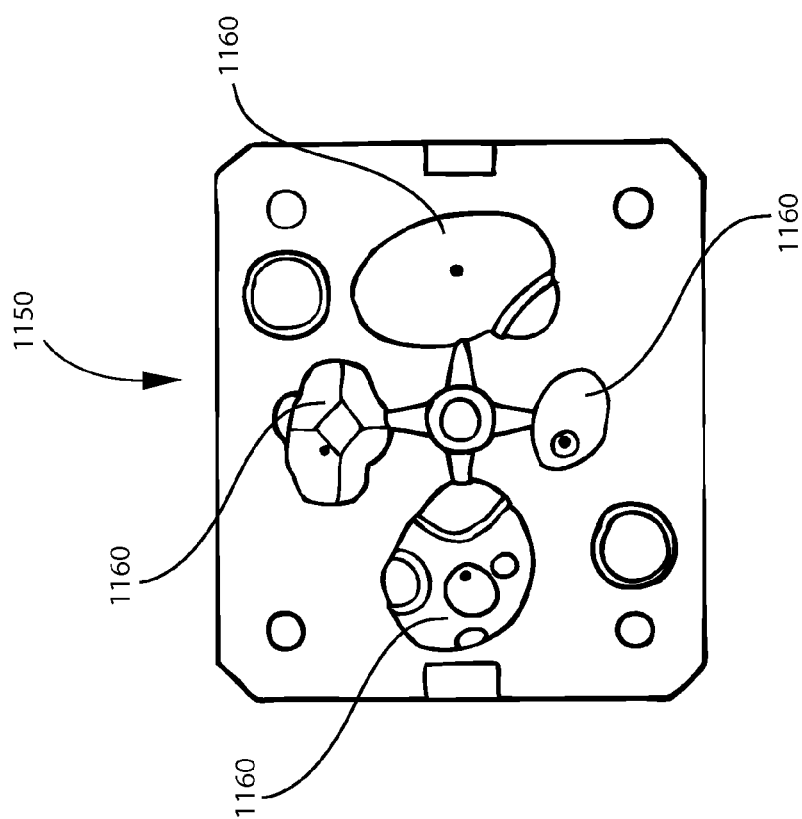

Specifically, FIGS. 93-94 show components of the molding system 1150 for forming a solid fibroid model according to embodiments of the present disclosure. FIGS. 93 and 94 are top views of component parts of the molding system 1150, for example a cope and a drag that are configured to mate together to form recesses or cavities 1160. FIGS. 93, 94, include the recesses or cavities 1160 of different shapes and sizes for forming exterior surfaces 1161 of fibroid models (e.g., fibroid models 1270, 1275, 1280, and 1285 shown in FIGS. 119, 120, 121, and 122, respectively). In FIG. 94, protrusions 1170 comprise molds to shape fibroid attachment sites that mimic the natural fibroid attachment sites of average human fibroids. Each fibroid model formed in the recess 1160 containing the protrusion 1170 will contain a "nipple" or attachment site 1171 (shown in FIGS. 119, 120, and 122) that will allow the fibroid model to simulate the connection of its base to the uterine myometrium where blood vessels are found. In different embodiments, the protrusions 1170 can be of different shapes, sizes, and positions within the recesses 1160.

Figure 97:
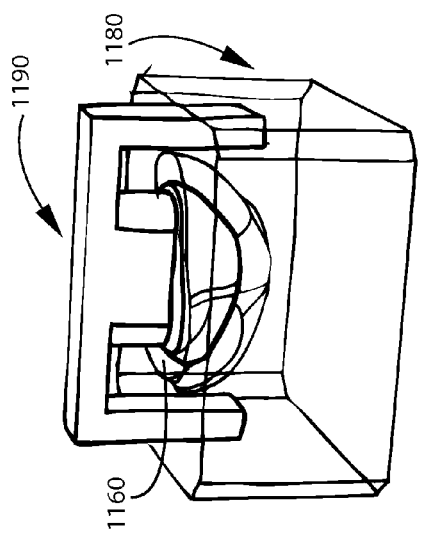
Figure 100:
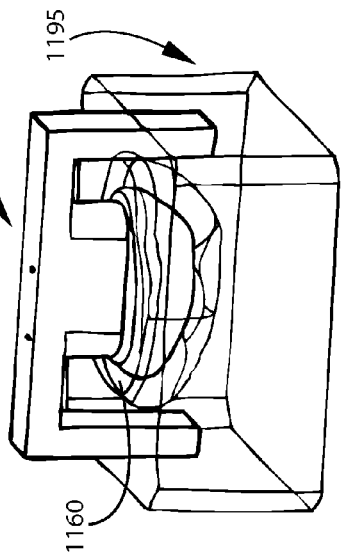
Figure 96:
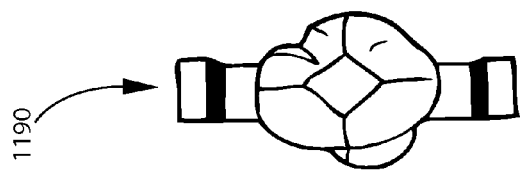
Figure 99:
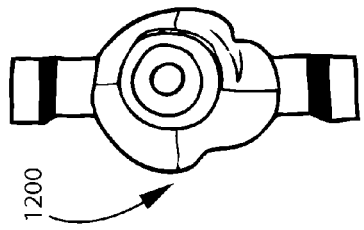
Figure 95:
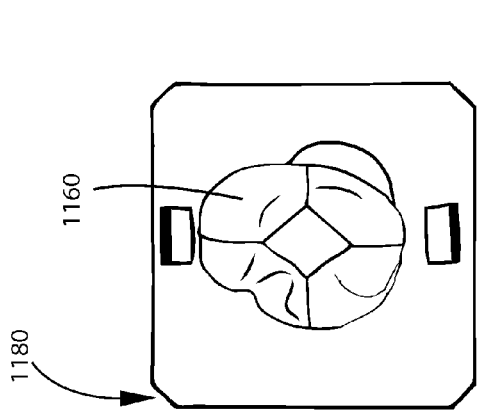
Figure 98:
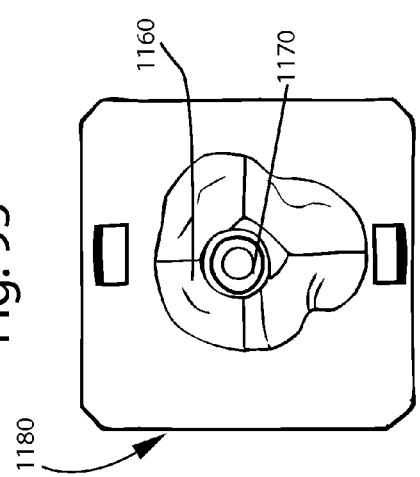

FIGS. 95-118 show embodiments of the molding system 1150 for forming hollow fibroid models according to embodiments of the present disclosure. Hollow fibroids that contain a fluid volume to simulate the blood oozing experienced during the removal of such are manufactured utilizing four mold pieces per unit. For example, FIGS. 95, 96, 98, and 100 show the four mold pieces of an exemplary hollow fibroid modeling system: FIG. 95 shows a top mold 1180 containing the recess 1160; FIG. 96 shows a core 1190; FIG. 98 shows a bottom mold 1195 containing the recess 1160 with the protrusion 1170; and FIG. 99 shows a core 1200. FIGS. 97 and 100 illustrate the cores 1190, 1200 placed within the molds 1180, 1195, respectively.

As shown in FIGS. 97 and 100, the diameter of the cores 1190, 1200 is less than the diameter of the cavities 1160 such that space remains around the cores. In that regard, the space around the cores 1190, 1200 will be filled with material injected into the molds 1180, 1195, respectively. Shell-like fibroid halves are formed around where blood-like fluid or material is injected into the molds 1180, 1195. The resulting blood-filled fibroids portray the earlier discussed attachment site or "nipple" 1171 to mimic the cohesion of the fibroid mass' base and the uterine myometrium.

Figure 103:
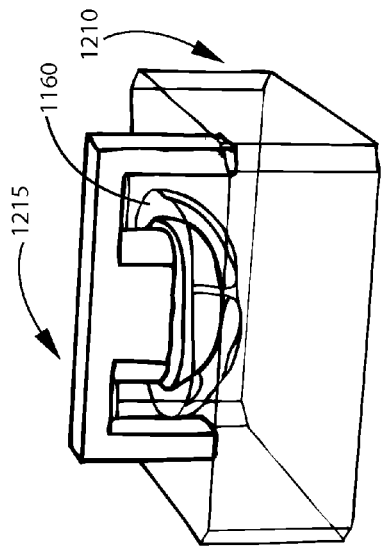
Figure 106:
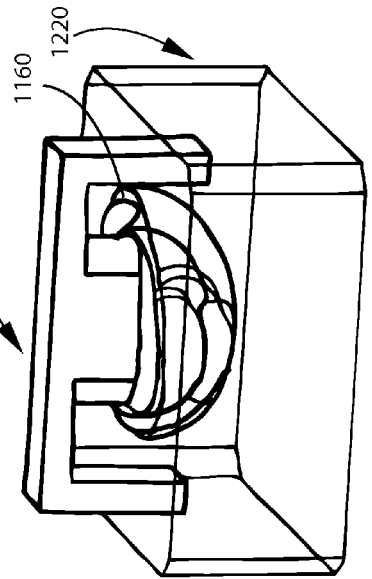
Figure 102:
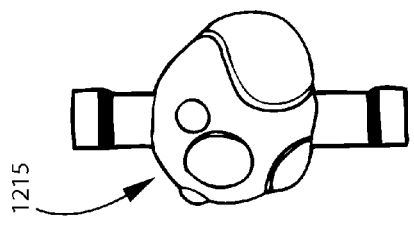
Figure 105:
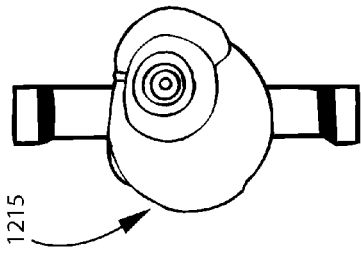
Figure 101:
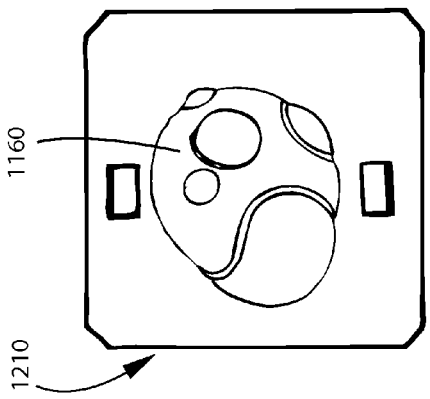
Figure 104:
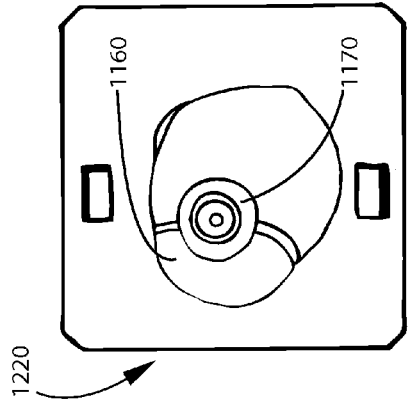

Similarly, FIGS. 101-106 show four mold pieces of another exemplary hollow fibroid modeling system having different physical characteristics: FIG. 101 shows a top mold 1210 containing the recess 1160; FIG. 102 shows a core 1215; FIG. 104 shows a bottom mold 1220 containing the recess 1160 with the protrusion 1170; and FIG. 105 shows a core 1225. FIGS. 103 and 106 illustrate the cores 1215, 1225 placed within the molds 1210, 1220, respectively. As shown in FIGS. 103 and 106, the diameter of the cores 1215, 1225 is less than the diameter of the cavities 1160 such that space remains around the cores. In that regard, the space around the cores 1215, 1225 will be filled with material injected into the molds 1210, 1220, respectively. Shell-like fibroid halves are formed around where blood-like fluid or material is injected into the molds 1210, 1220.

Similarly, FIGS. 107-112 show four mold pieces of another exemplary hollow fibroid modeling system having different physical characteristics: FIG. 107 shows a top mold 1230 containing the recess 1160; FIG. 108 shows a core 1235; FIG. 110 shows a bottom mold 1240 containing the recess 1160 with the protrusion 1170; and FIG. 111 shows a core 1245. FIGS. 109 and 112 illustrate the cores 1235, 1245 placed within the molds 1230, 1240, respectively. As shown in FIGS. 109 and 112, the diameter of the cores 1235, 1245 is less than the diameter of the cavities 1160 such that space remains around the cores. In that regard, the space around the cores 1235, 1245 will be filled with material injected into the molds 1230, 1240, respectively. Shell-like fibroid halves are formed around where blood-like fluid or material is injected into the molds 1230, 1240.

Figure 115:
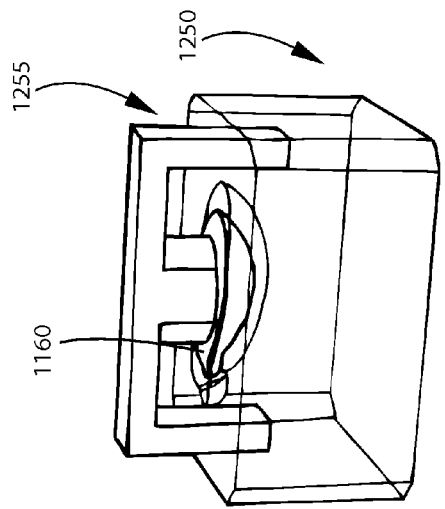
Figure 118:
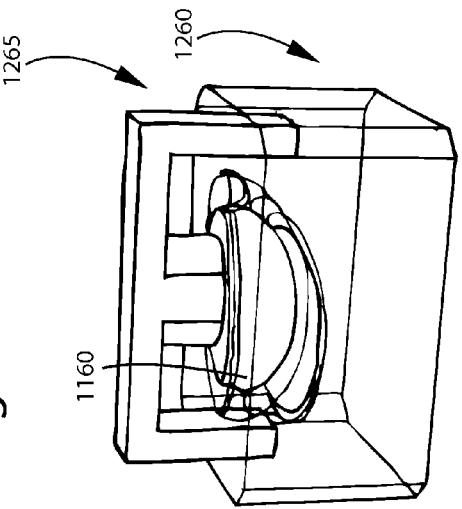
Figure 114:
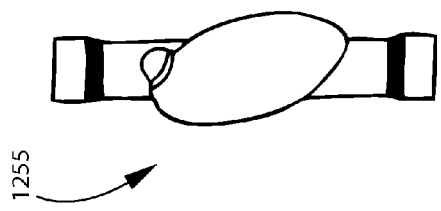
Figure 117:
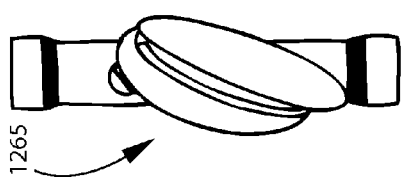
Figure 113:
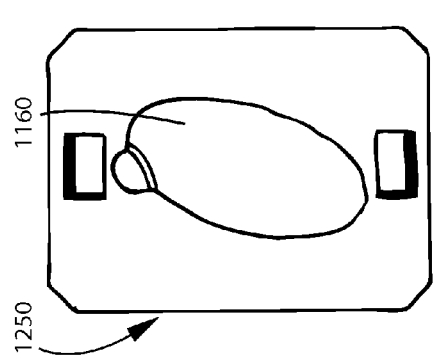
Figure 116:
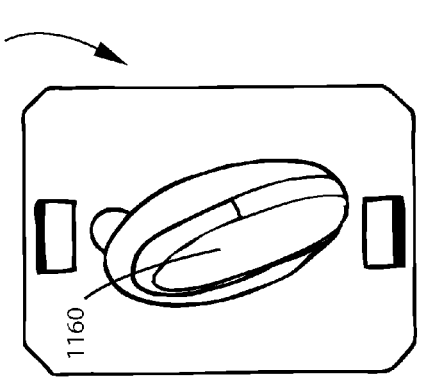

Similarly, FIGS. 113-118 show four mold pieces of another exemplary hollow fibroid modeling system having different physical characteristics: FIG. 113 shows a top mold 1250 containing the recess 1160; FIG. 108 shows a core 1255; FIG. 110 shows a bottom mold 1260 containing the recess 1160 with the protrusion 1170; and FIG. 111 shows a core 1265. FIGS. 109 and 112 illustrate the cores 1255, 1265 placed within the molds 1250, 1260, respectively. As shown in FIGS. 115 and 118, the diameter of the cores 1255, 1265 is less than the diameter of the cavities 1160 such that space remains around the cores. In that regard, the space around the cores 1255, 1265 will be filled with material injected into the molds 1250, 1260, respectively. Shell-like fibroid halves are formed around where blood-like fluid or material is injected into the molds 1250, 1260.

FIGS. 119-122 illustrate four exemplary fibroid models 1270, 1275, 1280, 1285, respectively, of varying shapes, sizes, and configurations. The fibroid models 1270, 1275, 1280, 1285 include the external surfaces 1161 and the nipples or protrusions 1171. In some embodiments, any of the fibroid models 1270, 1275, 1280, 1285 may comprise hollow, blood-filled fibroids. In some embodiments, any of the fibroid models 1270, 1275, 1280, 1285 may comprise solid fibroids. In some embodiments, the fibroids are configured to interact with tubing within the uterus to ooze blood to simulate uterine bleeding due to fibroids or myomas.

Figure 123:
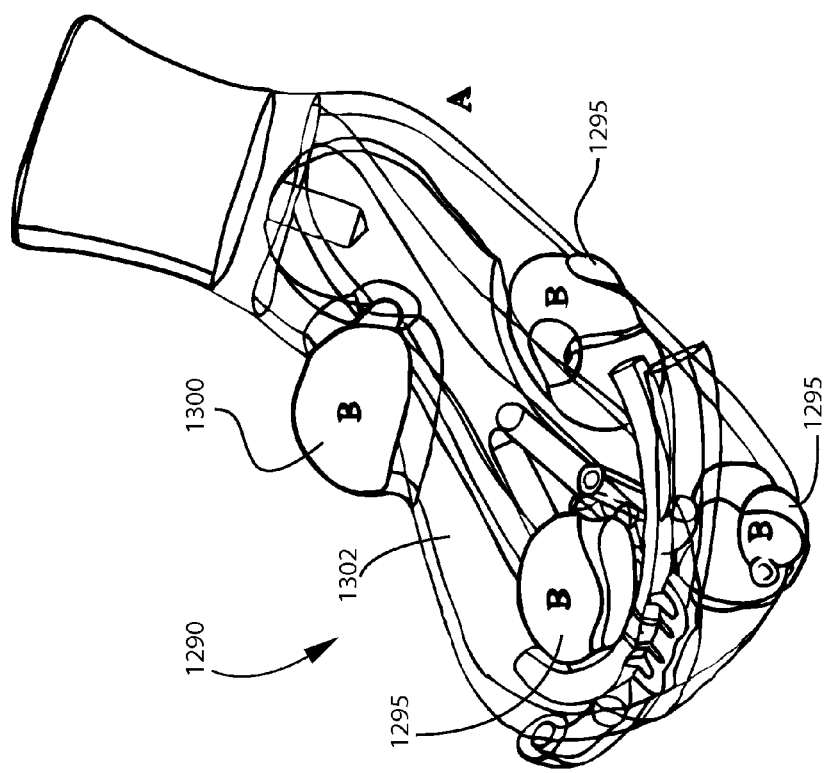
Figure 124:
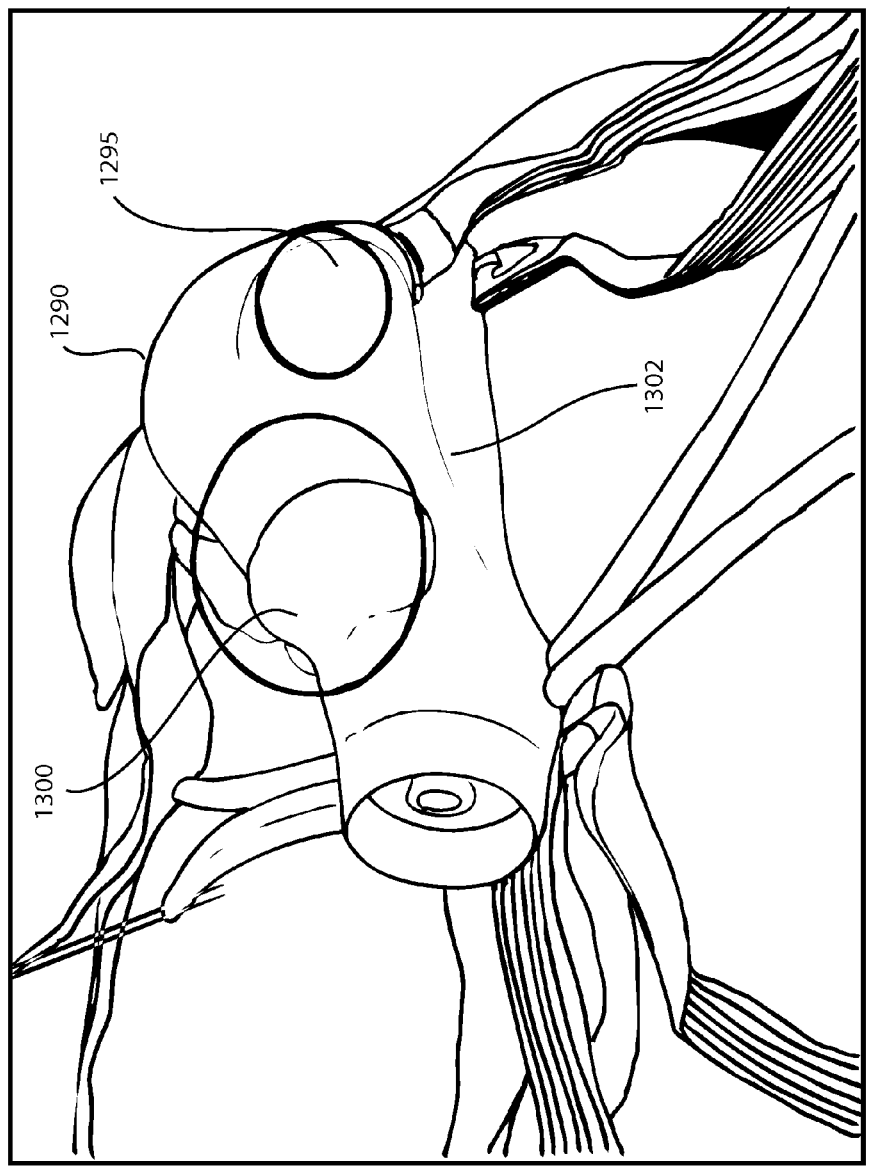
Figure 125:
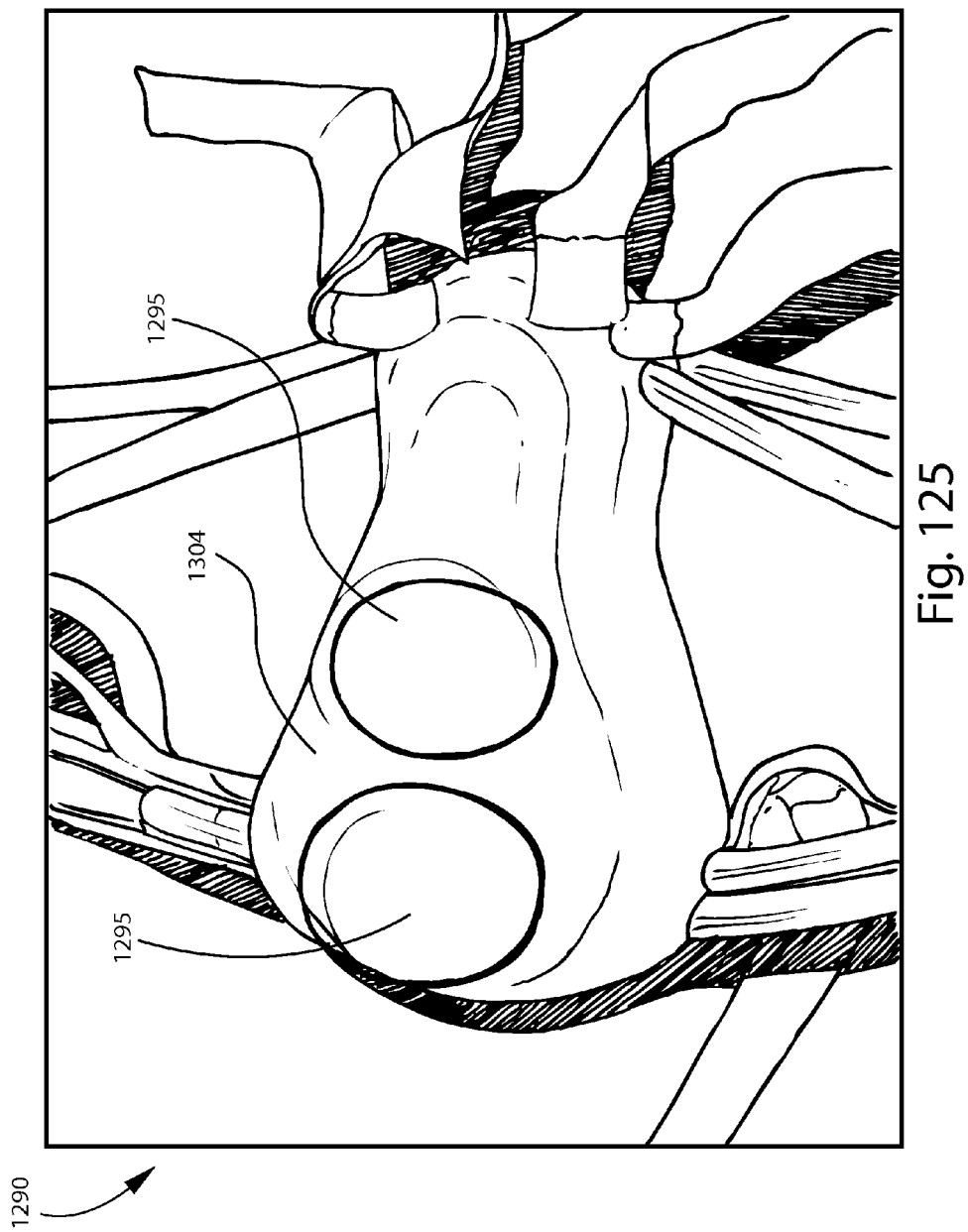
Figure 127:
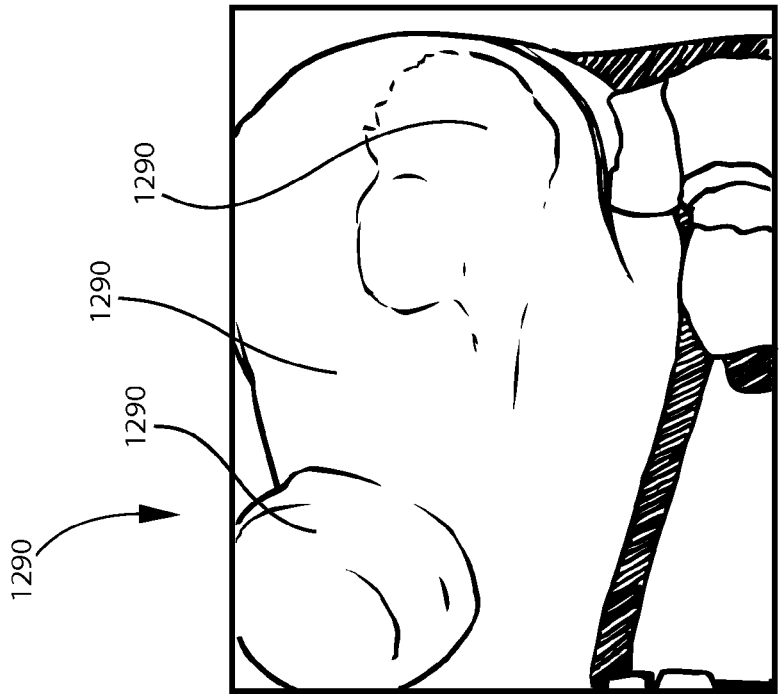
Figure 126:
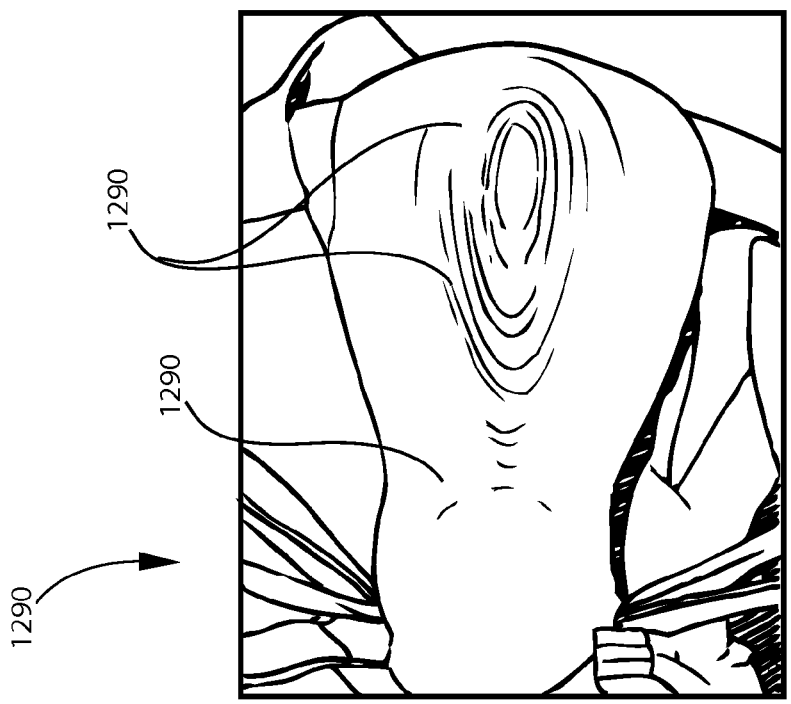

FIG. 123 illustrates a perspective view of an exemplary fibroid uterus model 1290 showing three intramural fibroids 1295 and one subserosal fibroid 1300 in phantom. As shown in FIGS. 123-7, in the pictured embodiment, the subserosal fibroid 1300 and one intramural fibroid 1295 are positioned on an anterior side 1302 of the model 1290, and the two remaining intramural fibroids 1295 are positioned on a posterior side 1304 of the model 1290.

Figure 129:
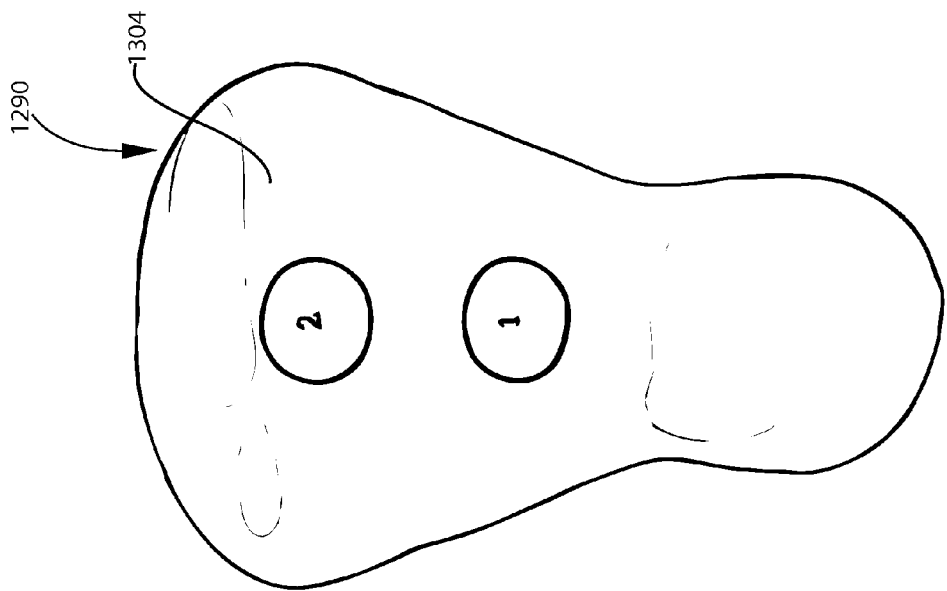
Figure 128:
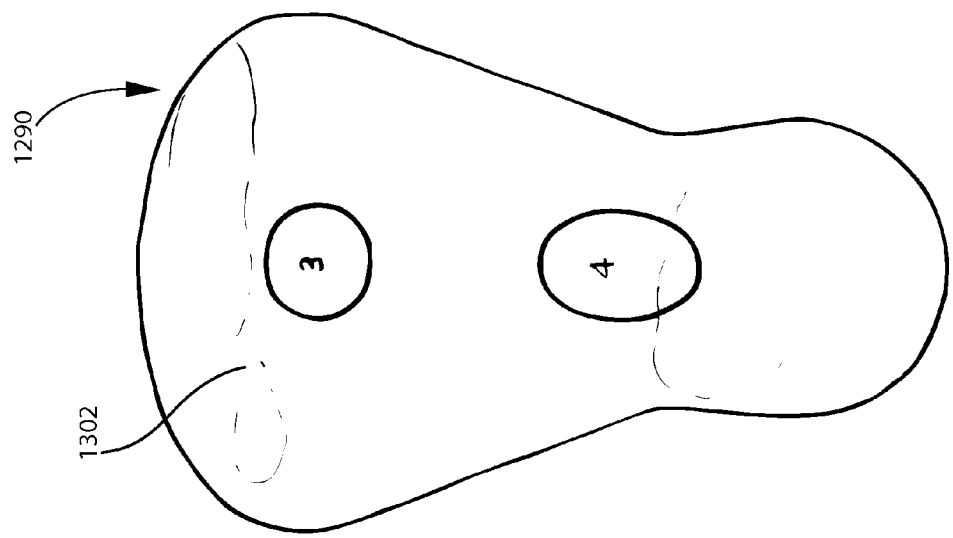

FIGS. 128 and 129 indicate an exemplary arrangement of fibroids within the fibroid uterus model 1290. In the pictured embodiment, there are two fibroids located in or on the anterior side 1302 of the model 1290, and two fibroids located in or on the posterior side 1304 of the model 1290. Alternate embodiments may contain any number and arrangement of fibroids or other pathological masses within or on the uterus model.

As discussed above in relation to FIGS. 86-87, to produce the venous blood oozing simulation of the fibroids 1295, 1300 within the uterus model 1290, the uterus model 1290 may be manufactured to contain tubing in the core at the precise location where these masses are located. The tubing may remain permanently within the uterus model 1290 and therefore permit continuous bleeding.

Figure 130:
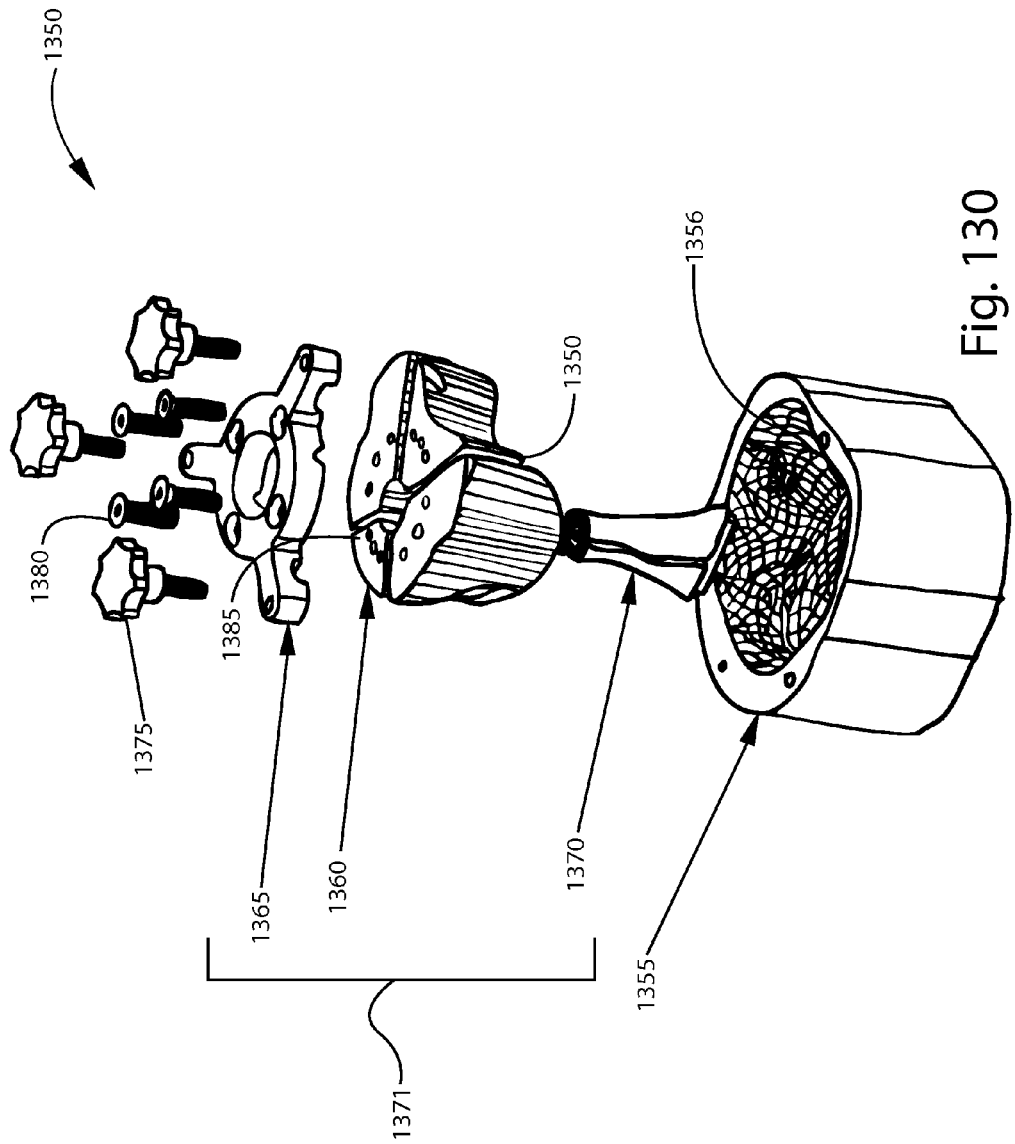

Referring now to FIG. 130, shown therein are aspects of a molding system 1350 for forming a perineum model, such as the perineum 224 described above, according to embodiments of the present disclosure. Specifically, FIG. 130 is an exploded view of the molding system 1350.

As shown in FIG. 130, the molding system 1350 comprises a pour mold that consists of a perineum mold base 1355, which contains a recess or cavity 1356 that defines the external perineum surface and walls (e.g., perineum walls 225 described above); a four-component perineum mold core 1360 that forms an internal perineum surface 1361, inner support members 1362, and vertical vaginal support 1363; a mold core support 1365 that aligns and supports the mold core 1360; and a vaginal core 1370 with an injected fiber-reinforced vagina model (which is manufactured before the perineum) attached. In the pictured embodiment, the vaginal core 1370 is de-molded from the vaginal mold (e.g., the molding system 790), and all redundant material and flashing is removed. The perineum mold cavity 1356 is sized, shaped, and contoured to simulate an outer surface 1372 (shown in FIGS. 131-133) of a natural perineum and/or surrounding tissue and walls 1373 (shown in FIGS. 131-133). In that regard, the particular size, shape, and contour of the cavity 1356 is selected based on the type of perineum to be simulated. For example, the contour of the cavity 1356 may be configured to reflect perineums of various ages and/or various pathologies.

The vaginal core 1370 with an attached vagina is inserted within the four components of the perineum core 1360, and the mold core support 1365 is secured to the components of the mold core 1360, thereby locking the vaginal core 1370 in position. The vaginal core 1370 and perineum core 1360 forms a subassembly 1371 that is then lowered into the perineum mold cavity 1356, and the elliptical base of the vaginal core 1370 slides into a receptacle slot 1374 (shown in FIG. 134) at the bottom of the perineum mold cavity 1356.

The perineum mold core support 1365 is coupled to the perineum mold base 1355 with fasteners 1375, 1380. The fasteners 1375, 1380 may comprise any of a variety of fasteners, such as, by way of non-limiting example, threaded fasteners. For example, in the pictured embodiment, the perineum mold core support 1365 is fastened to the perineum mold base 1355 with three ⅜-16 Knobs 1375 and four screws 1380 (e.g., flat-head socket cap screws). However, any suitable manner of securing perineum mold core support 1365 is coupled to the perineum mold base 1355 may be utilized.

The openings 1385 create support for the vaginal core 1370. In some embodiments, ligaments may attach to the tops of the walls of the perineum core 1360 (e.g., of the openings 1385) for further support.

During manufacturing of a perineum model, silicone material is poured into the perineum mold cavity 1356 before a core subassembly 1371 is slowly lowered into position in combination with the vaginal core 1370. As shown in FIG. 57, the diameter of the core subassembly 1371 is less than the diameter of the cavity 1356 such that a space remains around the core subassembly 1371. In that regard, the space around the core subassembly 1371 will be filled with material injected into the mold 1350. The speed at which the core subassembly 1371 is lowered is critical because if the core is lowered too fast, bubble entrapment will occur within the cavity 1356. Generally, sufficient time should be allowed for the level of the silicone to equilibrate and fill the openings 1385 between the four components of the perineum core 1360.

In some embodiments, the vagina model may be manufactured in combination with the uterine model, and the combined uterine-vaginal insert may be combined with the perineum core before the perineum core is lowered into position to manufacture the perineum. This may eliminate a silicone "gluing step" of the manufacture process.

Figure 131:
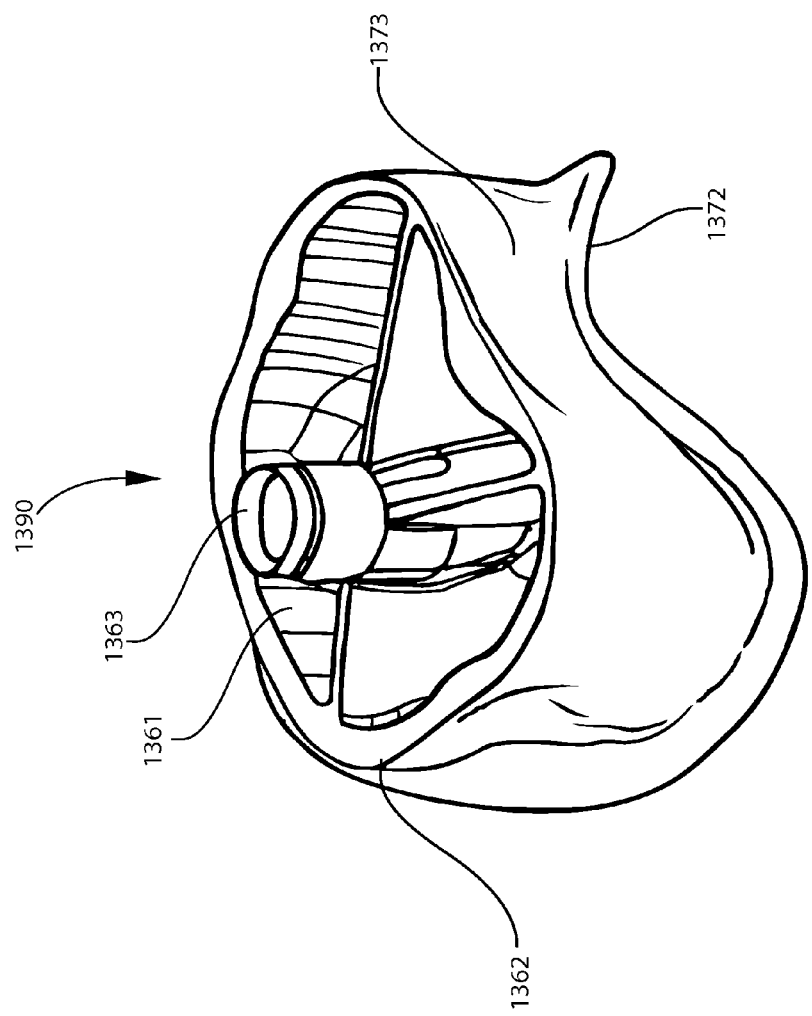
Figure 132:
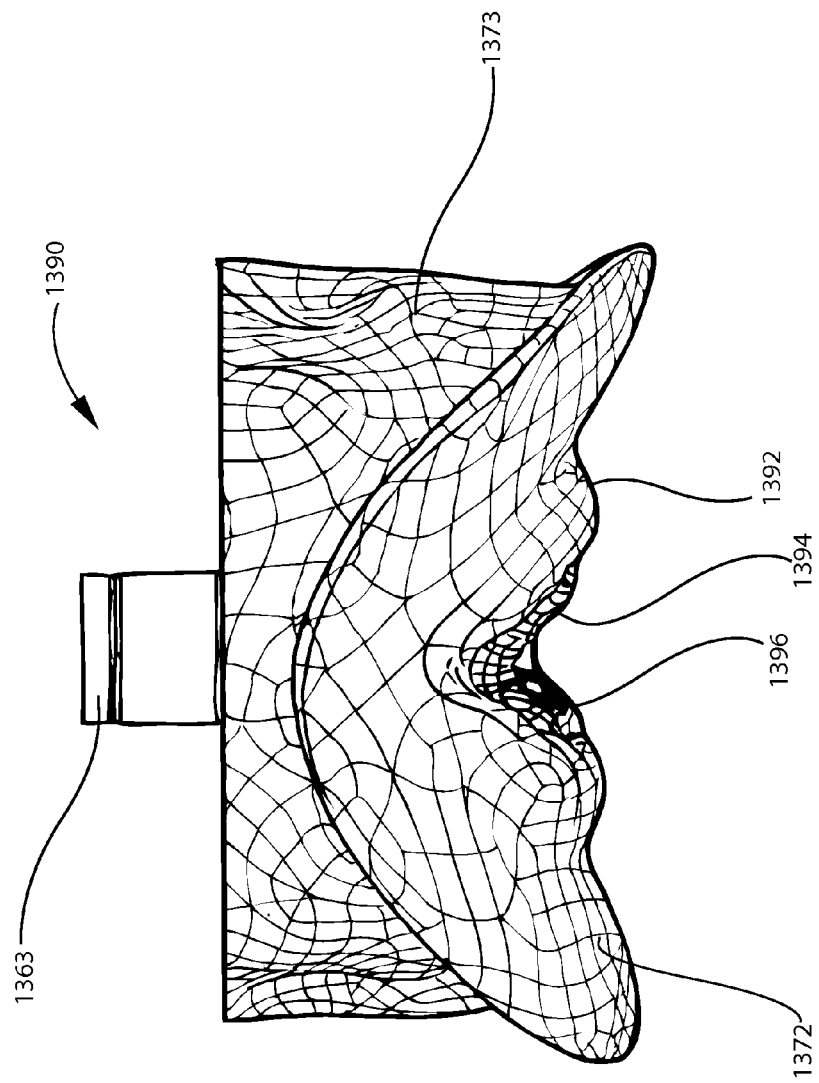

Referring now to FIGS. 131-134, shown therein are aspects of a perineum model 1390 according to one embodiment of the present disclosure. Specifically, FIG. 131 illustrates a perspective view of the perineum model 1390; FIG. 132 illustrates a plan view of the perineum model 1390; FIG. 133 illustrates a side view of the perineum model 1390; and FIG. 134 illustrates a top view of the perineum model 1390. In the pictured embodiment, the perineum model 1390 comprises the perineum 224 described above.

As shown in FIG. 131, the perineum model 1390 includes the internal perineum surface 1361, the inner support members 1362, the vertical vaginal support 1363, the outer perineum surface 1372, and the walls 1373. As shown in FIG. 132, the pictured embodiment includes realistic representations of a vulva 1392, labia 1394, and a clitoris 1396. Other embodiments may include representations of various vulvar and/or perineal pathologies.

Figure 135:
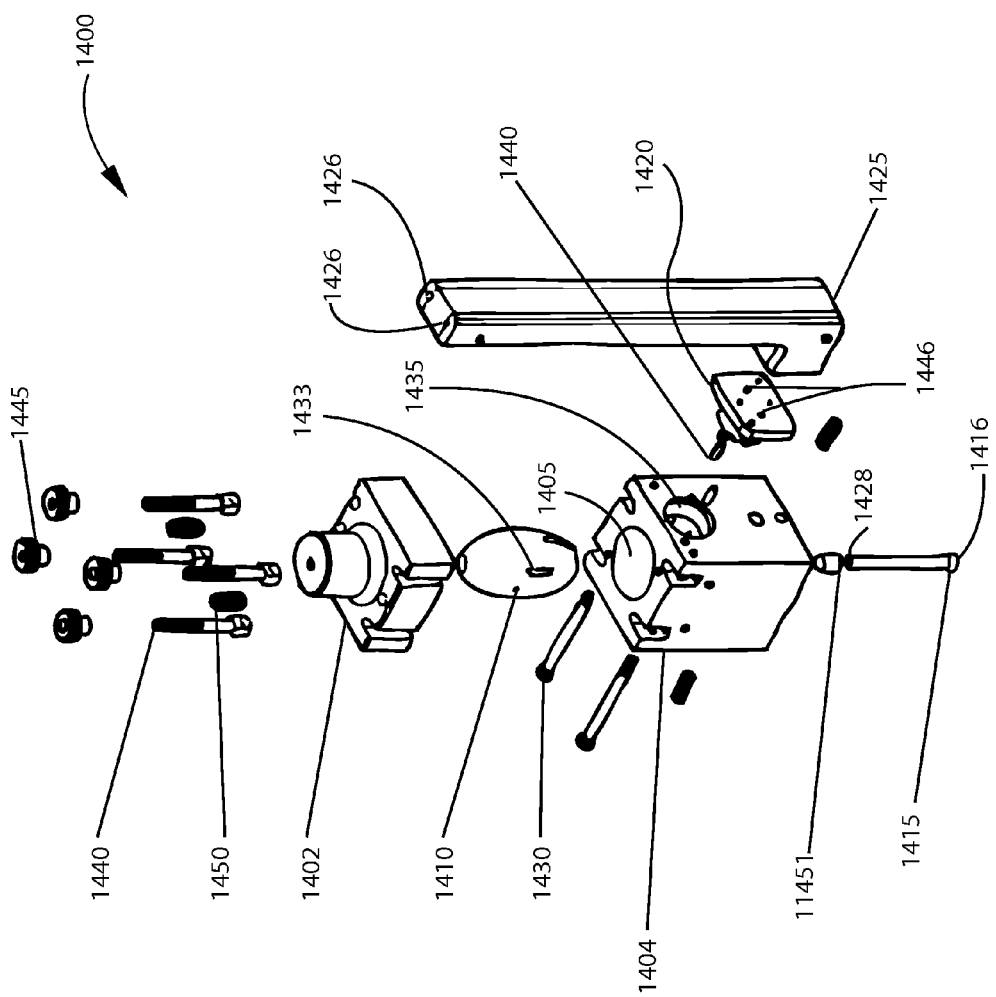
FIGS. 135-139 are directed to the molding and manufacture of a bladder model according to one embodiment of the present disclosure.

Referring now to FIG. 135, shown therein are aspects of a molding system 1400 for forming a bladder model, such as the bladder 214 described above, according to embodiments of the present disclosure. Specifically, FIG. 135 is an exploded view of the molding system 1400.

As shown in FIG. 135, the molding system 1400 is a multi-component injection mold consisting of a cope 1402 that includes a cavity 1403 (not shown), which forms the upper longitudinal half of the bladder, and a drag 1404 that includes a cavity 1405, which forms the lower longitudinal half of the bladder as well as the urethra, the core evacuation slot, and the base of the ureters. The molding system 1400 also comprises a core 1410 that shapes and defines an internal surface (not shown) of the bladder, a core centering pin 1415 that centers the core 1410 in the mold radially and longitudinally, a side insert 1420, and ureters blocks 1425. The side insert 1420 creates a core evacuation slot in the bladder wall and a segment of the ureters, and locates the core longitudinally and azimuthally in the mold. The ureter blocks 1425 include cavities 1426 that shape and define external surfaces 1427 (shown in FIGS. 136-139) of the ureters.

As shown in FIG. 135, the diameter of the core 1410 is less than the diameter of the cavities 1403, 1405. The location of the core 1410 within the mold is important to achieving consistent wall thickness throughout the molded part. To achieve this, the core 1410 is positioned in all directions by several components, namely the core centering pin and the side insert.

In the pictured embodiment, the core 1410 itself has an ellipsoid shape with a blind hole at the bottom end that is concentric to the ellipsoid axis. The core centering pin 1415 has a cylindrical body of precise diameter and length with a cylindrical head of larger diameter than the body. The pin includes a longitudinal axis 1416. The pin 1415 is inserted through a high precision steel liner in the bottom of the drag 1404 until a head 1428 of the pin touches the liner. The fit between the body of the pin 1415 and the bore of the liner is such that the pin slides through the liner with little effort but with no noticeable play. The pin 1415 is then held in place by two opposed set screws 1430 threaded into the drag 1404 substantially collinear to one another and substantially perpendicular to the pin's longitudinal axis 1416 such that when both are tightened they press on the head 1428 of the pin 1415.

The core 1410 is then inserted into the drag 1404 with the pin 1415 entering a blind hole 1431 (not shown) in the core 1410. The depth of the blind hole 1431 in the core and the length of the pin 1415 are such that they center the core 1410 longitudinally in the cavities 1403, 1405 of the molding system 1400. The fit between the body of the pin 1415 and the bore of the blind hole 1431 in the core 1410 is such that there is no noticeable play between these components. The core 1410 can then be rotated so that a vertical slot cavity 1433 in the core 1410 is aligned to an opening 1435 in the side of the drag 1404. The side insert 1420 is then inserted so that a fin 1440 enters the vertical slot cavity 1433 in the core 1410, thereby positioning it azimuthally. In some embodiments, the fin 1440 comprises a dowel pin.

The cope 1402 can be mated to the drag 1404 and secured with the fasteners 1440, 1445. In the pictured embodiment, the fasteners 1440, 1445 comprise rod ends 1440 and knurled-rim knobs 1445. However, any suitable manner of securing the cope 1402 and the drag 1404 may be utilized.

The side insert 1420 includes cavities 1446. The ureter blocks 1425 attach to the side insert 1420 so that the ureters block cavities 1426 line up to the side insert cavities 1446 and form a continuous cavity that shapes and defines the external surface 1427 of the ureters. Set screws 1450 and a liner 1451 may also be used to secure the components together.

Figure 137:
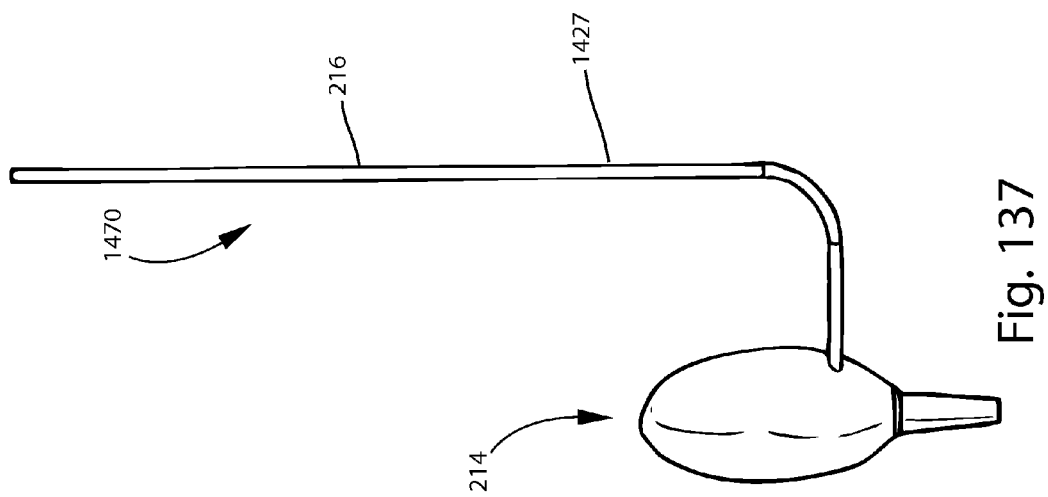
Figure 136:
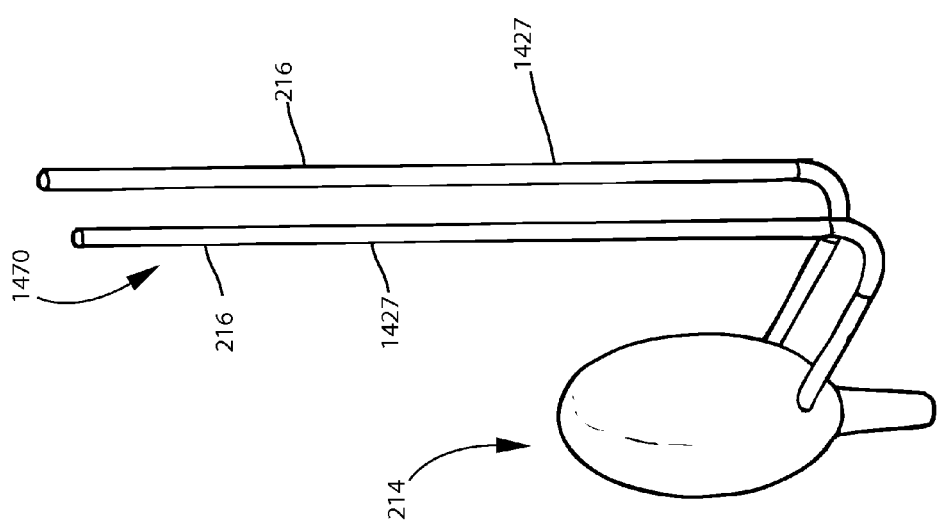
Figure 139:
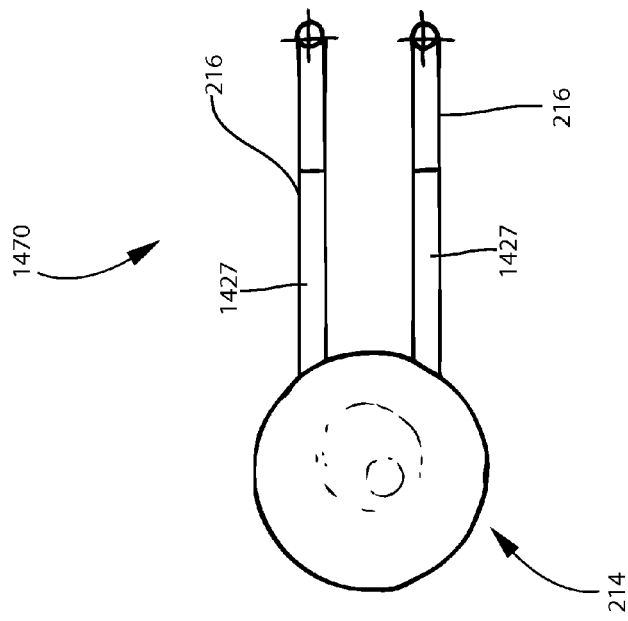
Figure 138:
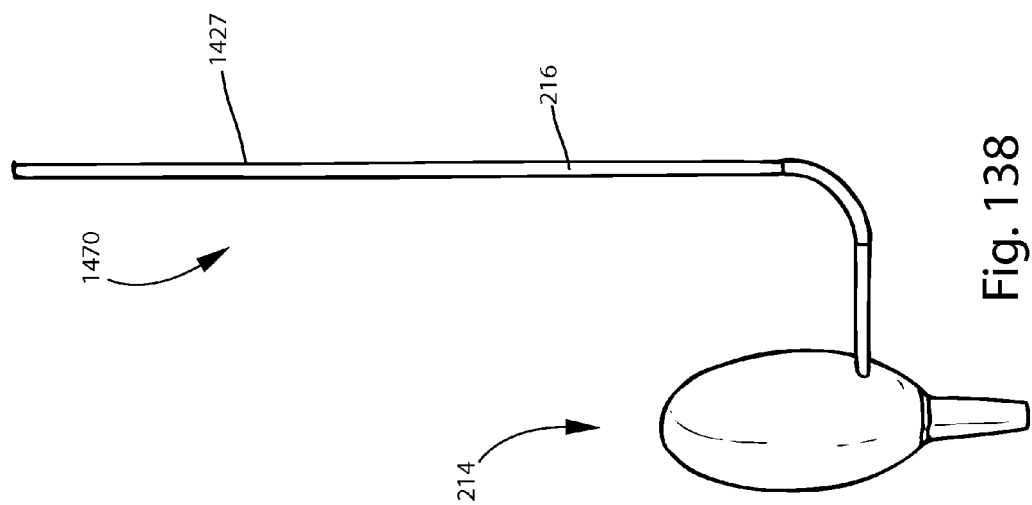

Referring now to FIGS. 136-139, shown therein are aspects of a bladder model 1470 according to one embodiment of the present disclosure. Specifically, FIG. 136 illustrates a perspective view of the bladder model 1470; FIG. 137 illustrates a side view of the bladder model 1470; FIG. 138 illustrates a side view of the bladder model 1470; and FIG. 139 illustrates a top view of the bladder model 1470. In the pictured embodiment, the bladder model 1470 comprises the bladder 214 described above, and includes the ureters 216 described above.

Some embodiments may include solid, non-patent ureters, while other embodiments include patent, tubular ureters. In embodiments containing patent ureters, the ureters may be connectable to kidney models that enable simulated urine flow through the ureters into the bladder. Moreover, the inadvertent incision of such ureters during a procedure may allow visualization of urine leakage into the recess 150 of the patient simulator 110.

Figure 140:
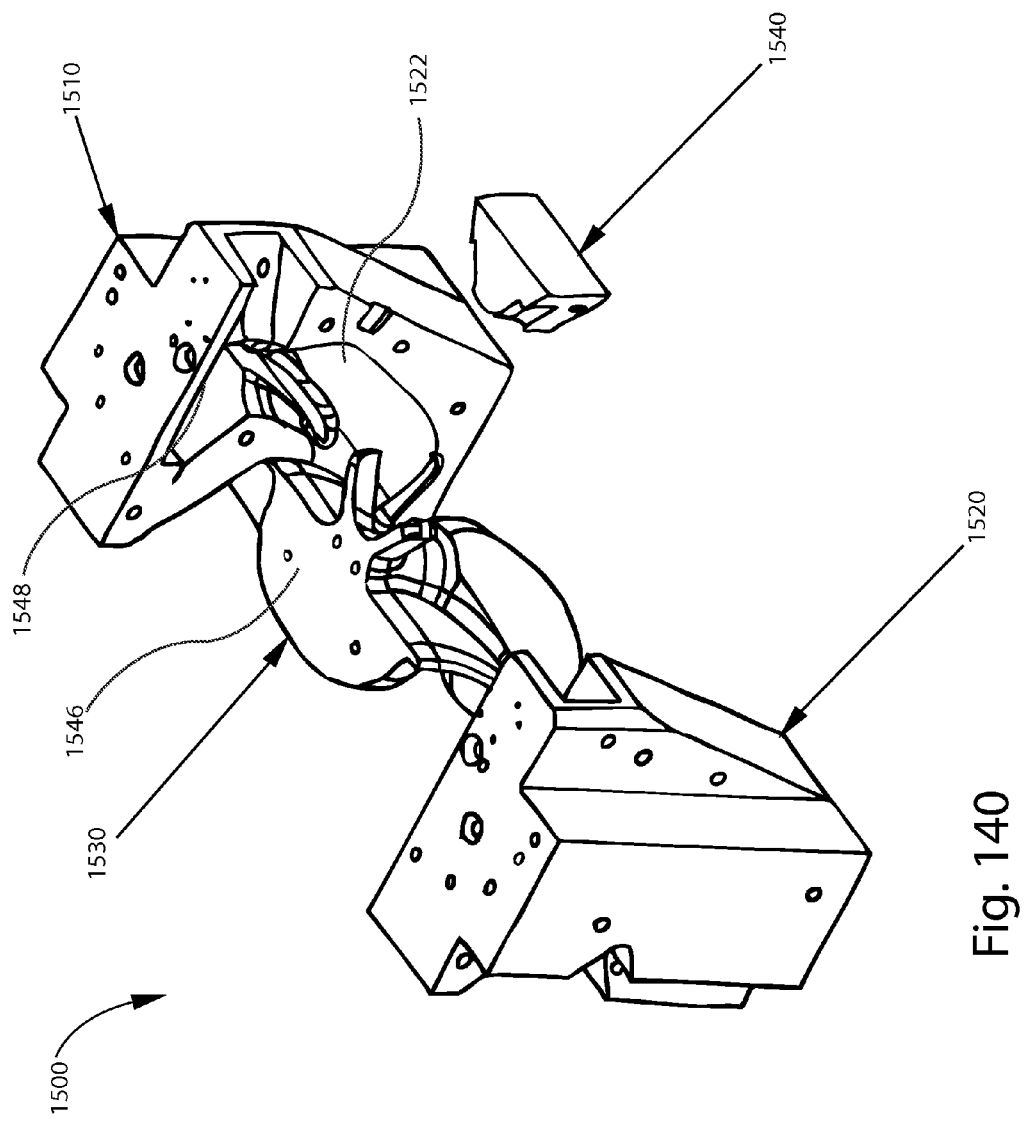
FIGS. 140-148 are directed to the molding and manufacture of a peritoneum model according to one embodiment of the present disclosure.
Figure 144:
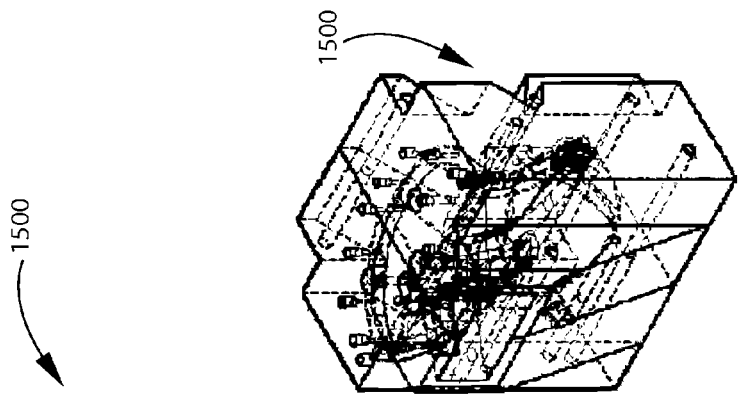
Figure 143:
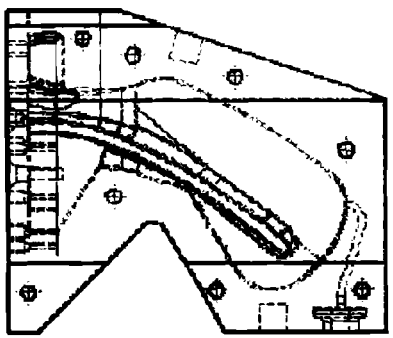
Figure 141:
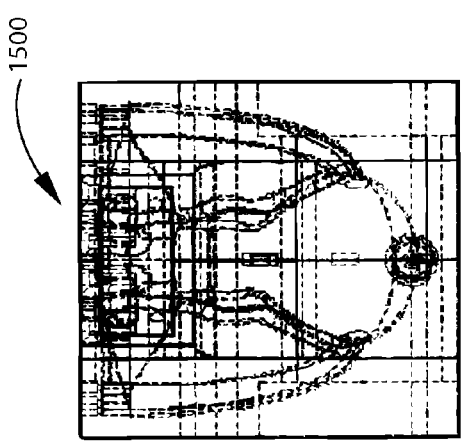
Figure 142:
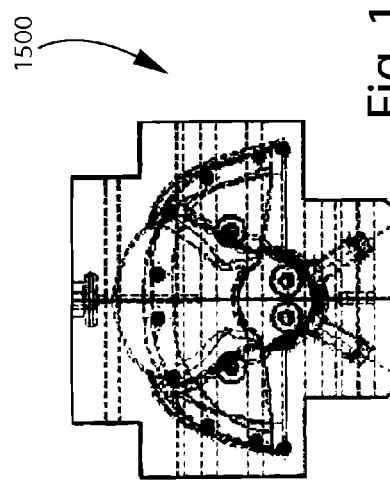

Referring now to FIGS. 140-144, shown therein are aspects of a molding system 1500 for forming a peritoneum model, such as the peritoneum 218 described above with reference to FIGS. 5 and 6, according to embodiments of the present disclosure. Specifically, FIG. 140 is an exploded view of the molding system 1500; FIG. 141 is a front plan view of the molding system 1500; FIG. 142 is a top view of the molding system 1500; FIG. 143 is a side view of the molding system 1500; and FIG. 144 is a perspective view of the molding system 1500.

In the pictured embodiment, the peritoneum model is manufactured in the multi-component injection molding system 1500 that allows replication of the thin-walled complex geometry of the peritoneum. In some embodiments, the peritoneum model's three-dimensional shape is derived as an offset of the enlarged uterus so that the molded part will fit tightly over the uterus and its ligaments when the components are assembled.

As shown in FIG. 140, the molding system 1500 is composed of a cope 1510 and a drag 1520 that are shaped and sized to mate to create a cavity 1522, which is used to form the external surface geometry of the peritoneum model. The cavity 1522 is shaped to define an outer surface 1524 (shown in FIGS. 145-148) of the peritoneum model. The molding system also comprises a core 1530, which is shaped and sized to define an inner surface (not shown) of the peritoneum model; and a side insert 1540, which allows for molding of undercut geometry. One or more injection ports facilitate the introduction of material into the molding system. In some embodiments, the injection port provides a threaded receptacle for a hose barb fitting, such as, by way of non-limiting example, a ⅛"-27 NPT×⅛" hose barb fitting, to connect to an injection machine.

The cope 1510 and the drag 1520 have symmetrical cavities thus creating a longitudinal split line 1544 (shown in FIGS. 145, 146, and 148) on the molded peritoneum model. A planar surface 1546 of the core 1530 is coincident to an inner upper planar surface 1548 of the mold cavity 1522. The core 1530 is located and secured in the cavity 1522 by a plurality of fasteners. Thereafter, the cope 1510 is secured to the drag 1520 by a plurality of fasteners. In some embodiments, the fasteners comprise threaded fasteners such as, by way of non-limiting example, socket head cap screws and/or knurled rim knobs. However, any suitable manner of securing the core 1530, the cope 1510, and the drag 1520 may be utilized.

For example, in the pictured embodiment, the cope 1510 may be secured to the drag 1520 by four ¼"-20 flat head socket cap screws, with two screws on the cope side and two screws on the drag side of the molding system 1500. Once the core 1530 is inserted into the drag 1520 and secured with two screws, the injection port 1542 and the cope 1510 can be assembled and two remaining screws can be installed. The side insert 1540 can then be inserted and secured in place with a rod (e.g., a ¼"-20 threaded rod) passed through concentric clearance holes in the cope 1510, the side insert 1540, and the drag 1520. Other fasteners may be used throughout the molding system 1500 with rods and knurled-rim knobs to secure the components to each other.

Once fully assembled, the molding system 1500 can be injected through the injection port 1542. The overall dimensions of the core 1530 are less than the overall dimensions of the cavity 1522 such that a space remains around the core when the cope 1510 is mated to the drag 1520. In that regard, the space between the core 1510 and the cavity 1520 will be filled with material injected into the molding system 1500.

Figure 145:
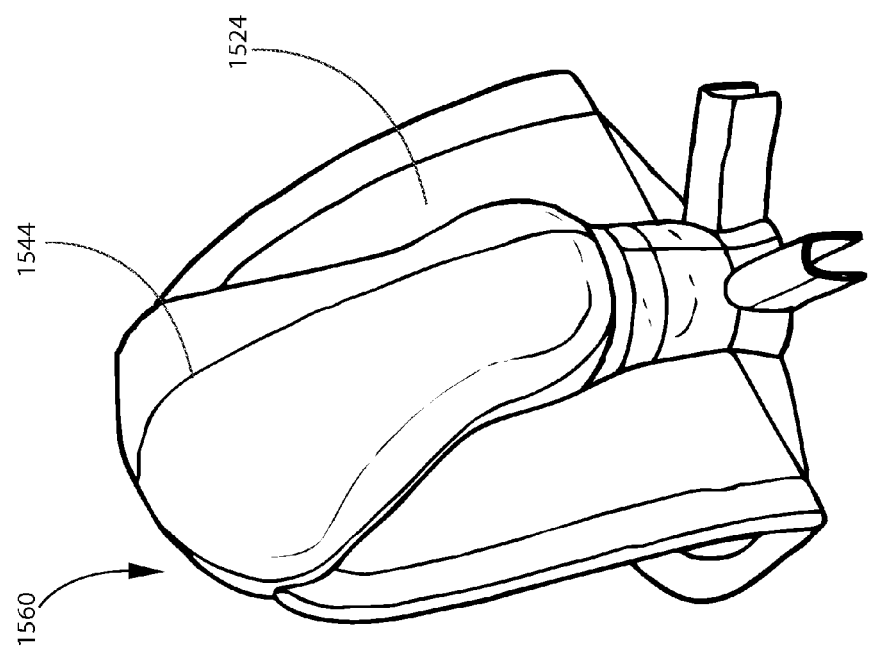
Figure 146:
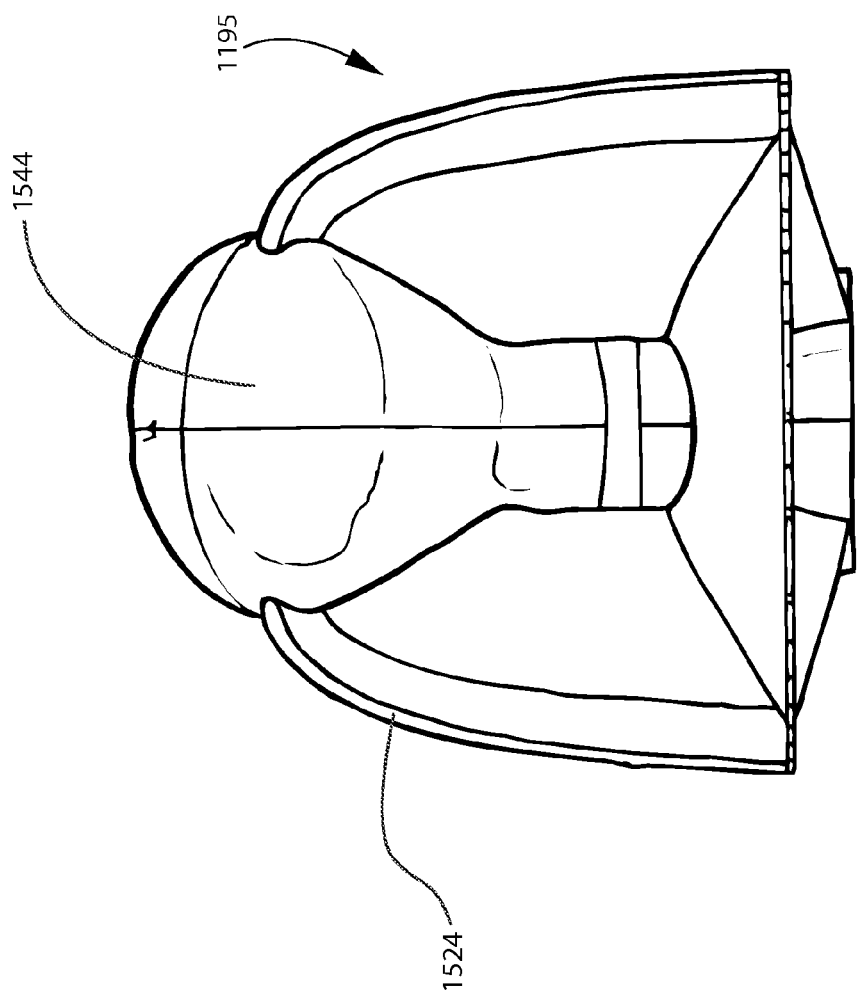
Figure 148:
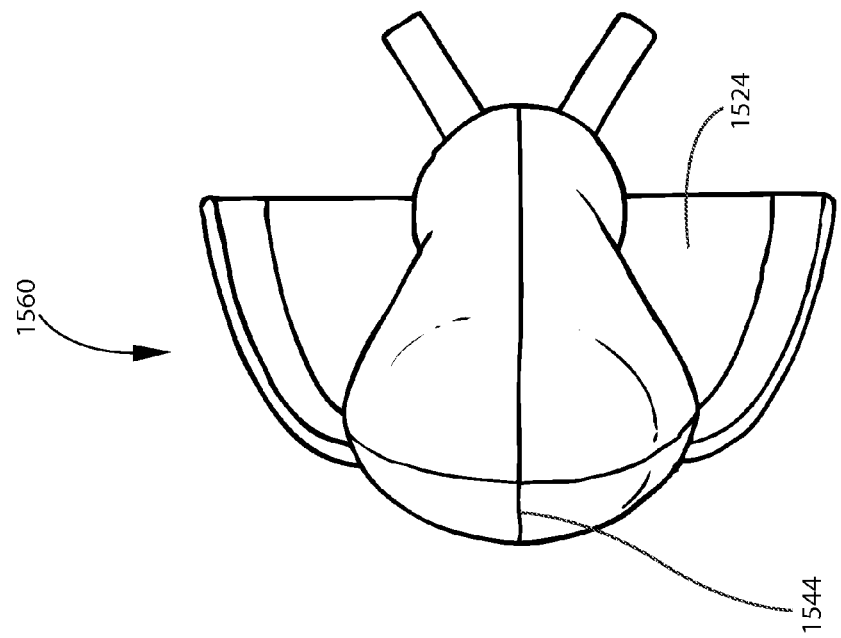
Figure 147:
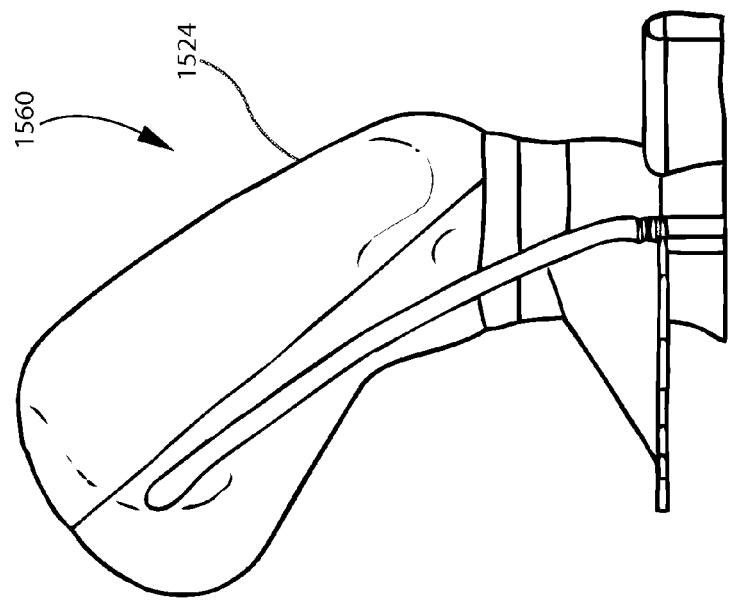

Referring now to FIGS. 145-148, shown therein are aspects of a peritoneum model 1560 according to one embodiment of the present disclosure. Specifically, FIG. 145 illustrates a perspective view of the peritoneum model 1560; FIG. 146 illustrates a plan view of the peritoneum model 1560; FIG. 147 illustrates a side view of the peritoneum model 1560; and FIG. 148 illustrates a top view of the peritoneum model 1560. In some instances, the peritoneum model 1560 is configured to cover every other component of the uterine assembly. In other instances, the peritoneum model 1560 is configured as a sleeve over the uterine and ovarian vessels and the ligaments. To provide accuracy and realism to the uterine assembly, it is important that the peritoneum model 1560 be centered and wrapped tightly about the other components in the uterine assembly.

Figure 149A:
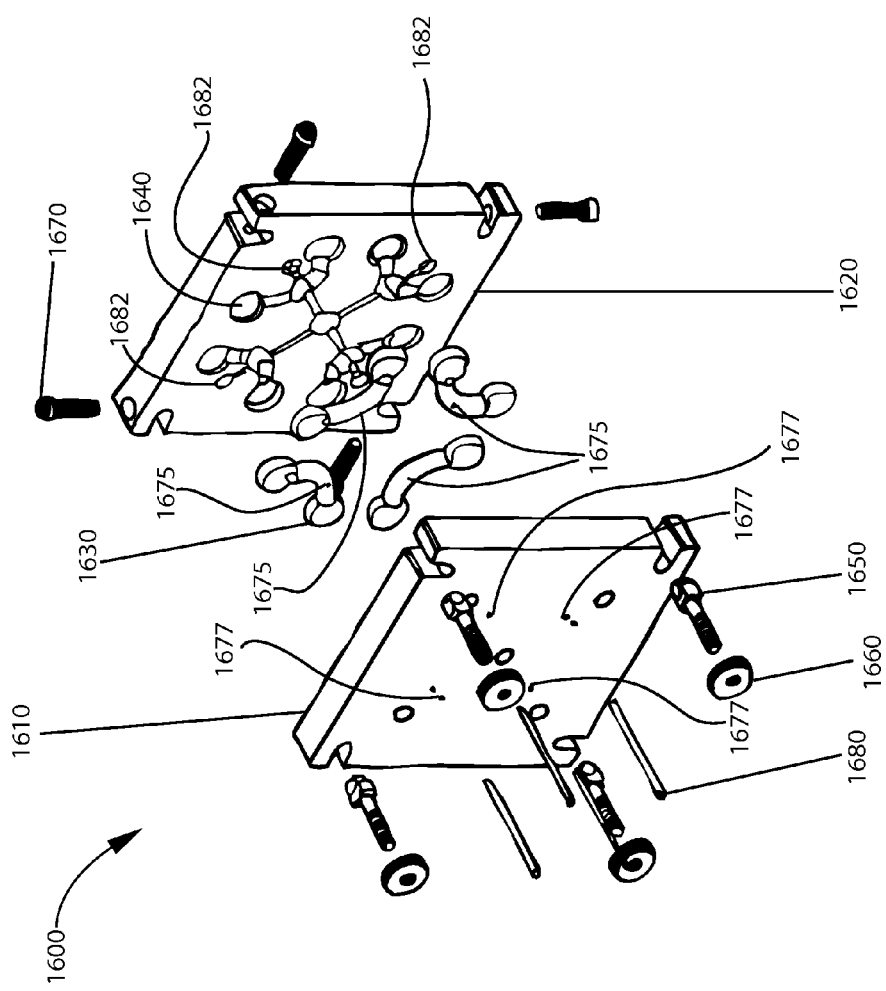
FIGS. 149a-149e are directed to the molding and manufacture of an ectopic model according to one embodiment of the present disclosure.
Figure 149C:
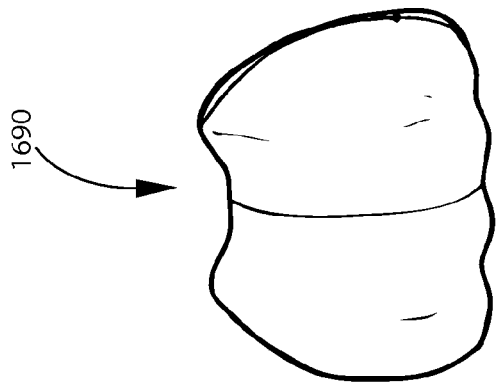

Referring now to FIG. 149a, shown therein are aspects of a molding system 1600 for forming an ectopic model, such as the ectopic 400 described above, according to embodiments of the present disclosure. Specifically, FIG. 149a is an exploded view of the molding system 1600.

The ectopic molding system 1600 is designed in a manner similar to the fallopian tube mold described above; however, because each individual simulated ectopic pregnancy is so small, four separate ectopic models are included in each mold so they can be manufactured simultaneously. The ectopic molding system 1600 consists of a cope 1610, a drag 1620, and four cores 1630 that are configured to mate to create four ectopic cavities 1640, which are used to form the external geometries of ectopic models 1690 (shown in FIGS. 149b-149e). The cavities 1640 are shaped to define outer surfaces 1650 of the ectopic models 1690.

After aligning the cope 1610, the drag 1620, and the cores 1630 such that the cores 1630 are positioned within the cavities 1640, the cope 1610, the drag 1620, and the cores 1630 can be secured in place with a plurality of fasteners. In some embodiments, the fasteners comprise threaded fasteners such as, by way of non-limiting example, socket head cap screws and/or knurled rim knobs. However, any suitable manner of securing the cores 1630, the cope 1610, and the drag 1620 may be utilized.

For example, in the pictured embodiment, the cope 1610 can be secured to the drag 1620 by four ¼-20 shoulder screws 1650, knurled-rim knobs 1660, and two embedded ¼-20 flat head socket cap screws 1670. Other fasteners may be used throughout the molding system 1600 with rods and knurled-rim knobs to secure the components to each other.

Each ectopic cavity 1640 has its own associated core 1630 that forms the internal geometry of the ectopic model, replicating the curvature of the fallopian tube on which it will be assembled. Each of the four independent ectopic cores 1630 includes a depression 1675 shaped and configured to accept a pin 1680. The depression 1675 are shaped and sized to form the bleeding ports in the ectopic models. The cores 1630 are positioned in the drag 1620 such that the depressions 1675 face the cope 1610. Once the drag 1620 and the cope 1610 are assembled with the cores 1630 in place, the pins 1680 (e.g., ³⁄₃₂" "bleeding port" pins) are inserted through holes 1677 in the cope 1610 and inserted into the depressions 1675 in the cores 1630 until they cannot be inserted any further.

Once fully assembled, the molding system 1600 can be injected through a central injection port located on the cope 1610. Each ectopic cavity 1640 has its own individual vent ports 1682 located at the highest point in the cavities. The overall dimensions of the cores 1630 are less than the overall dimensions of the cavities 1640 such that a space remains around the core when the cope 1610 is mated to the drag 1620. In that regard, the space between the cores 1630 and the cavities 1640 will be filled with the material injected into the molding system 1600.

Figure 149B:
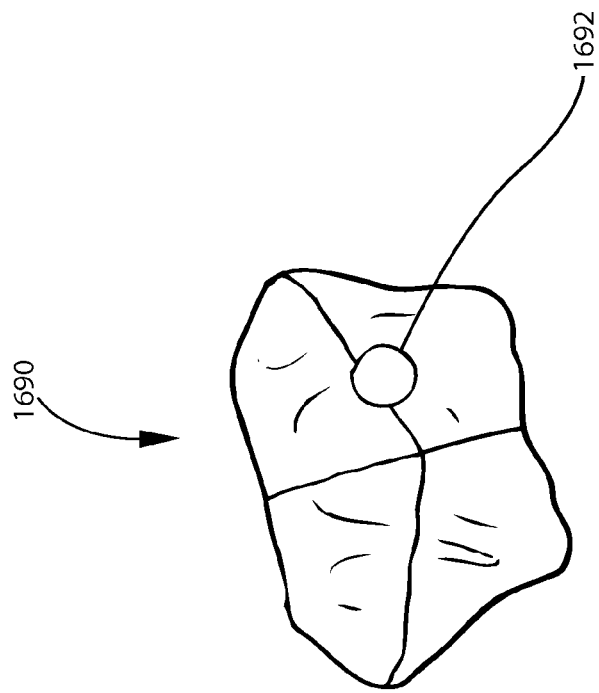
Figure 149E:
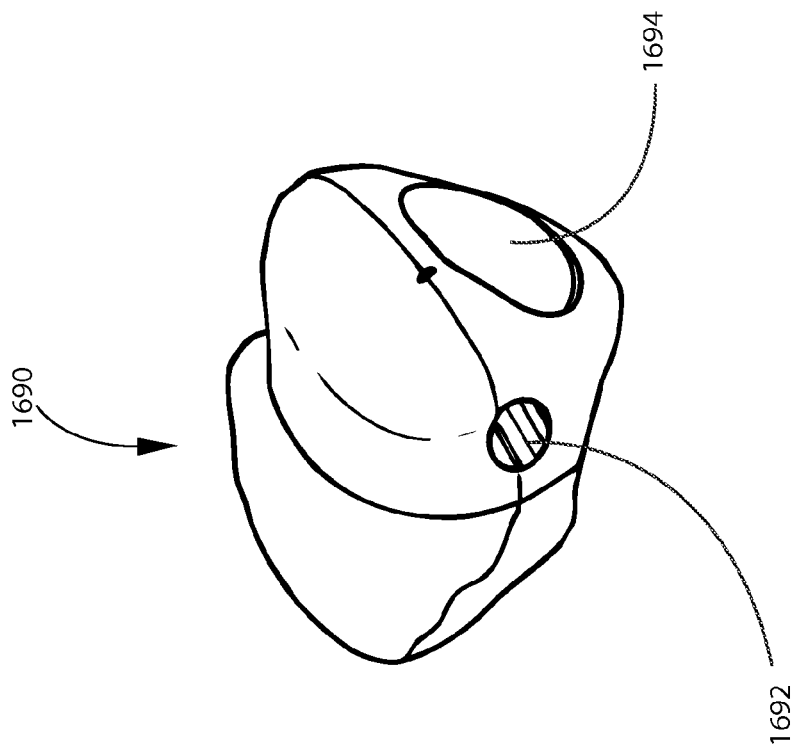
Figure 149D:
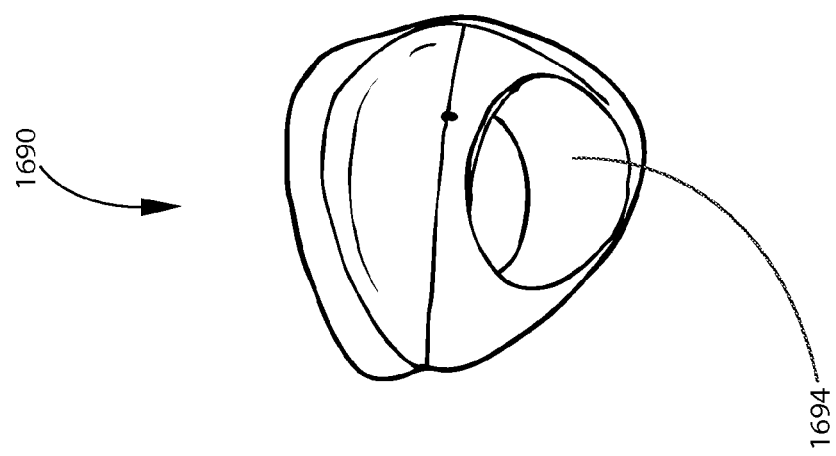

Referring now to FIGS. 149b-149, shown therein are aspects of an ectopic model 1690 according to one embodiment of the present disclosure. Specifically, FIG. 149b illustrates a plan view of the ectopic model 1690; FIG. 149c illustrates a top view of the ectopic model 1690; FIG. 149d illustrates a side view of the ectopic model 1690; and FIG. 149e illustrates a perspective view of the ectopic model 1690. FIG. 149b shows a bleeding port 1692 extending from an outer surface of the ectopic model 1690 through the center of the ectopic model. FIG. 149d shows a hollow, tubular center 1694 extending through the ectopic model 1690. The center 1694 enables the ectopic model 1690 to be slid onto a fallopian tube model to create a uterine assembly exhibiting an ectopic pregnancy or rupture ectopic pregnancy scenario (e.g., uterine assembly 200 shown in FIGS. 6-8).

Figure 150:
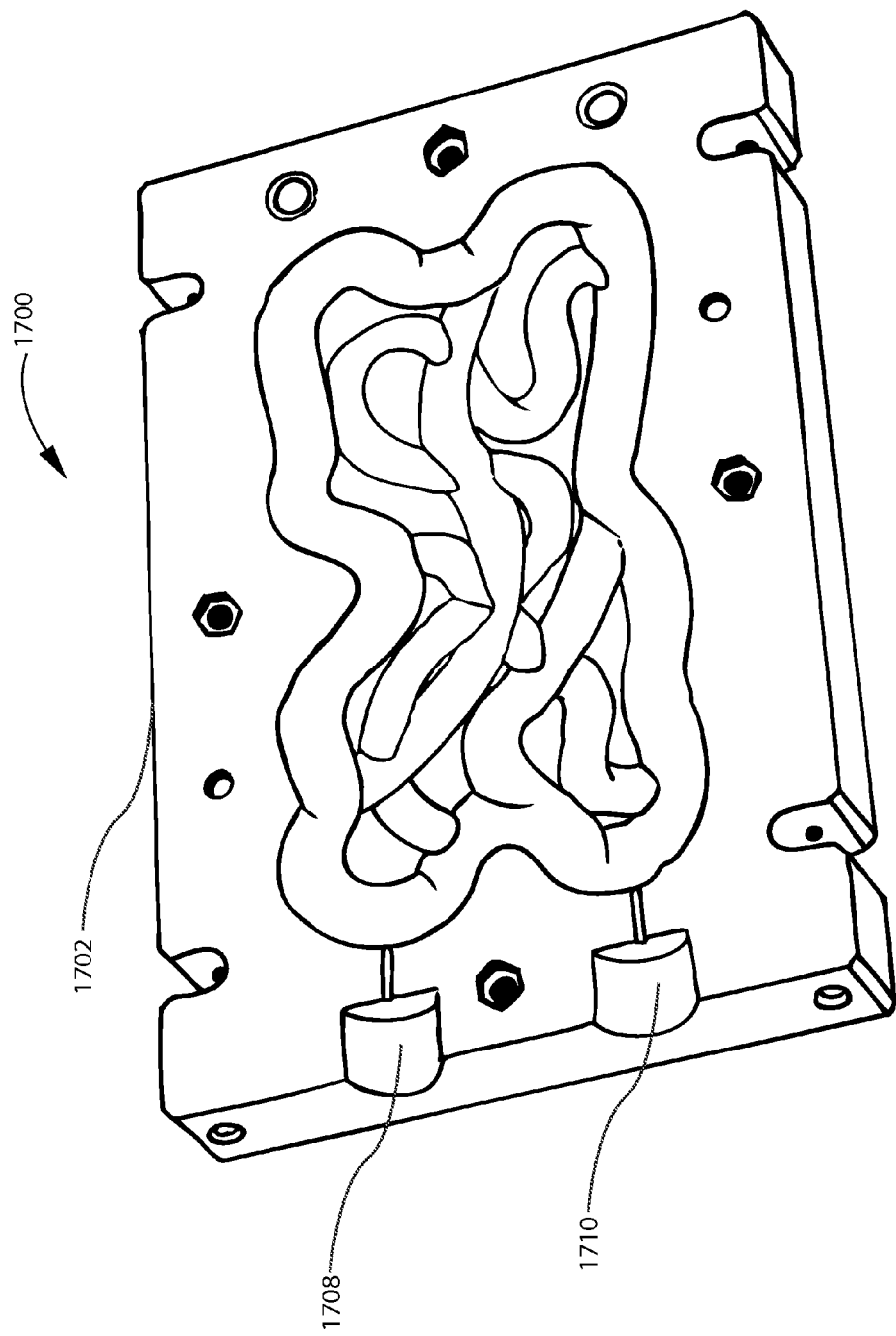
Figure 151:
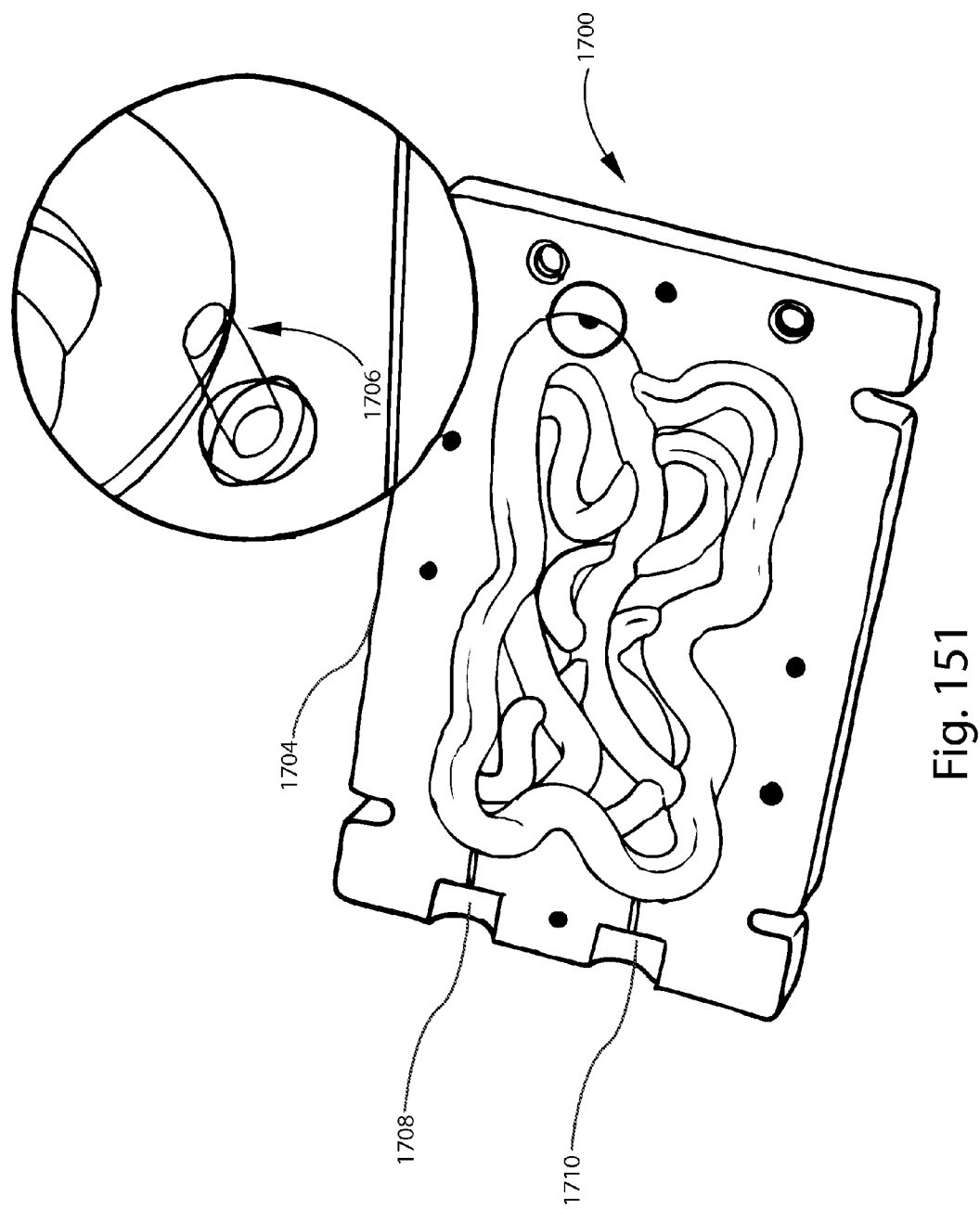

Referring now to FIGS. 150-151, shown therein are aspects of a molding system 1700 for forming a bowel insert model, such as the bowel insert 550 described above, according to embodiments of the present disclosure. FIG. 150 illustrates a cope mold 1702 for a solid model version of the bowel, while FIG. 151 illustrates the corresponding drag mold 1704. The bowel system is to be manufactured in a split mold arrangement in a vertical orientation using the cope and drag 1702, 1704 in order to enhance the escape of the trapped air within the mold wall. The material enters the mold through an injection port 1706 located at the base of the assembly. In the illustrated embodiment, the injection port 1706 extends at approximately a 45° angle with respect to the planar surface of the drag 1704 into which the recesses defining the outer surface of the bowel are formed. Located at the top of the cope and drag molds 1702, 1704 are two reservoir cups 1708, 1710 found directly at the two highest points of the model design this will allow flashing to be contained while releasing entrapped gases.

Figure 152:
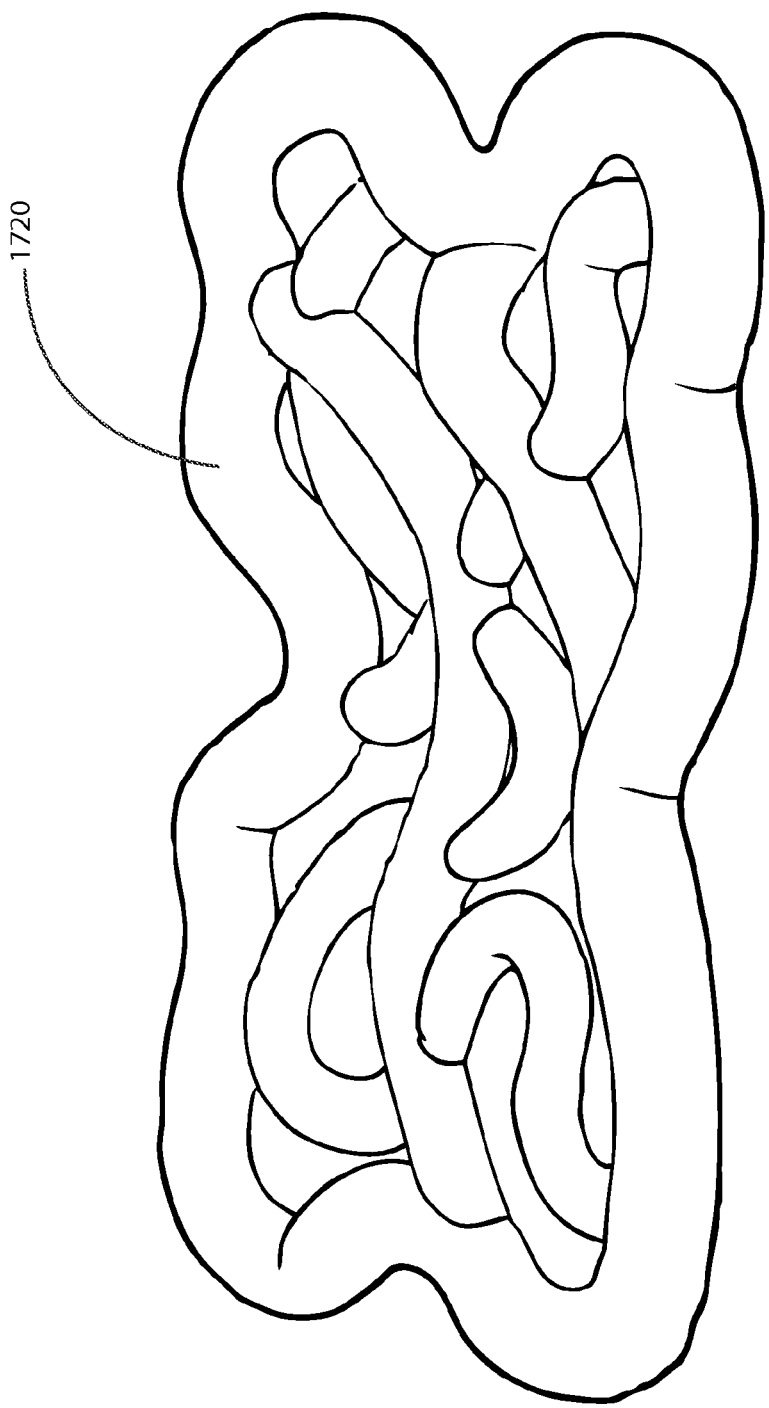
Figure 153:
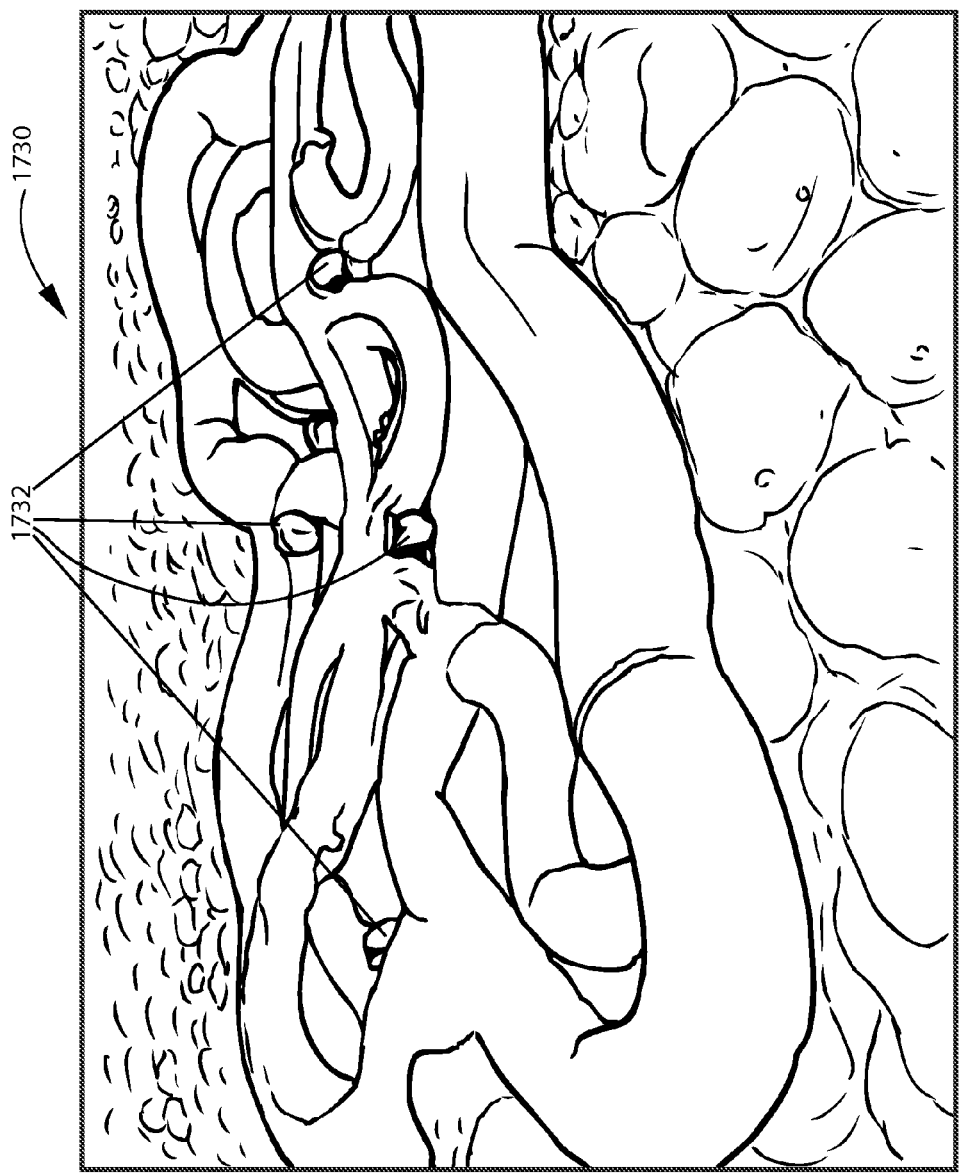
Figure 154:
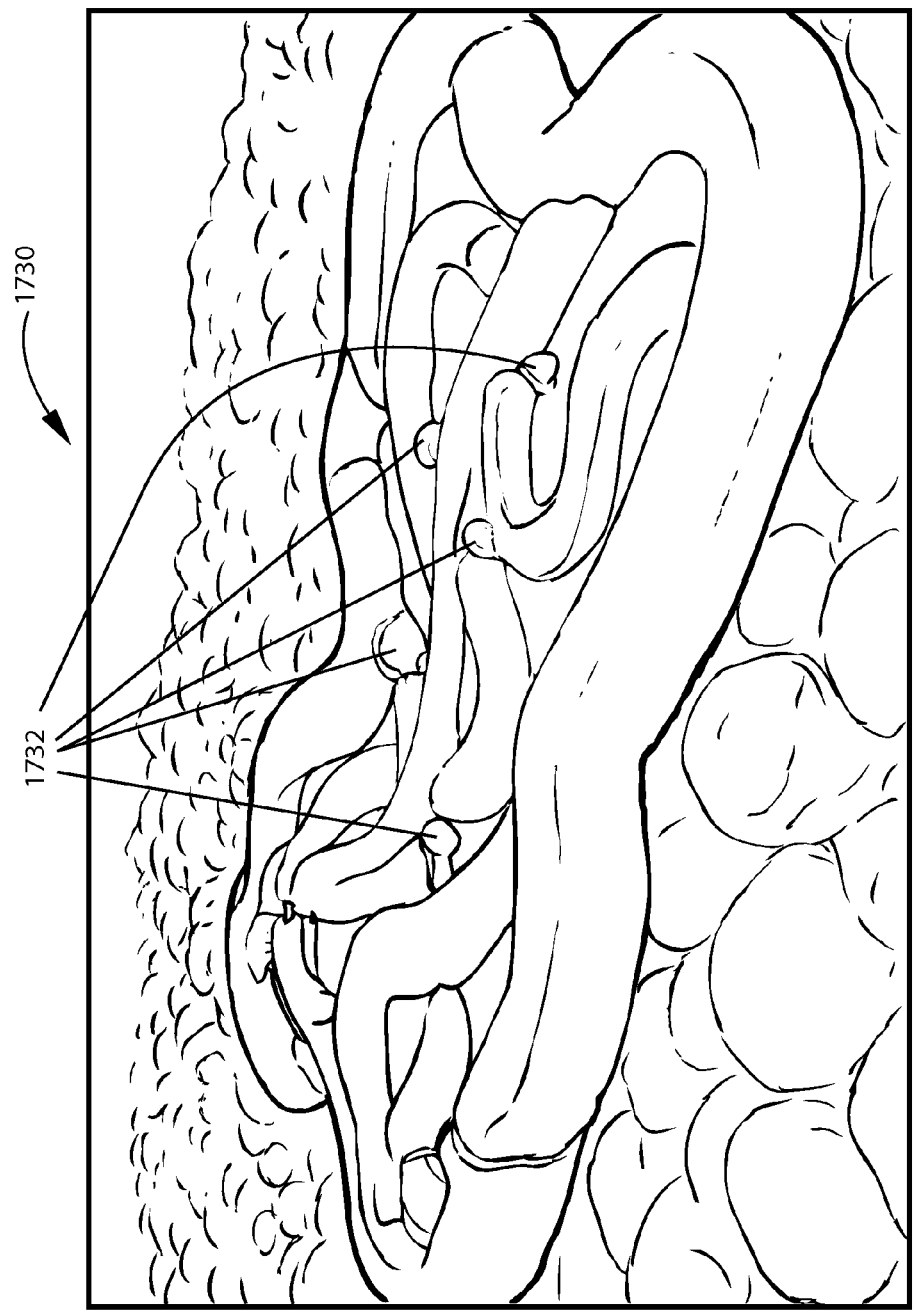

FIGS. 152-154 depict various embodiments of a solid bowel model according to embodiments of the present disclosure. In that regard, FIG. 152 depicts a bowel model 1720, while FIGS. 153 and 154 illustrate examples of a bowel model 1730 with diverticula 1732.

Alternatively, a hollow bowel system may be manufactured utilizing four mold pieces per unit. Therefore, one bowel assembly is conformed of the top mold along with its core and the bottom mold along with its core to produce a shell like mass where fluid, gel, and/or other suitable materials are injected to simulate contents of natural bowels.

In some instances, Aluminum 6061 is a preferred mold material for all mold components, except the Perineum Mold Cavity. Aluminum 6061 is light-weight and has superior heat transfer properties to allow accelerated cure at elevated temperatures. Aluminum 6061 is a durable mold material that is easily machined, and the molds were designed to eliminate all undercuts to allow machining.

The Perineum Mold Cavity in its current one-piece format has multiple undercuts that make it difficult to machine in a classic 3-axis CNC Mill; as a result, in some instances, a preferred mold type for this mold component would be manufactured via nickel deposition that allows replication of all complex geometries.

It is important to note that several other materials are also possible. For example, an alternative method for manufacturing all of these molds includes rapid prototyping with a system such as the Fortus 360MC, using either the 7-thousandths or 10-thousands tip and either ABS M30 or PC 10 (polycarbonate). When using the Fortus in some embodiments, molds containing undercuts are no longer a constraint, precision is approximately 0.007", and surface finish can be achieved with sanding or solvent coating. The ABS or polycarbonate molds, however, cannot sustain as high a temperature as the Aluminum molds, so maximum recommended curing temperature for these is approximately 80° C.

In some embodiments, the molds for the membranes for the Dermoid Cyst, Endometrioma, or Simple Cyst are simple spheres mounted on a post. The dermoid cyst may be more complicated to manufacture than the simple cyst, and a rounded flask may be used as a core to form the first outer membrane. Afterwards, the contents of the cyst may be injected (e.g., hair, teeth, fatty tissue, etc.). In alternative embodiments, the dermoid cyst may be fashioned in the same manner as a simple cyst and an endometrioma, as a two membrane model. These molds can be machined Aluminum 6061 that has the potential to meet any sphere diameter constraints. Alternately, round bottom flasks that meet diameter constraints can be mounted on posts and used. Each of these can be placed in an oven at elevated temperatures to accelerate curing time.

V. Manufacturing Examples

The invention is further defined by reference to the following examples, describing in detail the manufacture of the models of the present invention. Examples of suitable technique for manufacturing anatomical inserts according to the present disclosure will now be described. These examples are for illustrative purposes only, and are not to be construed as limiting the appended claims. No limitation is intended hereby and those skilled in the art will recognize that many different modifications and/or alternative manufacturing techniques may be utilized, including the use of alternative materials.

To manufacture one particular embodiment of a uterine assembly according to the present invention, the following exemplary materials and steps were used. It is important to note that the individual steps of the manufacturing process may be performed in an order other than the order described below.

Following is a description of the manufacturing procedure to create the three separate Uterine Assemblies:
1. Prepare the following silicone mixtures in 400 mL, 1:1 dual cartridge assemblies for the specified injection molds. Each mixture produces one cartridge:
   a. Material Preparation for Fallopian Tubes, Peritoneum, Peritoneum Sleeves, Uterus, Cyst Membranes, Endometrioma Membranes (Material: Dragon Skin 10 Medium):
      1) Measure 220 g of Part A, add 0.3 g Silc Pig Blood Silicone Pigment, mix until a uniform color, and vacuum until all entrapped air is removed.
      2) In a separate container, measure 220 g of Part B, add 0.3 g Silc Pig Blood Silicone Pigment, mix until a uniform color and vacuum until all entrapped air is removed.
      3) Transfer the Part A and Part B mixtures to the separate reservoirs in the dual cartridge assemblies, making sure not to cross-contaminate Parts A and B. With the cartridge upright, place it back in the vacuum and re-vacuum to remove any entrapped air within the cartridge assembly.
      4) Place the piston caps on the open ends of the reservoirs for Part A and Part B
   b. Material Preparation for Ovaries (Material: Dragon Skin 10 Medium)
      1) Measure 220 g of Part A, add 0.1 g Silc Pig White Pigment, mix until a uniform color, and vacuum until all entrapped air is removed.
      2) In a separate container, measure 220 g of Part B, add 0.1 g Silc Pig White Silicone Pigment, mix until a uniform color and vacuum until all entrapped air is removed.
      3) Transfer the Part A and Part B mixtures to the separate reservoirs in the dual cartridge assemblies, making sure not to cross-contaminate Parts A and B. With the cartridge upright, place it back in the vacuum and re-vacuum to remove any entrapped air within the cartridge assembly.
      4) Place the piston caps on the open ends of the reservoirs for Part A and Part B
   c. Material Preparation for Vagina (Material: Dragon Skin 10 Medium and Ecoflex 0030)
      1) Measure 55 g of Dragon Skin Part A, add 165 g Ecoflex 0030 Part A, add 0.3 g Silc Pig Blood Silicone Pigment, mix until a uniform color, and vacuum until all entrapped air is removed.
      2) Measure 55 g of Dragon Skin Part B, add 165 g Ecoflex 0030 Part B, add 0.3 g Silc Pig Blood Silicone Pigment, mix until a uniform color, and vacuum until all entrapped air is removed Transfer the Part A and Part B mixtures to the separate reservoirs in the dual cartridge assemblies, making sure not to cross-contaminate Parts A and B. With the cartridge upright, place it back in the vacuum and re-vacuum to remove any entrapped air within the cartridge assembly.
      3) Place the piston caps on the open ends of the reservoirs for Part A and Part B
   d. Material Preparation for Ectopic (Material: Ecoflex 0030)
      1) Measure 220 g of Part A, add 0.1 g Silc Pig Blood Pigment, add 0.1 g Silc Pig Red Pigment, add 0.1 g Silc Pig Blue Pigment, mix until a uniform color, and vacuum until all entrapped air is removed.
      2) In a separate container, measure 220 g of Part B, add 0.1 g Silc Pig Blood Pigment, add 0.1 g Silc Pig Red Pigment, add 0.1 g Silc Pig Blue Pigment, mix until a uniform color and vacuum until all entrapped air is removed.
      3) Transfer the Part A and Part B mixtures to the separate reservoirs in the dual cartridge assemblies, making sure not to cross-contaminate Parts A and B. With the cartridge upright, place it back in the vacuum and re-vacuum to remove any entrapped air within the cartridge assembly.
      4) Place the piston caps on the open ends of the reservoirs for Part A and Part B
   e. Material Preparation for Bladder (Material: Dragon Skin 10 Medium)
      1) Measure 220 g of Part A, add 0.1 g Silc Pig White Pigment, add 0.2 g Silc Pig Blood Pigment, mix until a uniform color, and vacuum until all entrapped air is removed.
      2) In a separate container, measure 220 g of Part B, add 0.1 g Silc Pig White Silicone Pigment, add 0.2 g Silc Pig Blood Pigment, mix until a uniform color and vacuum until all entrapped air is removed.
      3) Transfer the Part A and Part B mixtures to the separate reservoirs in the dual cartridge assemblies, making sure not to cross-contaminate Parts A and B. With the cartridge upright, place it back in the vacuum and re-vacuum to remove any entrapped air within the cartridge assembly.
      4) Place the piston caps on the open ends of the reservoirs for Part A and Part B
2. Manufacture of Ovaries:
   a. Clean the mold to remove any dirt and debris, and apply mold release.
   b. Align the Cope and Drag and secure the mold using the four flat head socket cap screws and Knurled-Rim Knobs.
   c. Place the mold on a leveled, flat surface so that the Cope faces upwards.
   d. Secure a static mixer (24 element, 5/16 ID or larger) to the Dual cartridge mixer prepared in step 1.b above, and secure the end of the static mixer in the left hand injection port. The tip can be secured by pressure so the conical surfaces of the injection port and static mixer seal.
   e. Inject the mixture at approximately 60 psi until it is seen venting from the left vent port.
   f. Stop injection and transfer the tip to the right injection port. Secure the tip in the right injection port, and re-start injection until the mixture is seen venting from both the right vent port and central vent port.
   g. Stop injection and remove the static mixer.
   h. Approximately 20 g of the mixture will completely fill the mold.
   i. Allow it to cure for at least 4 hours at room temperature or 30 minutes at 100° C.
   j. Demold the ovary and trim all flashing. Transfer to next step (Manufacture of Uterus (see Section 4 below)).
3. Manufacture of Fallopian Tubes
   a. Clean the mold to remove any dirt and debris, and apply mold release.
   b. Cut two 6" pieces of Dow Corning Silastic silicone tubing, 0.132" ID×0.183" OD
   c. Place each tube between the halves of the Fallopian Core so that one inch is exposed at the bottom.
   d. Place the left and right Cores in place on the Fallopian Tube Drag, and position the top end of the tubing so that it is centered in the cavity of the Fallopian tube. Secure the free ends of the tubing in the machined slots in the Drag.
e. Align the Cope and Drag and secure the mold using the four flat head socket cap screws and Knurled-Rim Knobs.
f. Place the mold on a leveled, flat surface so that the Cope faces upwards.
g. Secure a static mixer (24 element, 5/16 ID or larger) to the Dual cartridge mixer prepared in step 1.a above, and secure the end of the static mixer in the left hand injection port. The tip can be secured by pressure so the conical surfaces of the injection port and static mixer seal.
h. Inject the mixture at approximately 60 psi until it is seen venting from the left vent port.
i. Stop injection and transfer the tip to the right injection port. Secure the tip in the right injection port, and re-start injection until the mixture is seen venting from both the right vent port and central vent port.
j. Stop injection and remove the static mixer.
k. Approximately 20 g of the mixture will completely fill the mold.
l. Allow it to cure for at least 4 hours at room temperature or 30 minutes at 100° C.
m. Demold the Fallopian Tube and trim all flashing. Transfer to next step (Manufacture of Uterus (see Section 4 below)).

4. Manufacture of Uterus
a. Clean the mold to remove any dirt and debris, and apply mold release.
b. Cut four 18" pieces of Dow Corning Silastic silicone tubing, 0.132" ID×0.183" OD for the Uterine and Ovarian Arteries and Veins.
c. Cut 0.5" wide segments of Latex-Free Elastic Bandage, such as Walgreens Brand Tender
Tape into the following lengths:
   1) One 16" length segment for the infundibulopelvic ligament
   2) Two, 12" length segments for the Cardinal and Round ligaments
   3) One, 8" length segment for the Uterosacral ligaments
d. Secure the Left and Right Insert Bases and the lower halves of the Left and Right Ovary and Fallopian Insert to the Mold Bottom.
e. Secure the upper halves of the Left and Right Ovary and Fallopian Insert to the Mold Top.
f. Position the Cardinal Ligament by feeding it through the slotted channel on the left side of the Insert Base, pulling it through to the opposite side of the mold, and then feeding it through the opposite slot on the right side insert. Make sure ligament is centered.
g. Position the Ovarian and Uterine Arteries and Veins on the Mold Bottom by feeding them through the circular channels on the left side inserts, pulling them through to the opposite side of the mold, and then feeding them through the opposite circular channels on the right side inserts. Make sure the Arteries and Veins are centered.
  The Uterine Arteries and Veins are threaded through the two circular channels on the Left and Right Insert Base
  The Ovarian Arteries and Veins are threaded through the two circular channels on the Left and Right Ovarian and Fallopian Inserts
h. Thread the Uterosacral Ligament segment though the slot on the underside of the Mold Bottom, loop the free end up and over the Uterine Arteries and Veins, and thread it out through the second slot to the outside of the mold. Make sure it is centered and the free ends are of equal length.
i. Position the Infundibuopelvic Ligament on the Mold Bottom by feeding it through the slotted channel on the left side of the Ovary and Fallopian Insert, pulling it through to the opposite side of the mold, and then feeding it through the opposite slot on the right side insert. Make sure ligament is centered.
j. Position the Round Ligament on the Mold Top by feeding it through the slotted channel on the left side of the upper half of the Ovary and Fallopian Insert, pulling it through to the opposite side of the mold, and then feeding it through the opposite slot on the right side insert. Make sure ligament is centered.
k. Place the Fallopian Tubes and Ovaries manufactured in Steps 2 and 3 above in their slots on the Ovary and Fallopian Insert on the Mold Bottom. Make sure these are centered and lying flat within their designated slots.
l. Assemble the Vaginal-Cervical Core and Uterine Core, and slide it into position on the Mold Bottom. When in place, slide the free ends of the tubing from the Fallopian Tubes into the pre-drilled circular channels in the Uterine Core.
m. Slide the Injection Port into position on the Mold Bottom, and carefully lower the Mold Top into position on the mold bottom.
n. Secure the mold using the six flat head socket cap screws and Knurled-Rim Knobs.
o. Place the mold on a leveled, flat surface so that the Cope faces upwards.
p. Secure a static mixer (24 element, 5/16 ID or larger) to the Dual cartridge mixer prepared in step 0 above. Attach 8" of #2 Vinyl Tubing (1/8" ID×1/4" OD) to the static mixer, and assemble a 1/8-27 NPT hose fitting that threads directly into the Injection Port of the mold on the other end of the tubing.
q. Inject the mixture at approximately 60 psi until it is seen venting from all three vent ports.
r. Stop injection and remove the static mixer and tubing assembly.
s. Approximately 120 g of the mixture will completely fill the mold for the Normal Uterus, and 225 g will fill the mold for the Enlarged Uterus.
t. Allow it to cure for at least 4 hours at room temperature or 30 minutes at 100° C.
u. Demold the Uterus and trim all flashing. Transfer to next step (Uterus Assembly 5. Manufacture of Vagina
a. Clean the mold to remove any dirt and debris, and apply mold release.
b. Cut one 5" piece of Surgilast Latex-Free Tubular Elastic Dressing Retainer
c. Slide the Surgilast Tube over the Vaginal Mold Core so that approximately 1 center lies below the bottom, circular side of the core. Fold this additional material under the base of the core and hook it over the two alignment legs.
d. Place the Core in place on the Vagina Mold Drag
e. Align the Cope and Drag and secure the mold using the six flat head socket cap screws and Knurled-Rim Knobs.
f. Place the mold on a leveled, flat surface so that the vent holes face upwards.
g. Secure a static mixer (24 element, 5/16 ID or larger) to the Dual cartridge mixer prepared in step 0 above. Attach 8" of #2 Vinyl Tubing (1/8" ID×1/4" OD) to the static mixer, and assemble a ⅛-27 NPT hose fitting that threads directly into the Injection Port of the mold on the other end of the tubing.
h. Inject the mixture at approximately 60 psi until it is seen venting from the left vent port.
i. Stop injection and transfer the tip to the right injection port. Secure the tip in the right injection port, and re-start injection until the mixture is seen venting from both the right vent port and central vent port.
j. Stop injection and remove the static mixer.
k. Approximately 20 g of the mixture will completely fill the mold.
l. Allow it to cure for at least 4 hours at room temperature or 30 minutes at 100° C.
m. Remove the Cope and Drag from the Mold Core, leaving the Vagina attached to the Mold Core. Trim any redundant material from the elliptical side of the Vagina and remove all flashing, but leave the Vagina on the Mold Core and transfer it to the next step (Manufacture of Perineum (Section 6)).

6. Manufacture of Perineum
a. Clean the mold to remove any dirt and debris, and apply mold release.
b. Secure the Vagina/Vaginal Core between the four segments of the Perineum Core by holding all segments together while aligning and tightening the Mold Core Support. The Vaginal Core is symmetric, so it can be place in either orientation.
c. Prepare the Perineum Mixture (Dragon Skin 10)
Measure 300 g of Part B, add 1 g of Silc Pig Fleshtone, add 300 g Part B
Mix and Vacuum until all entrapped air is removed.
d. Pour the erineum Mixture into the mold making sure to start pouring at the lowest point. Pour all the material into the mold.
e. Slowly lower the Core and Vagina Subassembly into position, allowing time for the silicone layer to level as the subassembly is lowered into the mold. At its lowest point, the elliptical end of the Vaginal Core slides into a receptacle in the Mold Cavity, and the Mold Core Support sits flush on the top of the Mold Cavity.
f. Secure the subassembly in place with the three fastening Knobs.
g. Allow it to cure for at least 4 hours at room temperature or 30 minutes at 100° C.
h. Demold the Perineum/Vagina Subassembly and trim all flashing. Transfer to next step (Uterus Assembly)

7. Manufacture of Peritoneum
a. Clean the mold to remove any dirt and debris, and apply mold release.
b. Place the Core in position on the Drag, slide the Injection Port into position, and slide the Cope into Place. Once secured, slide the Side Core into position and secure the mold.
c. Place the mold on a leveled, flat surface so that the vents face upwards.
d. Secure a static mixer (24 element, 5/16 ID or larger) to the Dual cartridge mixer prepared in step 0 above. Attach 8" of #2 Vinyl Tubing (⅛" ID×¼" OD) to the static mixer, and assemble a ⅛-27 NPT hose fitting that threads directly into the Injection Port of the mold on the other end of the tubing.
e. Inject the mixture at approximately 60 psi until it is seen venting from all vent ports.
f. Stop injection and remove the static mixer.
g. Approximately 150 g of the mixture will completely fill the mold.
h. Allow it to cure for at least 4 hours at room temperature or 30 minutes at 100° C.
i. Demold the Peritoneum and trim all flashing. Transfer to next step (Final Assembly of General Uterine Assembly (Section 1).

8. Manufacture of Bladder
a. Clean the mold to remove any dirt and debris, and apply mold release.
b. Secure the Core in position in the Mold Bottom, secure the Mold Top to the Mold Bottom, Secure the Blade Insert, and finally secure the Ureter Blocks.
c. Place the mold on a leveled, flat surface so that the vents face upwards.
d. Secure a static mixer (24 element, 5/16 ID or larger) to the Dual cartridge mixer prepared in step 0 above. Attach 8" of #2 Vinyl Tubing (⅛" ID×¼" OD) to the static mixer, and assemble a ⅛-27 NPT hose fitting that threads directly into the Injection Port of the mold on the other end of the tubing.
e. Inject the mixture at approximately 60 psi until it is seen venting from all vent ports.
f. Stop injection and remove the static mixer.
g. Approximately 150 g of the mixture will completely fill the mold.
h. Allow it to cure for at least 4 hours at room temperature or 30 minutes at 100° C.
i. Demold the Bladder and trim all flashing. Bond the two walls formed by the Blade Insert using the same silicone that the bladder is manufactured from, and trim all redundant material.
j. Transfer to next step (Final Assembly of General Uterine Assembly (Section 1).

9. Manufacture of Ectopic
a. Clean the mold to remove any dirt and debris, and apply mold release.
b. Place the four Ectopic Cores in position on the Drag.
c. Align the Cope and Drag and secure the mold using the four shoulder screws and Knurled-Rim Knobs.
d. Insert the Four Ejector Pins through their designated slots in the Mold Cope until they are seated within the Cores.
e. Place the mold on a leveled, flat surface so that the Cope faces upwards.
f. Secure a static mixer (24 element, 5/16 ID or larger) to the Dual cartridge mixer prepared in step 0 above, and secure the end of the static mixer in the central injection port. The tip can be secured by pressure so the conical surfaces of the injection port and static mixer seal.
g. Inject the mixture at approximately 60 psi until it is seen venting from all four vent ports.
h. Stop injection and remove the static mixer.
i. Approximately 20 g of the mixture will completely fill the mold.
j. Allow it to cure for at least 4 hours at room temperature or 30 minutes at 100° C.
k. Demold the Ectopics and trim all flashing. Transfer to next step (Assembly of Ectopic Pregnancies)

1. Final Assembly of General Uterine Assembly
a. Attachment of Velcro to Perineum
  i. Cut sections of 2" wide white female Velcro to approximately ½" longer than the height of the outer perineum wall where the piece is to be glued.
  ii. Trim the edges of the Velcro section to match the curvature of the perineum where the piece is to be glued.
  iii. Apply Loctite 770 Primer to the outer perineum walls.

iv. Apply a thin layer of Loctite 401 cyanoacrylate adhesive to the smooth side of the Velcro sections.
v. Attach the Velcro sections to the outer perineum walls in their corresponding locations.
vi. Trim any remaining Velcro such that the superior edge sections are flush with the planar surface of the perineum.
b. Attachment of Bladder to Perineum
   i. Clean the urethral end of the bladder and its corresponding attachment point in the anterior perineal cavity with isopropyl alcohol to remove any contaminants.
   ii. Dispense a small volume of silicone from that prepared in Section 0 into a beaker, and with a spatula, apply a small amount of the silicone around the urethral end of the bladder up ¼" from tip. Also apply a small amount of silicone to the attachment point on the perineum. Ensure that the urethral opening is not blocked with silicone.
   iii. Insert the urethral end of the bladder into the attachment point with the ureters facing backwards and wrapping around the vagina.
   iv. Using a heat gun, apply heat to the joint area until the silicone is cured.
c. Attachment of Uterus to Vagina
   i. Clean the cervical flange of the uterus and the vaginal flange at the superior end of the vagina with isopropyl alcohol to remove any contaminants.
   ii. Dispense a small volume of silicone from that prepared in Section 0 into a beaker, and with a spatula, apply a thin layer of silicone around the inner surface of the cervical flange on the uterus below the step and around the outer surface of the vaginal flange above the step.
   iii. With the uterus positioned in the correct anatomical location (fundus of the uterus superior to the bladder), carefully join the inner surface of the cervical flange around the outer surface of the vaginal flange so that the end of the vagina coincides with the step of the cervical flange.
   iv. Using a heat gun, apply heat to the joint area until the silicone is cured.
d. Attachment of Ligaments
   i. Uterosacral Ligaments
      1. Prepare a 10 g sample of Dragonskin 10 Medium silicone (equal parts of A and B without pigment).
      2. Apply a thin layer of silicone to the underside of the uterosacral ligaments.
      3. Fold them downwards onto the vagina so that the inner edge of the ligament coincides with the edge of the vaginal supporting wall of the perineum.
      4. Using hemostats, hold the ligaments in place while slowly applying heat with a heat gun held approximately 12" away from the ligaments to avoid melting the ligament material until the silicone is cured.
   ii. Cardinal and Round Ligaments
      1. Locate the depression in the outer perineal walls that coincides with the ischial spine of the manikin. Apply Loctite 770 primer to four points on the inner perineal walls just below the edge of the planar surface approximately ½" inch anterior and ½" posterior to the depression on the left and right sides of the perineum.
      2. Apply 1-2 drops of Loctite 401 cyanoacrylate adhesive to the ends of the cardinal ligaments. Press the ends of the cardinal ligaments onto the area of the perineum posterior to the ischial depression where primer was applied.
      3. Repeat Step 2 for the round ligaments, however they should be glued to the area of the perineum anterior to the ischial depression where primer was applied.
e. Attachment of the Peritoneum
   i. Using a hole punch, open two ¼" holes in the peritoneum at the points where the IP ligaments and associated vasculature exit the fundus of the uterus.
   ii. Slide the peritoneum over the uterus. Pass the IP ligaments, blood vessels, and ovaries through the respective holes in the peritoneum.
   iii. Apply Loctite 770 primer to the following surfaces of the perineum/peritoneum and their corresponding surfaces on the perineum/peritoneum:
      1. The circumference of the planar surface of the perineum anterior to the round ligaments.
      2. The inner vertical surfaces of the posterior peritoneum flaps
      3. The anterior junction of the vagina and uterus.
   iv. Apply one drop of Loctite 401 cyanoacrylate adhesive to the anterior junction of the vagina and uterus. Press the matching point of the peritoneum down to glue it to the junction.
   v. Apply a thin layer of Loctite 401 to the circumference of the planar surface of the perineum anterior to the round ligaments. Press the matching surface of the peritoneum down to glue it to the perineum.
   vi. Prepare a 10 g sample of Dragonskin 10 Medium silicone (equal parts of A and B without pigment).
   vii. Apply a small amount of the silicone to the full length of both sides of the round ligaments. A syringe may be used to aid in this step.
   viii. Position the round ligaments in the wings of the peritoneum. They can be secured in position using hemostats or other wide mouthed locking pliers while using a heat gun to cure the silicone.
   ix. Apply a small amount of silicone to the uterosacral ligaments up to the top of the vaginal supporting walls.
   x. Using hemostats, hold the peritoneum on top of the ligaments while slowly applying heat with a heat gun held approximately 12" away from the peritoneum to avoid melting the ligament material until the silicone is cured.
   xi. Apply a small amount of Loctite 401 to the inner vertical surfaces of the posterior peritoneum flaps. Press them onto the vertical surfaces of the vaginal supporting walls to glue them in place.
2. Manufacture of Dermoid Cyst, Simple Cyst, and Endometrioma
   a. Manufacture Internal Membrane:
      i. Clean the mold to remove any dirt and debris, and apply mold release.
      ii. Secure a static mixer (24 element, 5/16 ID or larger) to the Dual cartridge mixer prepared in step 0 above.
      iii. Inject the mixture at approximately 60 psi so that it coats the top surface of the sphere. Rotate the sphere by hand so that the silicone coats the side and bottom surface. Make sure no voids exist.
      iv. Stop injection, and allow the mold to sit on its base until a uniform silicone thickness is created as it settles.
      v. Transfer to an oven set to 100° C. for 30 minutes.

vi. Demold the globe and trim the bottom, open end so that it is flat.
b. Manufacture of filling
   i. Dermoid Cyst
      1. Prepare fat mixture by blending 59.2 g of Soma Foama Part A, add 308 g of TC 5005 C, add 0.1 g of Silc Pig White, add 0.2 g Silc Pig Yellow. Blend until it is a uniform color, and add 29.6 g of Soma Foama Part B. Continue to mix until material begins to foam and set.
      2. Cut segments of the silicone foam prepared above (approximately 1"×1"×1") and place them within the Internal Membrane prepared above.
      3. Cut segments of hair from a synthetic wig and place them within the internal membrane.
      4. Prepare teeth mixture by blending 10 g of Smooth-Cast 305 Part A with 10 g of Smooth-Cast Part B, mixing, and pouring into a silicone glove mold. Allow teeth to cure for 1 hour at room temperature, demold, trim flashing, and place 5 teeth within the Internal Membrane.
      5. Add Olive oil to the internal membrane until the globe is completely filled.
      6. Add approximately 0.5 g of a silicone oil/silicone pigment blend (2:1 Silc Pig Blood:Silicone Oil)
   ii. Simple Cyst
      1. Fill Internal Membrane completely with Deionized water. Add approximately 0.5 g of Isopropanol and yellow food coloring to provide a pale yellow fluid.
   iii. Endometrioma
      1. Blend approximately 100 mL of fine saw dust with red food coloring, deionized water, and Corn Syrup until a red paste is formed.
      2. Tightly pack mixture within Internal Membrane
c. Seal the internal membrane by twisting the neck opening until it is sealed and secure it with a suture. Trim all excess silicone from the neck so it is flush with the suture.
d. Manufacture an External Membrane following the procedure outlined in Section 2.a, Manufacture of Internal Membrane.
e. Slide the External Membrane of the filled Internal Membrane so that the suture end of the Internal Membrane and the open end of the External Membrane line up. Leave this membrane open and transfer to next step (Assembly of Dermoid Cyst (Section 4.b))
3. Manufacture of Uterine Assembly 1
   a. Follow the procedures outlined in Section 4, using the Normal Uterine mold. During assembly of the Uterine mold, connect the venous bleeding to the ectopic pregnancy and uterine core using the following methods:
      i. Assembly of Ectopic Bleeding
         1. Cut the Ovarian Vein in the center so that it forms two separate tubes.
         2. Instead of placing the tubing from the right fallopian tube into the Uterine Core, splice it to the Ovarian Vein on the left of the uterus using silicone tubing (⅛" OD by 1/16" ID) to splice the two together.
      ii. Assembly of Bleeding Disorder
         1. Take the free end of the right half of the Ovarian Vein and feed it into the vacant Circular Channel on the right side of the Uterine Core.
   b. Assembly of Ectopic Pregnancy
      i. Punch a ⅛" hole in the right Fallopian Tube just proximal to the Fimbriae.
      ii. Slide the Ectopic Pregnancy over the Fimbriae and orient the hole in the ectopic over the punched hole in the Fallopian Tube.
      iii. Bond the Ectopic in place using a silicone adhesive.
4. Manufacture of Uterine Assembly 2
   a. Follow the procedures outlined in Section 4, using the Enlarged Uterine mold. During assembly of the Uterine mold, connect the venous bleeding to the ectopic pregnancy:
      i. Assembly of Ectopic Bleeding and Pregnancy
         1. Follow the procedures as outlined in Uterine Assembly 1
   b. Once Final assembly of the General Uterine Assembly is complete (Section 1), attach the Dermoid Cyst:
      1. Trim the External Neck of the Dermoid Cyst so that it is approximately 1 cm higher than the Inner Membrane.
      2. Spray both the left ovary and the open neck of the Dermoid Cyst liberally with mold release.
      3. Inject the silicone prepared in Section 0 above until it completely fills the open neck.
      4. Lay the ovary in the open neck so that approximately ½ of the ovary body is submerged within the silicone.
      5. Allow it to cure for approximately 3 hrs at room temperature, and trim all redundant material from around the ovary.
5. Manufacture of Uterine Assembly 3
   a. Follow the procedures outlined in the Fibroid Uterus section to make the Fibroid Uterus, and then follow the procedures as outlined in the General Uterine Assembly (Section 1) to create a final assembly prior to attachment of the Cyst and Endometrioma.
   b. Assembly of Simple Cyst
      i. Follow the procedures outlined above for Assembly of the Dermoid Cyst, also attaching it to the left ovary.
   c. Assembly of Endometrioma
      i. Follow the procedures above for the Dermoid Cyst, but attach it to the Right Ovary.
Manufacture of the Enlarged fibroid uterus:
   1. Pour 35 grams of platinum cured Dragon Skin® 10 part B into container.
   2. Add 2 drops of flesh skin pigmentation and two of old blood pigmentation Slic-Pig® into container.
   3. Pour 35 grams of platinum cured Dragon Skin® 10 part A into container.
   4. Mix generously to obtain a homogenous composition.
   5. Vacuum mixture to approximately 25 psi.
   6. Allow mixture to sit approximately 5 minutes in order to permit passage of entrapped air.
   7. Open valve and remove container from inside vacuum.
   8. Transfer mixture to syringe.
   9. Inject solution into mold element.
   10. Allow an hour prior to de-molding.
Manufacture of the blood-filled fibroid models:
   1. Pour 25 grams of platinum cured Dragon Skin® 10 part B into container.
   2. Add 2 drops of flesh skin pigmentation and two of old blood pigmentation Slic-Pig® into container.
   3. Pour 25 grams of platinum cured Dragon Skin® 10 part A into container.
   4. Mix generously to obtain a homogenous composition.
   5. Vacuum mixture to approximately 25 psi.
   6. Allow mixture to sit approximately 5 minutes in order to permit passage of entrapped air.
   7. Open valve and remove container from inside vacuum.
   8. Transfer mixture to syringe.
   9. Dispense solution half way onto open mold.

10. Fill nipple cavity with mixture and insert core into mold.
11. Allow an hour prior to de-molding.
12. Once fibroid shells are de-molded apply Sil-Poxy® silicone adhesive to inner wall of one of the pairs.
13. Place both sides or the pair of shells that conform one fibroid together allowing a small gap to produce an injection port for the blood like fluid, preferably but not limited to FD&C Red #40 granulated, OB Scientific, to be diluted with water.
14. Allow 10-15 minutes to allow the silicone adhesive to set and inject the blood like fluid into fibroid cavity.
15. Once fluid is topped then apply a thin film of the silicone adhesive to enclose fluid within the fibroid.

Manufacture of the Enlarged fibroid uterus with its fibroids:
1. Set both sides of mold open (cope and drag) and generously spray mold release, Mann Release Technologies®.
2. Use Vaseline to lubricate the fibroids thoroughly avoiding the nipple or attachment site.
3. Place all intramural fibroids at their specify location in the mold and adhere them using some of the solution for the fibroid uterus (Dragon Skin® 10).
4. Place the subserosal fibroid in its specify mold location and drip silicone solution form fibroid uterus (Dragon Skin® 10) at perimeter or fillet found on mold to prevent air entrapment at this site.
5. Allow silicone to cure for approximately 30 minutes before proceeding.
6. Follow the allocation procedures for the enlarge uterus when placing the ovaries, fallopian tubes, ligament and alternate tubing.
7. Utilizing Vaseline lubricate fibroid uterus core and stem generously and place within the molds specify location.
8. Assemble mold carefully to avoid rupturing of the blood-filled fibroids.
9. Inject mold using the formulated silicone mixture for the enlarge uterus until flashing is seen.
10. DO NOT place in oven.
11. Allow 2 hours before de molding.

Manufacture of the Bowel Insert:
1. Prepare cartridge with 200 grams of platinum cured Ecoflex® 30 part B into container.
2. Add 2 dropper of old blood pigmentation Slic-Pig® into container.
3. Pour 200 grams of platinum cured Ecoflex® 30 part A into container.
4. Vacuum cartridge to approximately 25 psi.
5. Allow mixture to sit approximately 5 minutes in order to permit passage of entrapped air.
6. Open valve and remove container from inside vacuum.
7. Dispense cartridge into open mold at approximately 40 psi.
8. Shut system once flashing is seen at cups
9. System can be placed in 66° oven to accelerate the curing process.
10. Allow two hour prior to de-molding.
11. Once bowels are de-molded allow 10-15 minutes to cool down before proceeding to the makeup enhancement steps.

Example of the Bowel System Makeup Enhancement:
1. Sponge on off white Slic-Pig® all throughout the bowel silicone model.
2. Allow 10-15 minutes at minimum before proceeding to the following step in order to allow proper material curing time.
3. Use an open paintbrush to brush on the perimeter and curvature of the bowels diluted pigment of old blood Slic-Pig®.
4. Mix in 3 parts of yellow and 1 part of old blood Slic-Pig® in order to produce the fat coloring that should resemble that of a standard human (or close to a mustard like color.)
5. Pour fat mixture into syringe and dispense at fat sites evenly and generously.
6. Mix in one part of old blood and one part of red Slic-Pig® in order to obtain a fresh blood like color and mix in with Fumed Silica powder and/or stretched cotton strands in order to produce tissue alike consistency and apply in an irregular pattern throughout the geometry and perimeter of the organ.
7. Using the same solution to create the fresh blood-like color brush on at uneven sites to produce an asymmetrical appearance.
8. Allow 15-20 minutes before proceeding to the other side to permit the silicone paint to fully cure.
9. Turn bowel system on its opposite face and repeat steps 1 through 8.

Figure 155:
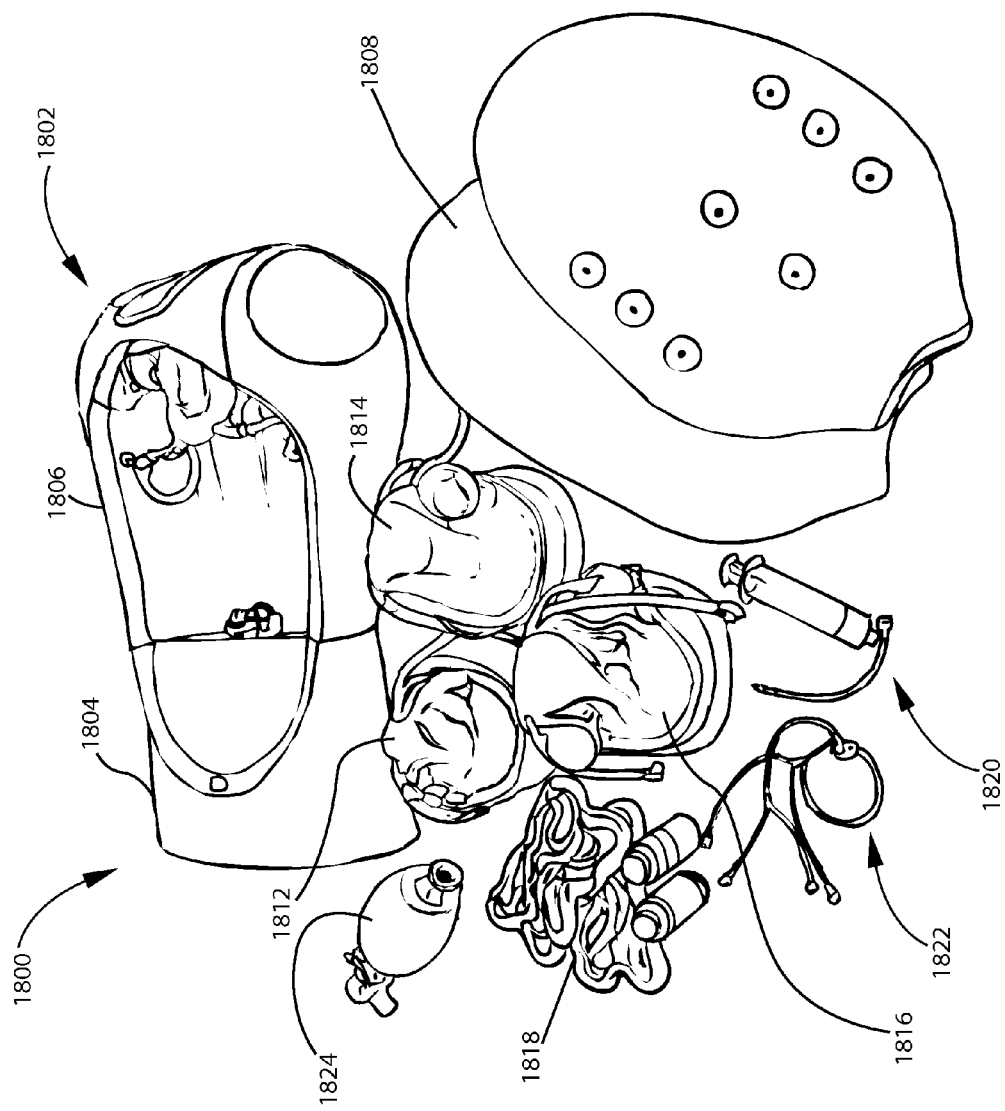
FIG. 155 is a perspective view of a surgical patient simulator kit according to an embodiment of the present disclosure.

Referring now to FIG. 155, shown therein are aspects of a surgical patient simulator kit 1800 according to an embodiment of the present disclosure. As shown, the surgical patient simulator kit 1800 includes a torso 1802 having an upper torso portion 1804 that includes the fluid reservoirs and pneumatic and fluid valve system and a lower torso 1806 that includes a lighting system, air reservoirs, pneumatic and fluid valve system, ovarian artery and vein connections, and uterine artery and vein connections. In some implementations, the torso 1802 includes the pneumatic fluid control system of FIG. 156. The kit 1800 also includes a laparotomy abdominal cover 1808 including a multi-layer abdominal insert such as those described in U.S. Provisional Patent Application No. 61/591,748, filed on Jan. 27, 2012, which is hereby incorporated by reference in its entirety. The kit 1800 also includes a laparoscopy abdominal cover 1810 including a plurality of pre-placed ports (e.g., between one and sixteen ports, with eight in the illustrated embodiment). The kit 1800 also includes three uterine assemblies 1812, 1814, and 1816 and a bowel insert 1818, such as those described above. A blood filling system 1820 and a blood drainage system 1822 are also provided with the kit 1800. Further, the kit 1800 includes a manual air pump 1824.

The foregoing outlines features of several embodiments so that those skilled in the art may better understand the aspects of the present disclosure. Those skilled in the art should appreciate that they may readily use the present disclosure as a basis for other devices that simulate natural biological tissue, including human tissue. In particular, the materials and methods of the present disclosure may be readily used in any application where the simulation of human skin, with or without underlying tissue structures, is desired. Such applications include, but are not limited to, manikins, sex toys, puppets, costumes, medical training devices, forensic training devices, and/or other devices. In that regard, the methods described above for manufacturing the inserts and assemblies of the present disclosure may similarly be used with molds configured to make other simulated human body portions, including any part or portion of the body having skin (e.g., arms, legs, hands, feet, torso, head, male genitalia, and portions thereof) as well as internal structures (e.g., heart, liver, kidneys, pancreas, stomach, colon, bladder, female genitalia, other internal organs, and portions thereof). Those skilled in the art should also realize that such equivalent constructions do not depart from the spirit and scope of the present disclosure, and that they may make various changes, substitutions, and alterations to the embodiments disclosed herein without departing from the spirit and scope of the present disclosure. Also, it will be fully appreciated that the above-disclosed features and functions, and variations thereof, may be combined into other methods, systems, apparatus, or applications.

One purpose of the inventive materials and methods described herein is the production of simulators for use in medical procedure and examination technique training. Other uses contemplated, however, include any application that requires the feel and appearance of animal tissue, especially human tissue. Such applications include, without limitation, puppets, taxidermy, robotics, forensic simulation, and sex toys.

Persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A surgical simulator, comprising:
   a uterine assembly simulating the appearance and feel of natural tissue, the uterine assembly including a plurality of materials arranged and dimensioned to simulate at least the following anatomic structures:
   a right fallopian tube,
   a left fallopian tube,
   a right ovary,
   a left ovary,
   a uterus having a cervix,
   a bladder,
   ureters,
   a peritoneum,
   a uterine artery,
   a uterine vein,
   a plurality of ligaments,
   an ovarian artery,
   an ovarian vein,
   a perineum, and
   a vagina;
   wherein at least the uterine artery, uterine vein, ovarian artery, and ovarian vein are in communication with a fluid supply such that each is pressurized with a blood-like fluid to simulate natural arteries and veins.

2. The surgical simulator of claim 1, wherein the uterine assembly is sized and shaped to be received within a pelvic opening of a manikin.

3. The surgical simulator of claim 2, wherein the manikin comprises a torso.

4. The surgical simulator of claim 3, wherein the manikin further comprises arms, legs, and a head coupled to the torso.

5. The surgical simulator of claim 1, wherein the plurality of ligaments comprise a round ligament, a uterosacral ligament, and a infundibulopelvic ligament.

6. The surgical simulator of claim 1, wherein each of the right and left fallopian tubes include fimbriae at a free end not connected to the uterus.

7. The surgical simulator of claim 1, wherein the uterus is sized and shaped to simulate a normal human uterus.

8. The surgical simulator of claim 1, wherein the uterus is sized and shaped to simulate an enlarged human uterus.

9. The surgical simulator of claim 1, wherein the uterus is positioned in an anteverted position.

10. The surgical simulator of claim 1, wherein the uterus is positioned in a retroverted position.

11. The surgical simulator of claim 1, wherein at least one of the left and right fallopian tubes includes a simulated ruptured ectopic pregnancy.

12. The surgical simulator of claim 11, wherein the simulated ruptured ectopic pregnancy is in communication with the fluid supply such that the ruptured ectopic pregnancy simulates bleeding.

13. The surgical simulator of claim 1, further comprising a shunt between a uterine cavity and at least one of the uterine vein and ovarian vein such that when fluid flows through the at least one uterine or ovarian vein the fluid will pool within the uterine cavity and flow out from the vagina simulating hemorrhaging.

14. The surgical simulator of claim 1, wherein the uterine assembly is configured to facilitate training and assessment of one or more of the following procedures:
   diagnosing and treating a ruptured ectopic pregnancy;
   performing a dilatation and curettage;
   diagnosing and treating a bleeding disorder;
   performing a bladder repair, and
   performing a vaginal or abdominal hysterectomy.

15. The surgical simulator of claim 1, wherein the uterine artery and ovarian artery are in communication with a fluid supply that is separate from the fluid supply of the uterine vein and ovarian vein.

16. The surgical simulator of claim 15, wherein the fluid supply of the uterine artery and ovarian artery provides a pulsatile flow and the fluid supply of the uterine vein and ovarian vein provides a steady flow.

17. The surgical simulator of claim 16, wherein the fluid supply of the uterine artery and ovarian artery comprises a fluid-filled bag with an adjacent air bag, wherein the air bag is selectively inflated and deflated to control the flow of fluid through the uterine artery and ovarian artery.

18. The surgical simulator of claim 17, wherein the fluid supply of the uterine vein and ovarian vein comprises a fluid-filled bag with an adjacent air bag, wherein the air bag is selectively inflated and deflated to control the flow of fluid through the uterine vein and ovarian vein.

19. The surgical simulator of claim 18, further comprising at least one air compressor in communication with the air bags of the fluid supplies of the uterine artery and ovarian artery and the uterine vein and ovarian vein.

20. The surgical simulator of claim 1, further comprising a dermoid cyst formed on at least one of the left ovary and right ovary.

* * * * *